United States Patent [19]
Morley et al.

[11] 3,944,984
[45] Mar. 16, 1976

[54] COMPUTER CONTROLLER SYSTEM WITH A REPROGRAMMABLE READ ONLY MEMORY

[75] Inventors: Richard E. Morley, Mason, N.H.; Michael P. Greenberg, Winchester, Mass.

[73] Assignee: Modicon Corporation, Andover, Mass.

[22] Filed: Apr. 23, 1974

[21] Appl. No.: 463,281

[52] U.S. Cl............................ 340/172.5; 235/151.1
[51] Int. Cl.².................... G06F 15/46; G06F 9/16
[58] Field of Search.. 235/151.1; 340/172.5, 173 SP

[56] References Cited
UNITED STATES PATENTS

| | | | |
|---|---|---|---|
| 3,686,639 | 8/1972 | Fletcher et al.................. | 340/172.5 |
| 3,813,649 | 5/1974 | Struger et al.................. | 340/172.5 |

*Primary Examiner*—R. Stephen Dildine, Jr.
*Attorney, Agent, or Firm*—Mattern, Ware and Davis

[57] ABSTRACT

A miniaturized computer controller system utilizes reprogrammable "read only" ultraviolet memory chips instead of conventional core memories to store a control program comprising variable information regarding all electrical elements in all electrical circuit lines of the controller. The memory chips are reprogrammable within the controller and thus delicate removal of the chips for reprogramming is eliminated. The controller utilizes a central processor removably interfitting with a reprogramming module that also communicates with a programming panel.

When in a "monitor" mode, the programming panel, in conjunction with the reprogramming module, allows the operator to view any particular electrical circuit line while the controller is operating. A scroll switch on the programming panel further allows the operator to view sequentially higher or lower numbered electrical circuit lines while a trace switch provides for examining any electrical circuit line to which a currently viewed element is referenced.

When in a "program" mode, the programming panel, in combination with the reprogramming module, replaces the variable memory "read only" chips and allows the controller to continue operation while the operator is programming, adjusting, or de-bugging the electrical circuit lines. Following the programming of the electrical circuit lines with the desired electrical elements, the information regarding these lines is transferred to the reprogrammable "read only" memory chips when the programming panel is in a "write" mode. In this mode all the information previously stored in the memory chips is first erased by ultraviolet light, followed by the insertion of the new information regarding the electrical circuit lines.

Following the transferral of information to the memory chips, the reprogramming module is disconnected from the central processor and replaced by a removably interfitting power supply module, whereby the system operates with electrical circuit line information stored in the reprogrammable memory chips.

23 Claims, 104 Drawing Figures

FIG. 3
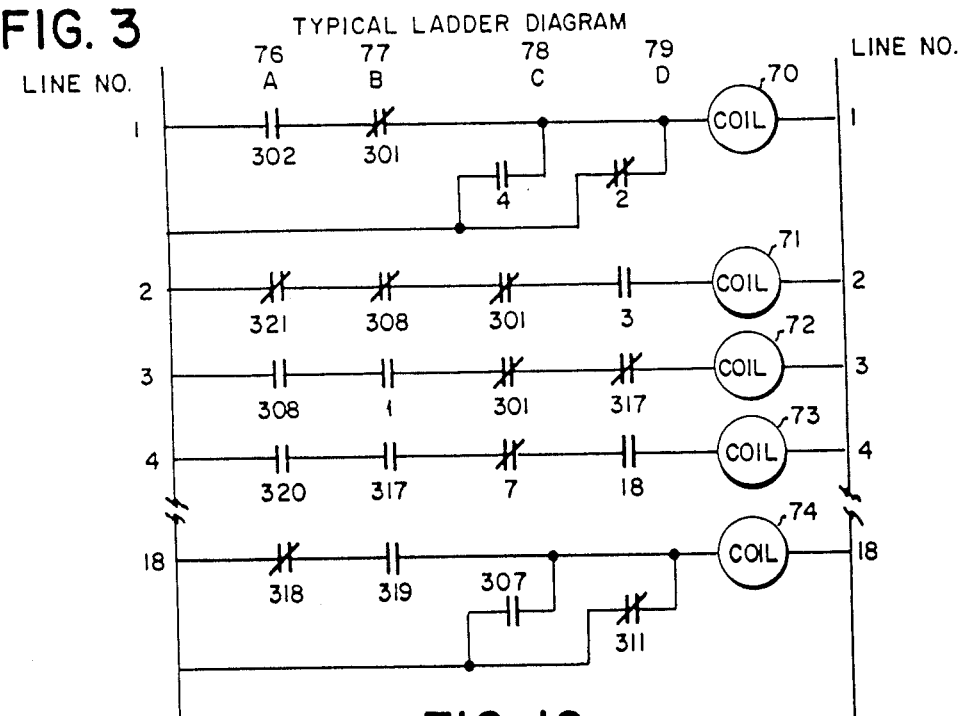
FIG. 10
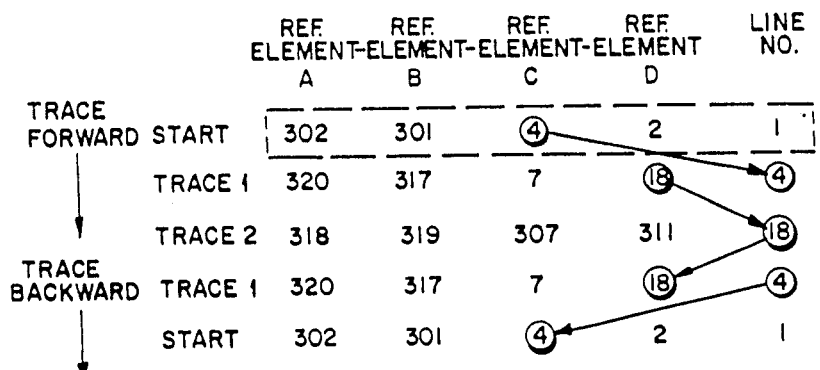
FIG. 11

FIG. 7A
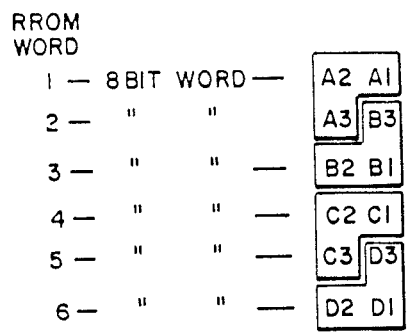
FIG. 7B
| | | | WORD (NODE) | |
|---|---|---|---|---|
| A3 | A2 | A1 | A | 12 BIT WORD |
| B3 | B2 | B1 | B | 12 BIT WORD |
| C3 | C2 | C1 | C | 12 BIT WORD |
| D3 | D2 | D1 | D | 12 BIT WORD |
FIG. 7D
ab
00 ─┤├─
01 ─┤├┬─
10 ─┤├┘─
11 ─┤├┬┘─
FIG. 7C
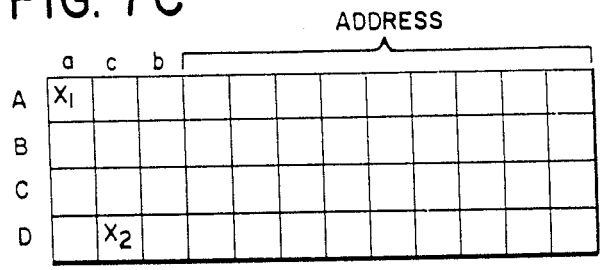
FIG. 7E
x₁ x₂
00 — DISABLE OFF
01 — DISABLE ON
10 — NORMAL
11 — DISABLE OFF
FIG. 4
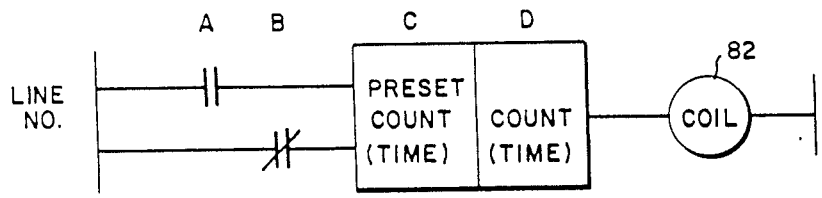
FIG. 9
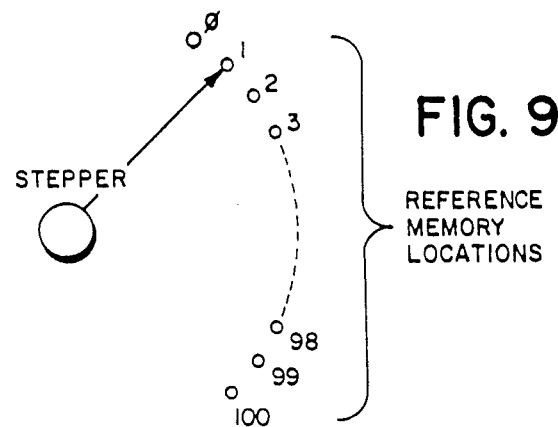

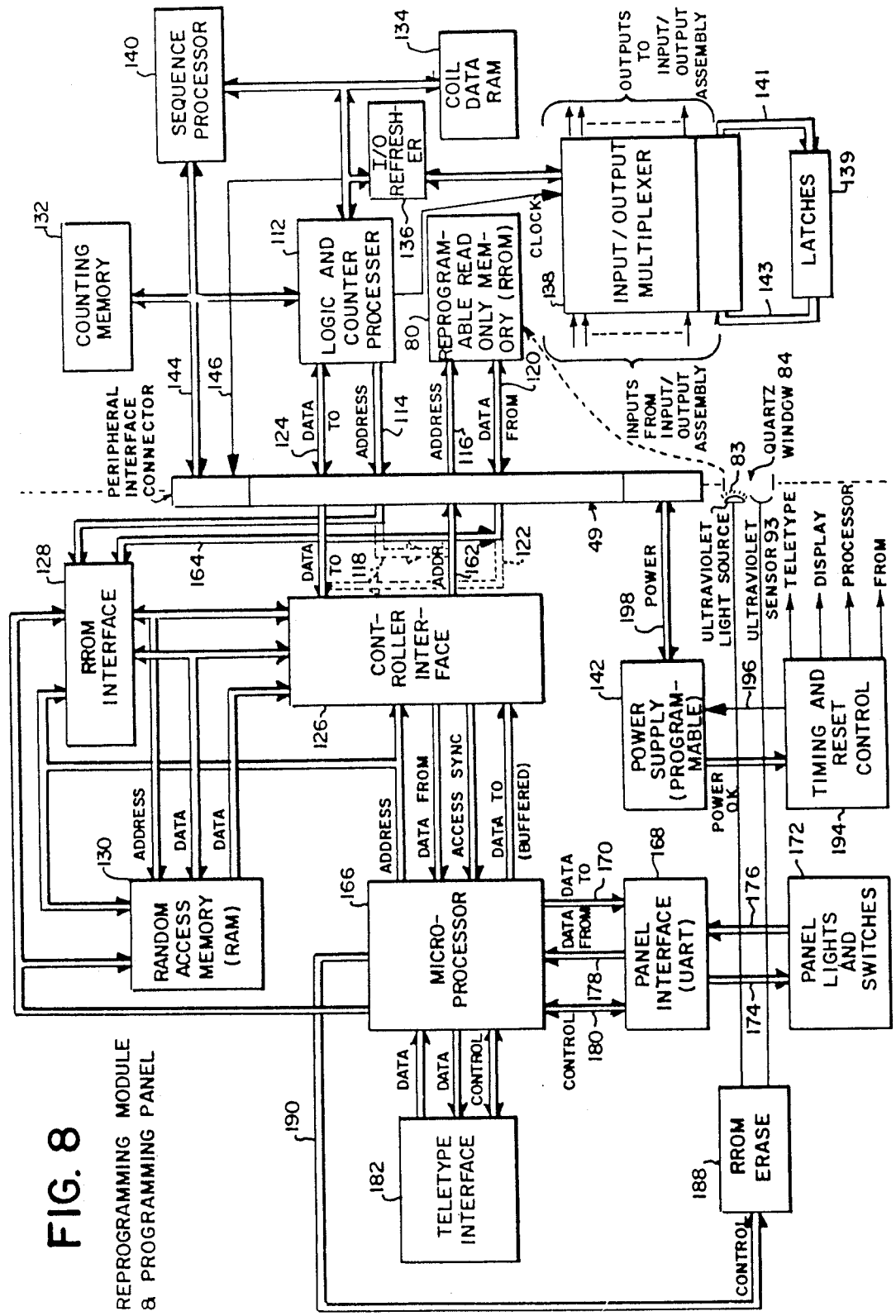

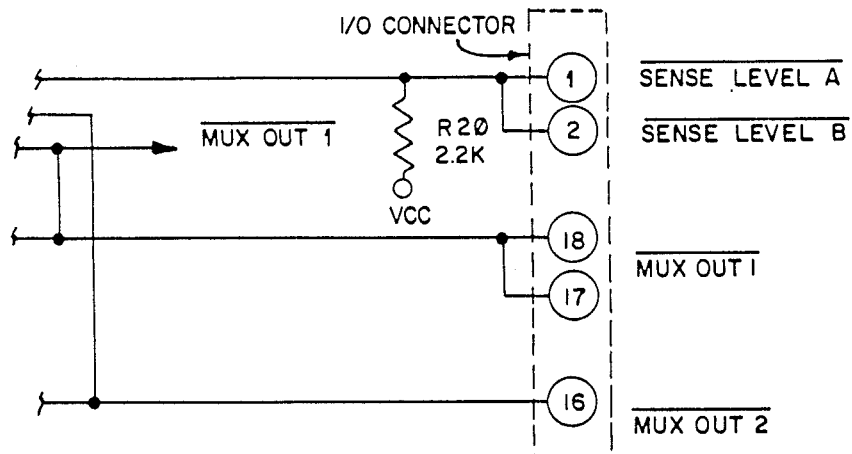
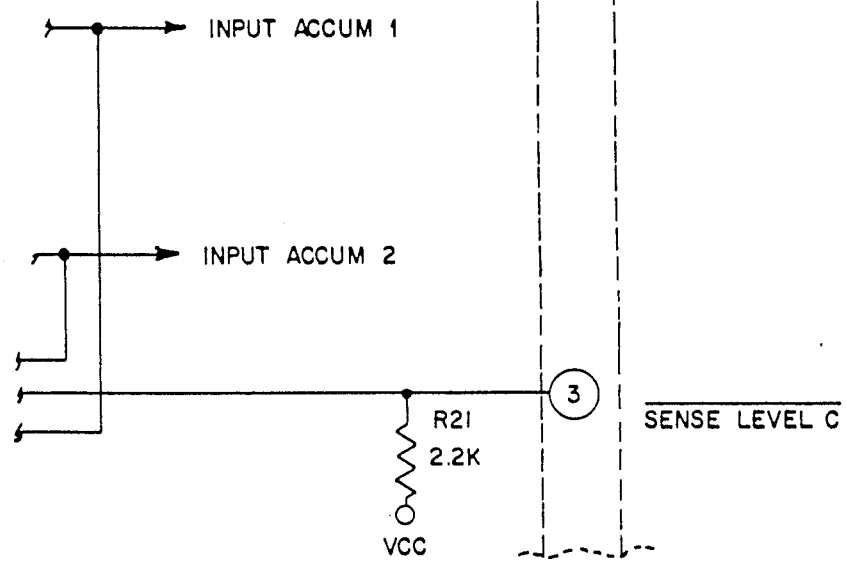
FIG. 13F

FIG. 14K

| FIG. 14A | FIG. 14B | FIG. 14C | FIG. 14D | FIG. 14E |
|---|---|---|---|---|
| FIG. 14F | FIG. 14G | FIG. 14H | FIG. 14I | FIG. 14J |

FIG. 15H

| FIG. 15A | FIG. 15B | FIG. 15C |
|---|---|---|
|  | FIG. 15E | FIG. 15F | FIG. 15G |

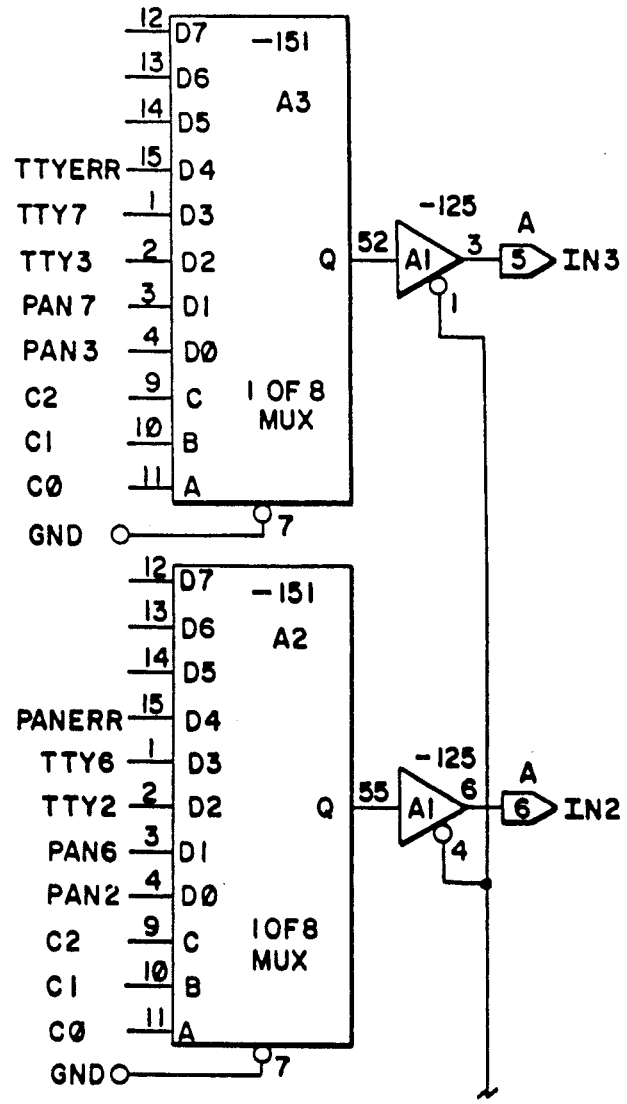

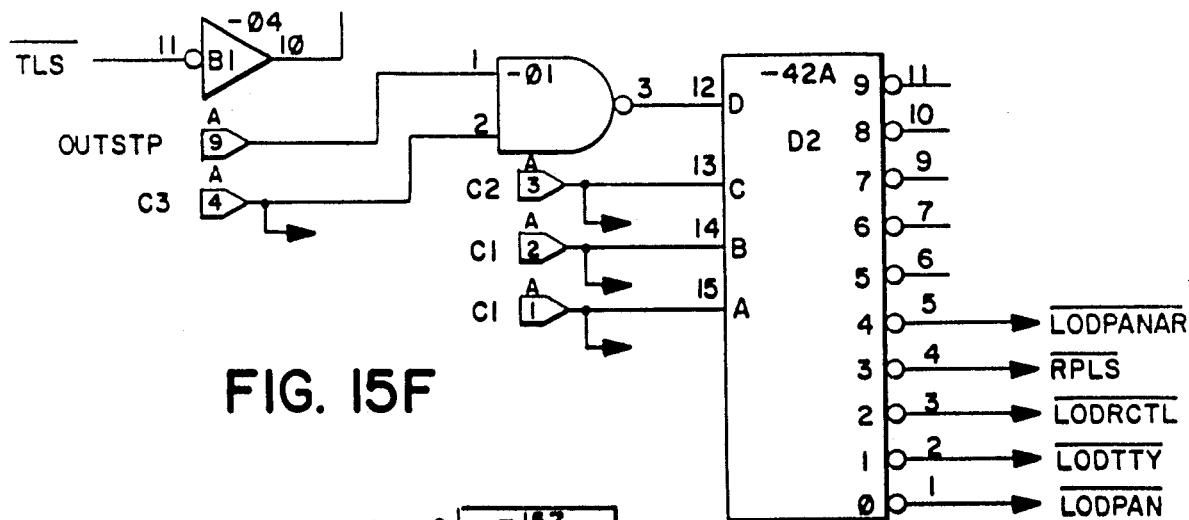
FIG. 15F
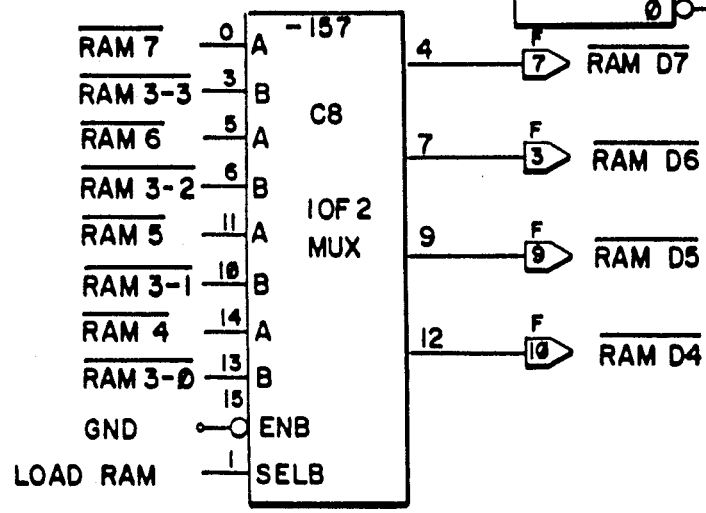
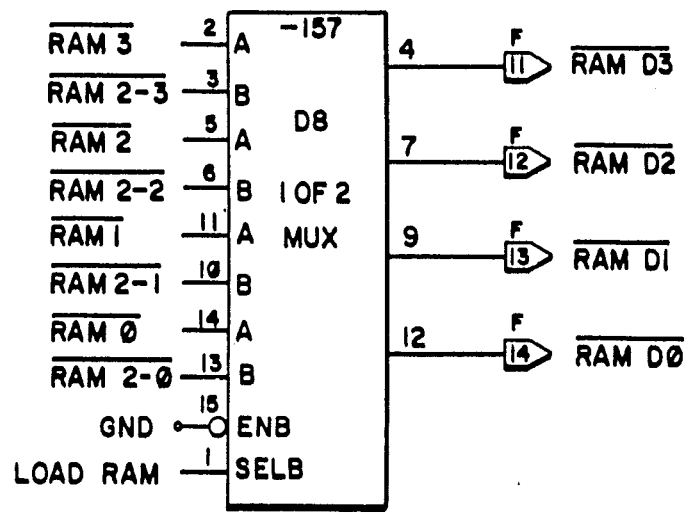

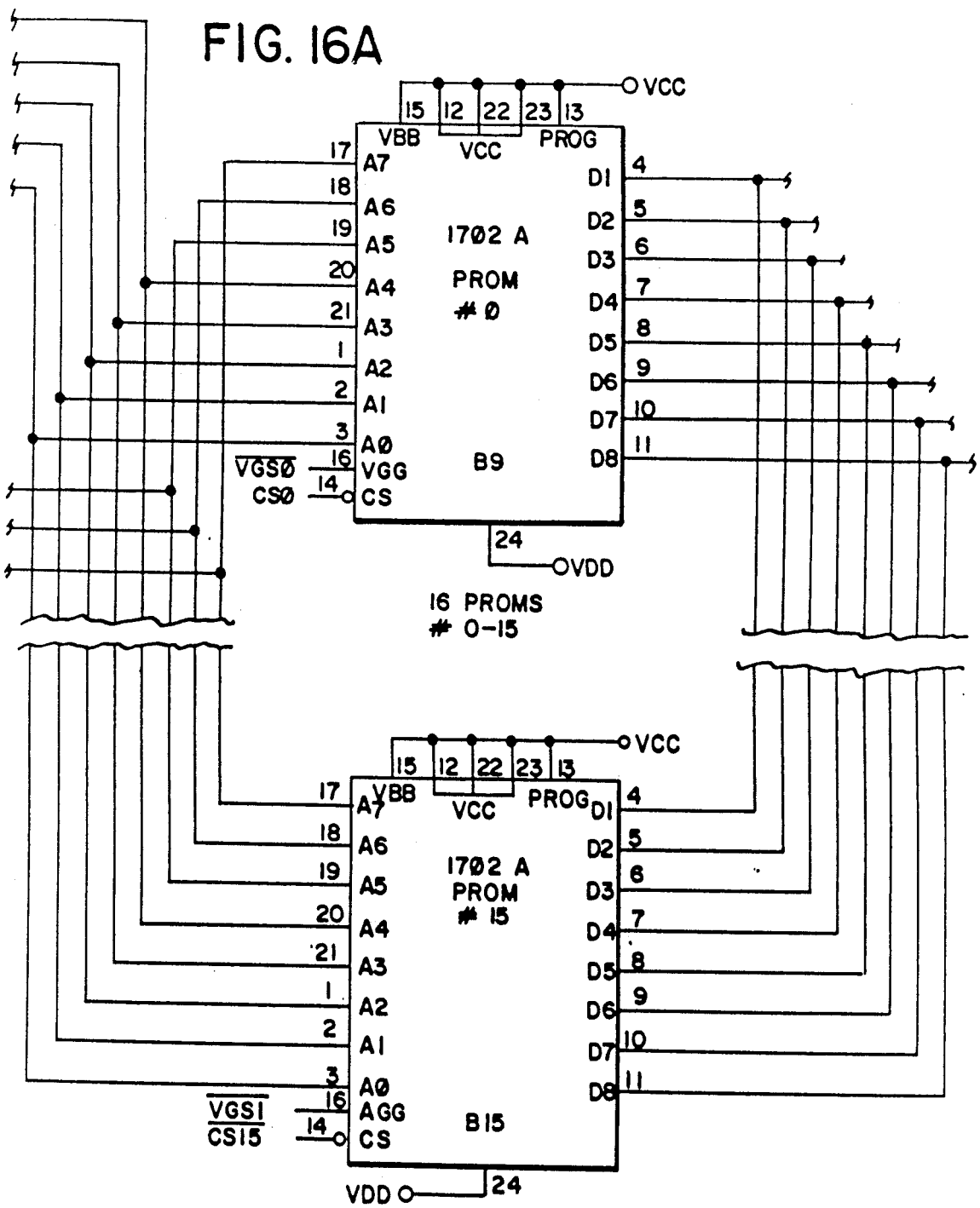

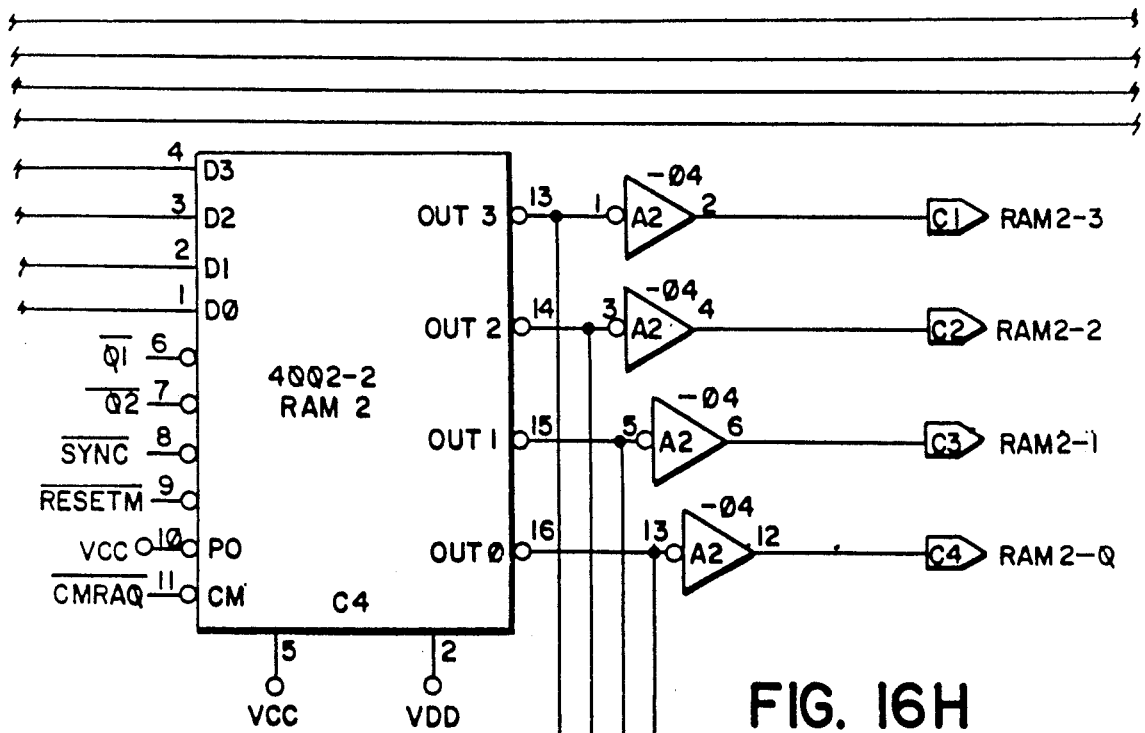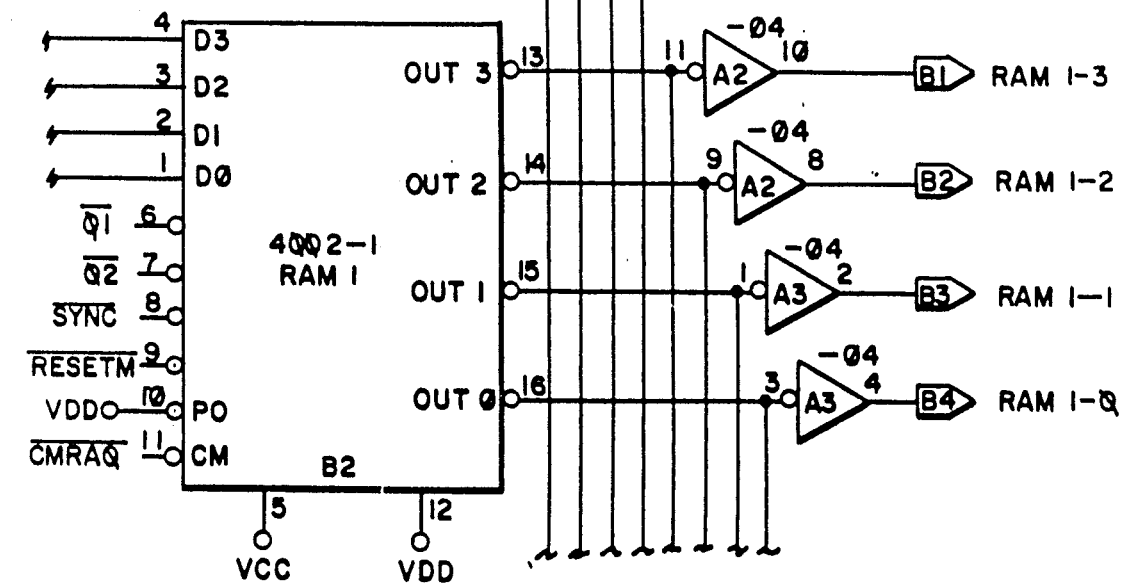
FIG. 16H

FIG. 16I
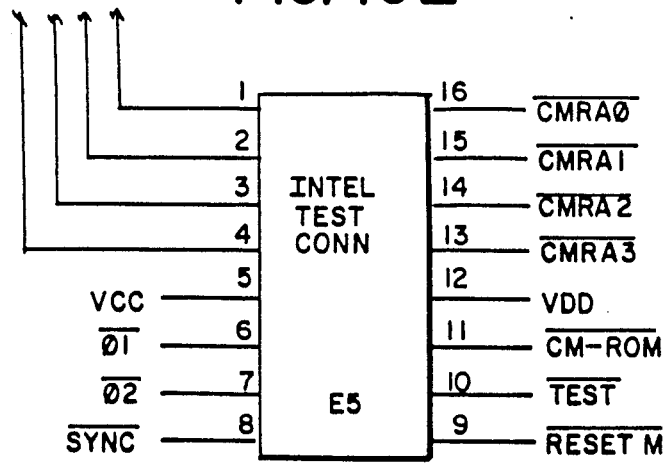
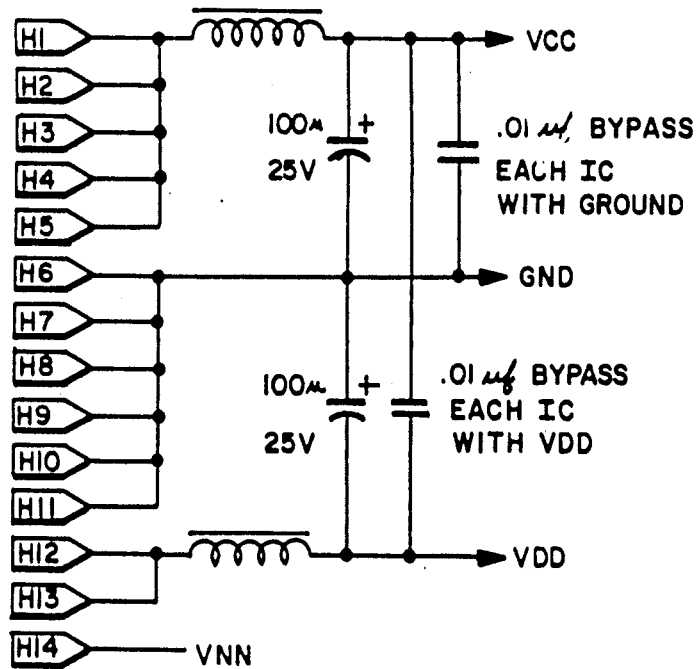

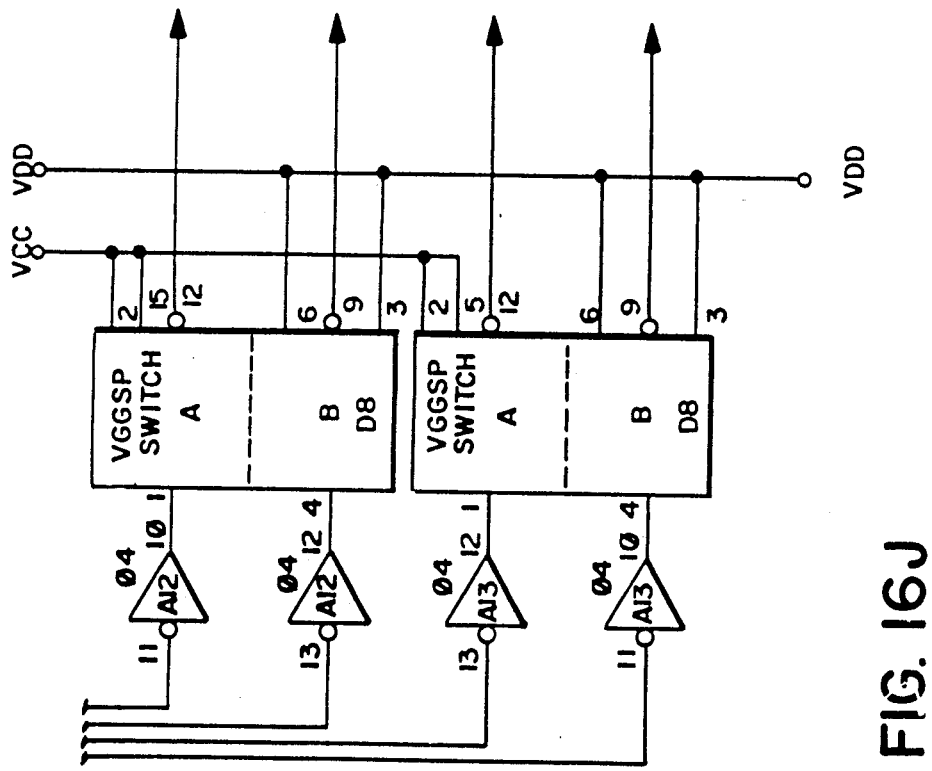
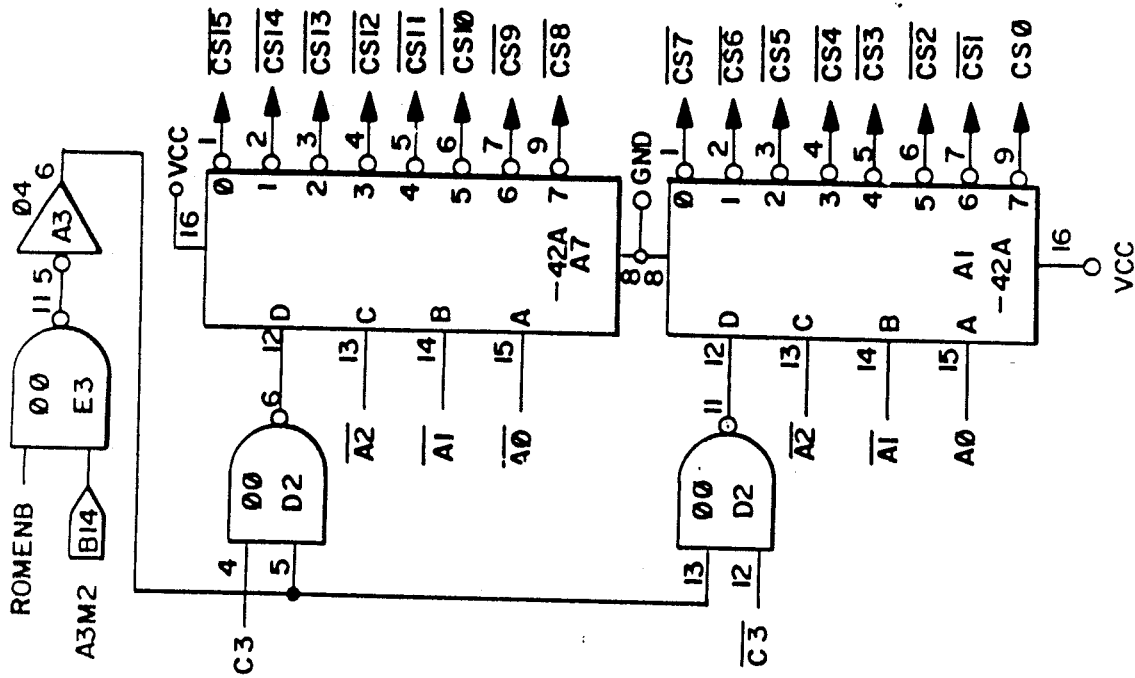
FIG. 16J

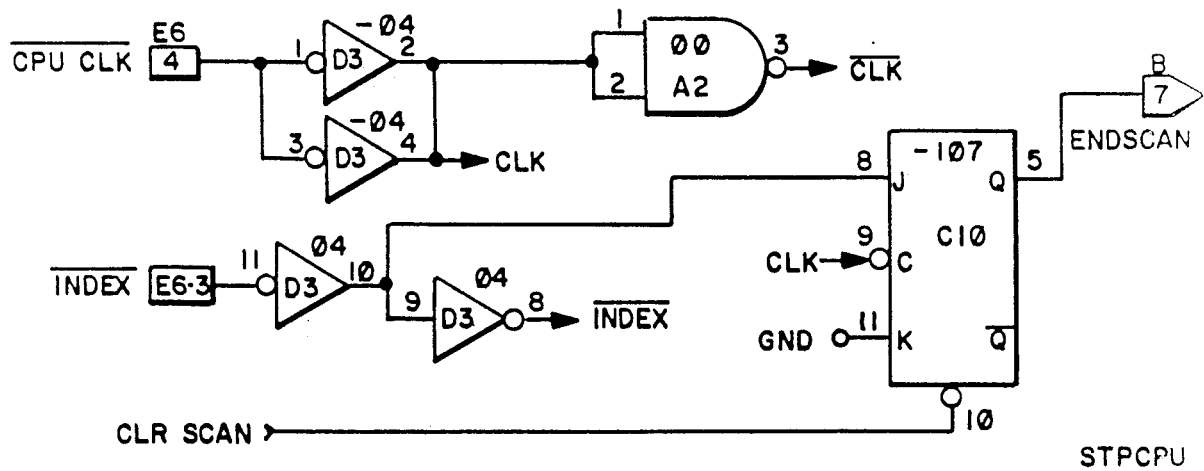
FIG. 17A
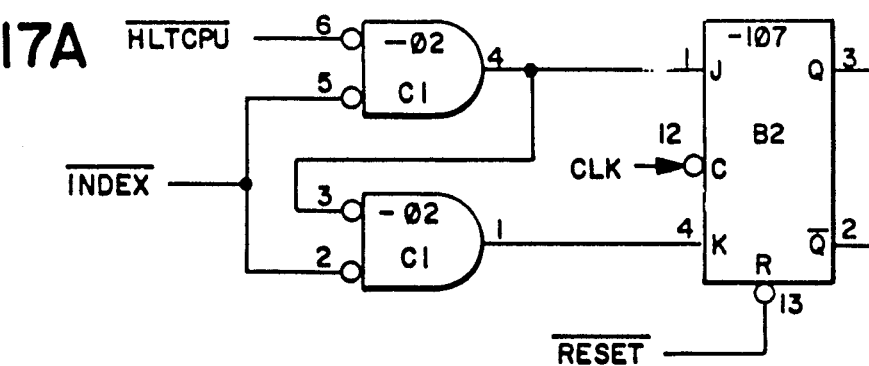
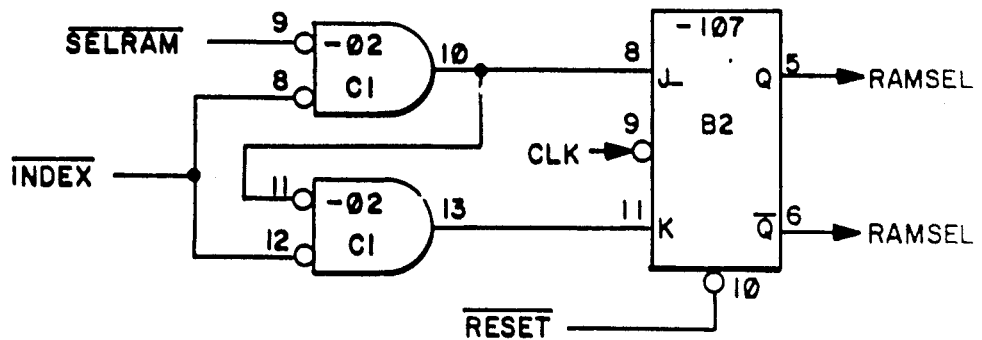

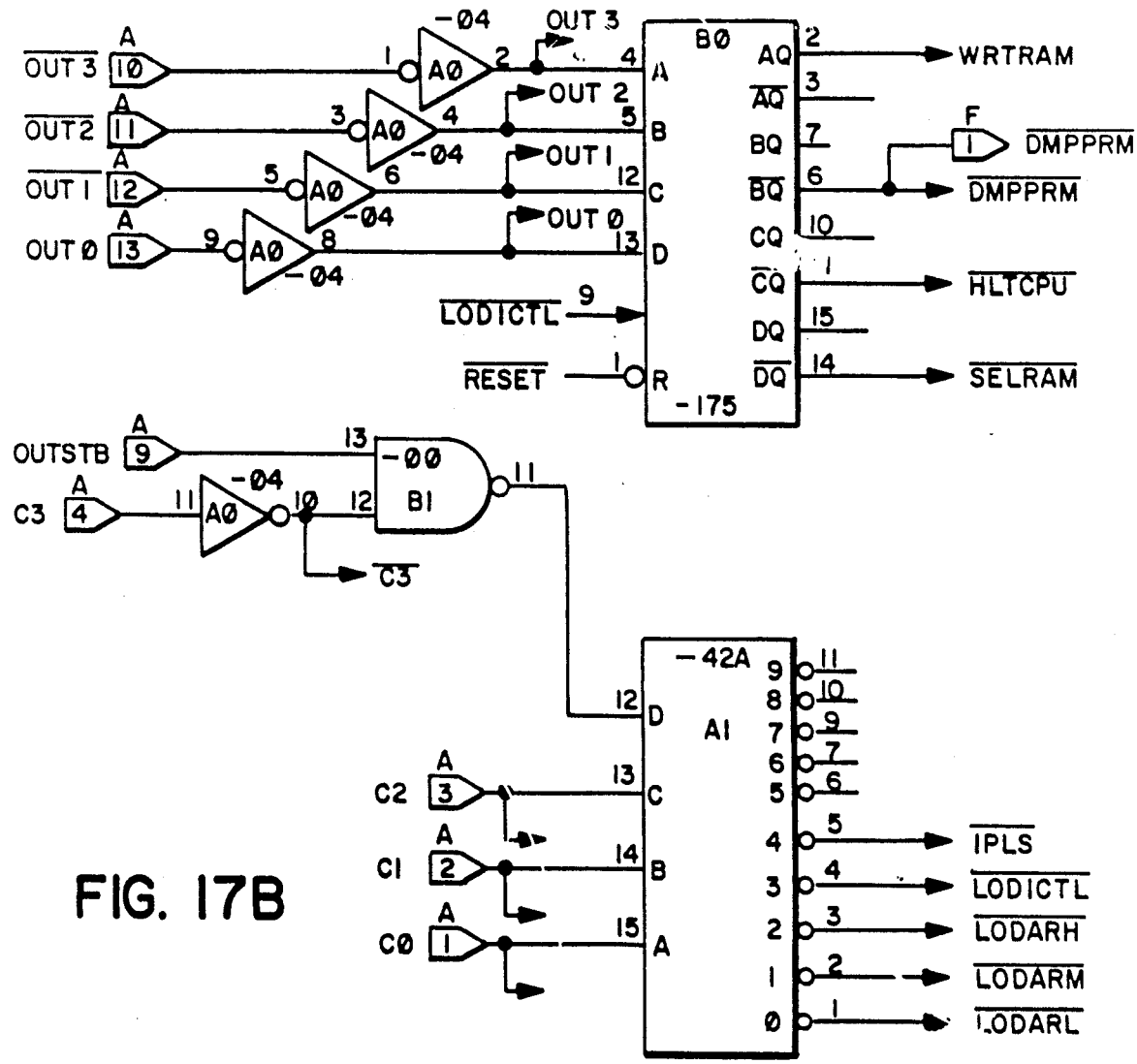
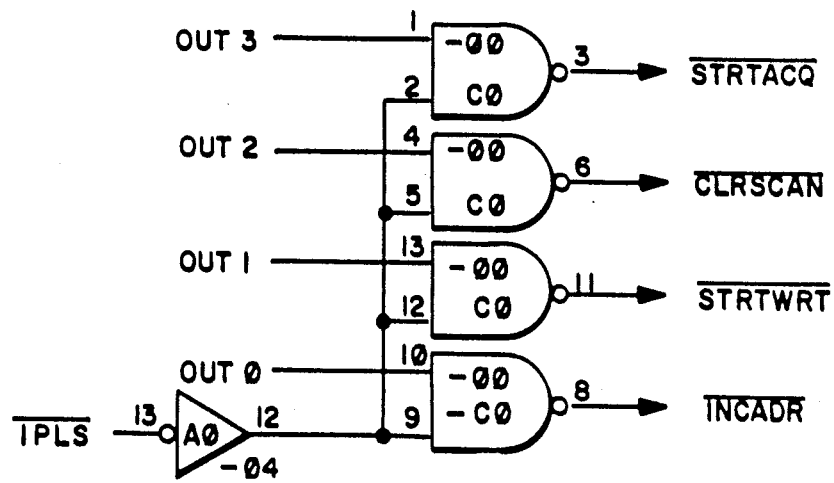
FIG. 17B

284 PROG PANEL
CPU INTERFACE A

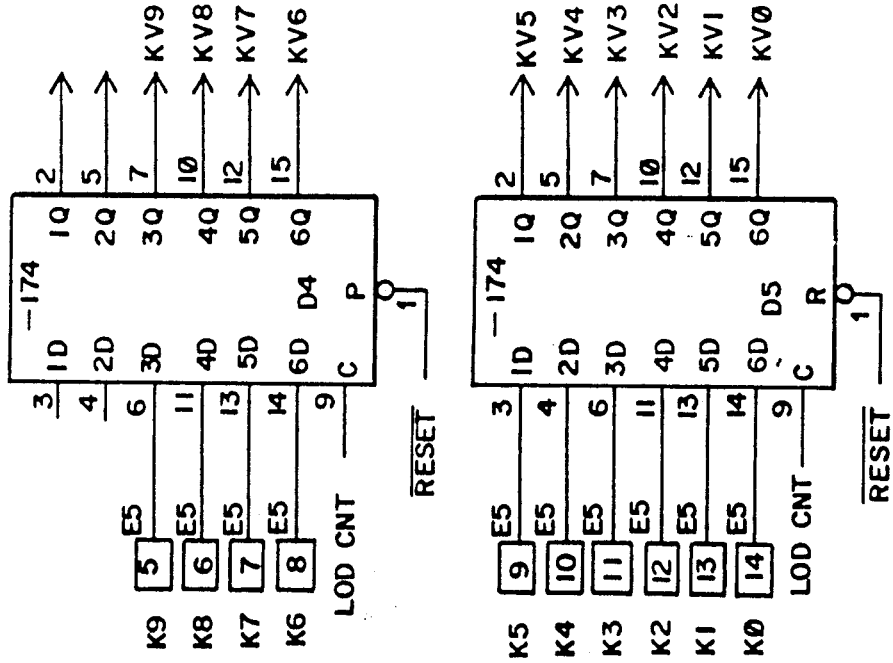
FIG. 18B
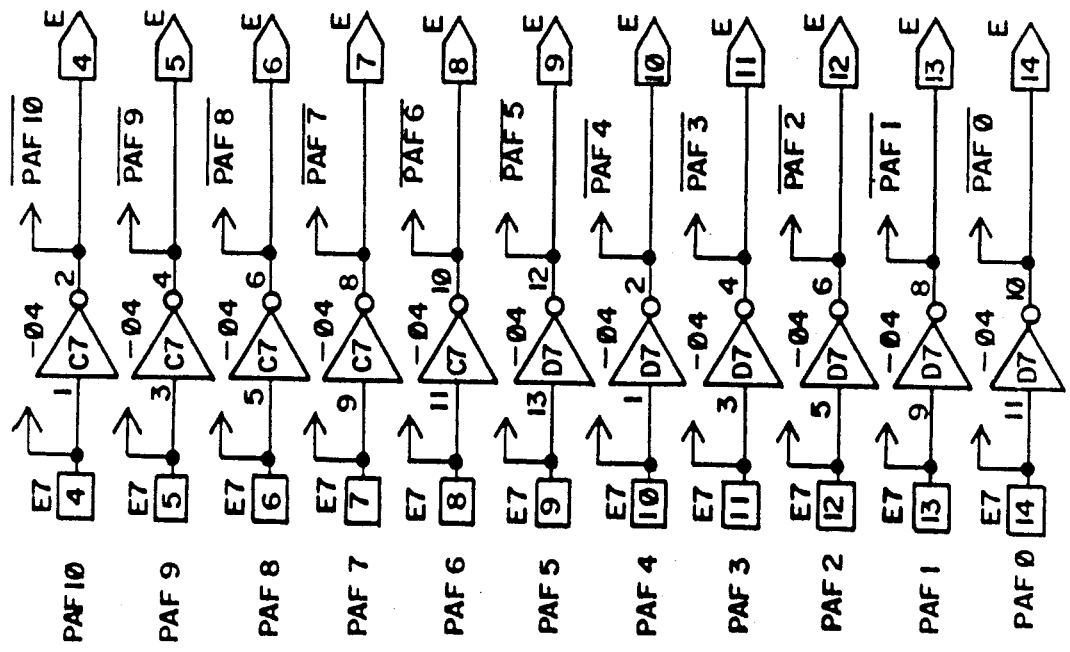

FIG. 18D
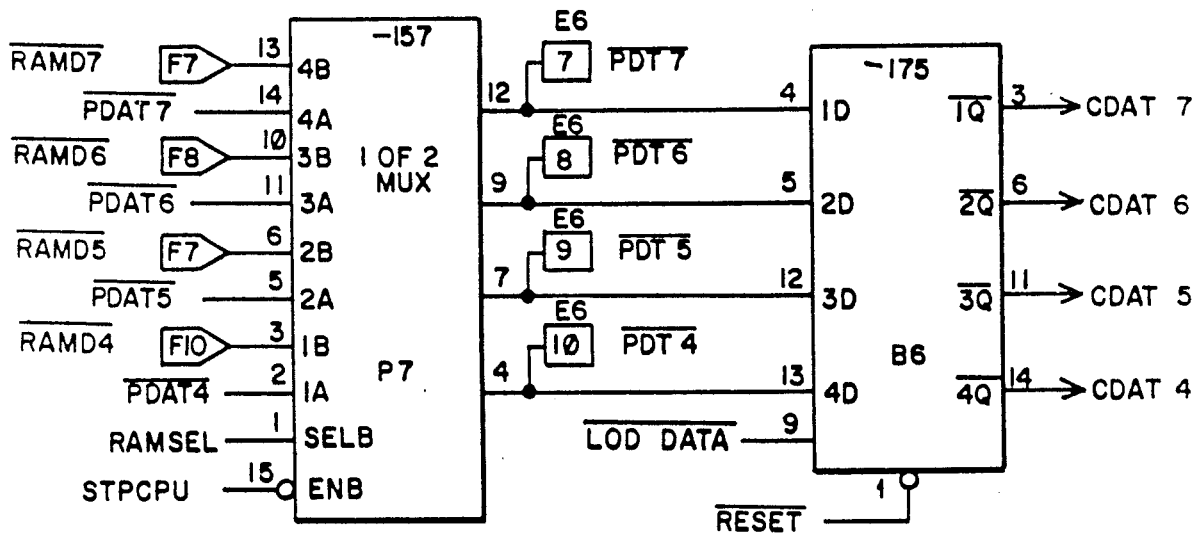
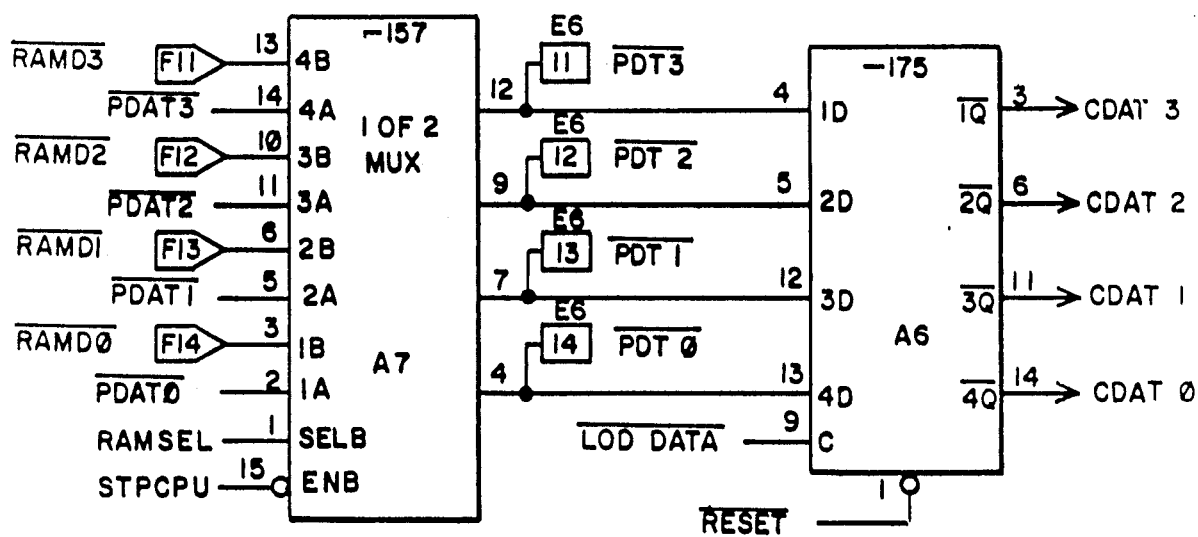

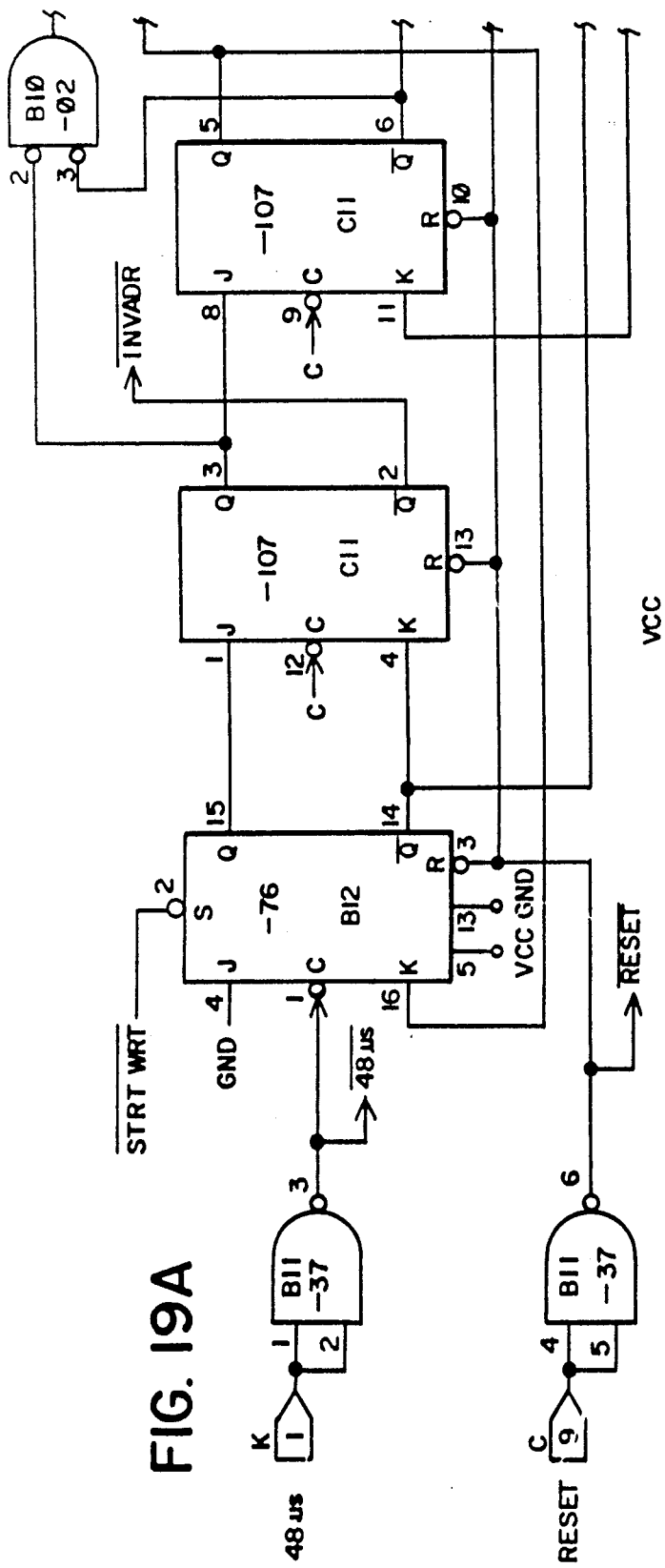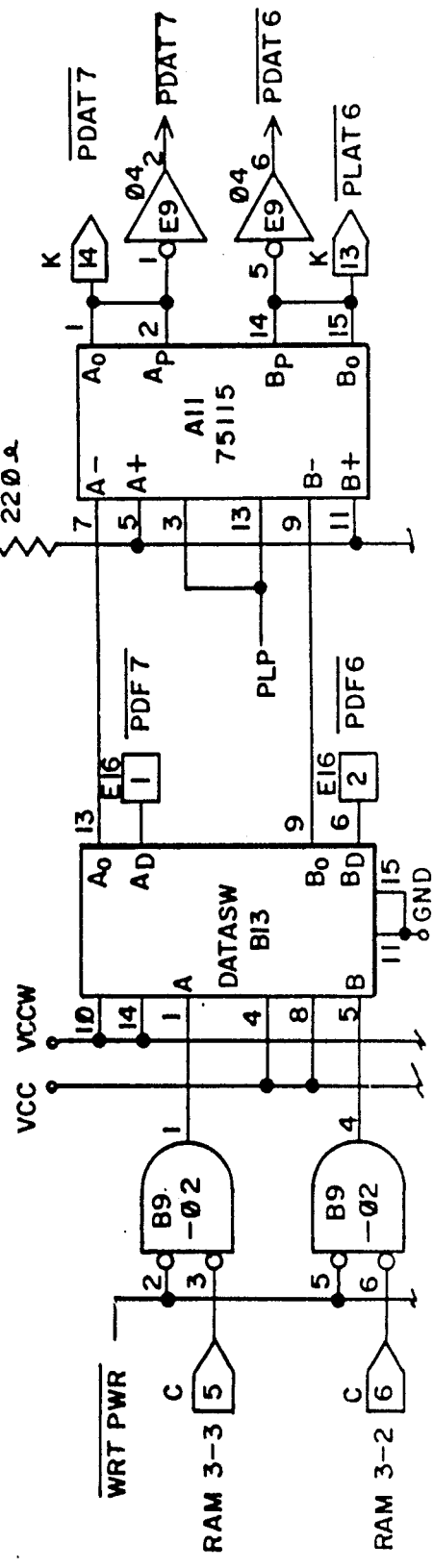
FIG. 19A

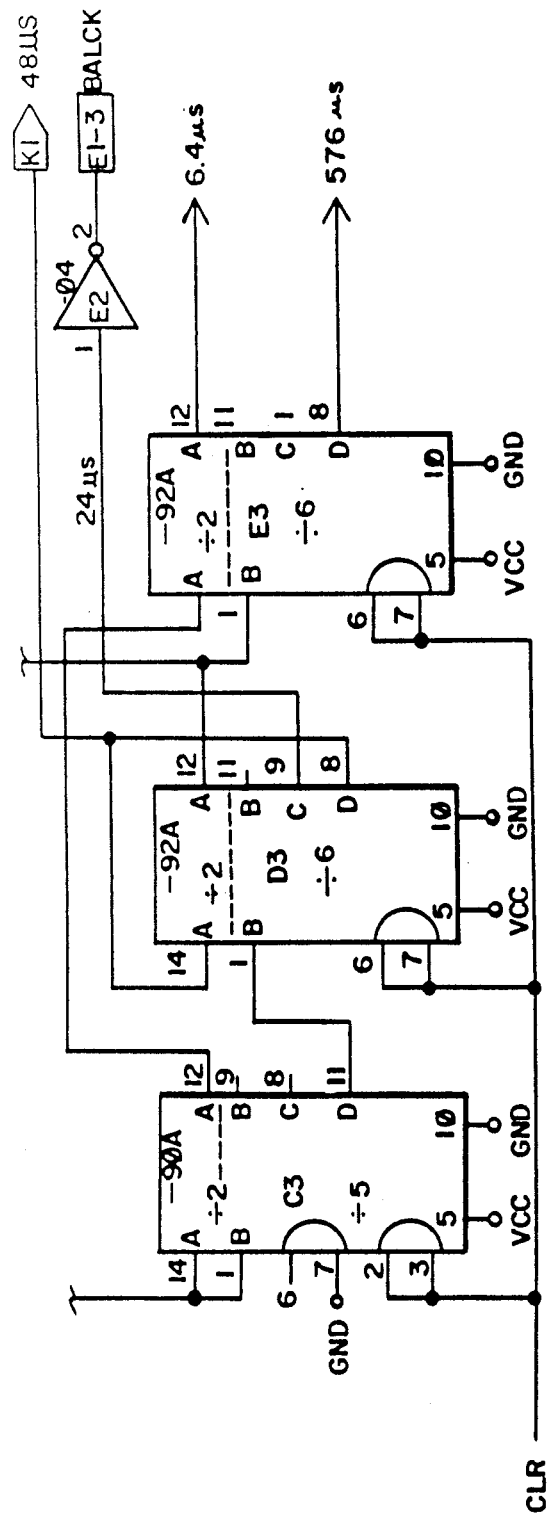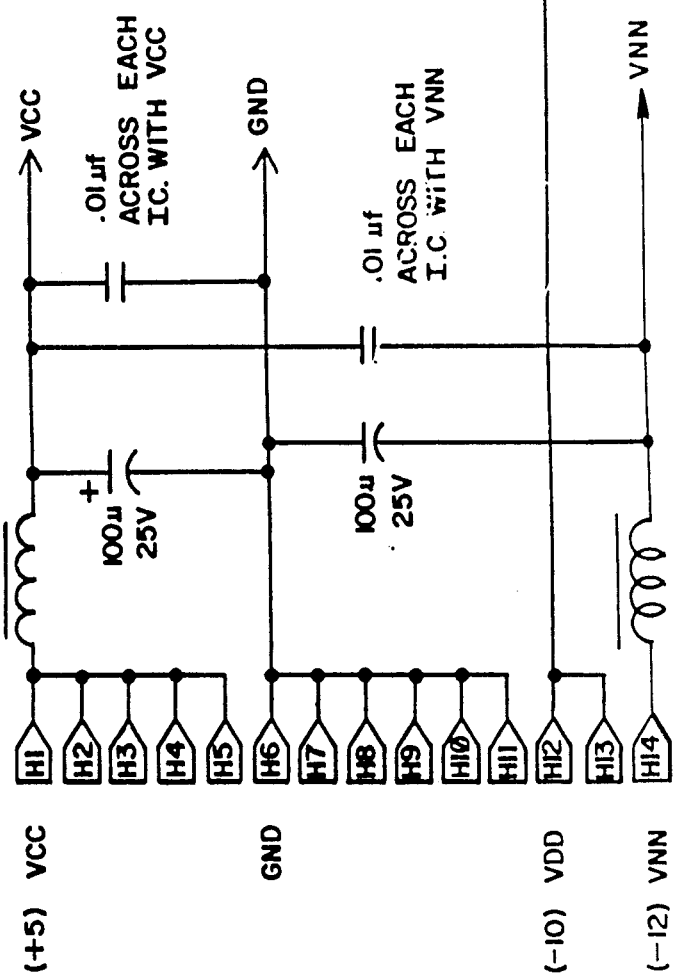
FIG. 20B

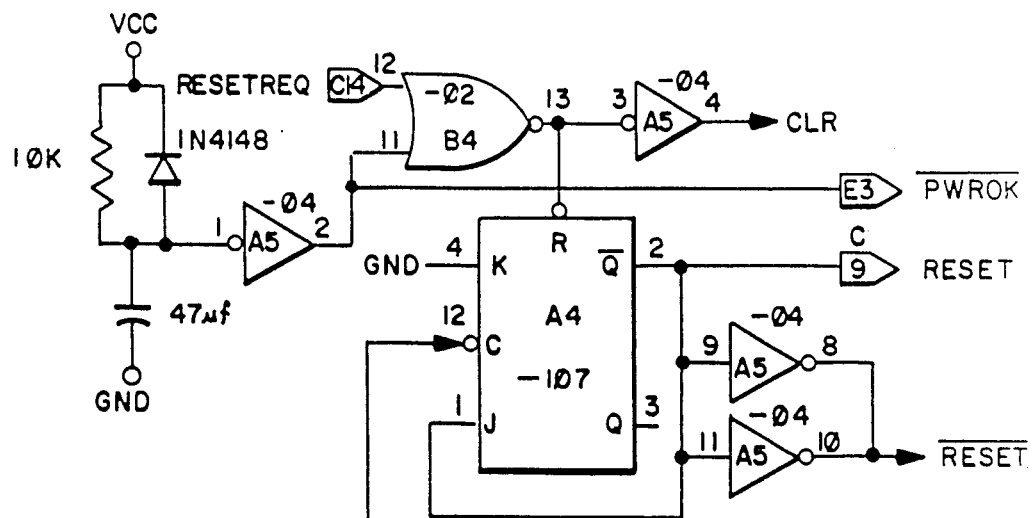
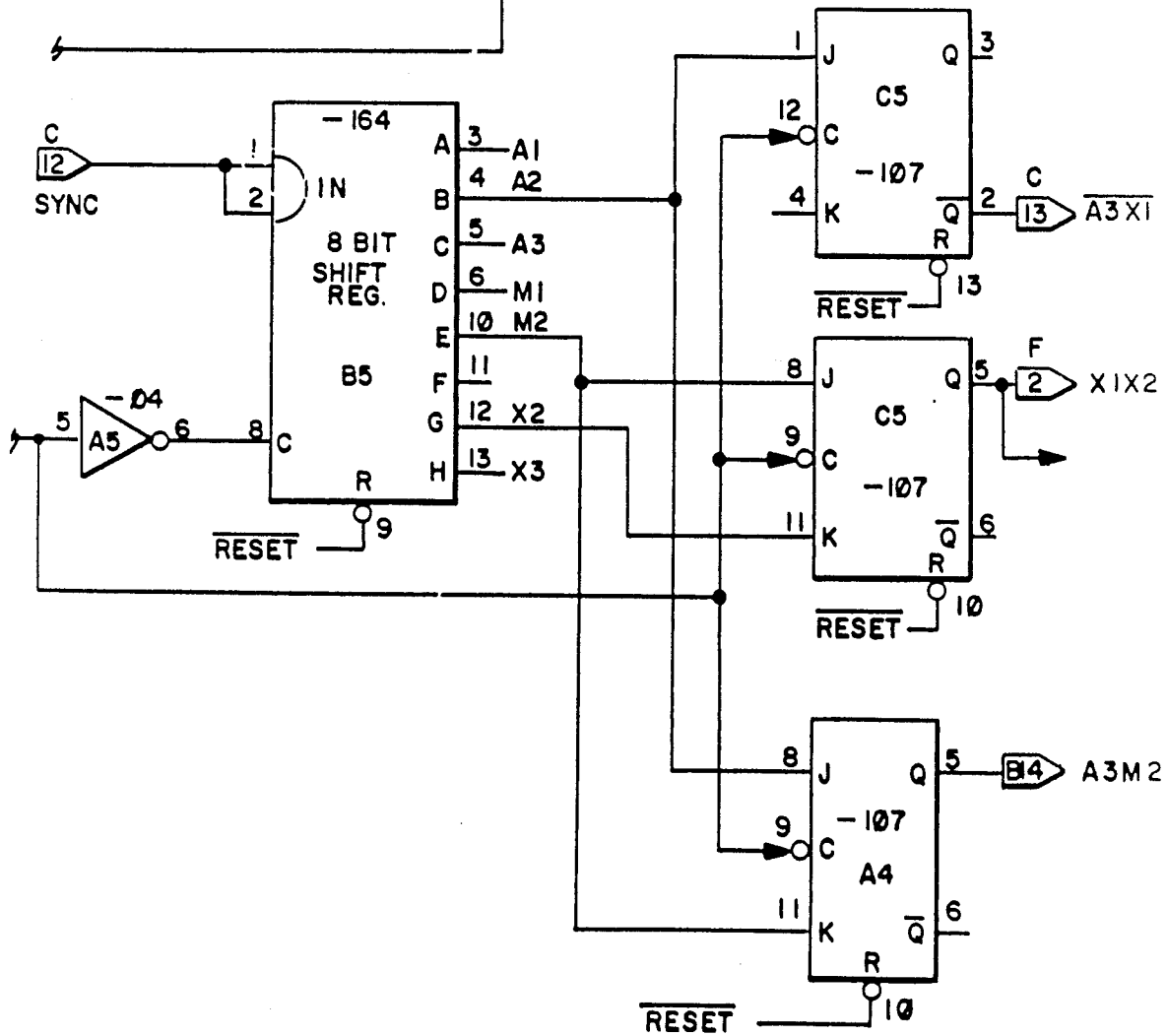
FIG. 20C

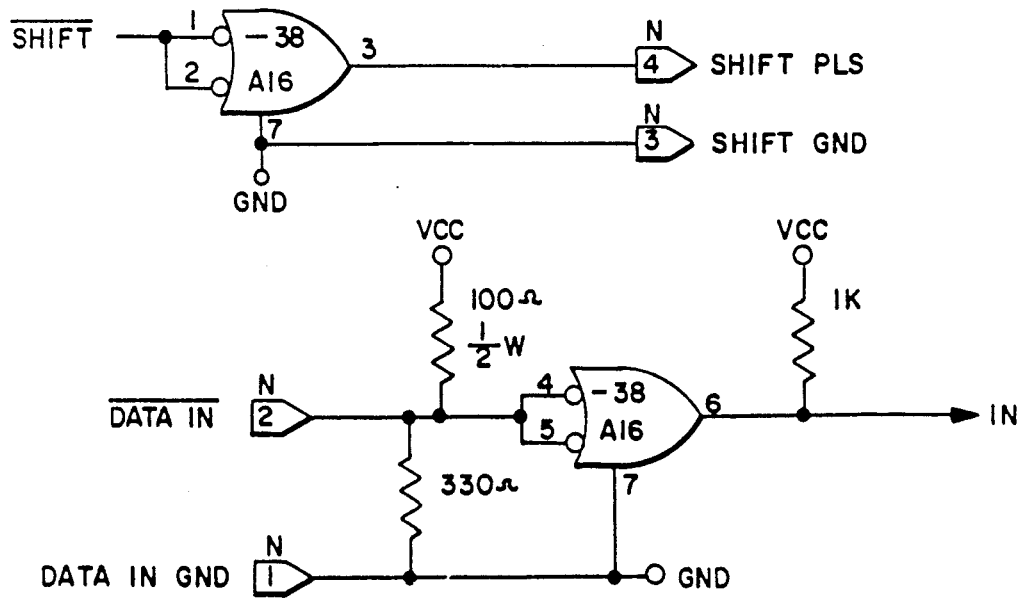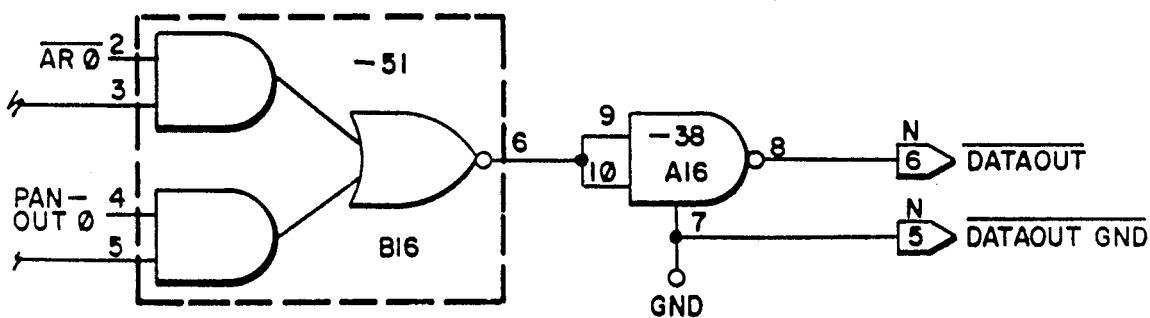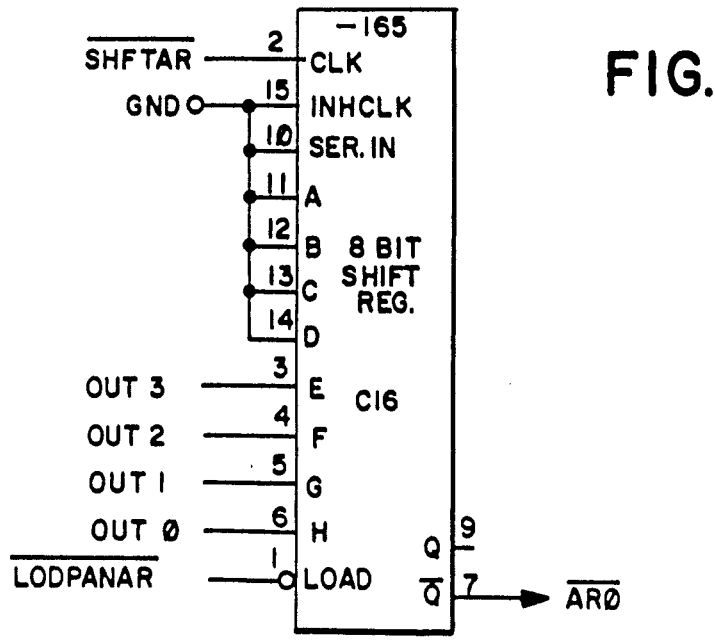
FIG. 21B

BINARY → BCD CONVERTER  ✷ THE PROGRAM CAN BE SPEED UP IF CALLED FOR BY SENSING LEADING ZEROES.

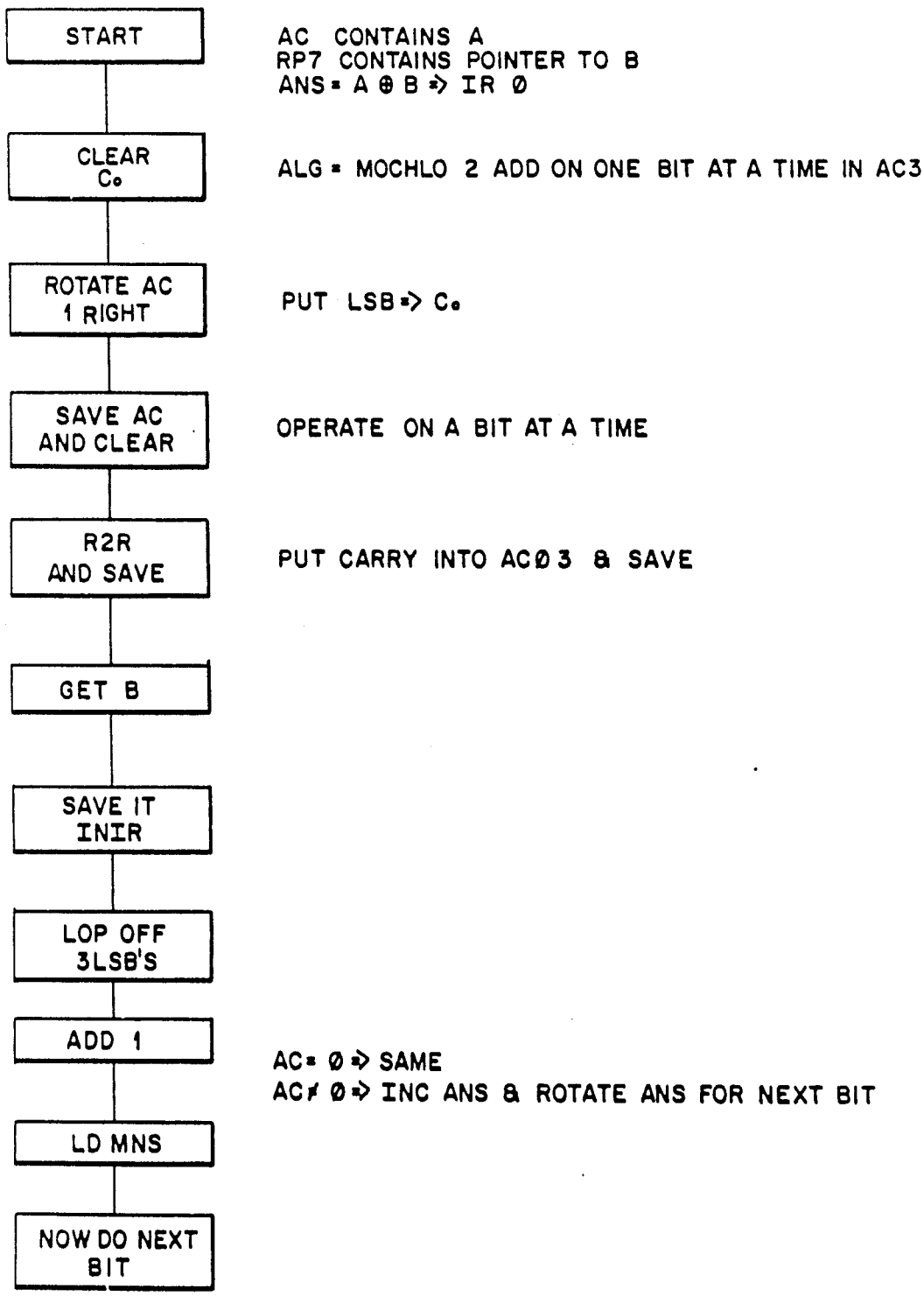
FIG. 24 — EXCLUSIVE OR SUBROUTINE FLOW CHART

COMPUTER CONTROLLER SYSTEM WITH A REPROGRAMMABLE READ ONLY MEMORY

BACKGROUND OF THE INVENTION

Computer controller systems such as those disclosed in U.S. Pat. No. 3,686,639 entitled "Digital Computer-Industrial Controller System and Apparatus", have been utilized in recent years to control many industrial operations such as automatic assembly equipment, textile machinery, materials handling equipment, and chemical processes. Computer controller systems have generally utilized core memories in order to store variable information relating to electrical circuit lines found in standard electrical circuit ladder diagrams commonly used in industrial control systems. These core memories require a significant amount of peripheral electronic circuitry in order to properly write-in and read-out information. Because of these inherent problems encountered with core memories and also because of their relatively high price, computer controller systems have not been readily adaptable to small industrial control systems utilizing from 10 to 30 simulated outputs and from 20 to 60 input signals.

During the last several years, new methods of storing variable data have been developed in the electronic industry. Thus the use of integrated circuit random access memories has allowed the electronic designer to store and retrieve variable information without the need for core memories. However, such electronic memory devices are unable to retain stored information upon de-energization of the integrated circuits. Therefore, such integrated circuits are unable to be utilized in storing electrical circuit line information if the system is periodically de-energized either for work shutdowns or during power failures.

Recently however, the Intel Corporation of Santa Clara, California has invented memory chips which are able to retain stored information regardless of the energized state of the memory chip. Information is electrically written into the chip but only ultraviolet light is able to erase the memory chip. Since the ultraviolet light erases the entire memory of the chip, selective erasure of information within the memory chip is unobtainable.

Some manufacturers of electronic equipment have utilized Intel Corporation's ultraviolet "read only" memory chips in various electronic devices including industrial computer controllers. However, these manufacturers require that the delicate memory chip be physically removed from the electronic structure when reprogramming of the memory chip is desired. Such a technique is highly undesirable in industrial computer controllers since these controllers are commonly used in very harsh industrial environment where soot, oil and grime are frequently found. In addition, the removal of the memory chip in an industrial controller system requires that the equipment being controlled be shutdown during the removal and reprogramming of the memory chip. Such shutting down of highly expensive equipment is of course undesirable; and also, since a desired change may require more than one adjustment to the industrial controller, repeated removals of the memory chip from the controller may be necessary.

The present invention eliminates these problems by reprogramming the memory chips without physically removing them from the central processor in which they are located. In addition, the present invention allows the operator to vary the electrical circuit line network or control program without shutting down the controller. Therefore, "on-line" de-bugging of the control program is possible with the present invention.

The present invention thus allows the operator to observe the present electrical circuit line network, to reprogram this network, and to store this reprogrammed network into the memory chips while the industrial computer controller system is operating. In addition, the present invention provides a "trace" feature which greatly facilitates de-bugging the control program by allowing the operator to view the entire electrical circuit line to which an electrical element in a presently viewed electrical circuit line has its state referenced. Furthermore, the present invention provides a "scroll" feature that allows the operator to sequentially view higher or lower numbered electrical circuit lines of the electrical circuit diagram. The present invention also allows the operator to disable any electrical circuit line without the need for erasing the entire memory chips and reprogramming the chips with the previous control program minus the disabled circuit line. In addition, the present invention allows a new electrical circuit line to be programmed into the memory chips without first erasing the entire memory chips.

Thus the present invention is a miniaturized computer controller system providing relay type logic as well as timers and counters for controlling industrial control systems having relatively few inputs and outputs. The present invention is compact, rugged, and inexpensive and so is readily suited for small industrial systems including designers and manufacturers of automatic machine tools.

SUMMARY OF THE INVENTION

The use of computer controller systems to monitor and control industrial process systems has become highly prevalent since U.S. Pat. No. 3,686,639, entitled "Digital Computer-Industrial Controller System and Apparatus" was issued in 1972. Industrial controllers, such as the Model 084 and the Model 184 of Modicon Corporation, Andover, Massachusetts utilize a schematic electrical circuit diagram to control industrial control systems. These diagrams consist of two spaced apart vertical bus lines, each theoretically connected to one terminal of a power supply. Connected between the parallel vertical lines are horizontal circuit lines which form the schematic electrical circuit diagram resembling a ladder.

Each electrical circuit line terminates in a relay and preceding the relay are a plurality of electrical elements such as normally open or normally closed switches which control the operation of the relay to provide an output signal when the circuit line conducts. The electrical elements commonly utilized are the normally open and the normally closed switch as well as the parallel normally open and the parallel normally closed switches so as to provide both AND functions and OR functions. In addition, timers and counters may be entered into these electrical circuit lines so as to energize the simulated relay coil when the time or the number of counts received is equal to a preselectable time or count respectively.

It has been found that in order to store variable information regarding electrical circuit lines as well as the particular electrical elements within these circuit lines, it is necessary to have a random access memory that is capable of retaining its stored information when the industrial computer controller is de-energized during normal shutdowns or during possible power failures. In the recent past, the only feasible, economic way of providing such a random access memory was through the use of core memories. These memories however, have inherent limitations due to the electronic circuitry needed to write-in information and read-out information from the core memories as well as the expense of the core memory itself.

Recently the Intel Corporation of Santa Clara, California has devised a "read only" memory chip that is capable of storing information while the memory chip is de-energized. In addition these "read only" memories may be completely erased by the use of ultraviolet light and then reprogrammed by electrically energizing the desired bits within the memory chip. These memory chips thus provide an alternative to the use of core memories in industrial computer controllers with the major disadvantage being that selective bits of the memory chip may not be erased. In order to erase any particular bit in the memory chip all the bits of the chip must be erased.

The present invention, however, is able to overcome this particular disadvantage of reprogrammable "read only" memories (RROM) by providing an industrial computer controller that is able to reprogram the information in the memory chips without the need for de-energizing the particular industrial process being controlled by the invention.

More particularly, the present invention incorporates a central processor that is able to solve the relay logic of the electrical circuit lines including timers and counters entered within these electrical circuit lines. This central processor consists entirely of solid state circuitry that processes and controls the electrical circuit lines and the electrical elements within the circuit lines that are stored in the RROM within the central processor. The central processor also incorporates a counting memory for solving counters placed within the electrical circuit lines as well as a clock for solving timing functions placed within the electrical circuit lines. Furthermore, the central processor includes a sequence processor for allowing a particular electrical circuit line to energize up to 100 other electrical circuit lines, as well as other modules for storing information relating to the relay coils of the electrical circuit lines and additional modules for properly receiving and transmitting information to an input/output assembly.

Other manufacturers have devised reprogrammable "read only" memories that are erasable. However, most of these memories require that they be removed from the control circuit during reprogramming since electrical signals of a non-compatible nature to the control circuitry must be applied to them during reprogramming. In all these cases the data from the reprogrammable chips is not available for a significant time interval during programming of the chips.

The input/output assembly consists of input/output modules for receiving and transmitting either alternating current or direct current signals to and from industrial equipment that is to be controlled by the computer controller system. The operation and mechanical design of these input/output modules and the accompanying input/output housing in which they are placed is similar to the modules currently utilized on the Modicon Model 184, manufactured by the Modicon Corporation, Andover, Massachusetts. Some of the output lines to the input/output assembly have retentive memories that energize certain inputs when power is restored after a power shutdown if corresponding outputs were energized before the shutdown.

Mechanically and electrically removably interfitting with the central processor is a reprogramming assembly consisting of a reprogramming module and a programming panel. The reprogramming module incorporates a controller interface for communicating to the central processor as well as from a random access memory (RAM), a RROM interface, and a microprocessor.

The microprocessor communicates with the programming panel which allows the operator to observe the present electrical circuit lines within the central processor's RROM as well as providing means for changing the electrical circuit lines within this RROM. In addition, the reprogramming module incorporates a power supply for energizing the reprogramming module itself as well as the programming panel and the central processor which in turn provides power to the input/output assembly.

When the programming panel is in a "monitor" mode, the reprogramming module retrieves the electrical circuit line information stored in the RROM of the central processor and transfers this information back to the central processor for solving the electrical circuit lines. The reprogramming panel also transfers information regarding any operator selected circuit line to the programming panel where the entire status of the line is displayed. In addition the programming panel provides a "scroll" switch that allows the operator to sequentially view higher or lower numbered electrical circuit lines without the need for entering each circuit line on a numeric key pad of the programming panel.

When the programming panel is in a "program" mode, the reprogramming module retrieves all the information in the RROM of the central processor and stores this information in its random access memory. The information is then transferred to the central processor so that the electrical circuit lines may be solved. In addition, the operator may view any electrical circuit line as well as add additional circuit lines to the random access memory. These new electrical circuit lines will automatically be transferred to the central processor to be solved. Furthermore, the operator may vary any of the previously programmed electrical circuit lines that were initially stored in the central processor's RROM.

When the operator has obtained the desired electrical circuit lines and elements therein so as to properly control the industrial process, the information may then be transferred to the central processor's RROM. In order to do this, the programming panel is placed in the "write" mode. In this mode the reprogramming module first erases all the information in the central processor's RROM. Specifically, when the Intel type RROM is used, this is achieved by activating an ultraviolet light source within the reprogramming module that visually communicates through a quartz window to the RROM memory chips within the central processor. Generally, the appropriate erasing means is employed for whatever RROM type is used. When the information in the RROM has been completely erased, the reprogramming module then transfers the electrical circuit line information in its random access memory to the RROM. During this time, the computer controller system is capable of controlling the desired industrial process so that de-energization of the controlled process is unnecessary at any time.

Following the reprogramming of the RROM, the reprogramming module may be disconnected from the central processor, with the insertion of a power supply in its place. This power supply provides the electrical energy to the central processor as well as interconnecting the RROM to the other modules of the central processor for the continued control of the desired industrial process. If at a later time the electrical circuit line configurations stored in the RROM are to be monitored or changed, the reprogramming module may again be interconnected to the central processor.

The reprogramming assembly is also used to initially store the information regarding the electrical circuit lines into the RROM. The reprogramming module includes a teletype interface for allowing a pre-stored control program to be transferred from the reprogramming module to the RROM without the need for the operator to manually enter each electrical circuit line via the switches on the programming panel. In addition, the reprogramming module allows the operator to enter additional electrical circuit lines to a previously stored circuit line program without the need for erasing the entire RROM memory and re-entering the updated program. When new lines are to be entered into the RROM of the central processor, the reprogramming module merely transfers this updated information from its random access memory through the RROM interface to the central processor's RROM.

Furthermore, in the troubleshooting of a control program, the operator may utilize a "trace" switch on the programming panel that allows the operator to observe an electrical circuit line to which an electrical element in a presently observed electrical circuit line is referenced. The operator may then look at an electrical circuit line to which a particular element in this latter circuit line is referenced for ascertaining if an error in the control program lies in this particular circuit line. After observing these referenced electrical circuit lines, the operator may, by changing the position of the "trace" switch, return to the initial electrical circuit line that he was observing. The above trace operation may be performed any number of times in either direction, thus allowing the operator to sequentially view lines that reference the condition of any element in any other circuit line.

This feature, in combination with the "scroll" feature, greatly facilitates the de-bugging of the control programs.

OBJECTS OF THE INVENTION

It is therefore an object of the present invention to provide an industrial computer controller that utilizes reprogrammable "read only" memory chips for the storage of variable information related to a desired control program consisting of electrical circuit lines incorporating electrical elements.

A further object of the invention is to provide a computer controller of the above character whereby the reprogrammable "read only" memory chips may be reprogrammed without their removal from the controller.

Another object of the present invention is to provide a computer controller of the above character that allows an operator to observe the condition of the electrical circuit lines of the control program while the controller is operating.

An additional object of the present invention is to provide a computer controller of the above character that allows the operator to vary or add to the control program without deenergizing the controller.

Another object of the present invention is to provide a computer controller of the above character that allows the operator to reprogram the reprogrammable "read only" memory chips while the controller is operating.

Another object of the present invention is to provide a means for allowing an operator to sequentially view electrical circuit lines of the control program without the need for numerically entering each of these electrical circuit lines on a programming panel of the controller.

Another object of the present invention is to provide a computer controller of the above character having a programming panel that provides means for observing an electrical circuit line that references an electrical element in a presently viewed electrical circuit line without the need for numerically entering this referencing circuit line.

A further object of the present invention is to provide a computer controller of the above character that utilizes a reprogramming assembly that removably interconnects with a central processor.

Another object of the present invention is to provide a computer controller of the above character that monitors, varies, and rewrites the reprogrammable "read only" memory chips of the controller.

A further object of the present invention is to provide a computer controller of the above character that is compact, rugged, and easy to operate.

A still further object of the present invention is to provide a computer controller of the above character that is inexpensive and easy to service.

An additional object of the present invention is to provide a computer controller of the above character having a programming panel that is capable of displaying an entire electrical circuit line of the control program including the electrical elements in the electrical circuit line as well as the other electrical circuit lines or inputs that may reference the condition of these electrical elements.

A further object of the present invention is to provide a computer controller of the above character that generates self-diagnostic signals regarding the condition of the controller.

Other objects of the invention will, in part, be obvious and will in part appear hereinafter.

THE DRAWINGS

FIG. 3 is a schematic diagram showing the ladder diagram form of the electrical circuit lines that are simulated by the computer controller system of FIG. 1;

FIG. 4 is a schematic diagram showing a counter or timer type of electrical circuit line that is simulated by the computer controller system of FIG. 1;

FIG. 7A is a diagram showing six, eight bit "read only" memory words used to store one electrical circuit line of the computer controller system of FIG. 1;

FIG. 7B is a diagram showing how the six "read only" memory words are used to define four, 12 bit words used to define each of the four nodes of one electrical circuit line of the computer controller system of FIG. 1;

FIG. 7C is a diagram showing the various bit locations of the twelve bit words used to define one electrical circuit line of the computer controller system of FIG. 1;

FIG. 7D is a diagram showing the type of electrical element generated by various states of designated bits of the four, twelve bit words used to define one electrical circuit line of the computer controller system of FIG. 1;

FIG. 7E is a diagram showing the various states of an electrical circuit line of the computer controller system of FIG. 1 depending on the states of two bits of the four, twelve bit words of FIG. 7C;

FIG. 8 is a functional block diagram of the computer controller system of FIGS. 1 and 2;

FIG. 9 is a diagrammatic representation of a sequencer function of the computer controller system of FIG. 1;

FIG. 10 is a diagrammatic representation of a "trace" feature of the computer controller system of FIGS. 1 and 2;

FIG. 11 is a diagrammatic representation of a "scroll" feature of the computer controller system of FIGS. 1 and 2;

Figure 1:
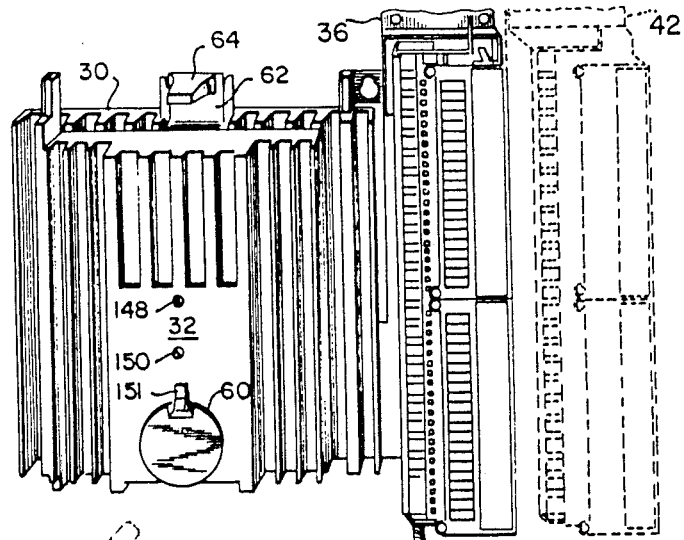
FIG. 1 is a perspective diagrammatic view of a computer controller system according to the present invention.
Figure 2:
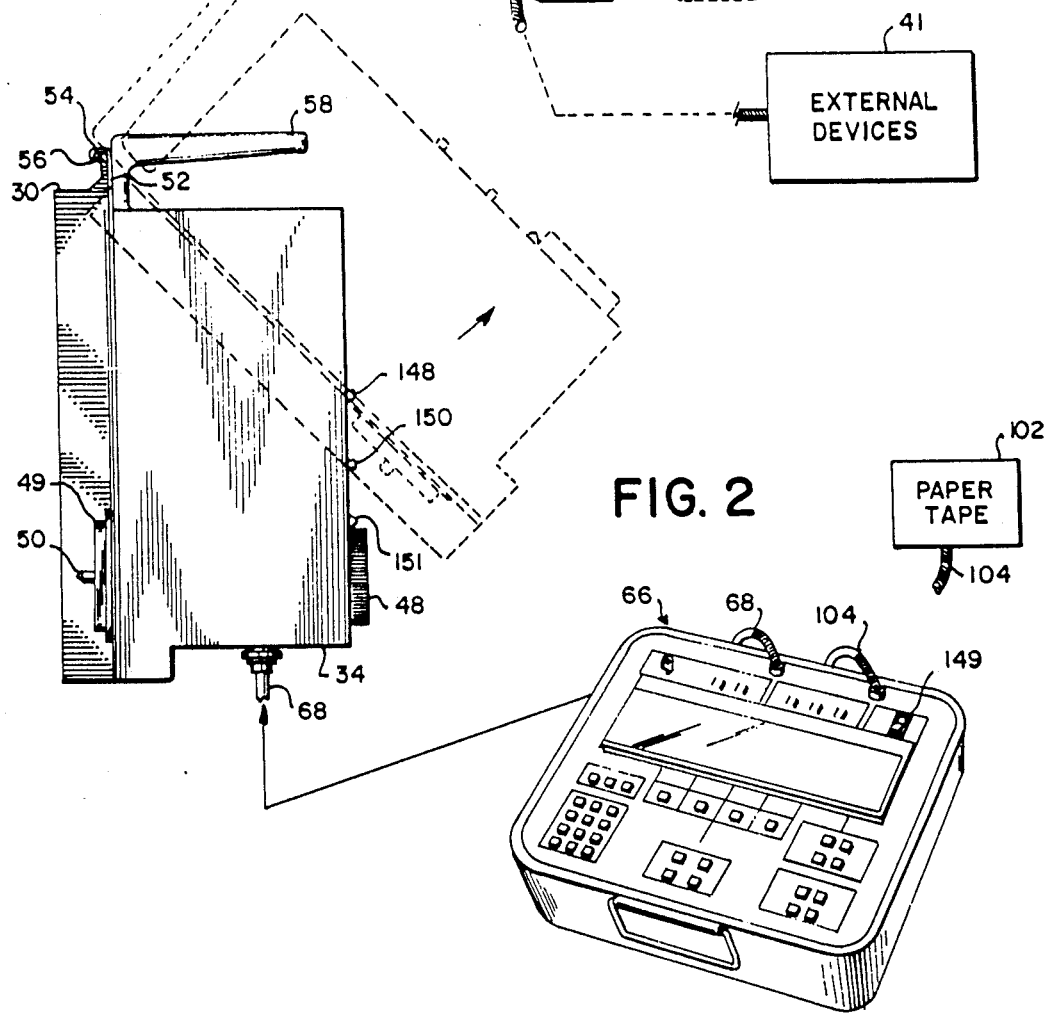
FIG. 2 is a diagrammatic side view of a central processor and a reprogramming module of the computer controller system of FIG. 1 communicating with a programming panel of this system.
Figure 12A:
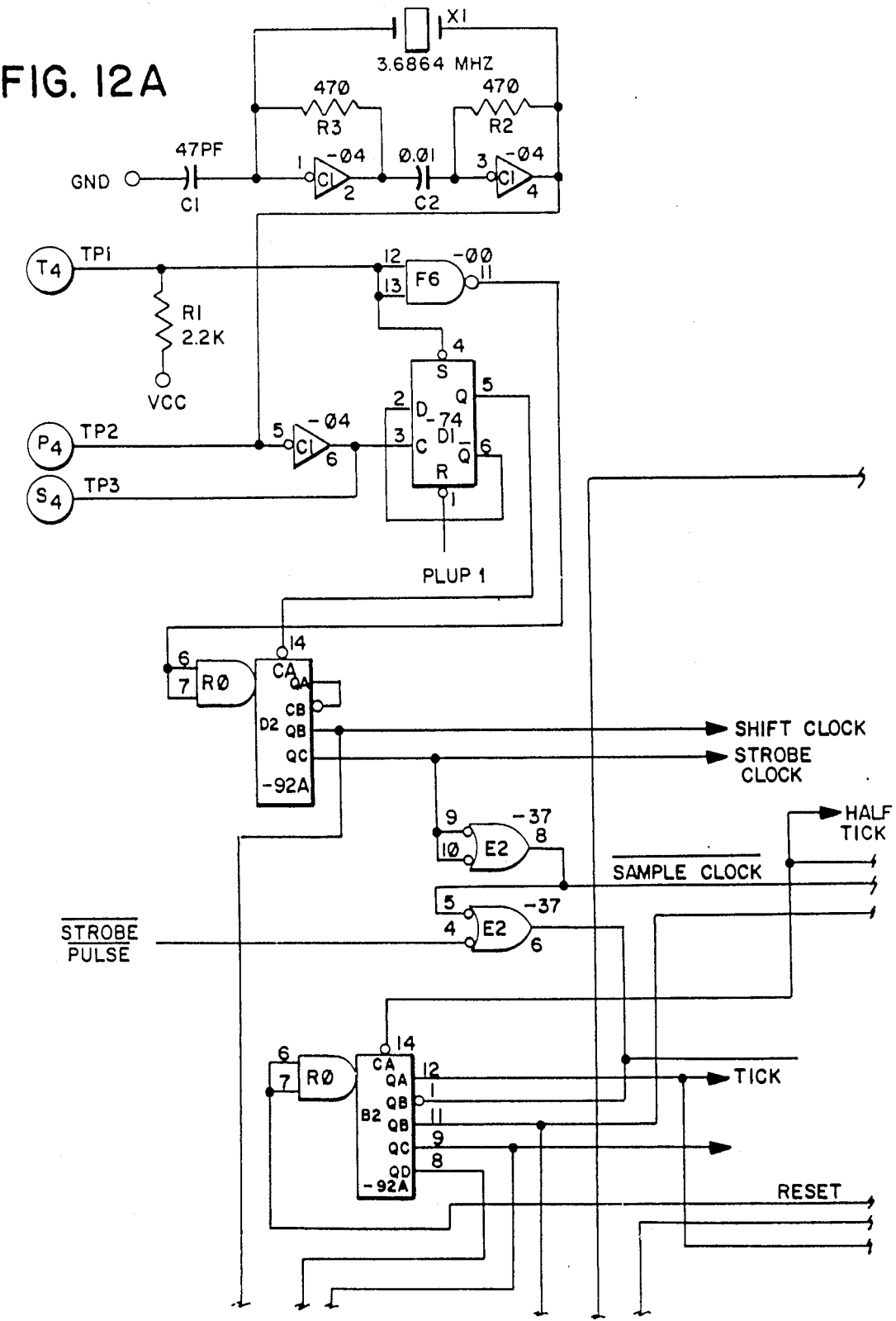
Figure 12B:
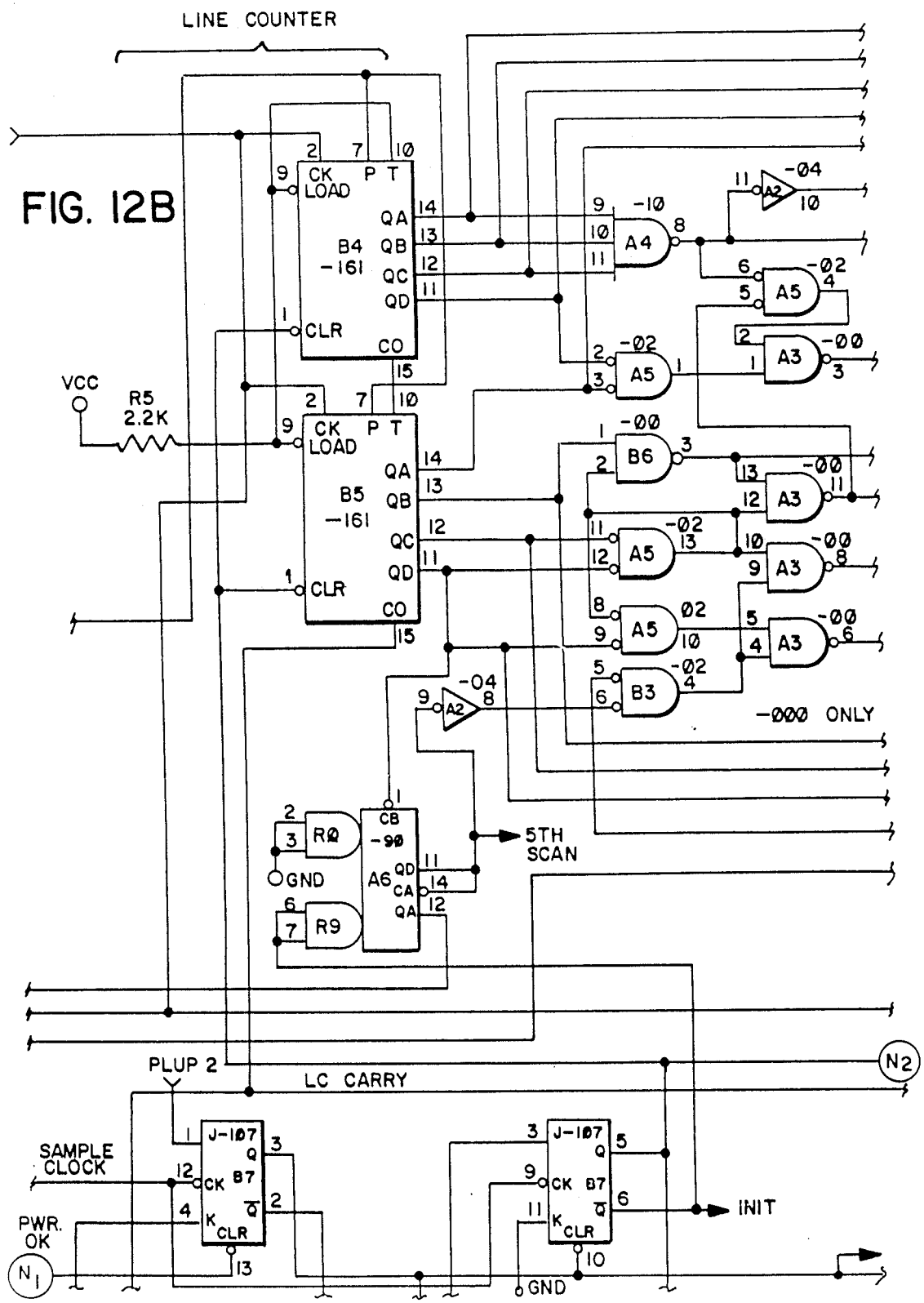
Figure 12C:
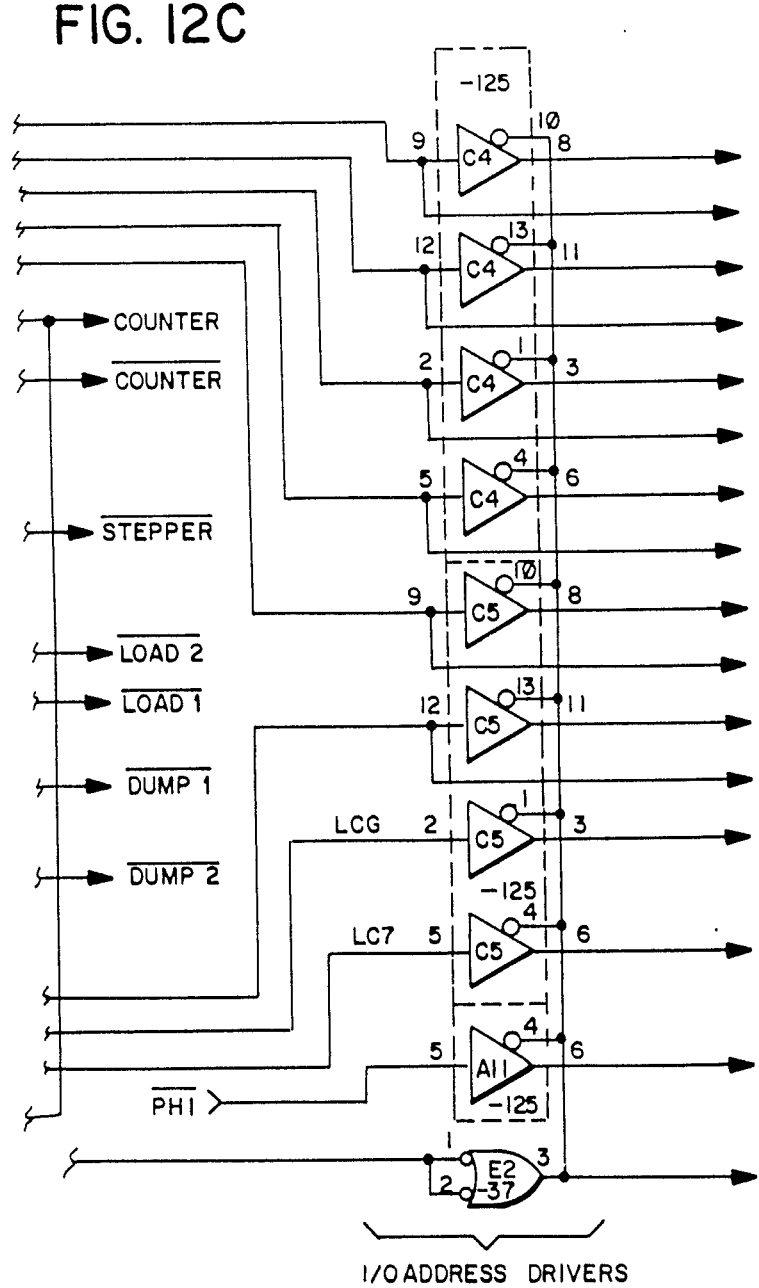
Figure 12D:
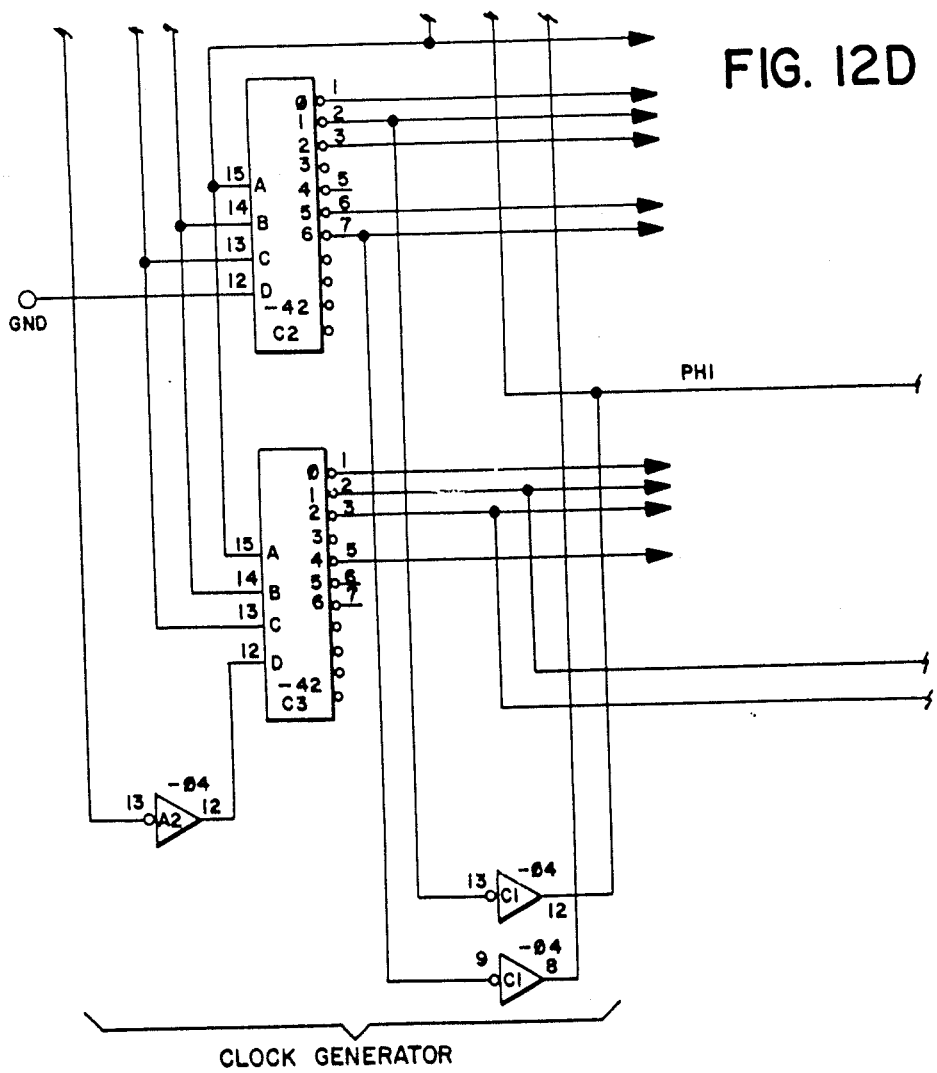
Figure 12E:
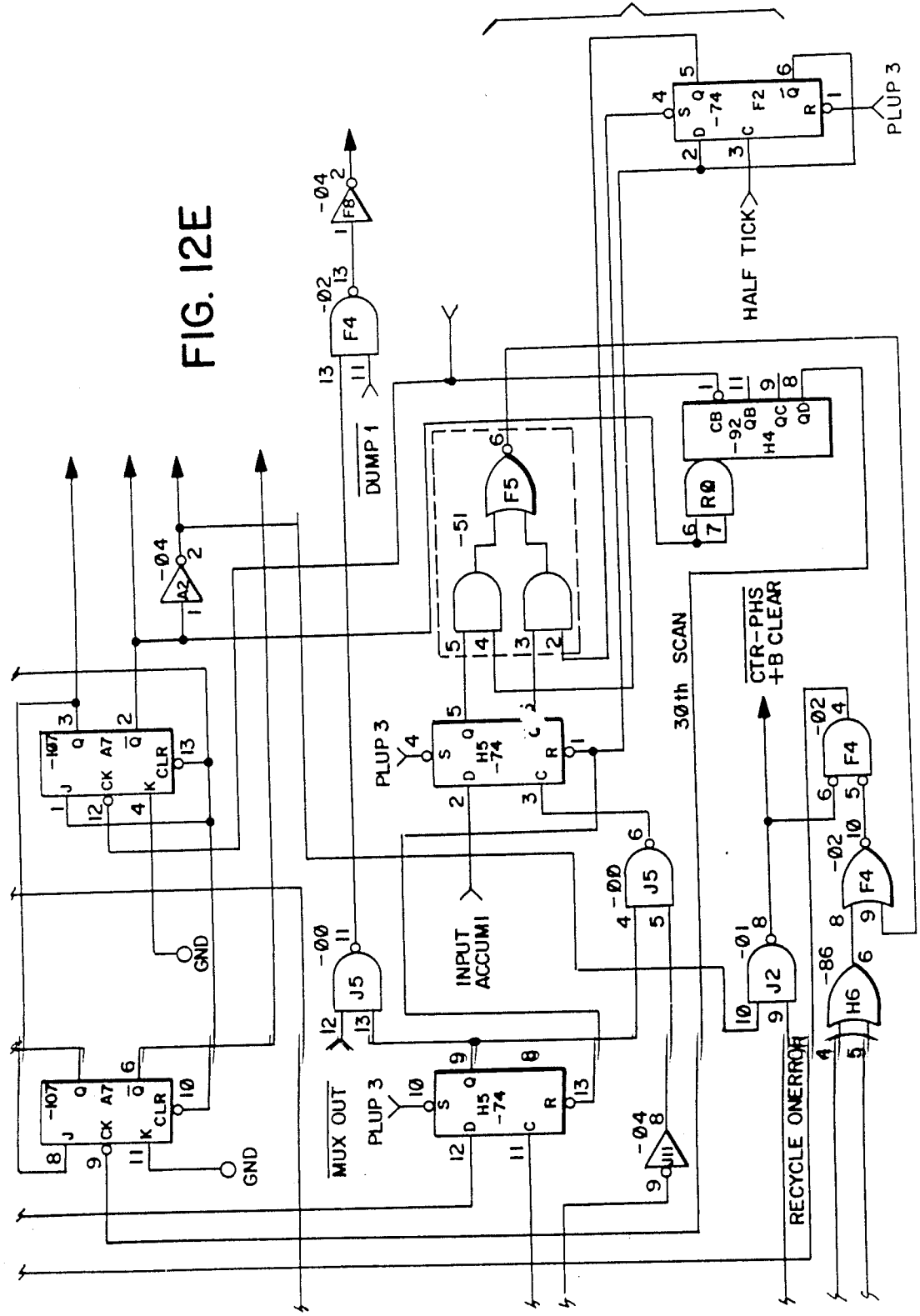
Figure 12F:
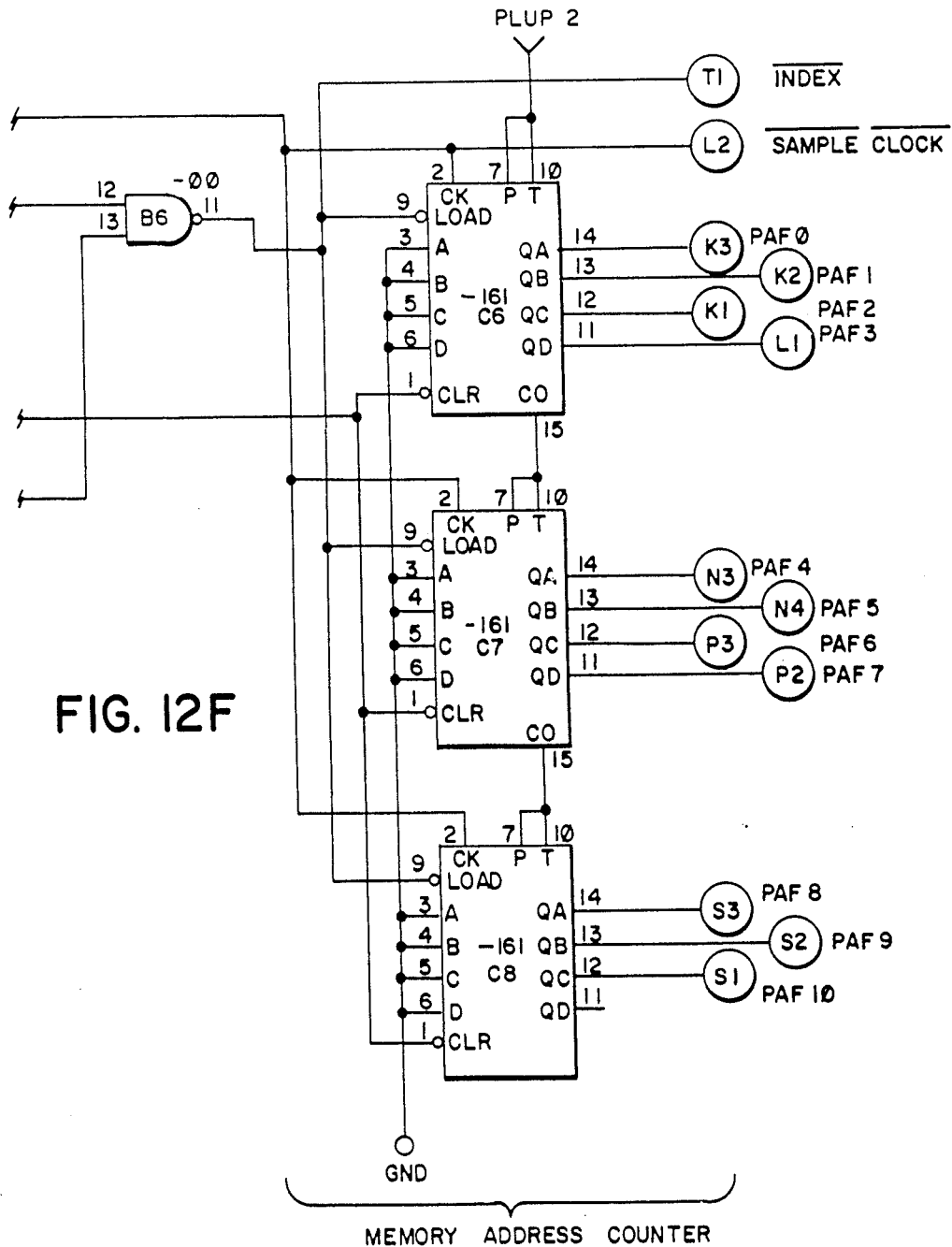
Figure 12G:
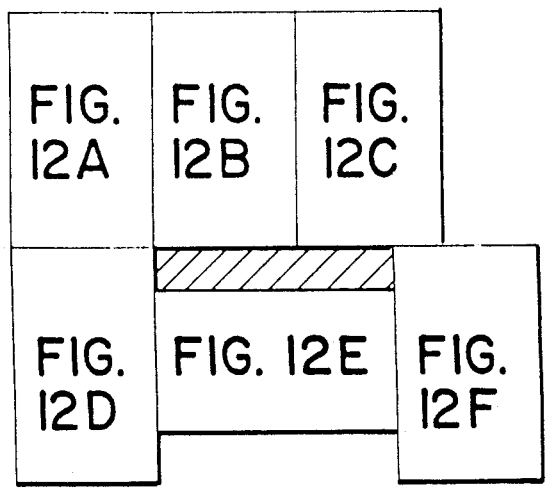
Figure 13I:
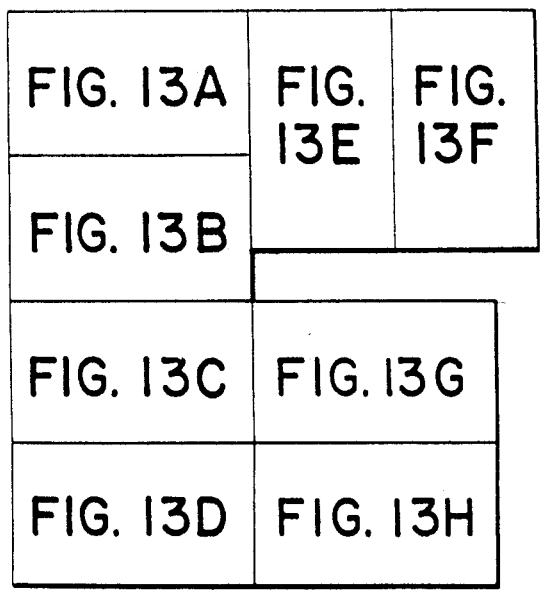
Figure 13A:
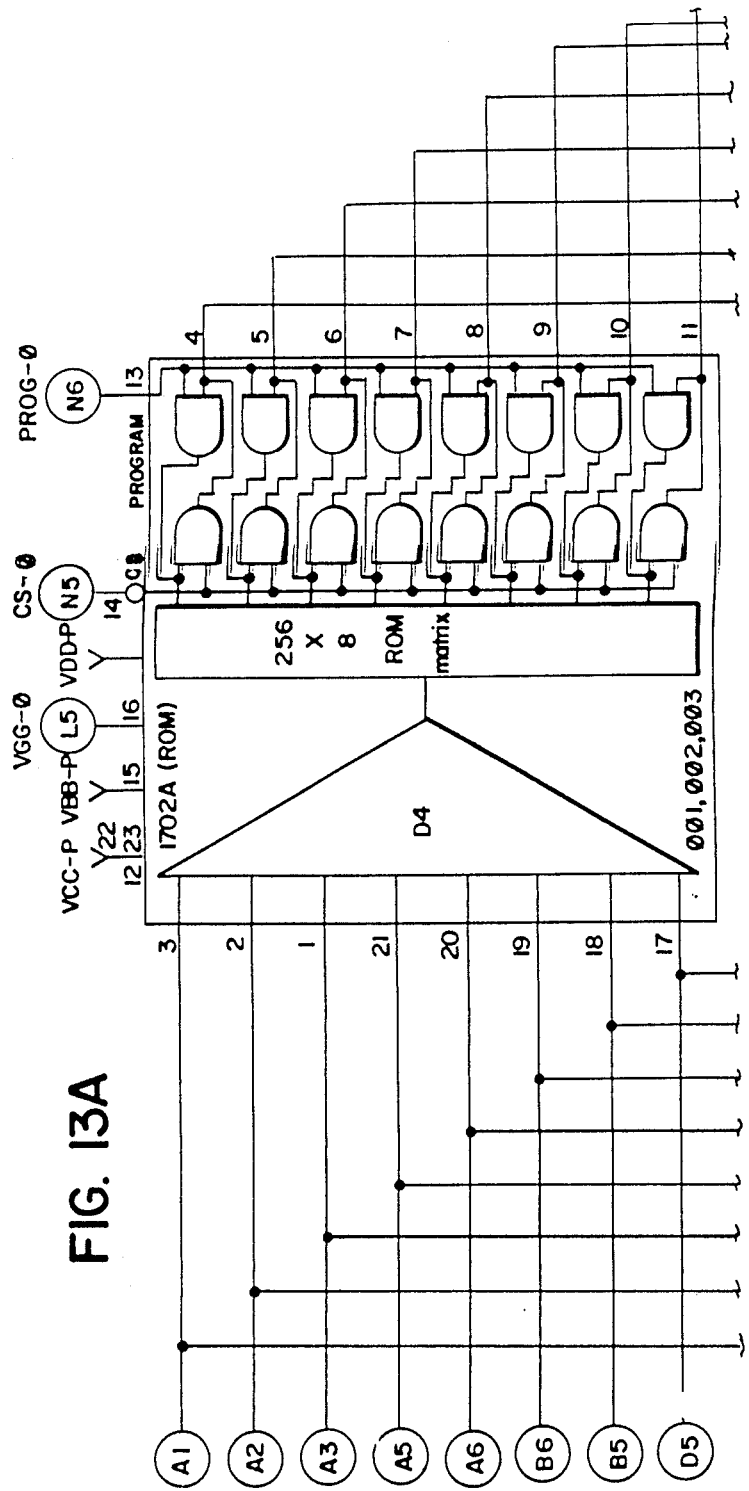
Figure 13B:
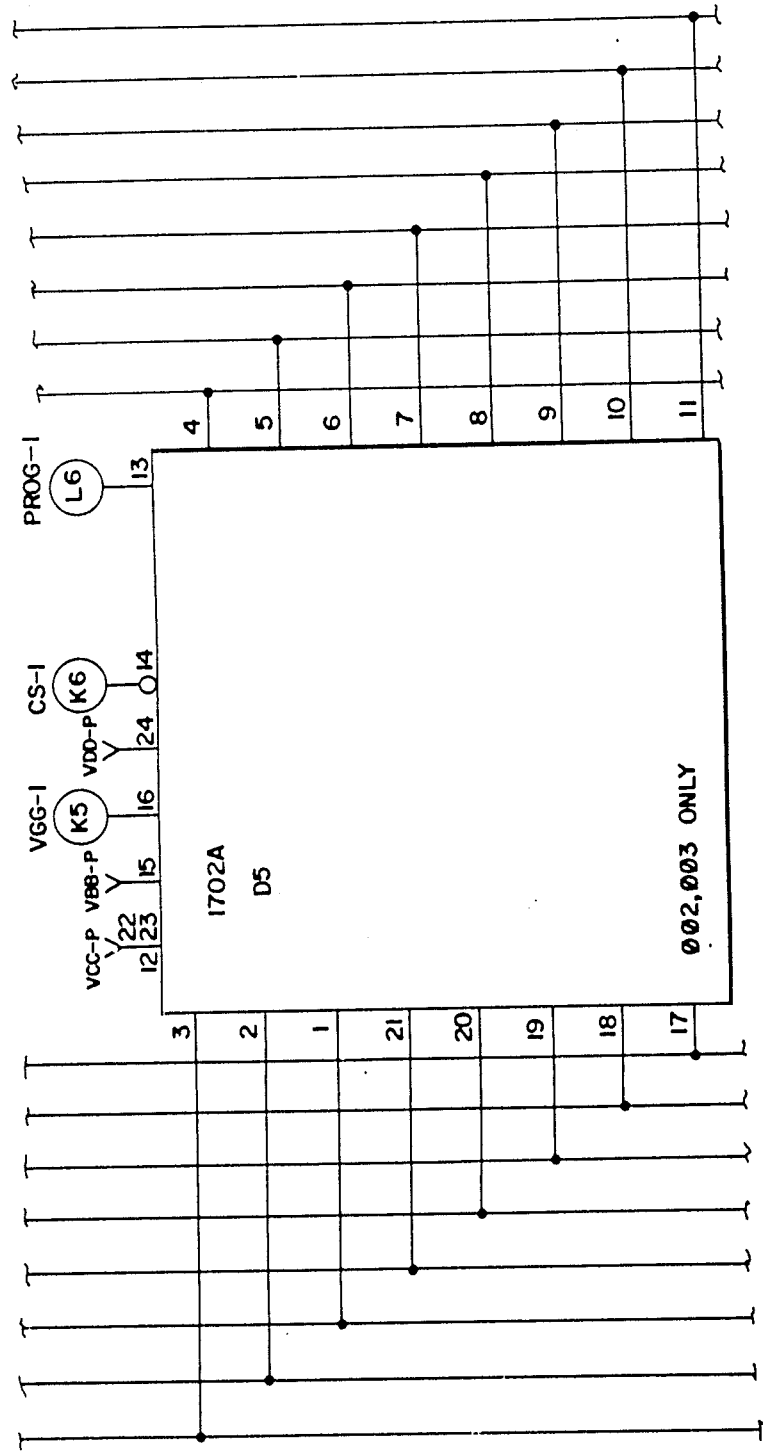
Figure 13C:
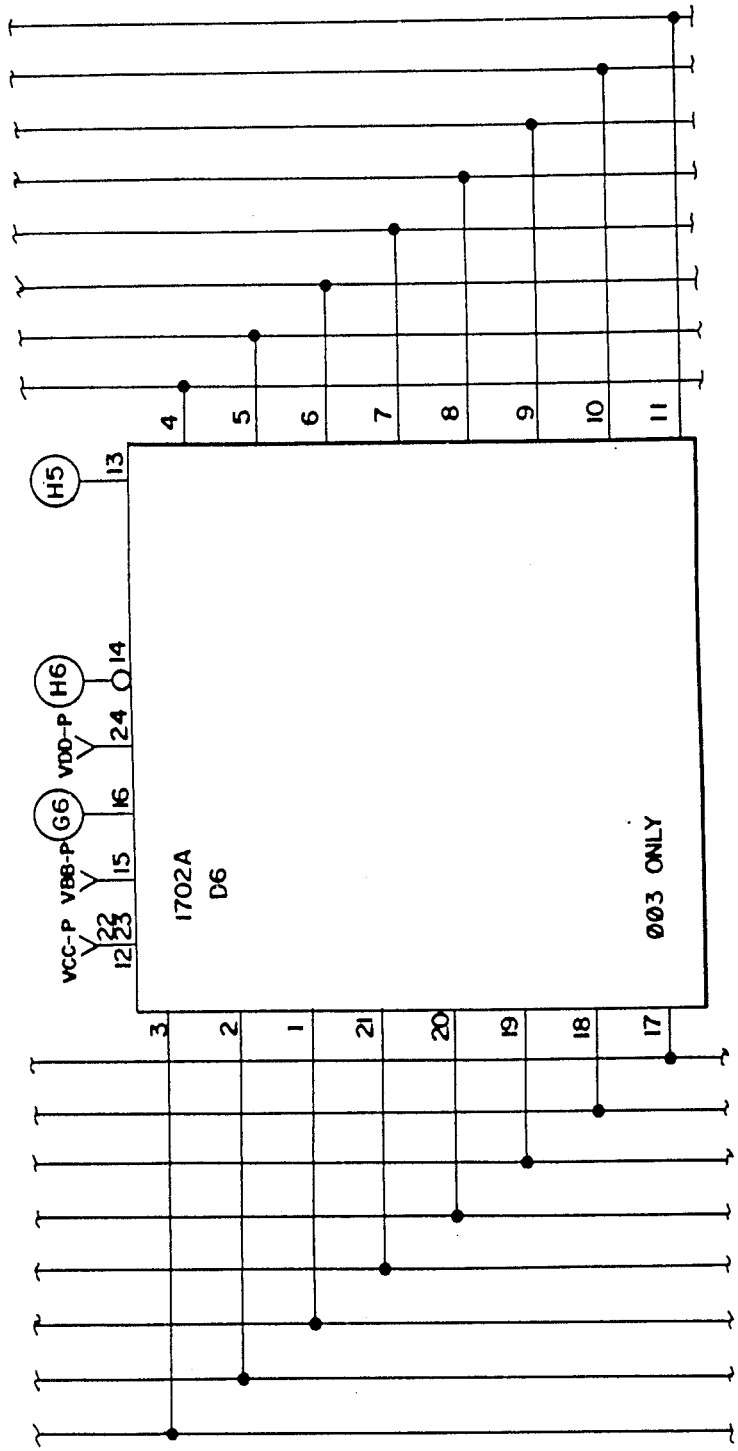
Figure 13D:
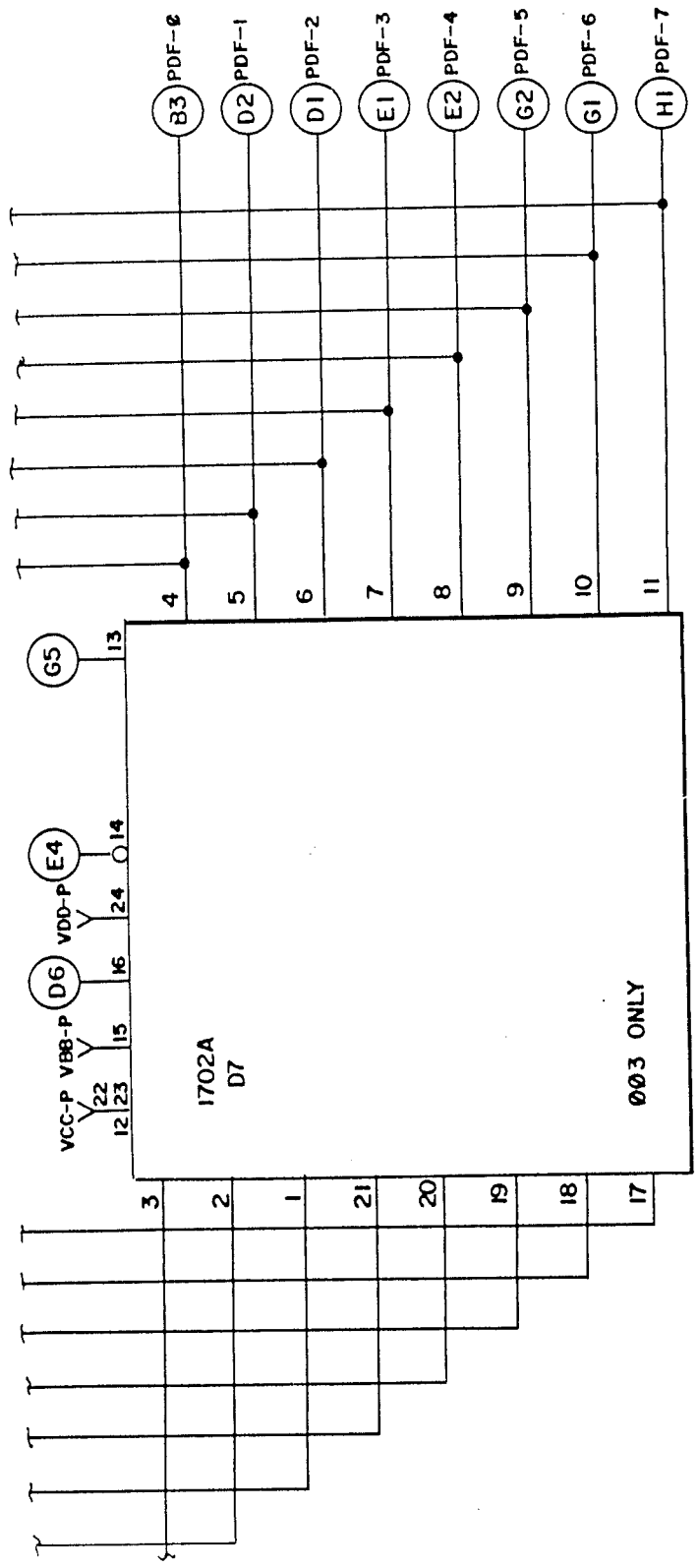
Figure 13E:
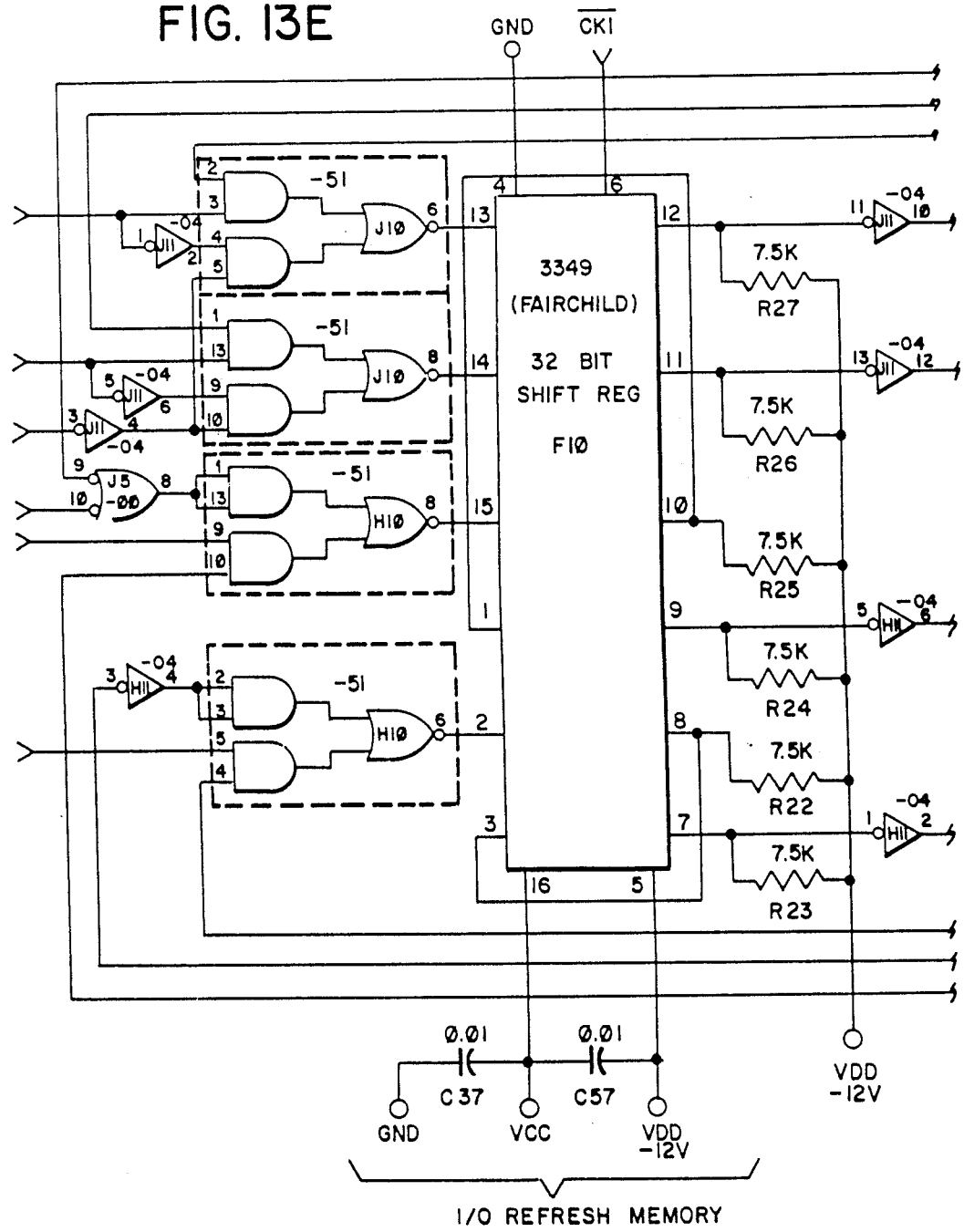
Figure 13G:
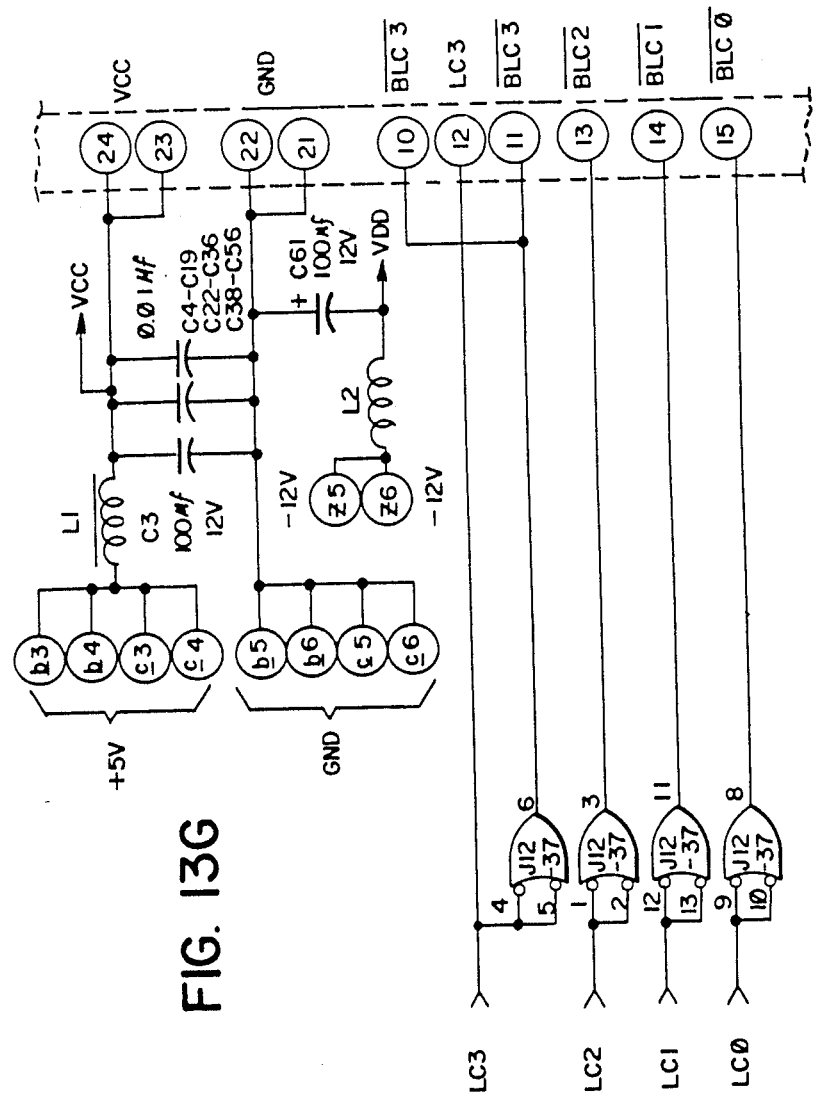
Figure 13H:
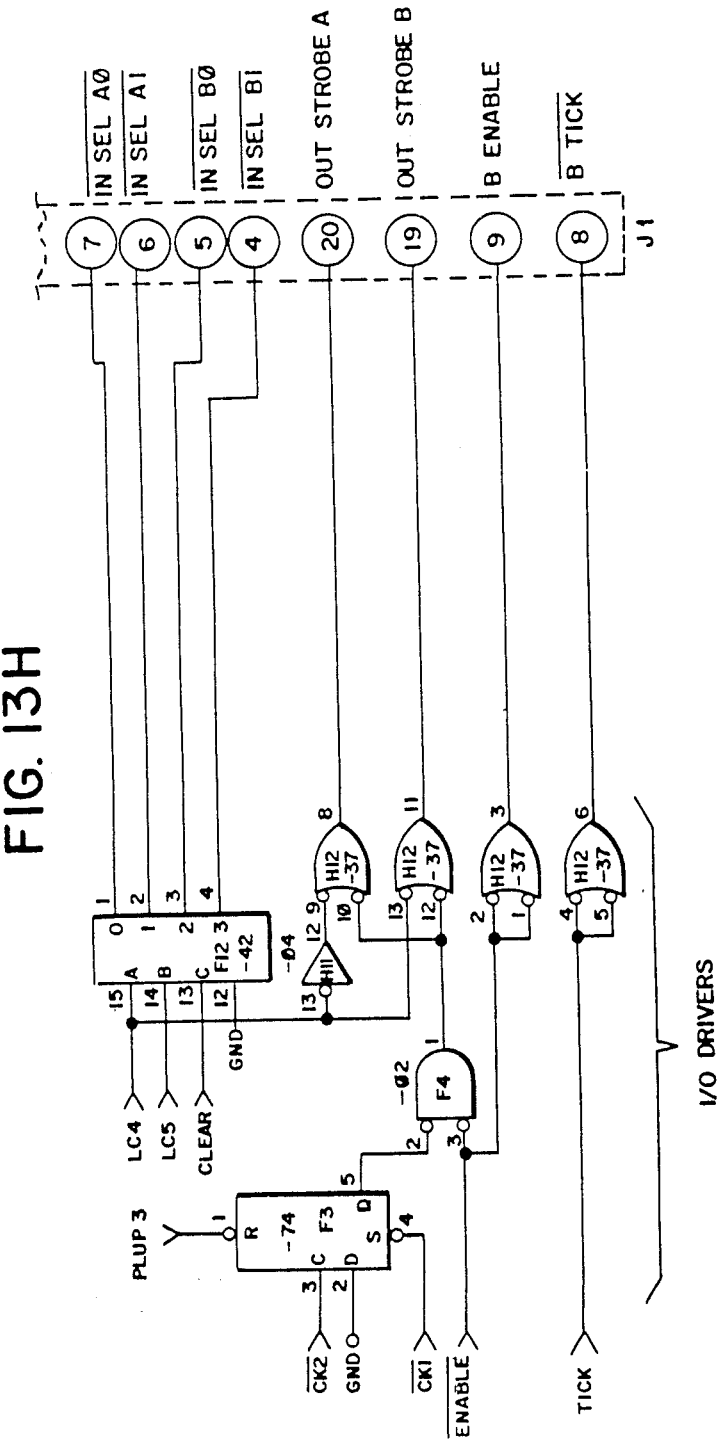
Figure 14A:
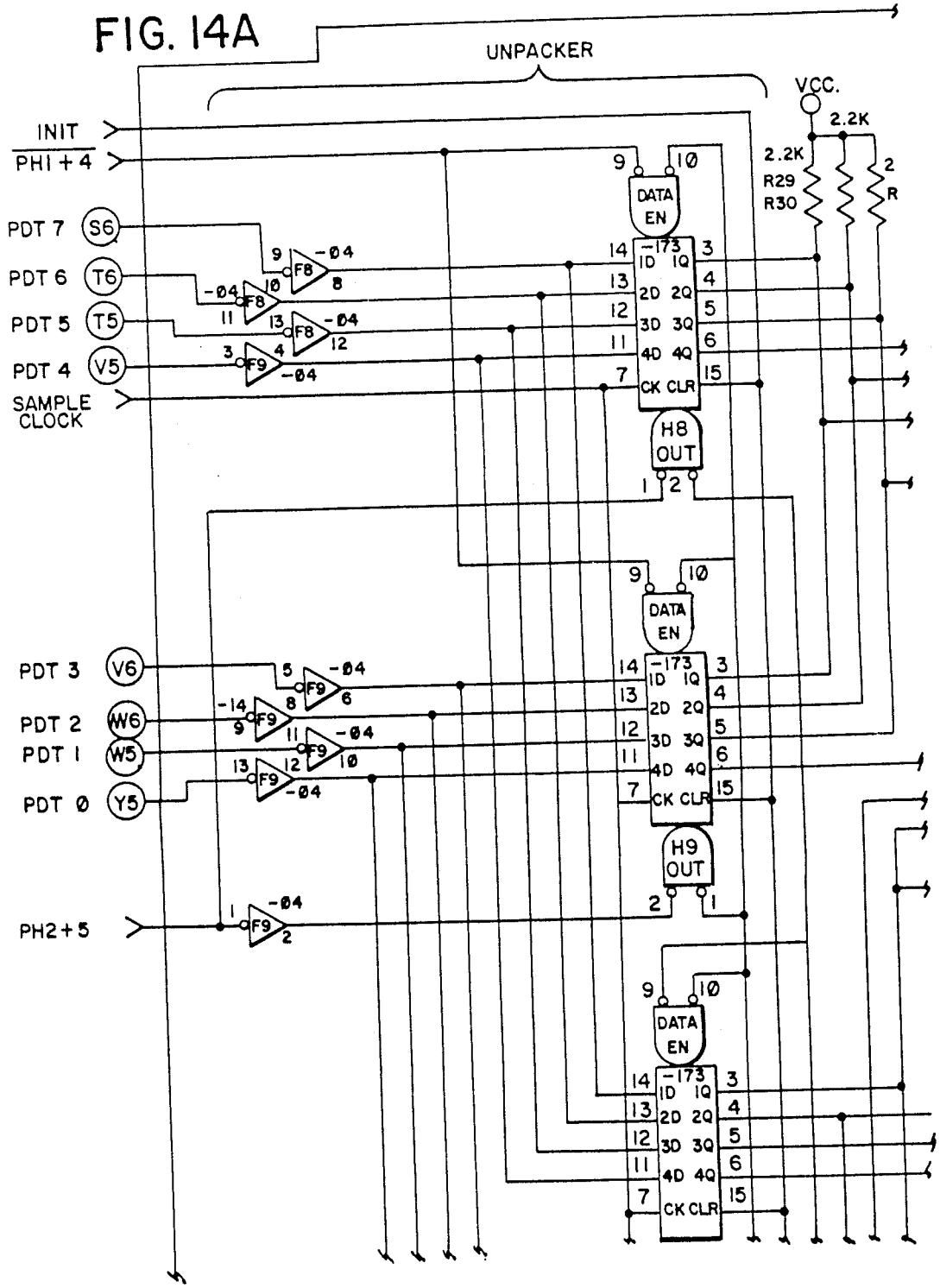
Figure 14B:
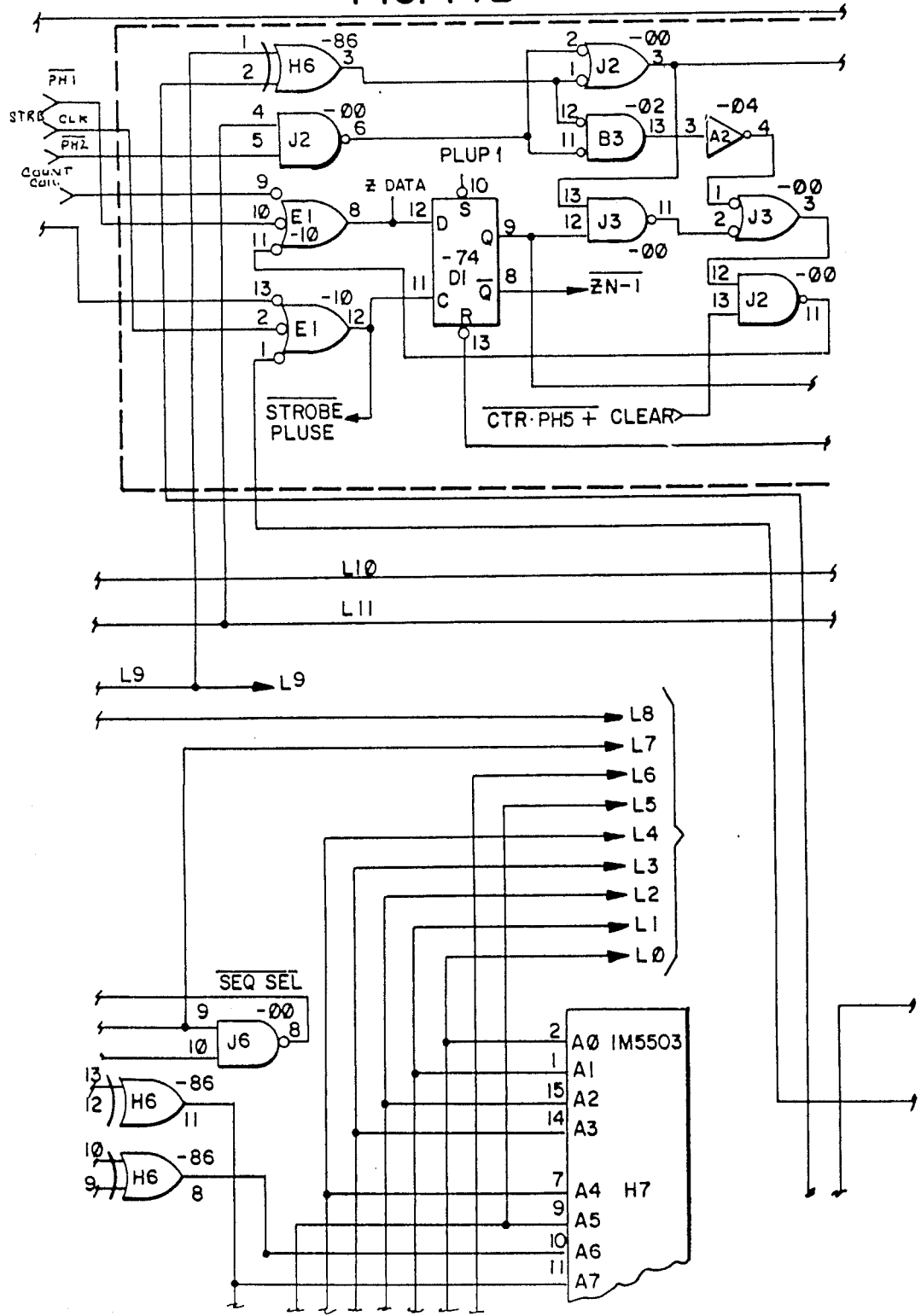
Figure 14C:
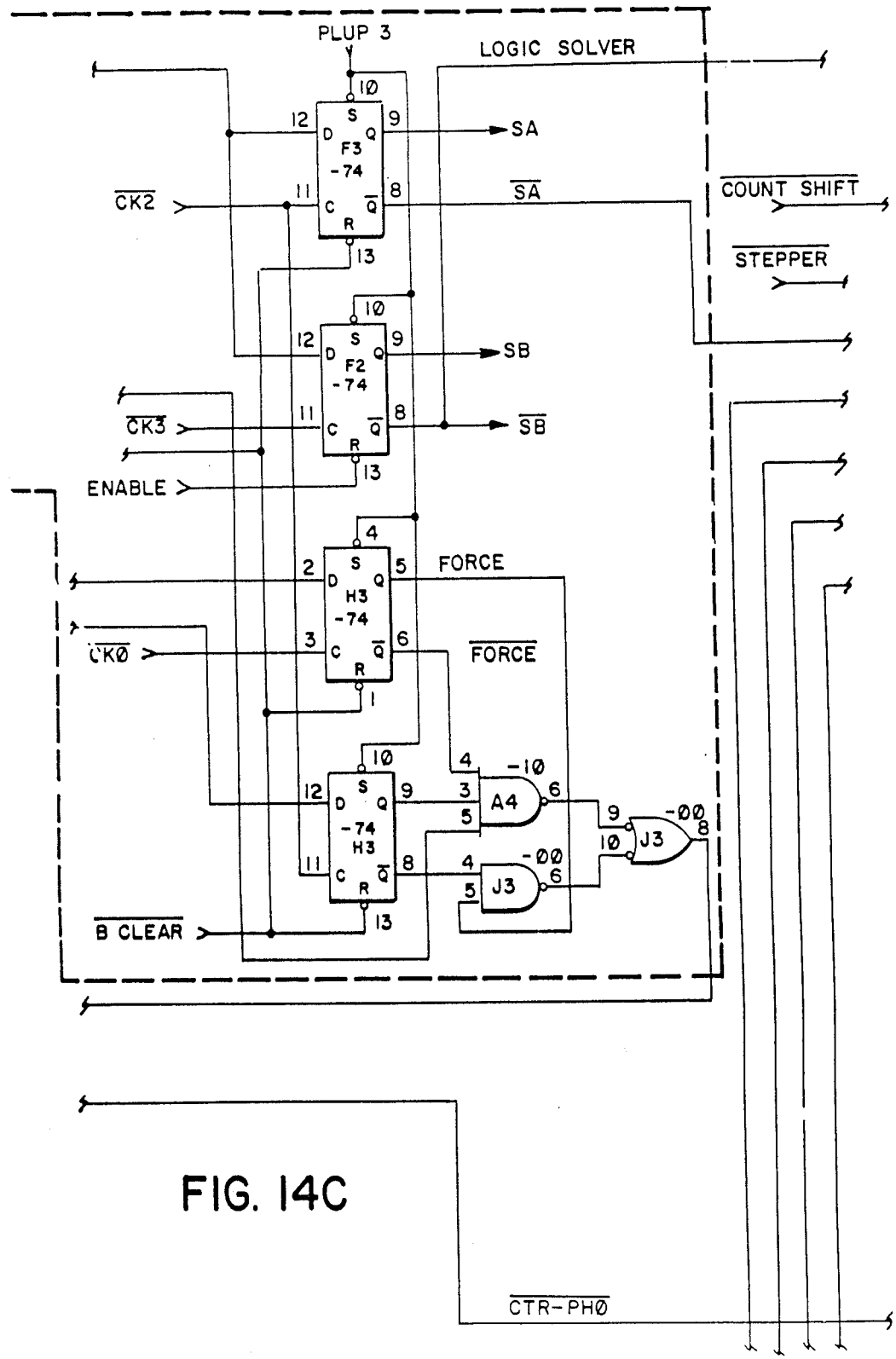
Figure 14D:
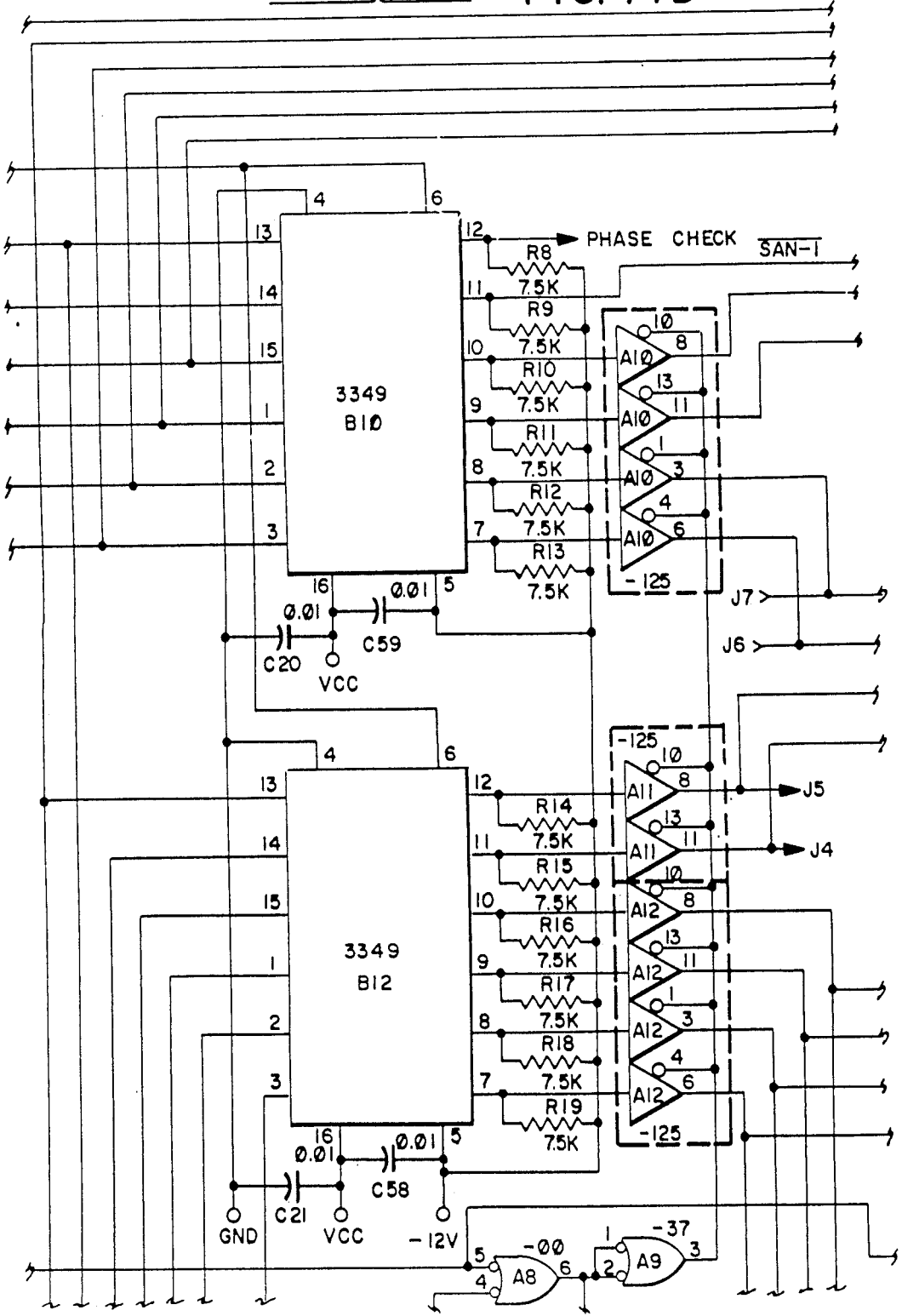
Figure 14E:
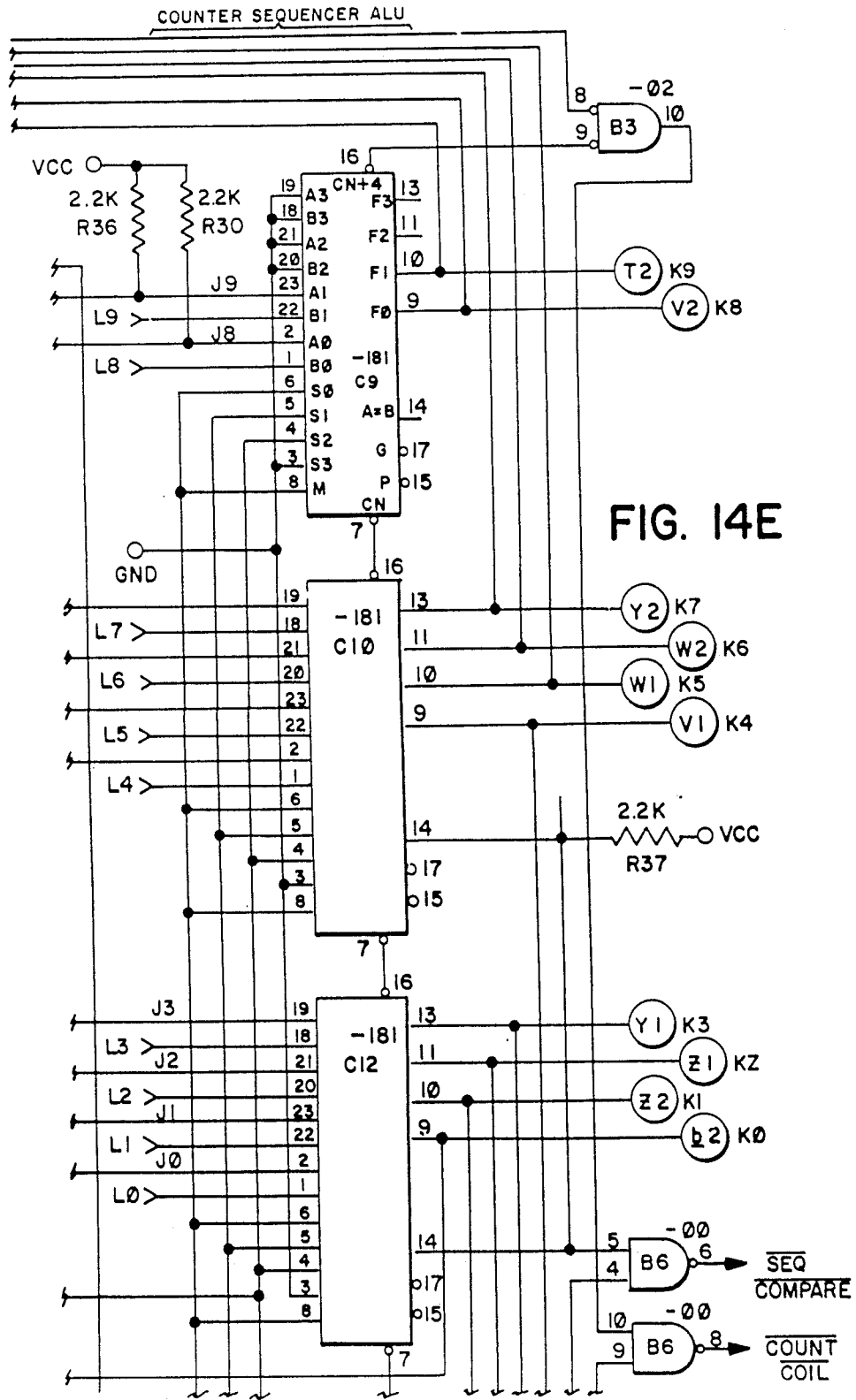
Figure 14F:
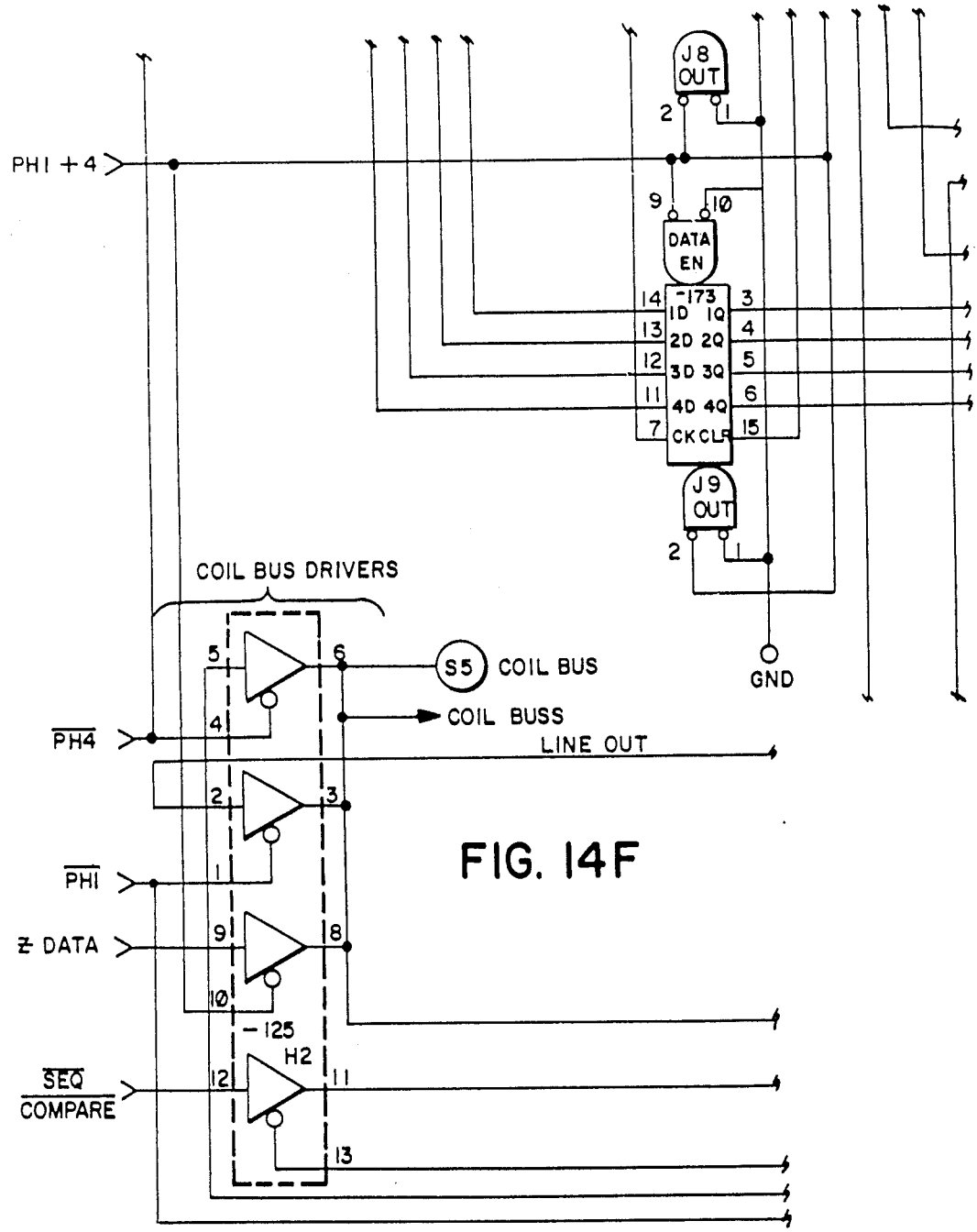
Figure 14G:
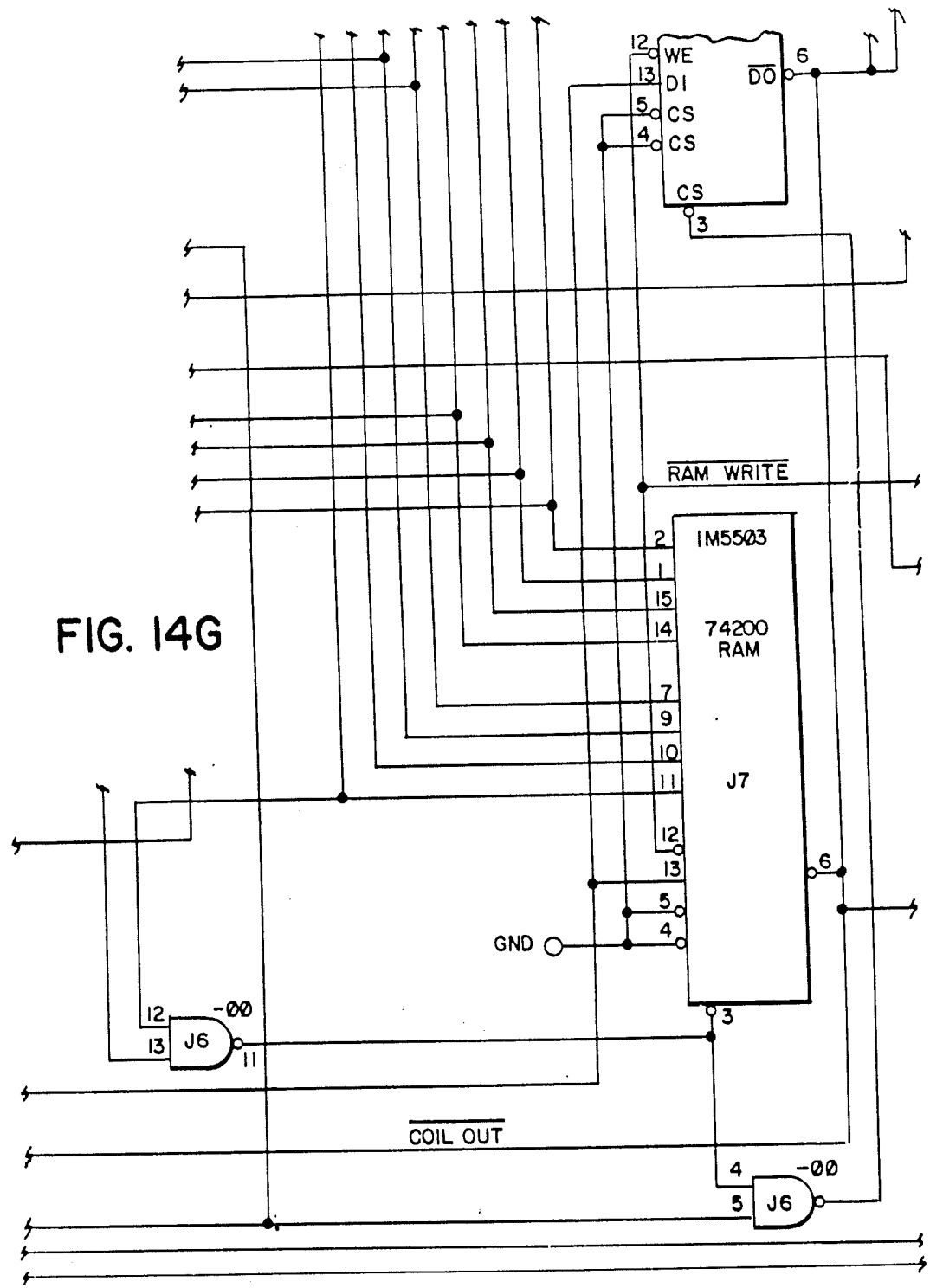
Figure 14H:
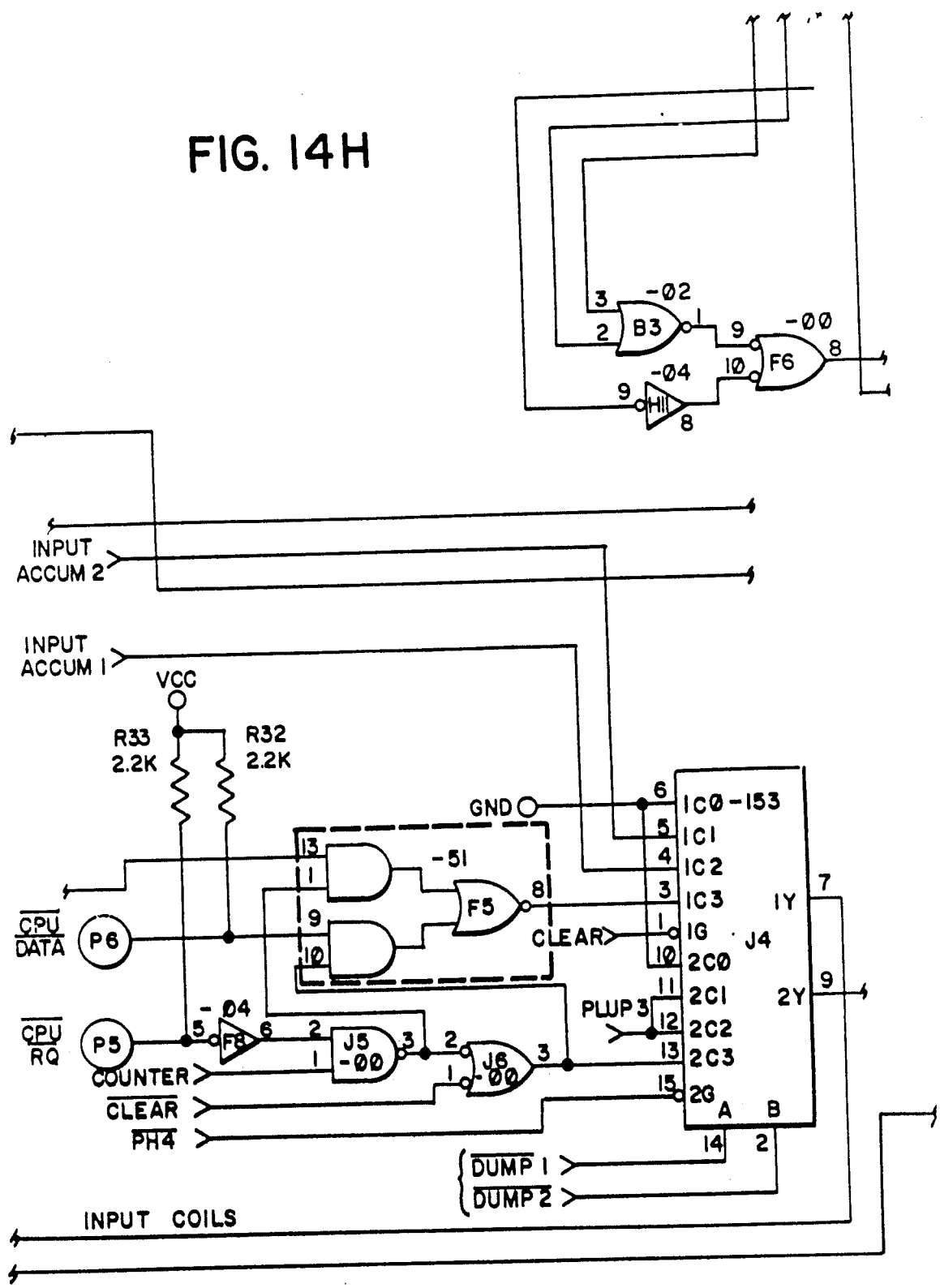
Figure 14I:
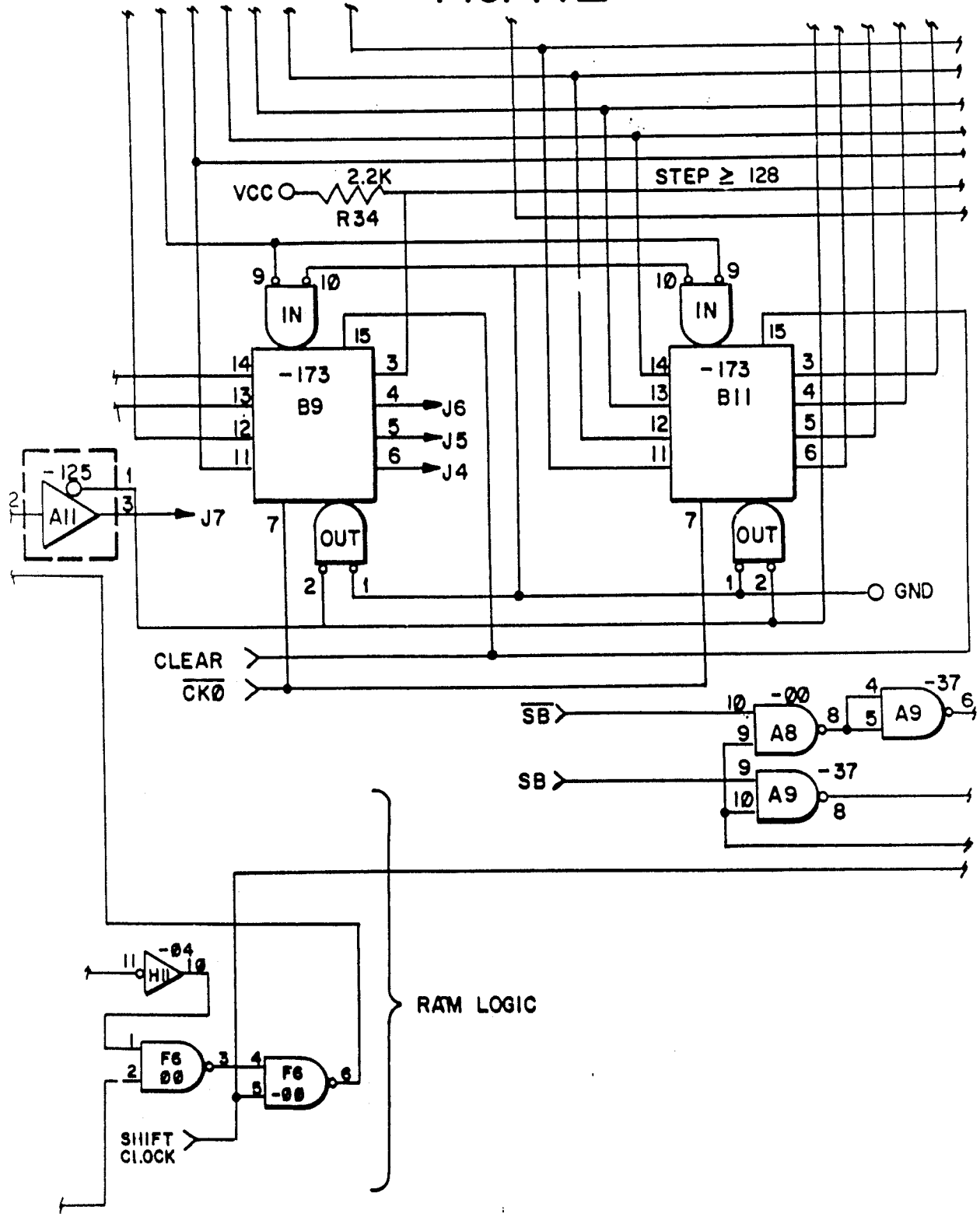
Figure 14J:
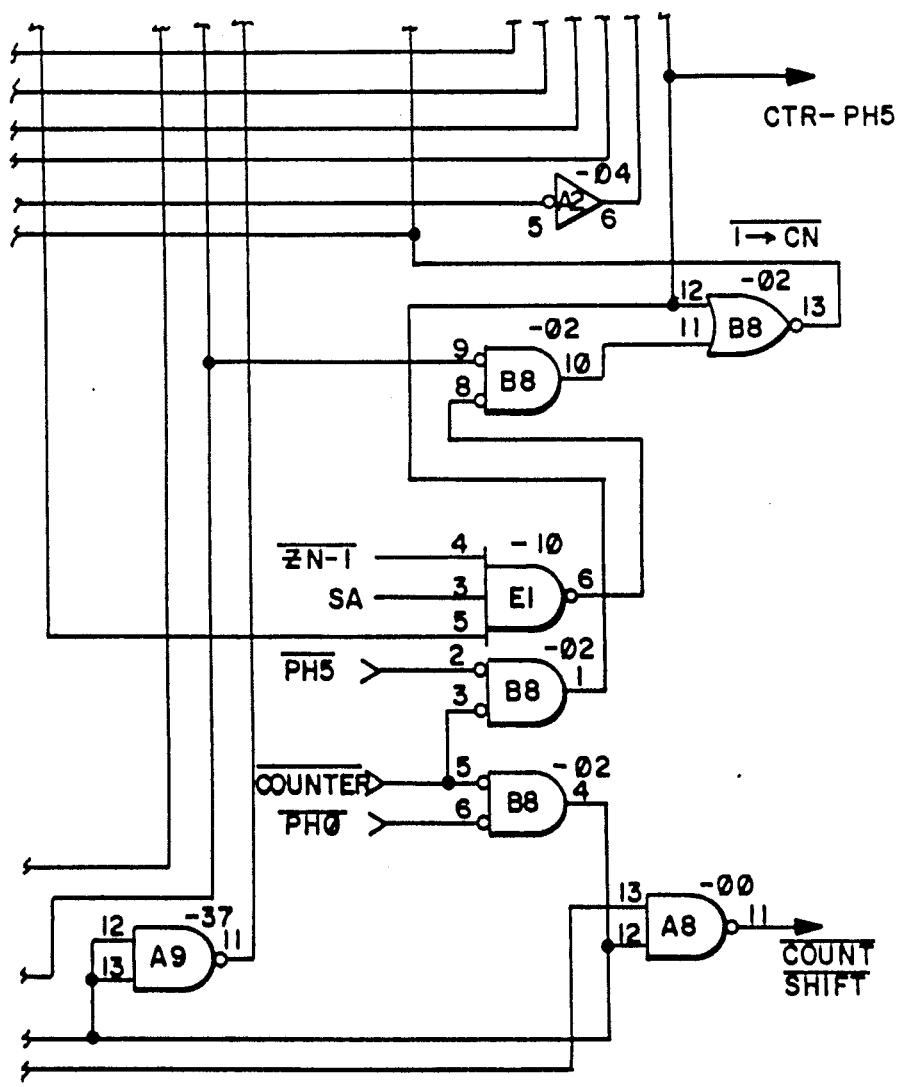
Figure 15A:
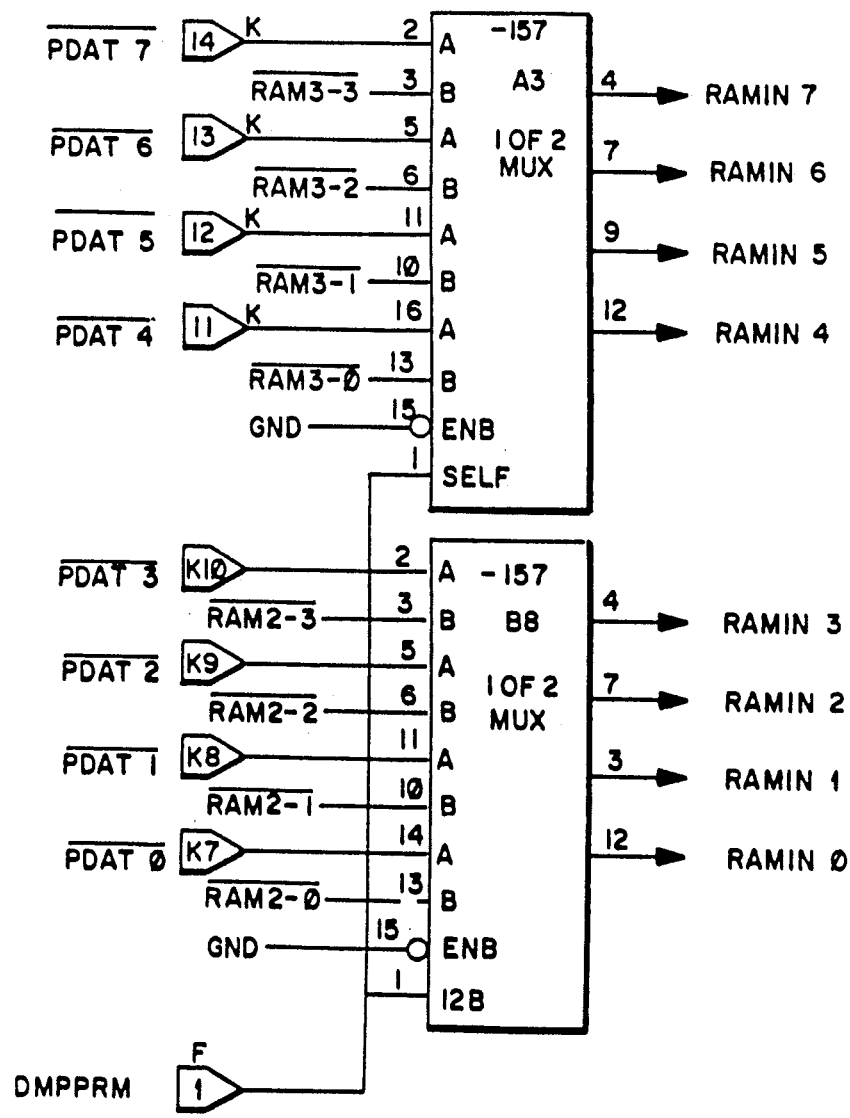
Figure 15B:
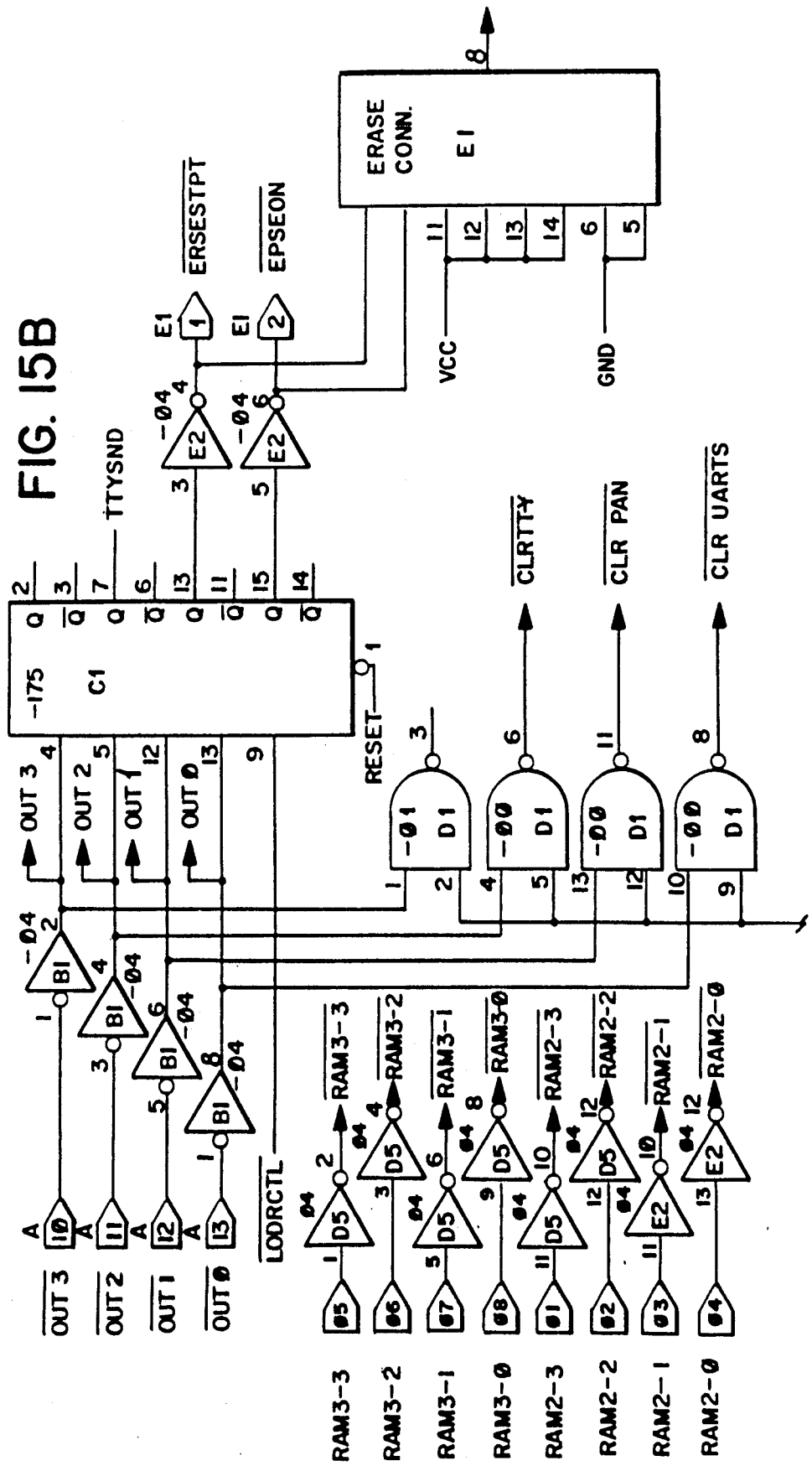
Figure 15E:
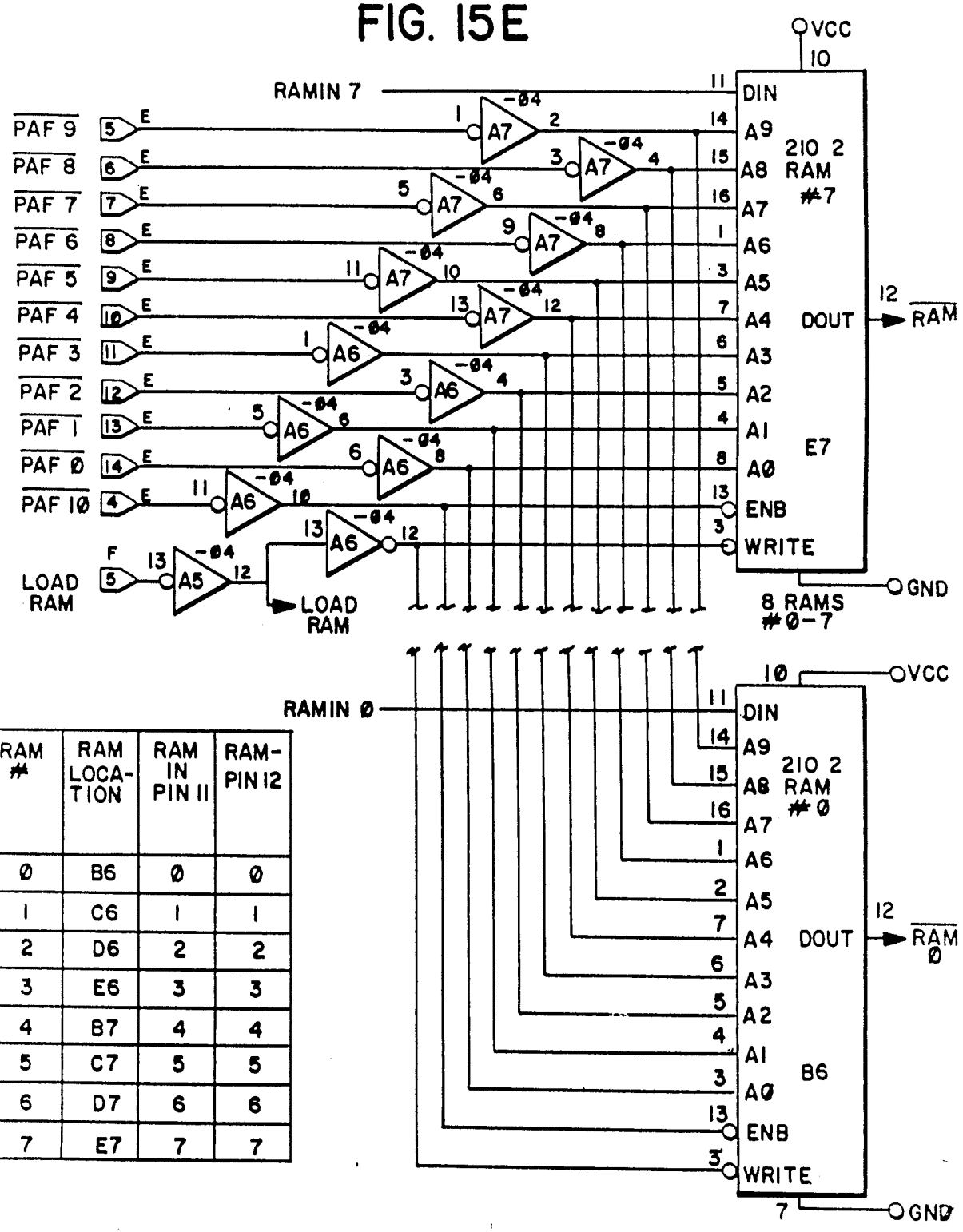
Figure 15G:
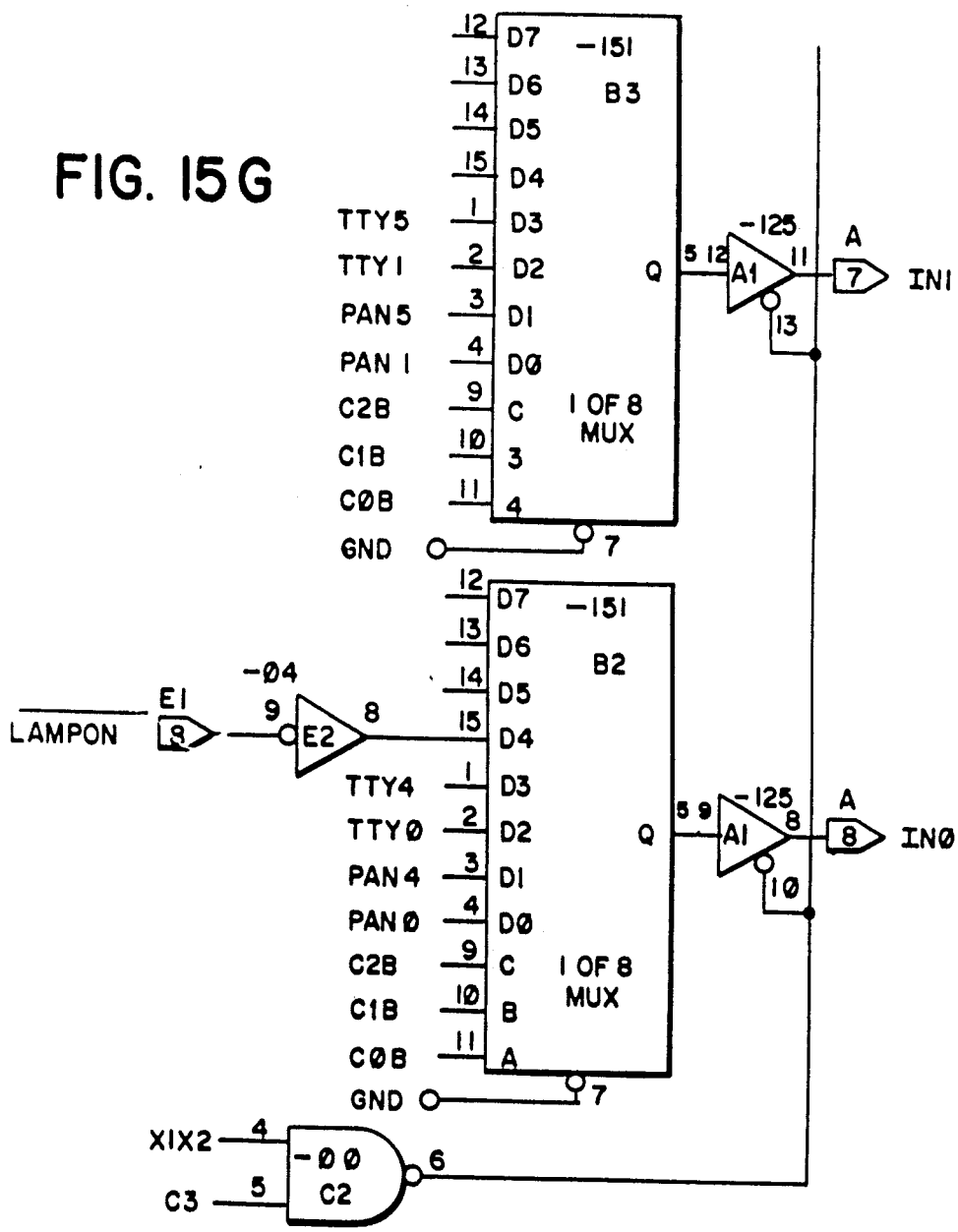
Figure 16A:
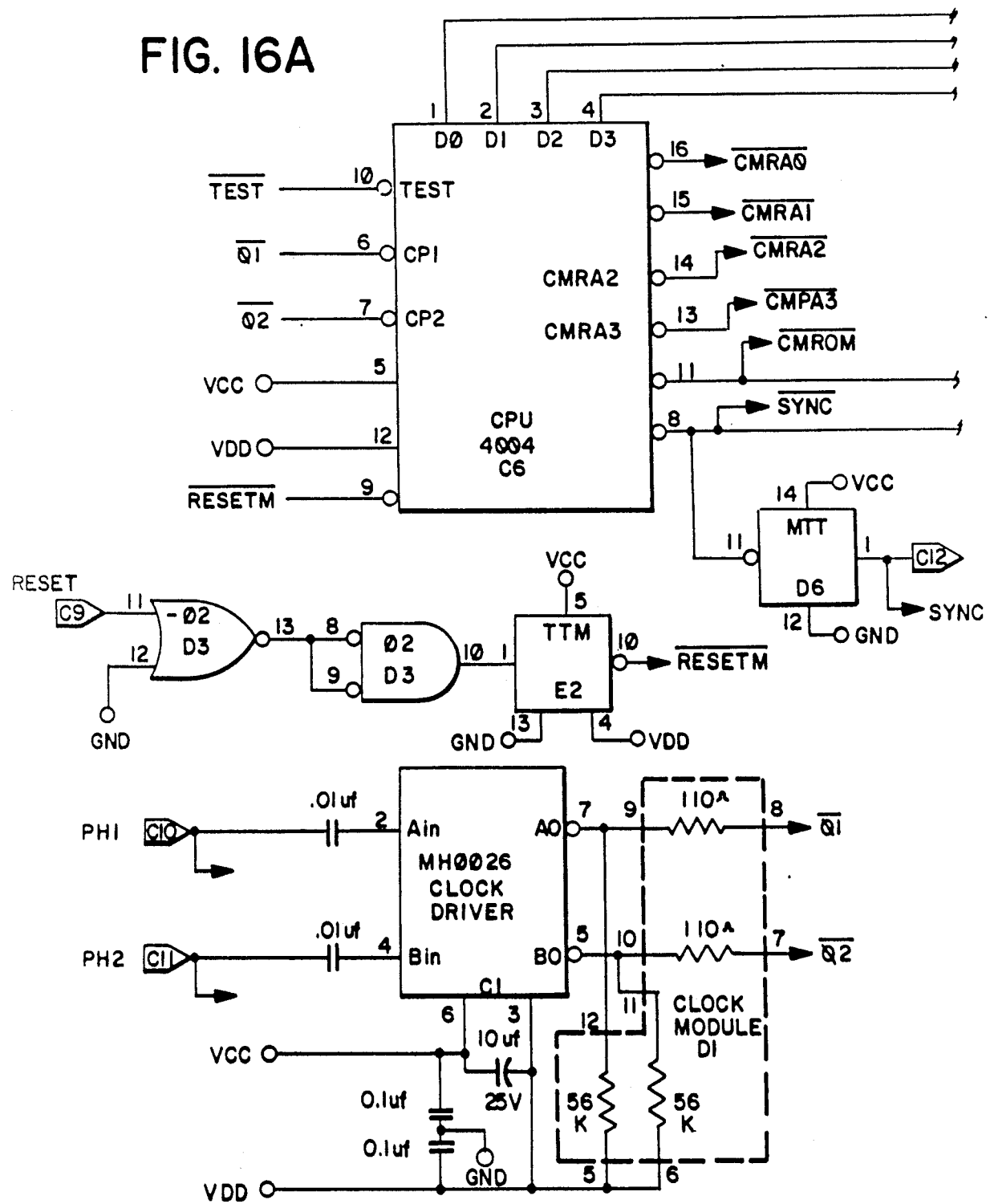
Figure 16B:
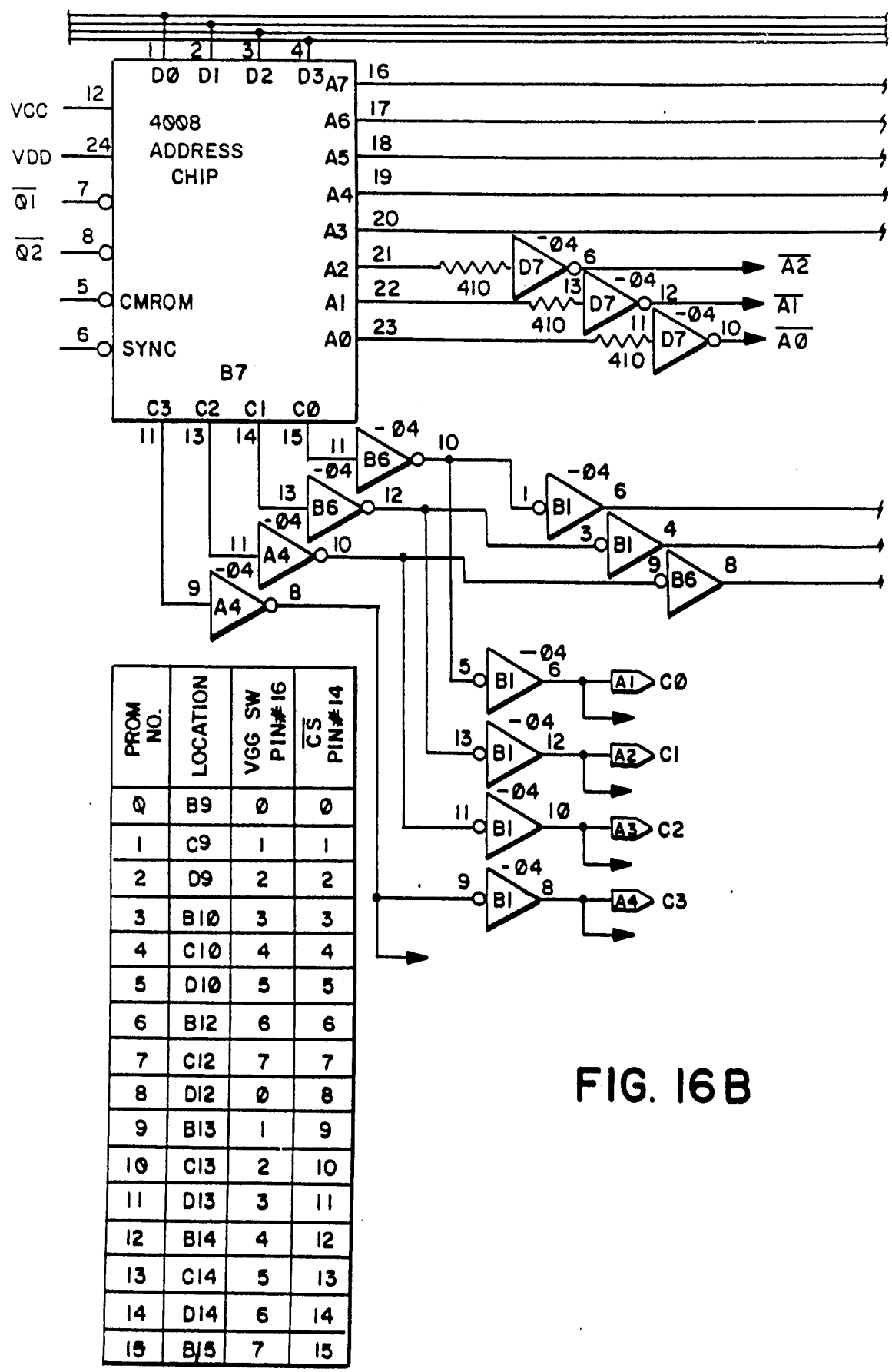
Figure 16D:
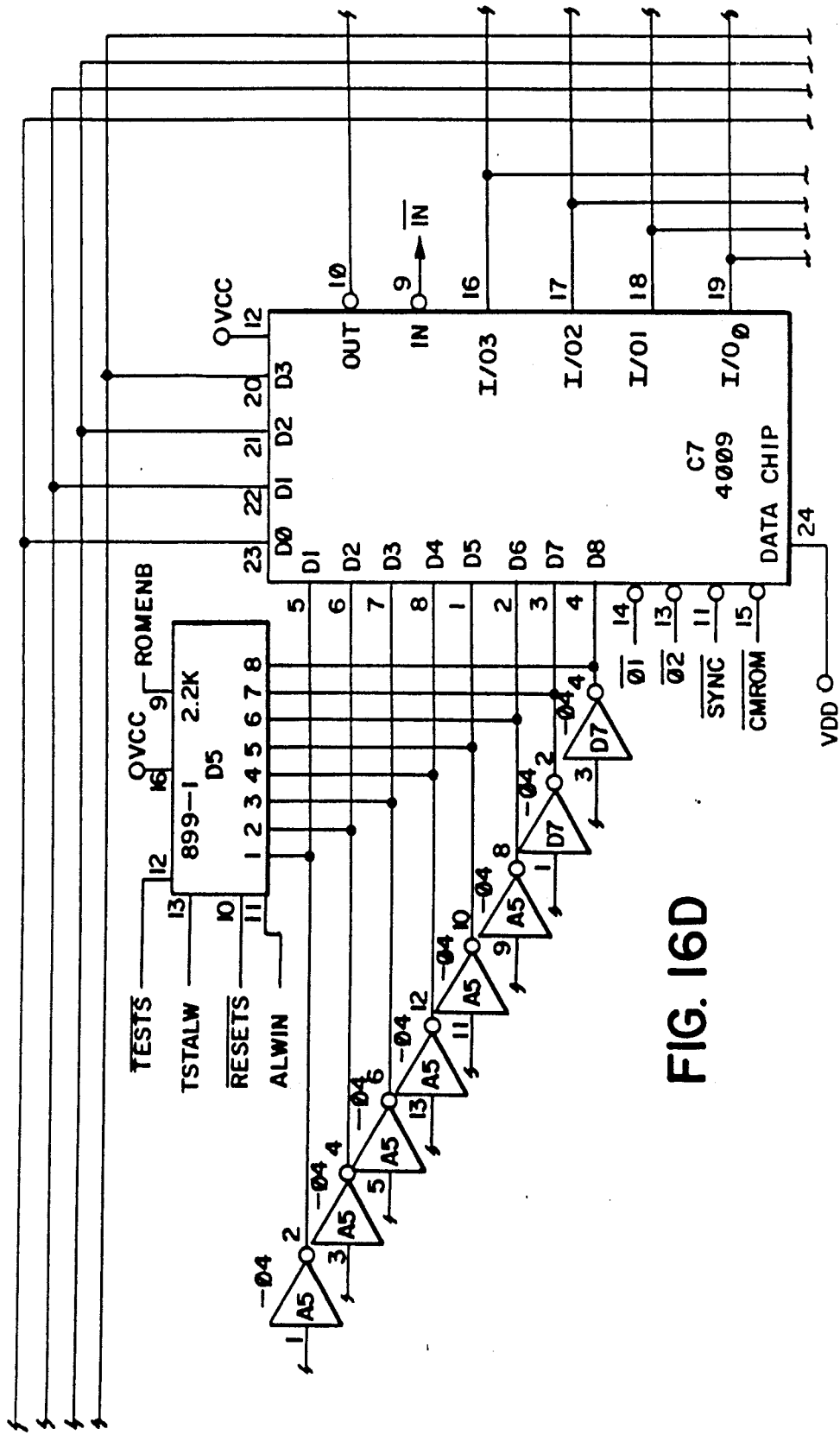
Figure 16E:
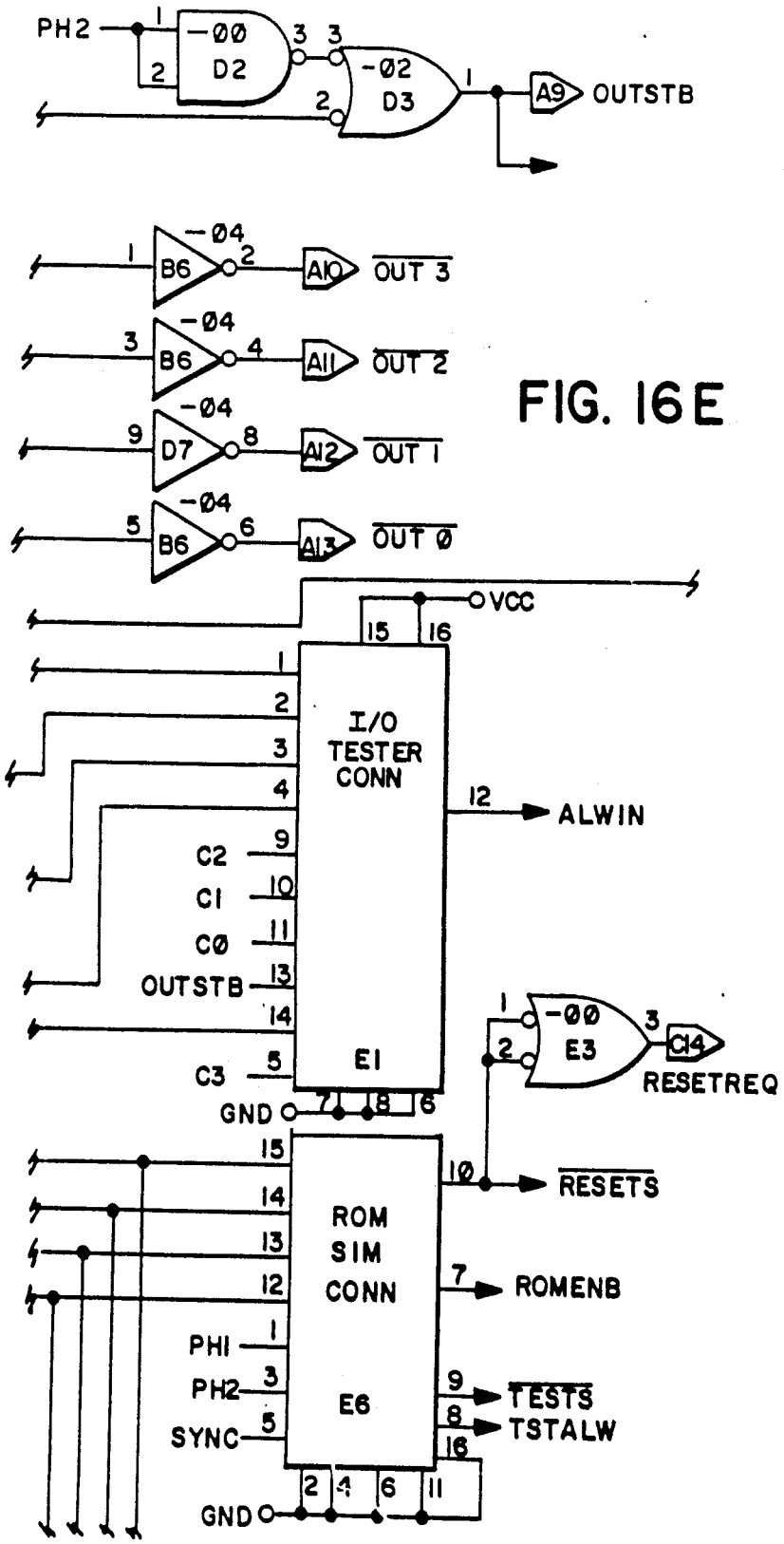
Figure 16F:
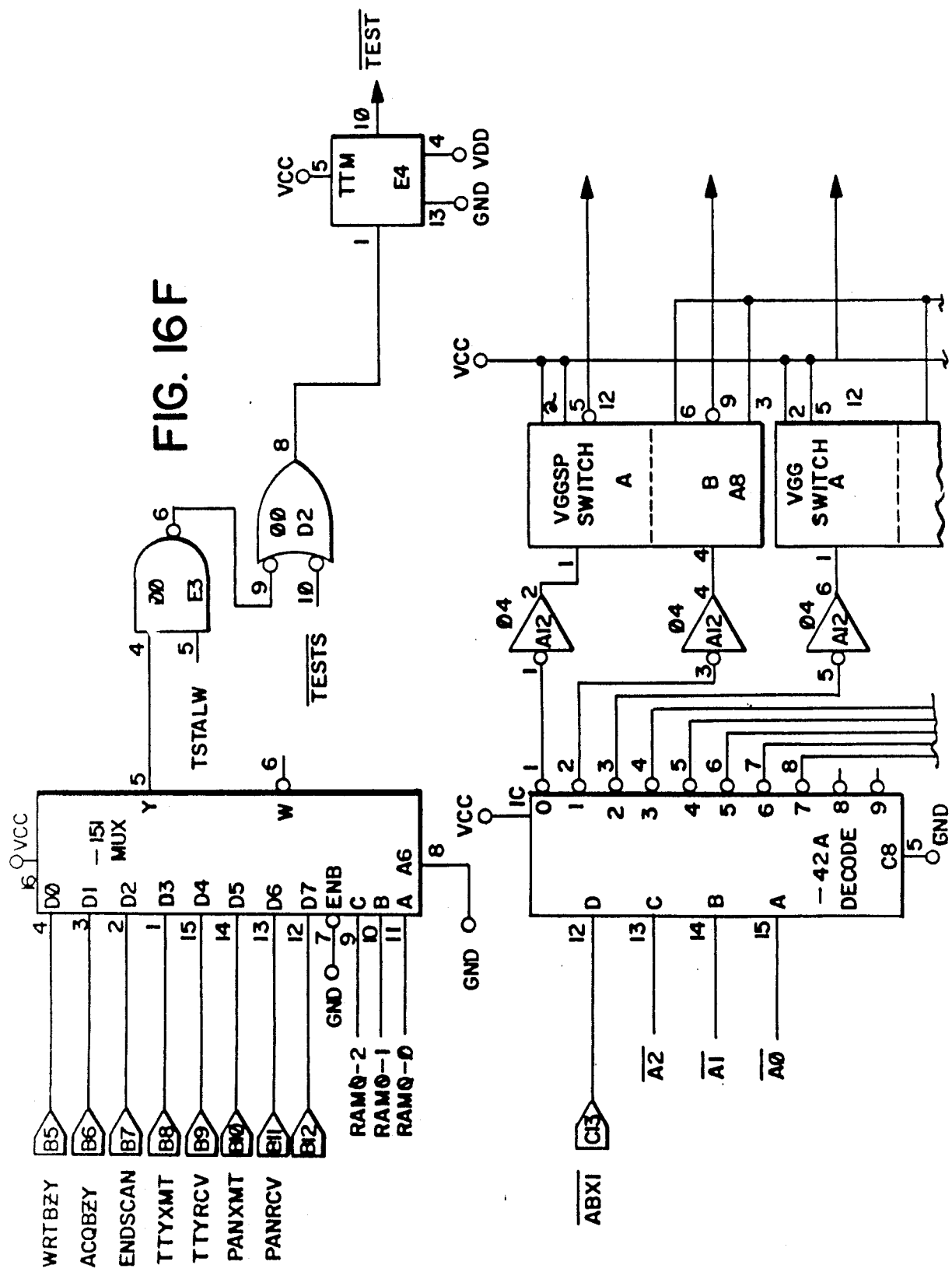
Figure 16G:
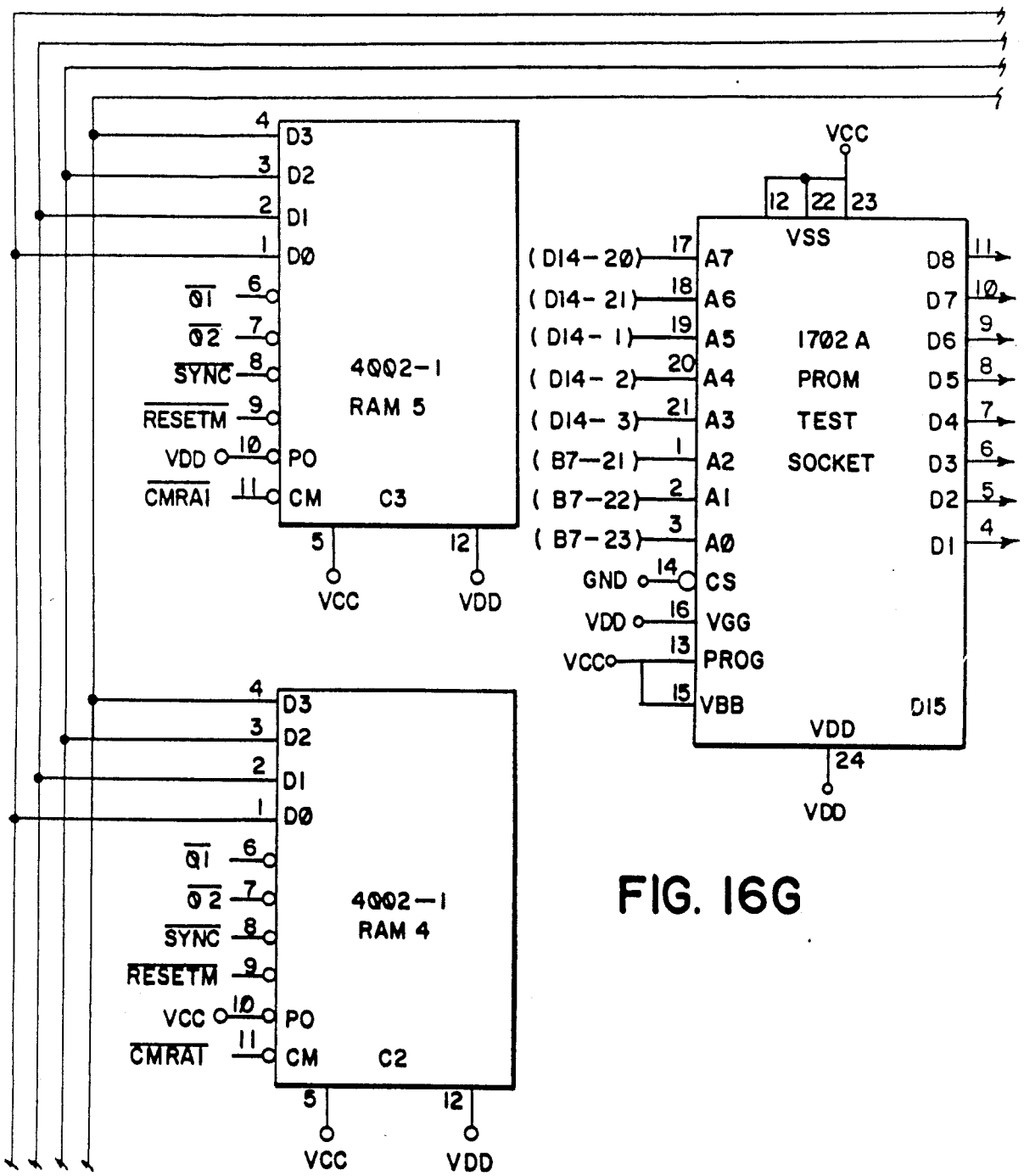
Figure 16K:
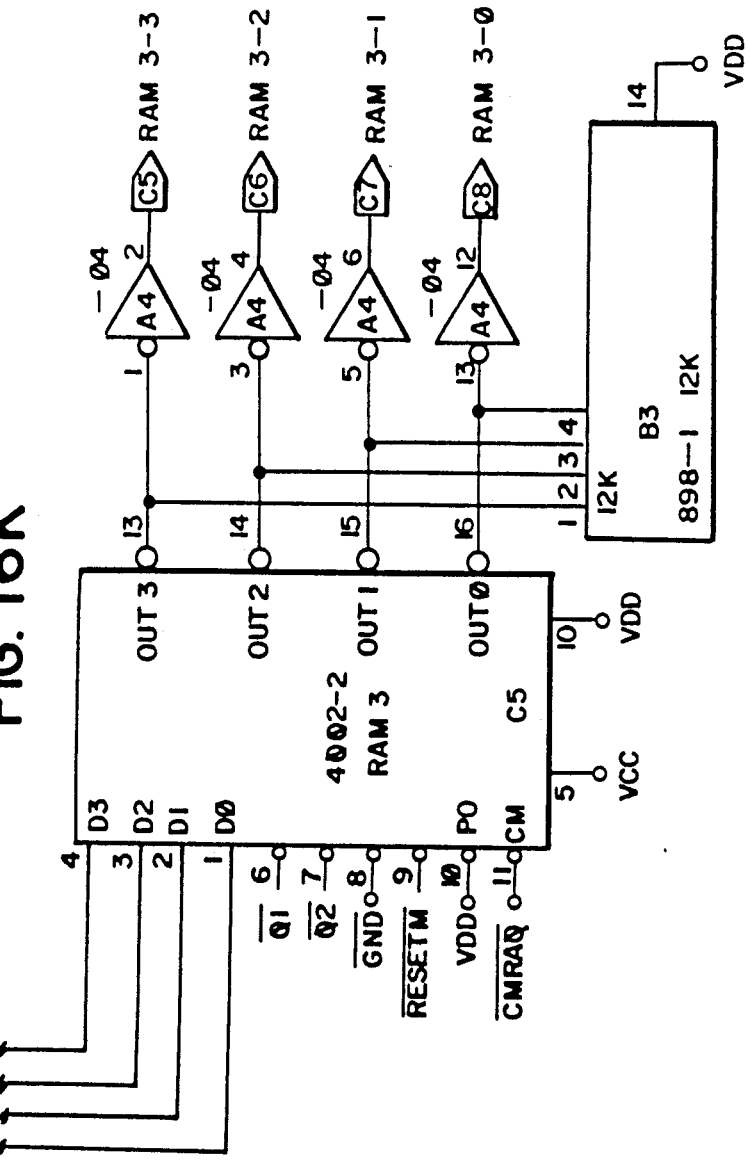
Figure 16L:
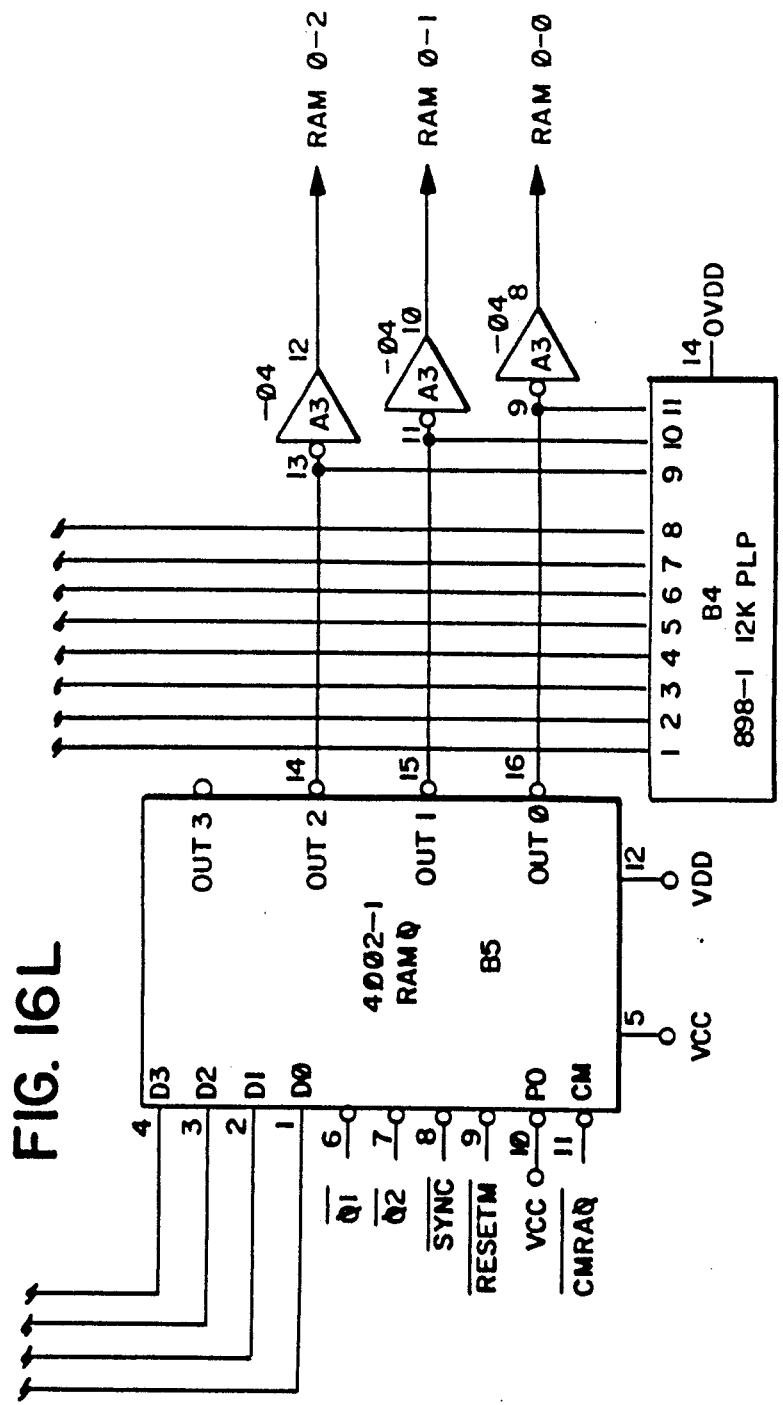
Figure 16M:
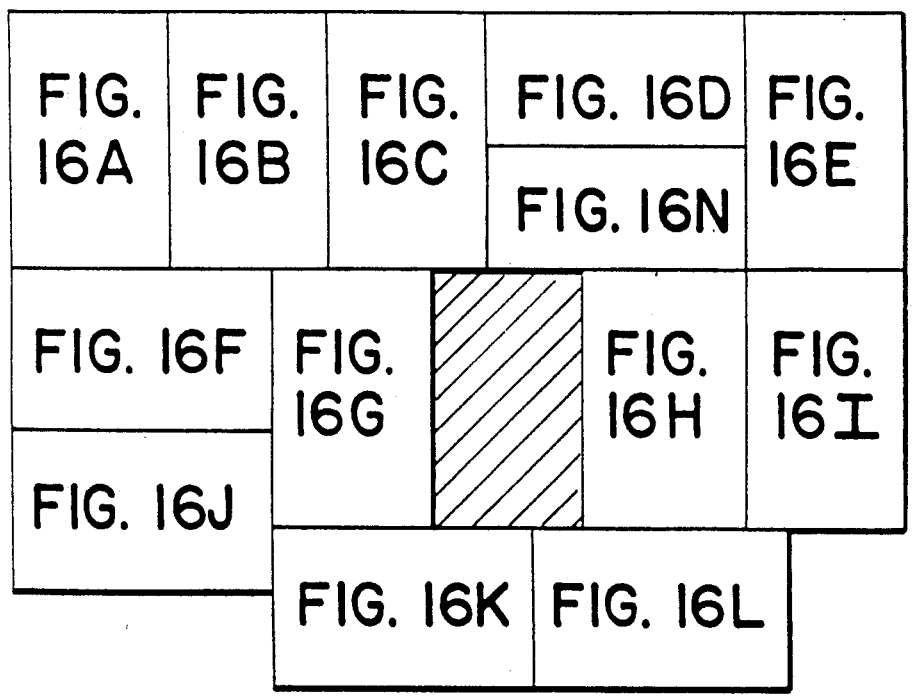
Figure 17F:
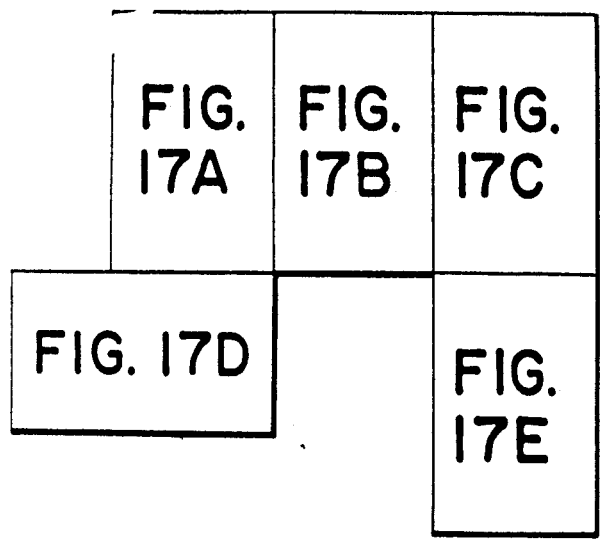
Figure 16N:
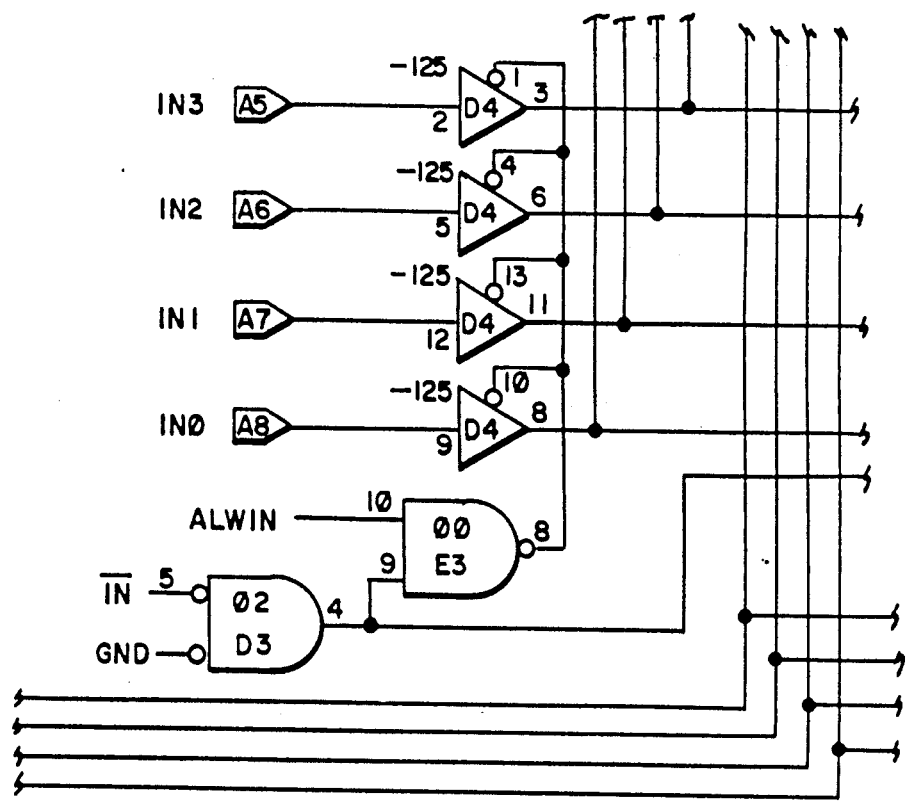
Figure 17C:
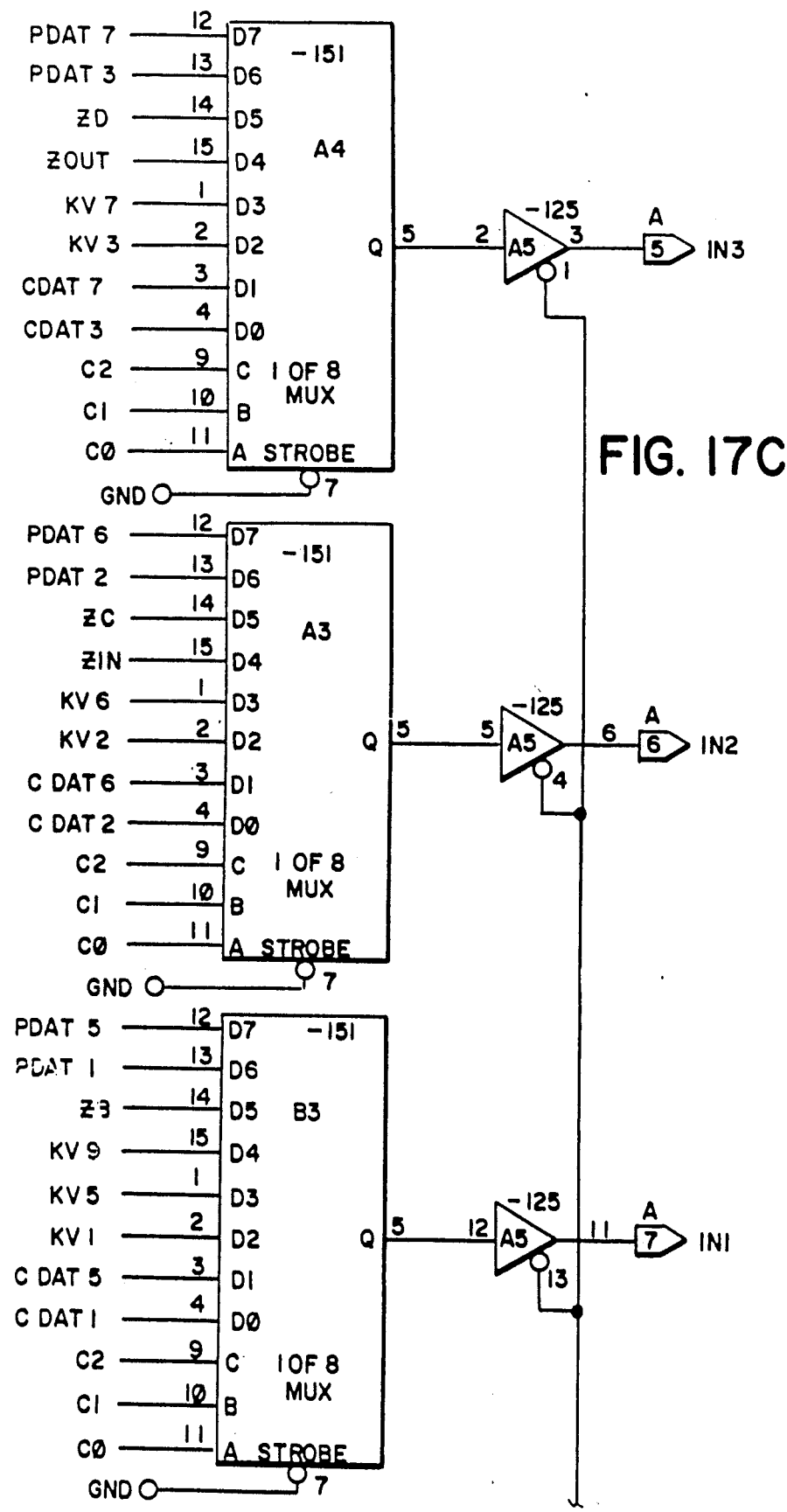
Figure 17D:
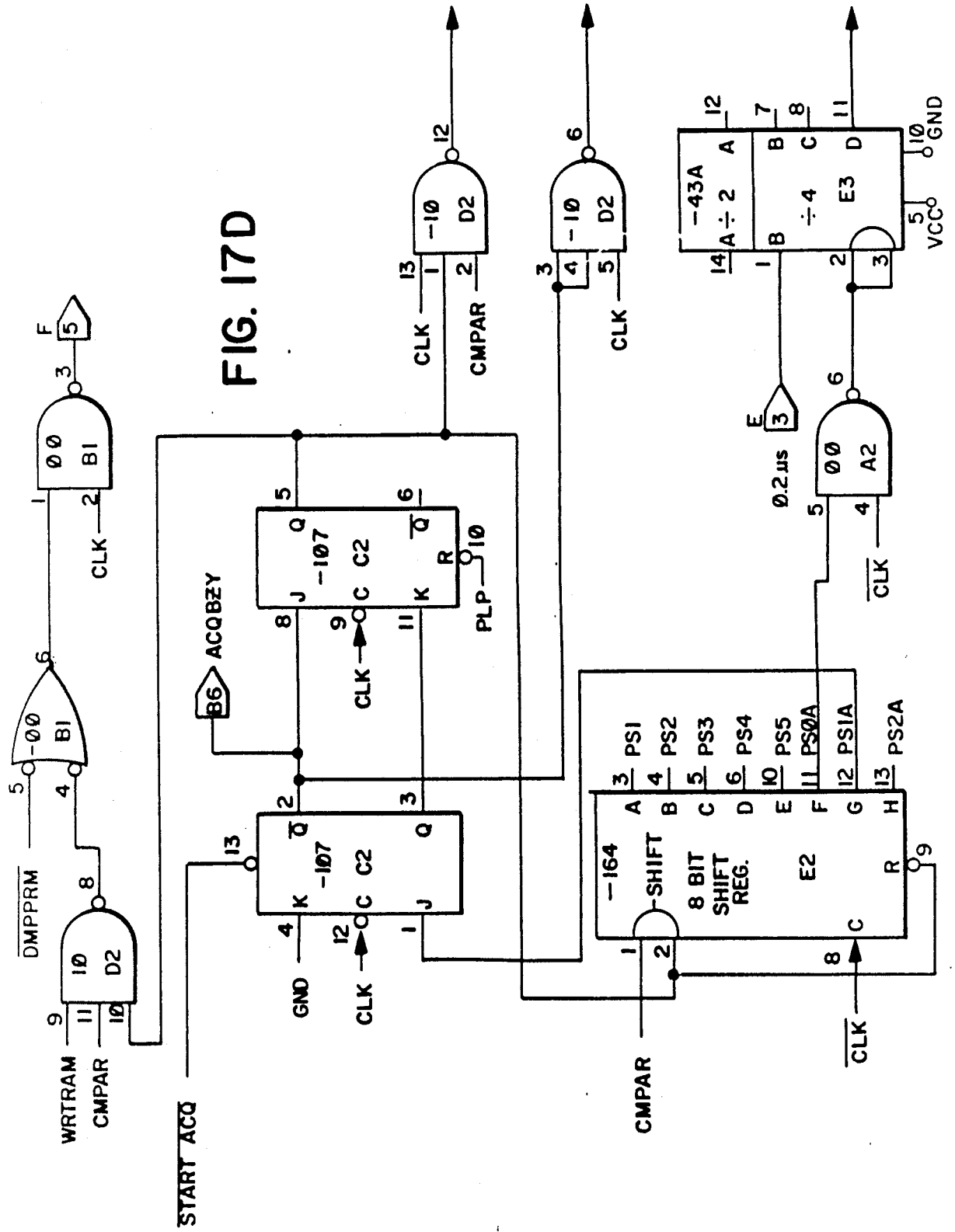
Figure 17E:
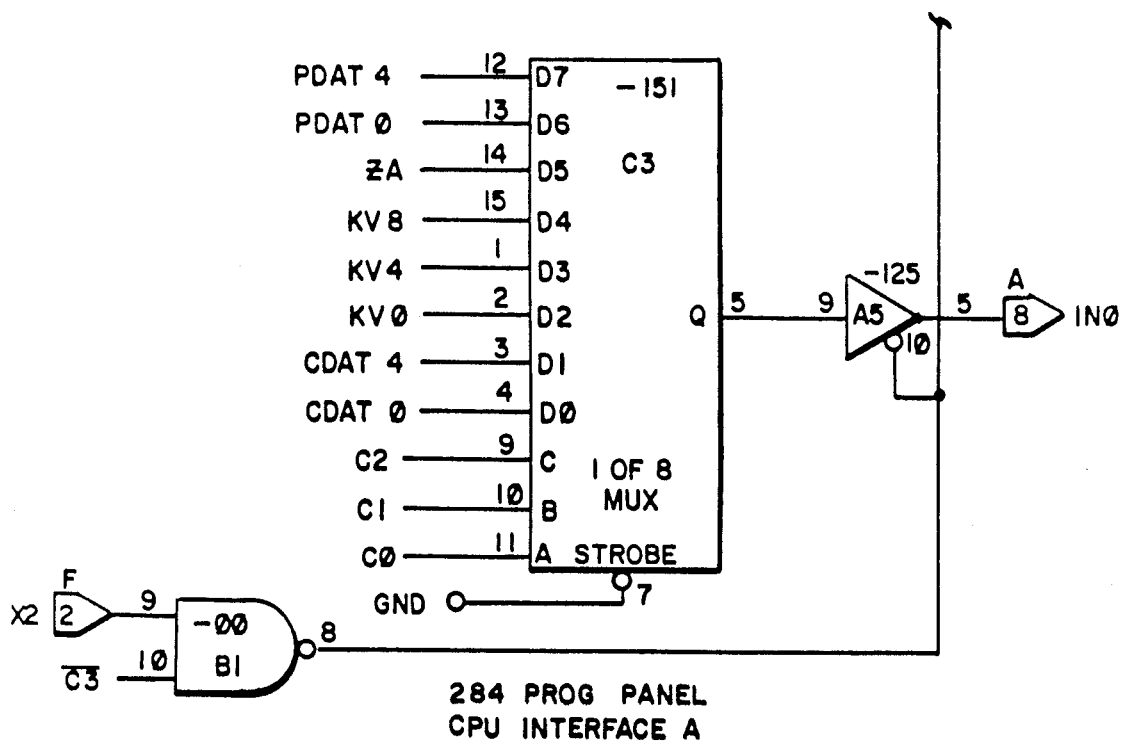
Figure 18A:
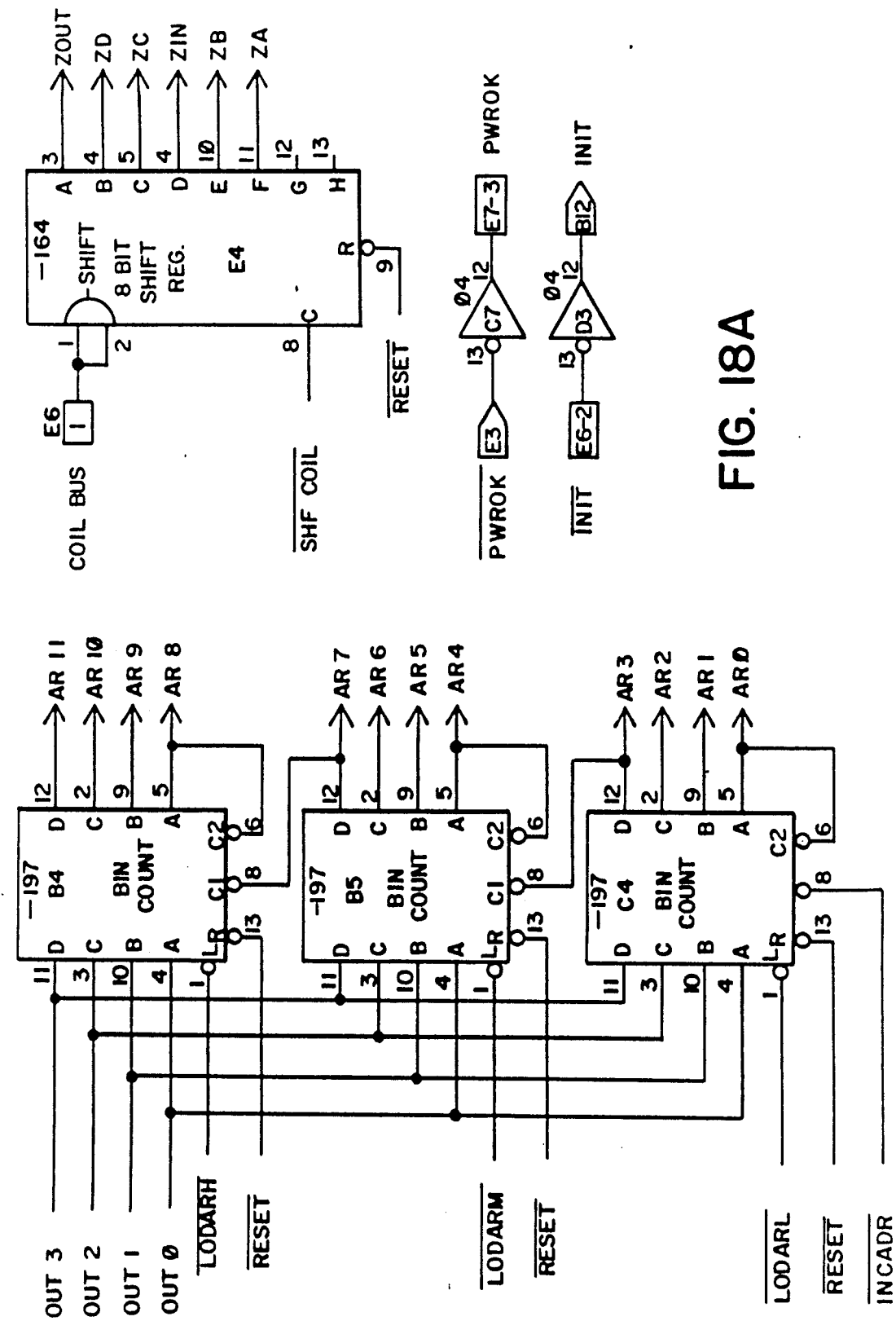
Figure 18C:
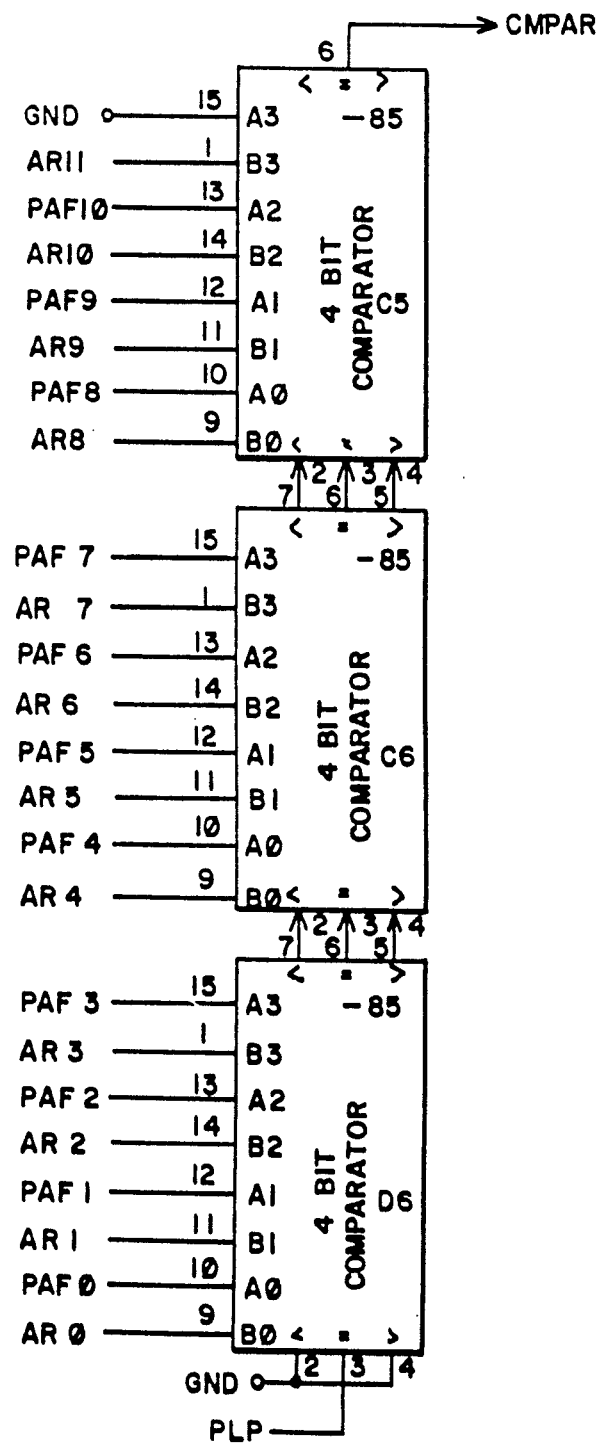
Figure 18E:
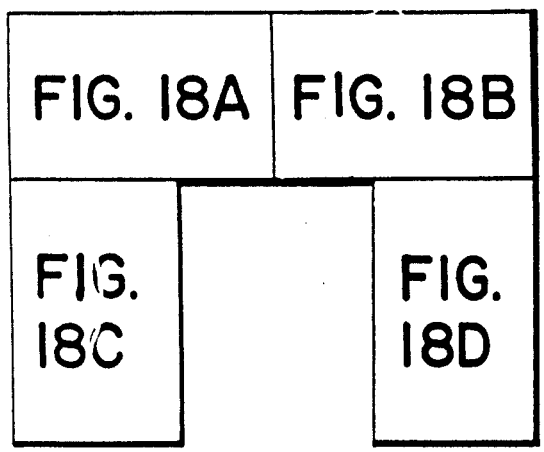
Figure 19E:
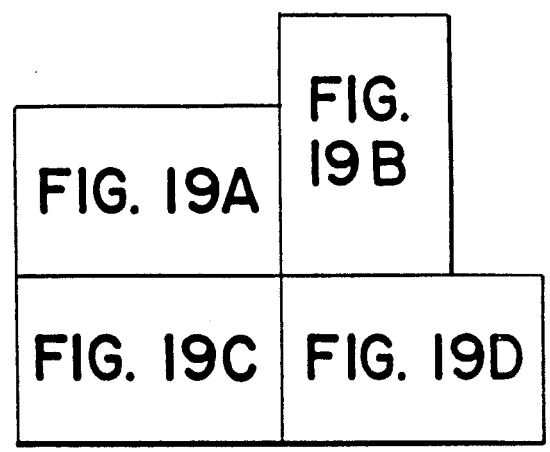
Figure 20D:
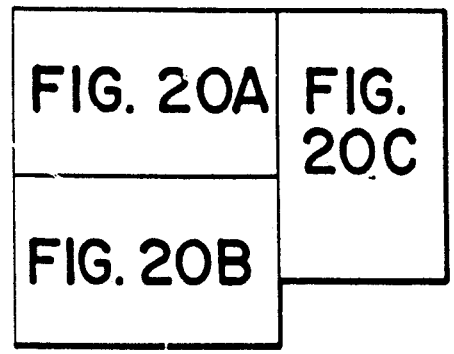
Figure 21D:
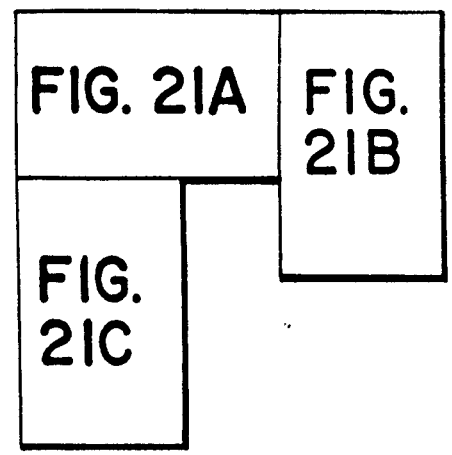
Figure 19B:
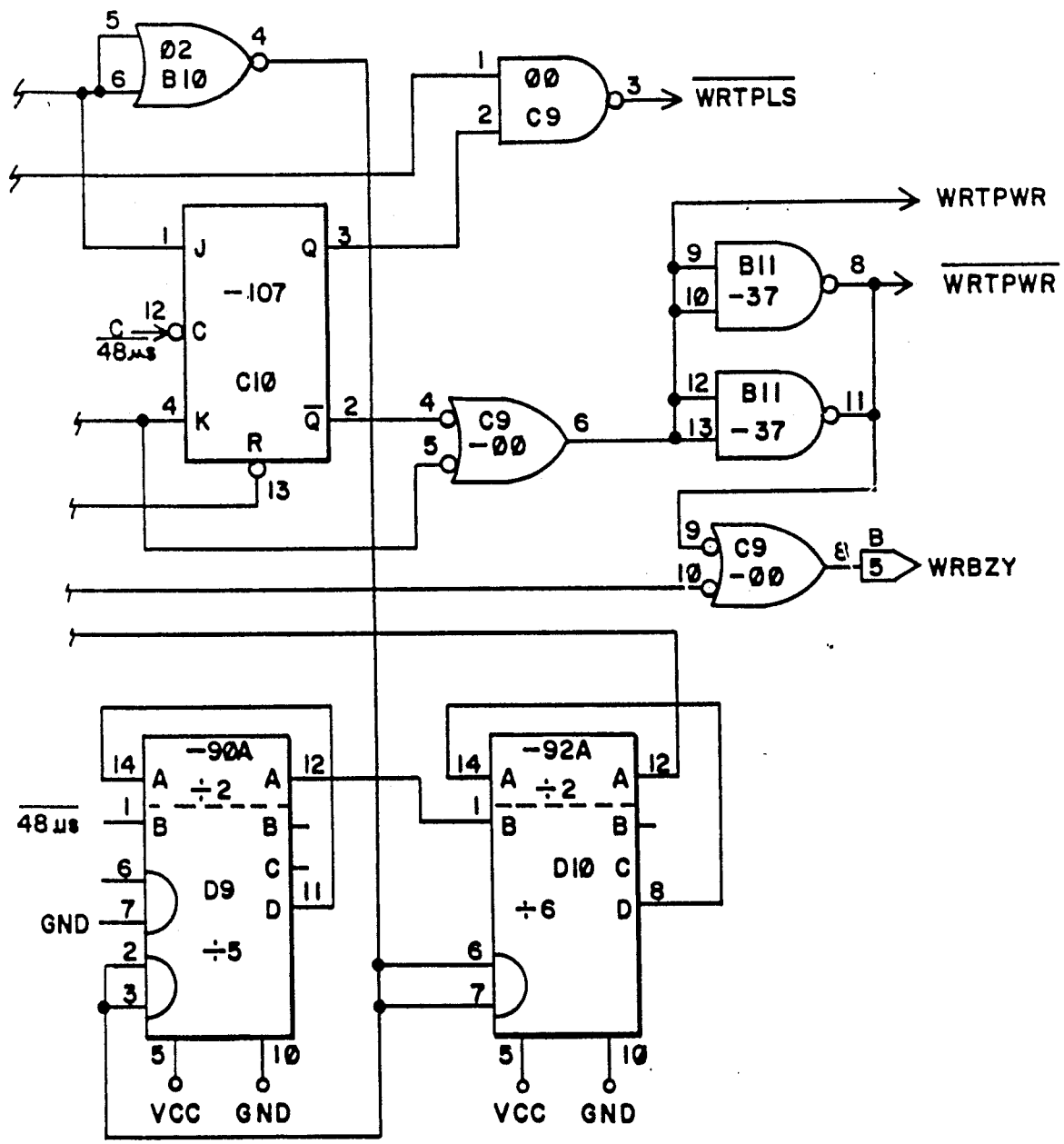
Figure 19C:
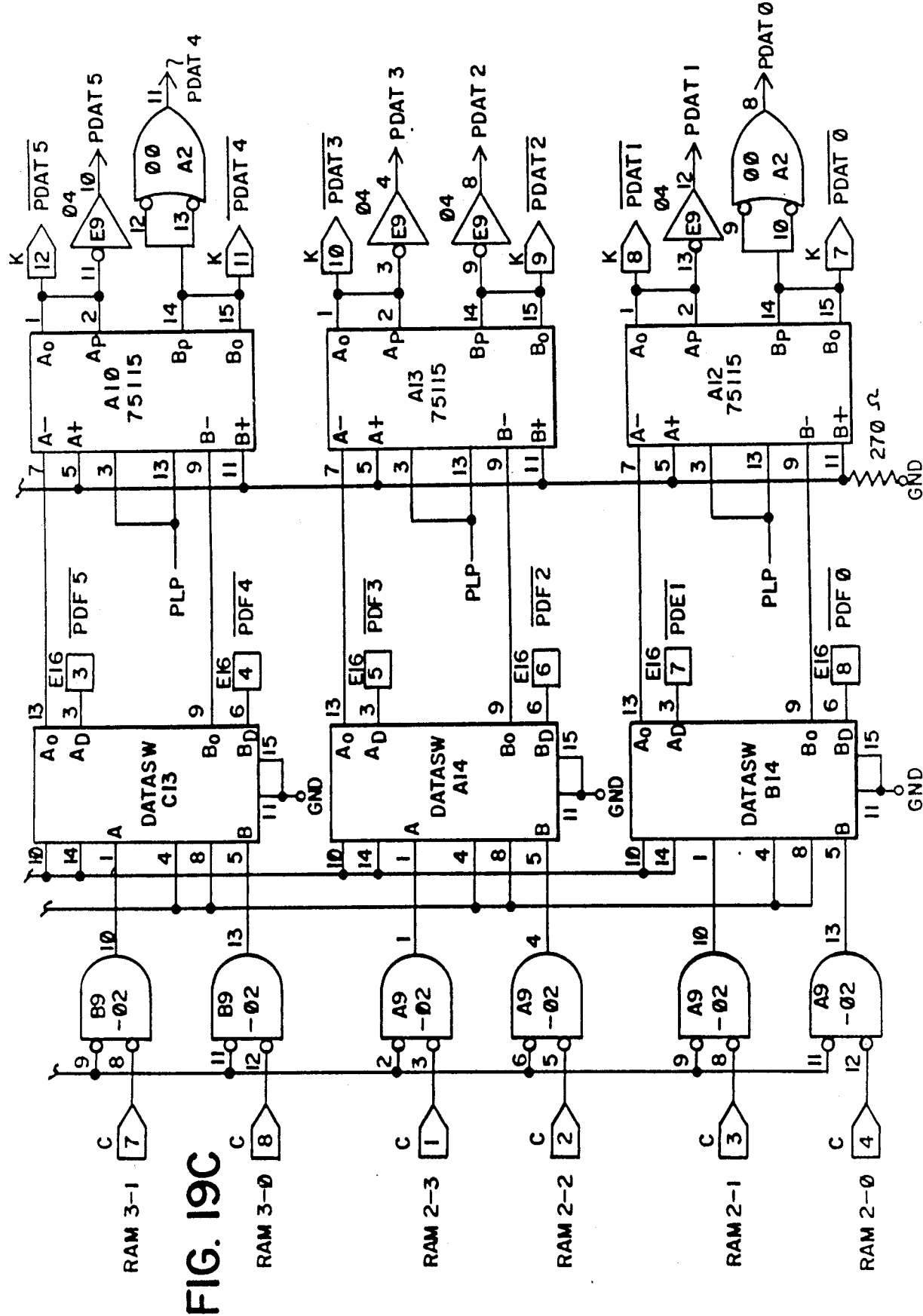
Figure 19D:
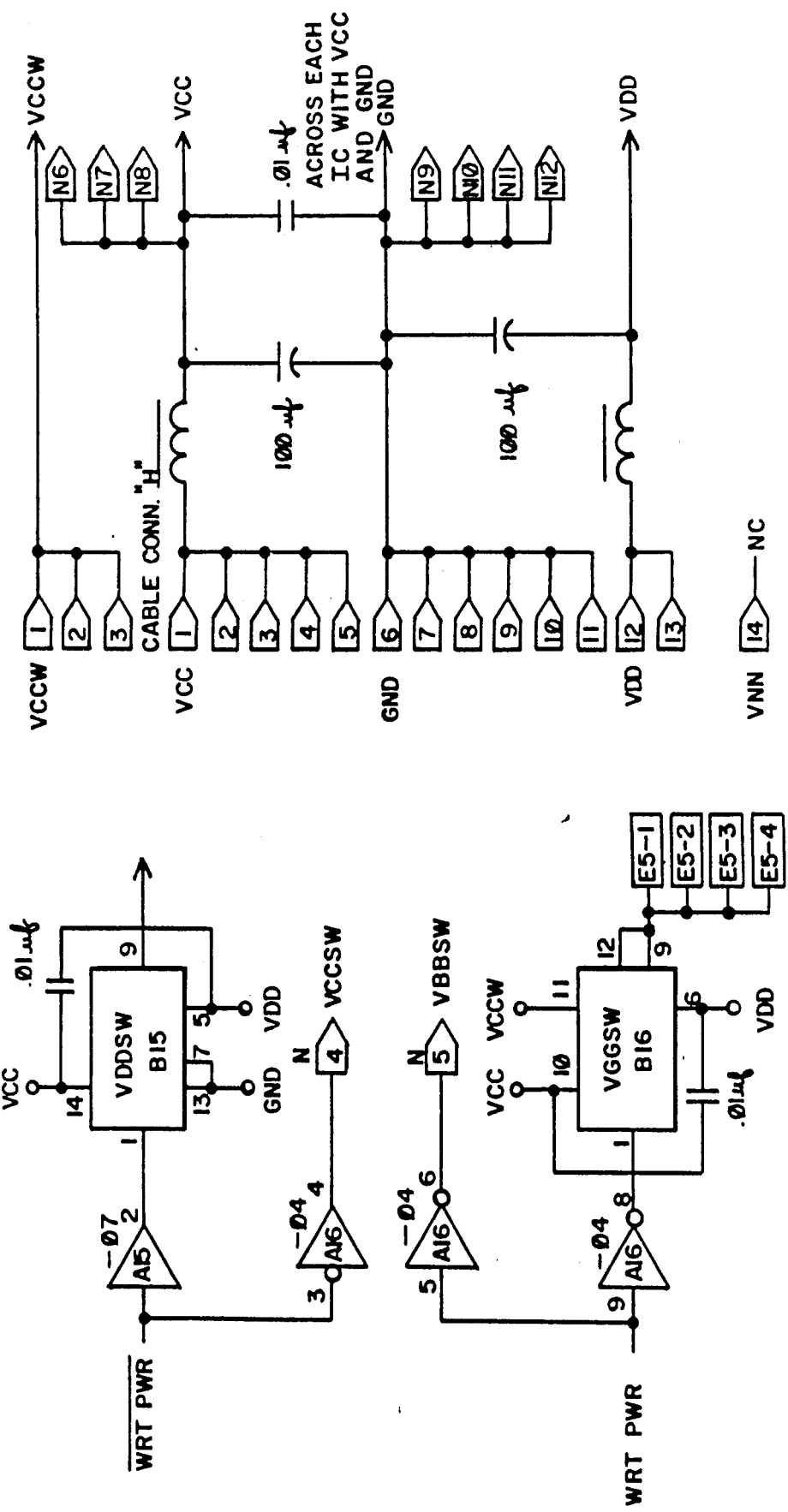
Figure 20A:
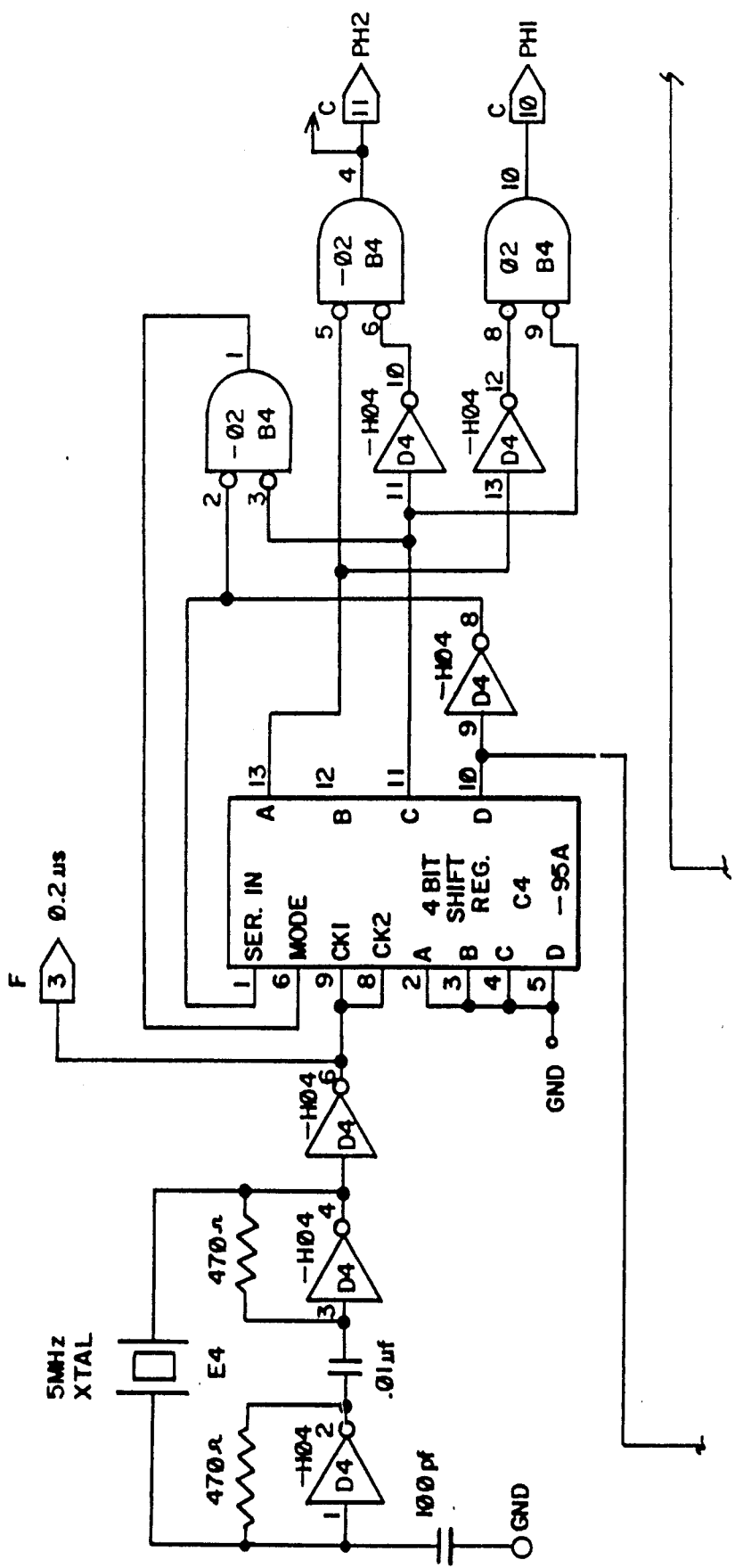
Figure 21A:
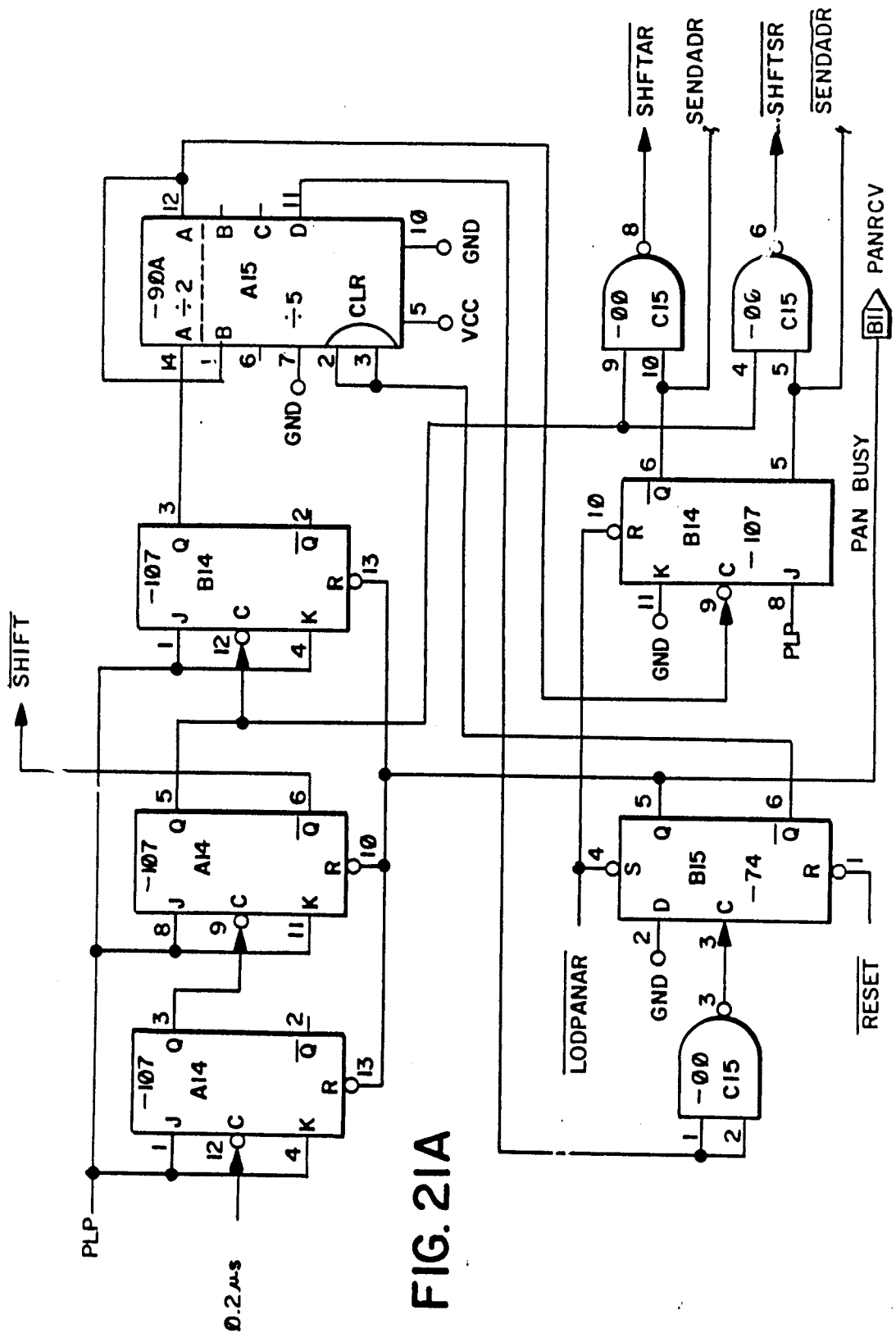
Figure 21C:
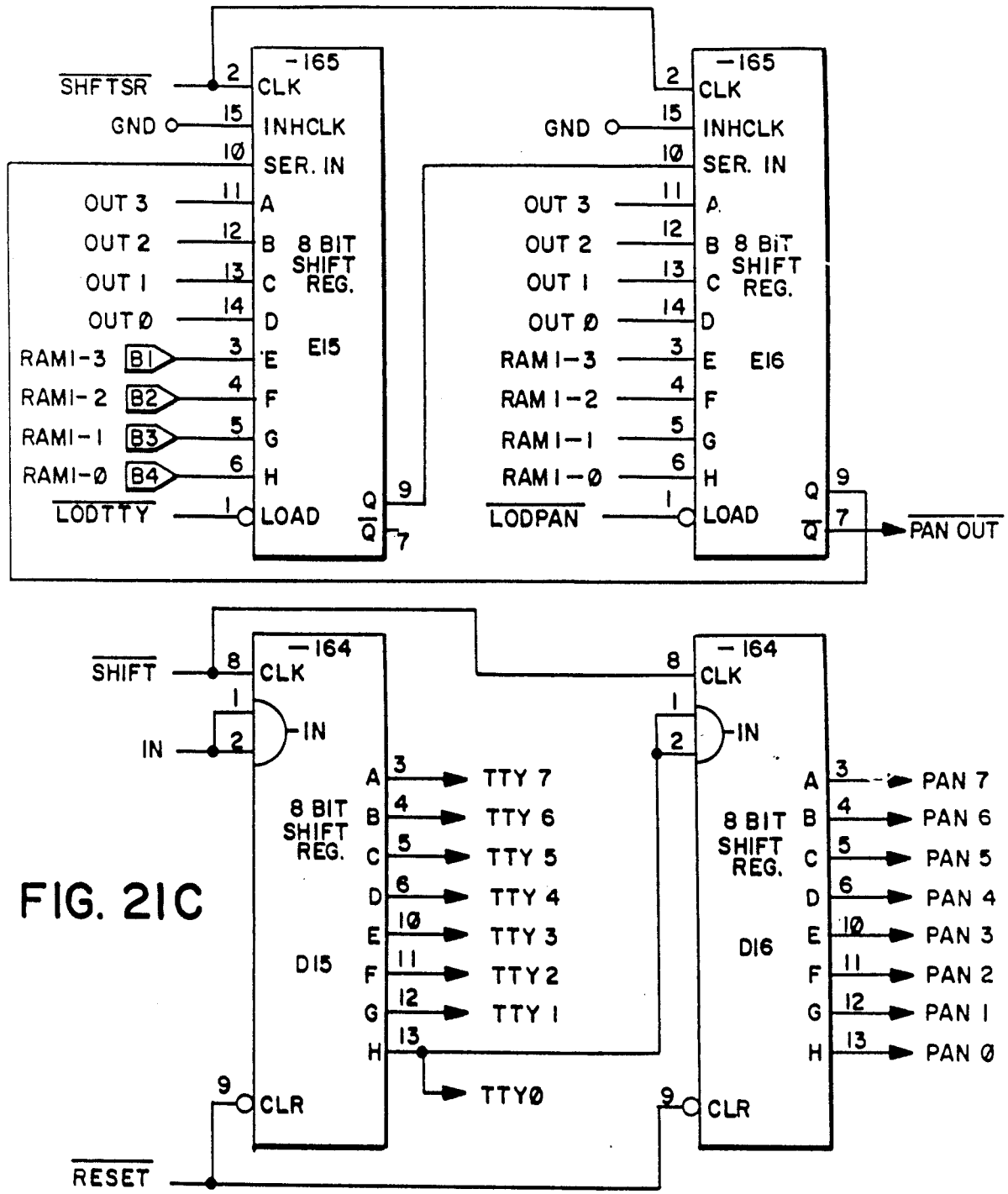
Figure 22A:
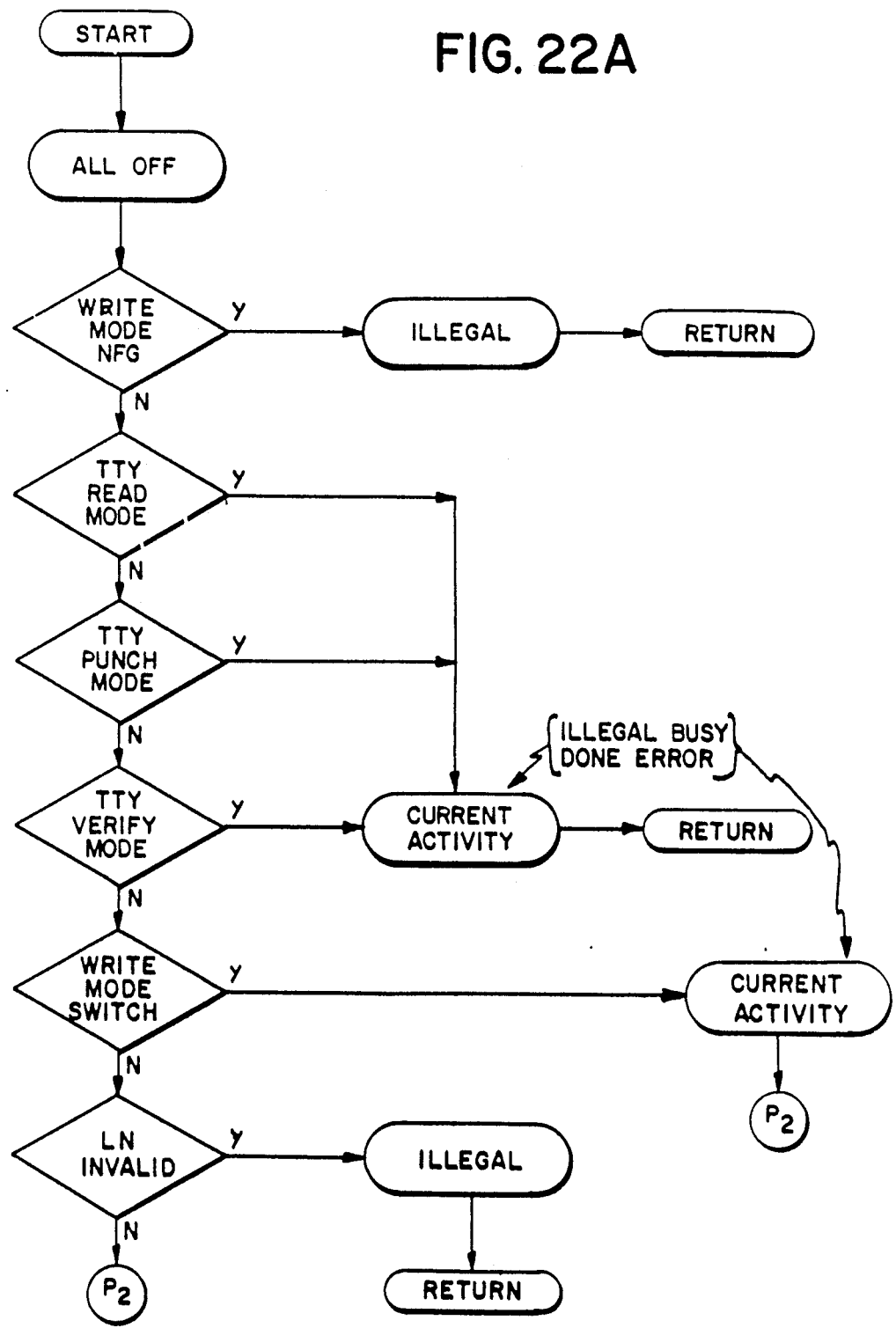
Figure 22B:
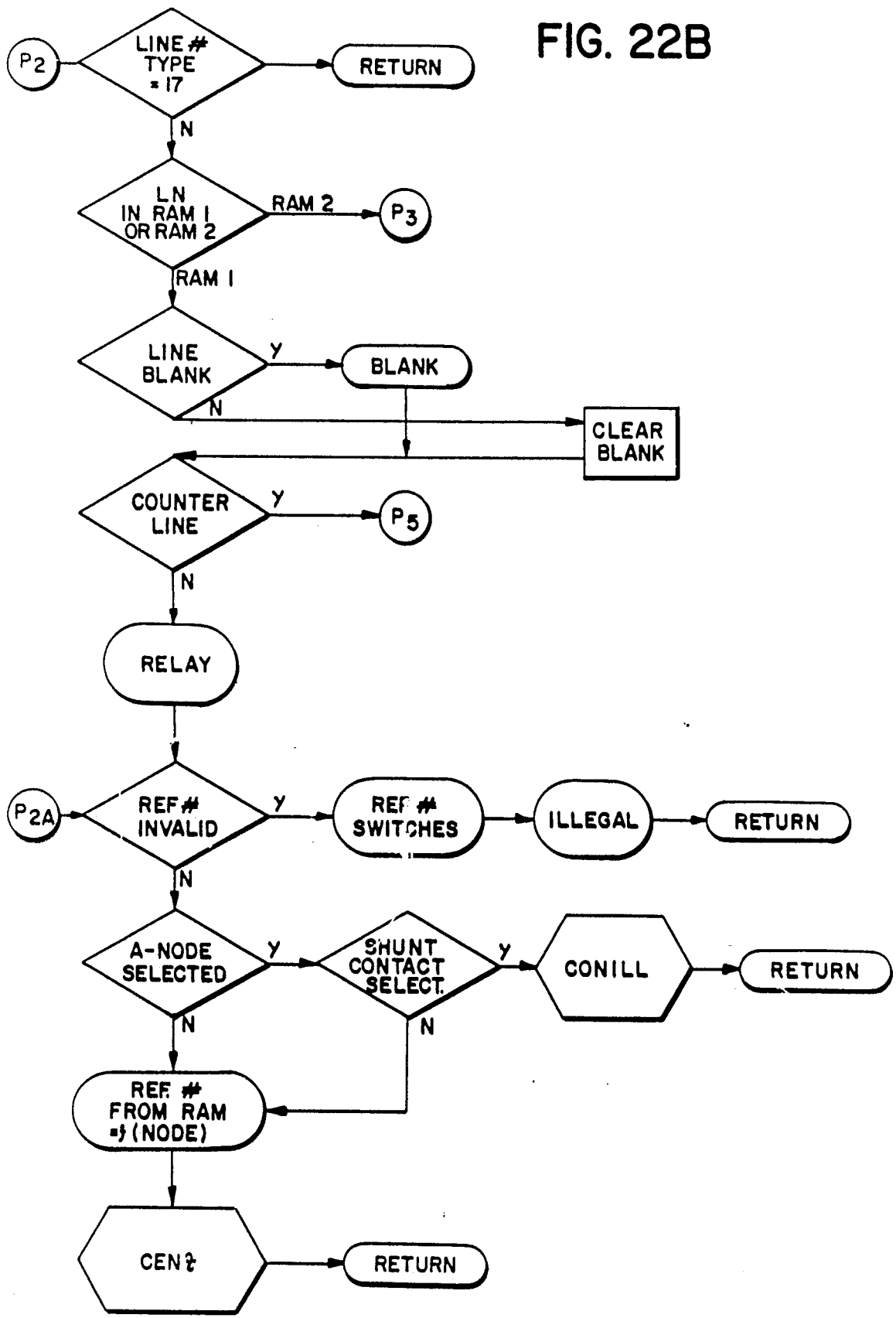
Figure 22C:
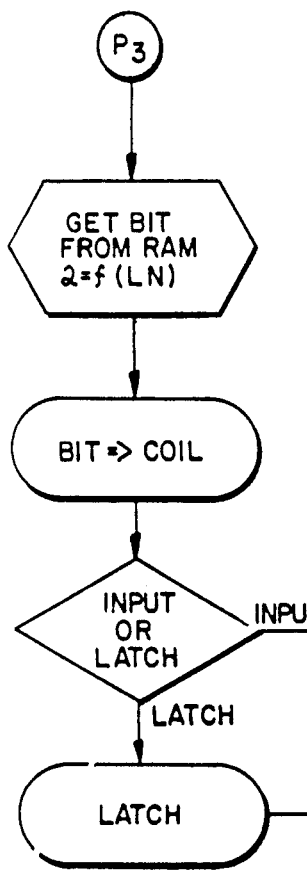
Figure 22D:
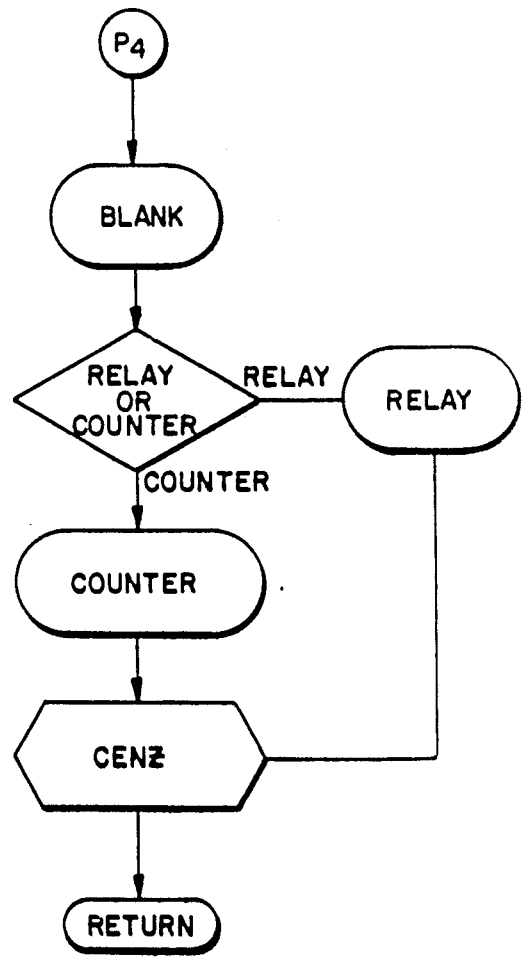
Figure 22E:
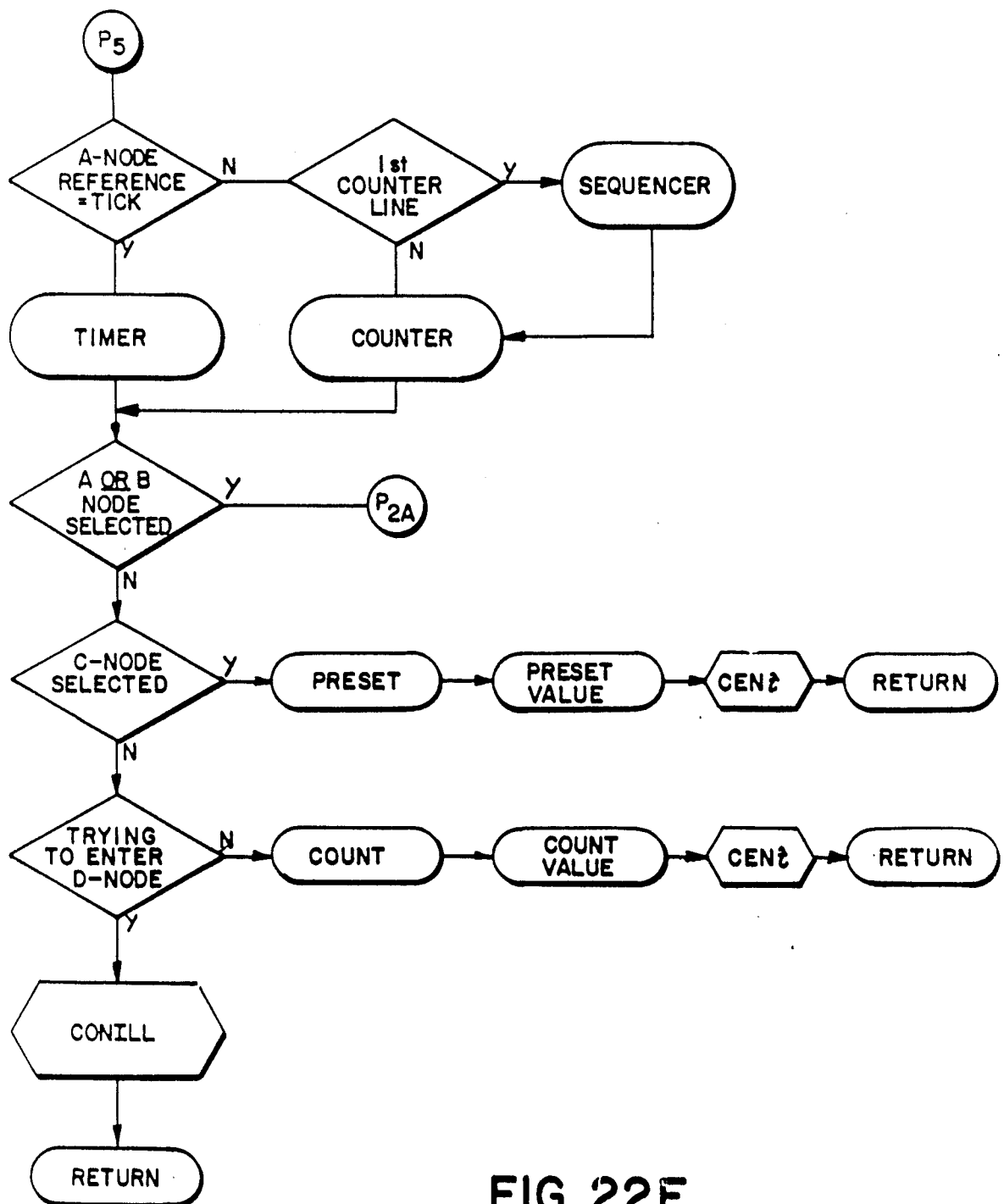
Figure 22F:
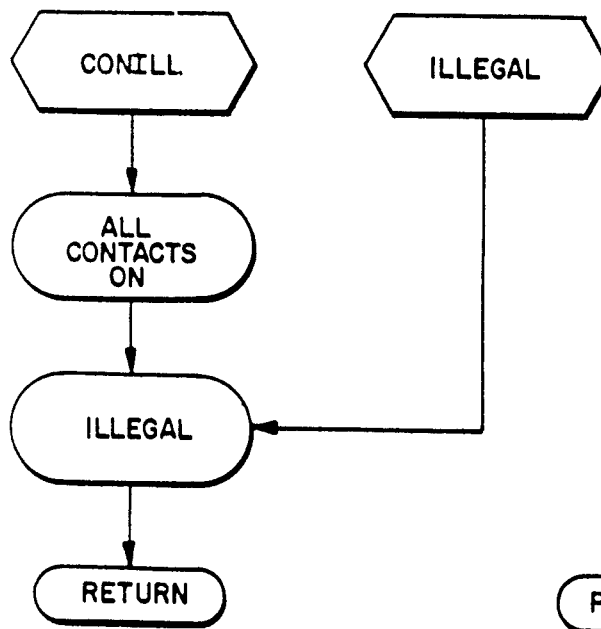
Figure 25:
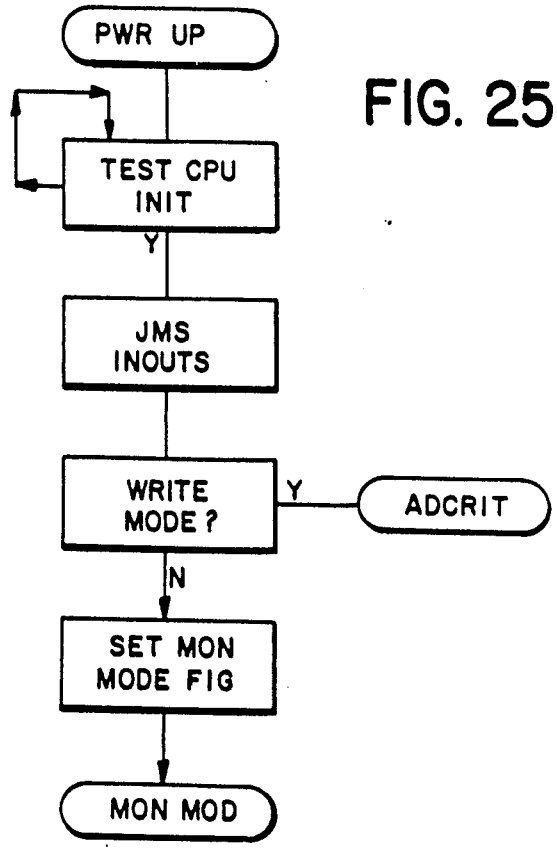
Figure 22G:
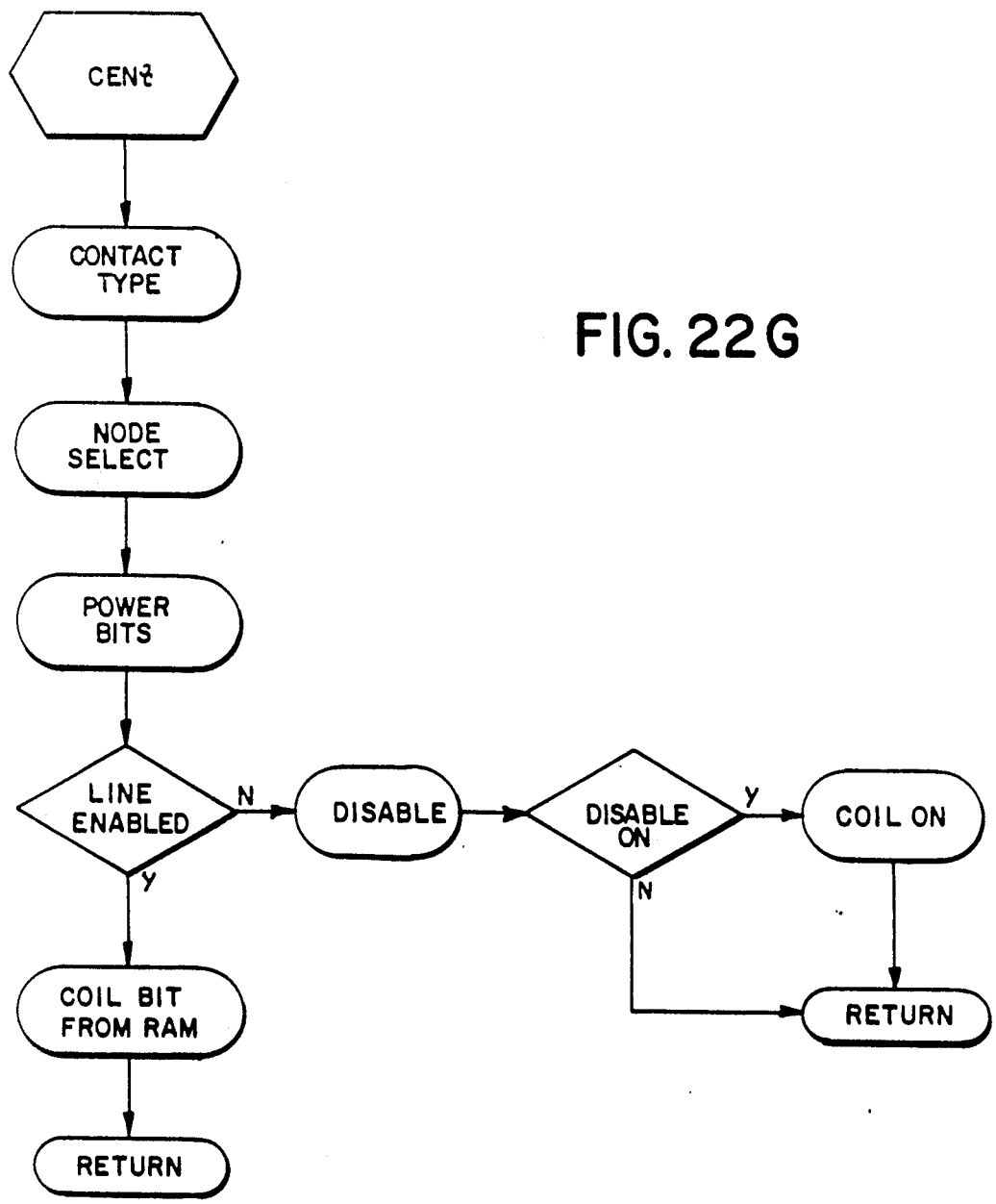
Figure 23:
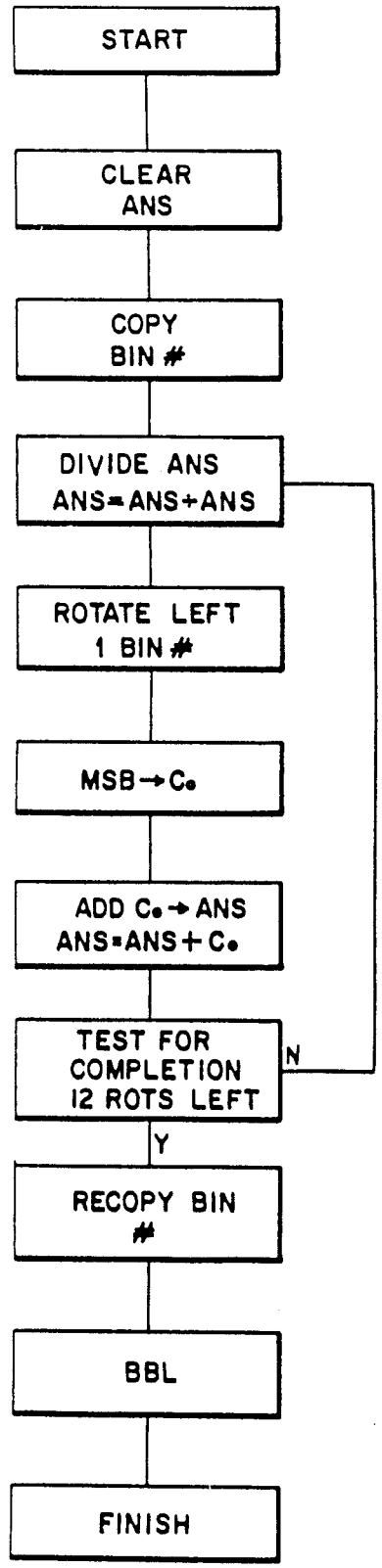
Figure 26A:
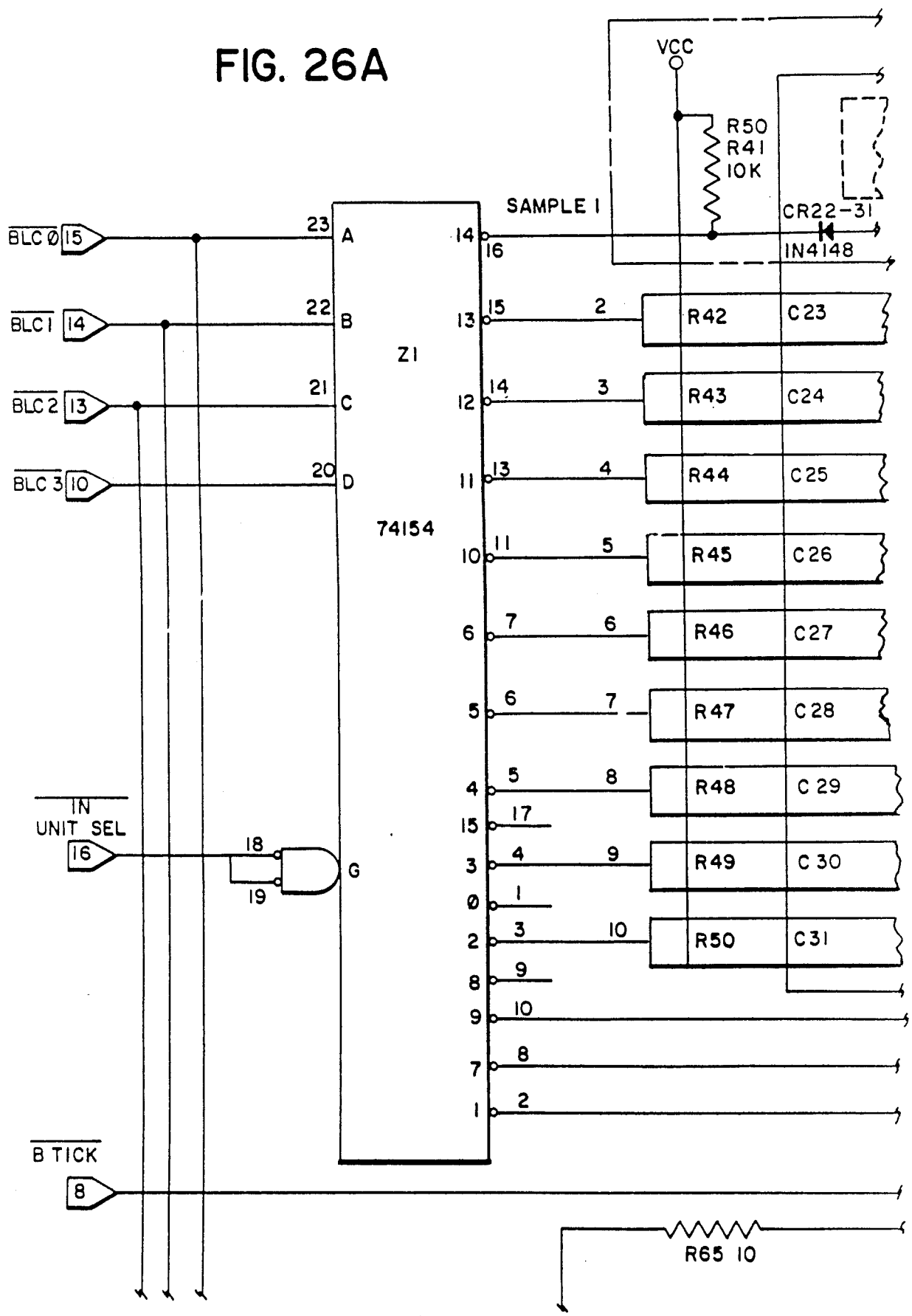
Figure 26B:
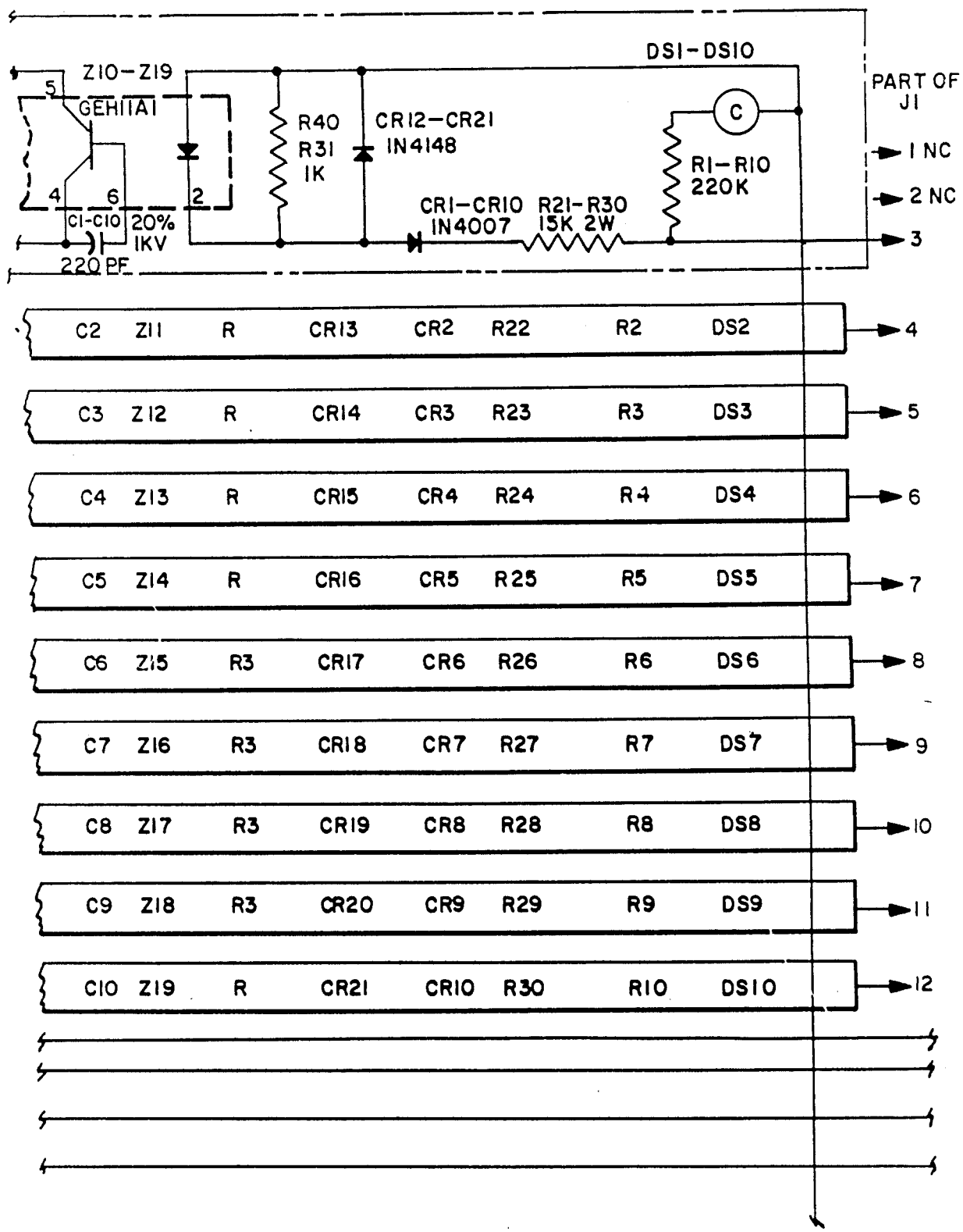
Figure 26C:
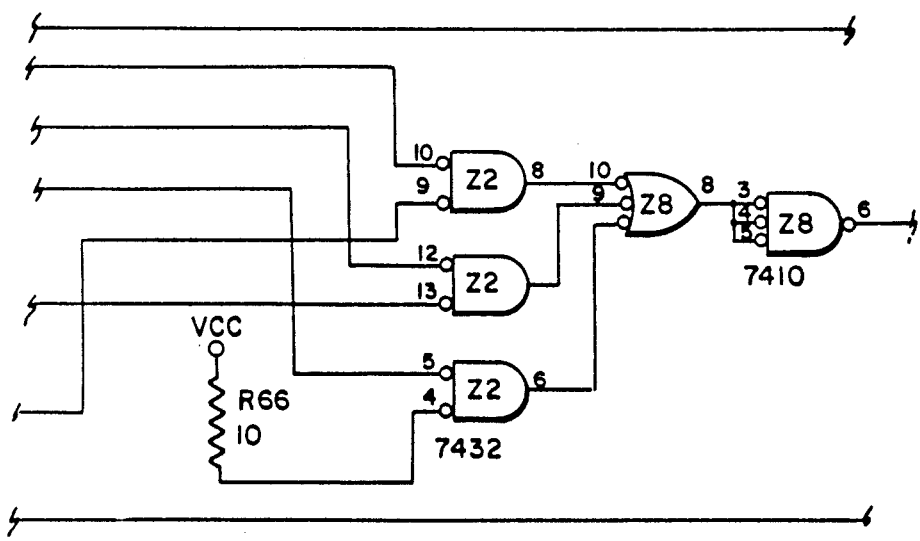
Figure 26D:
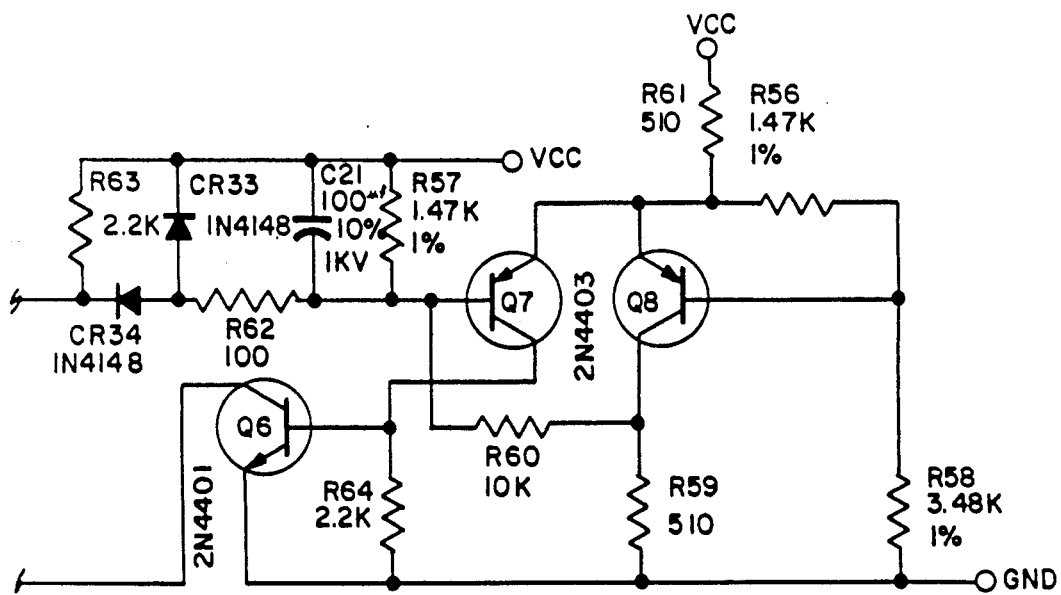
Figure 26E:
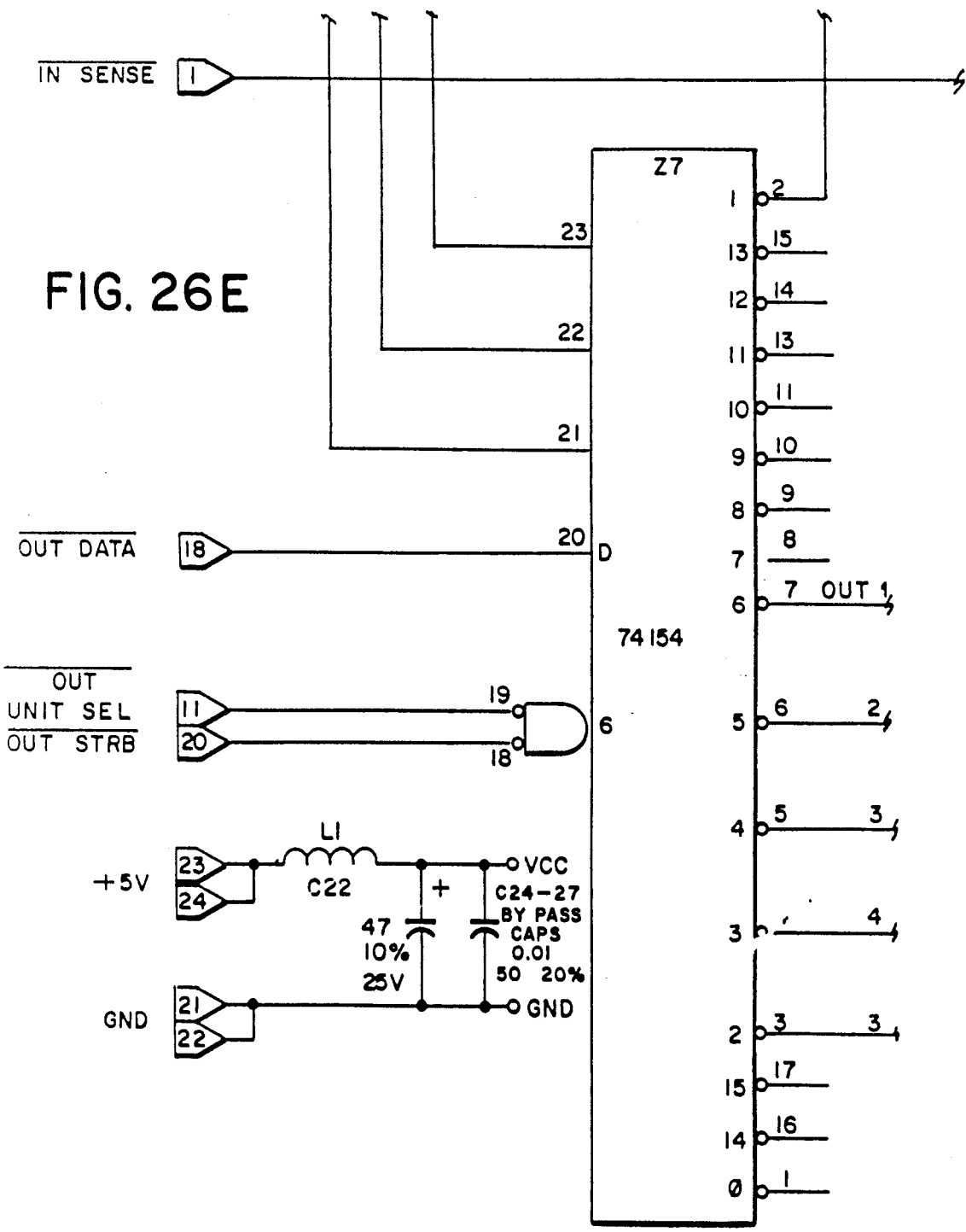
Figure 26F:
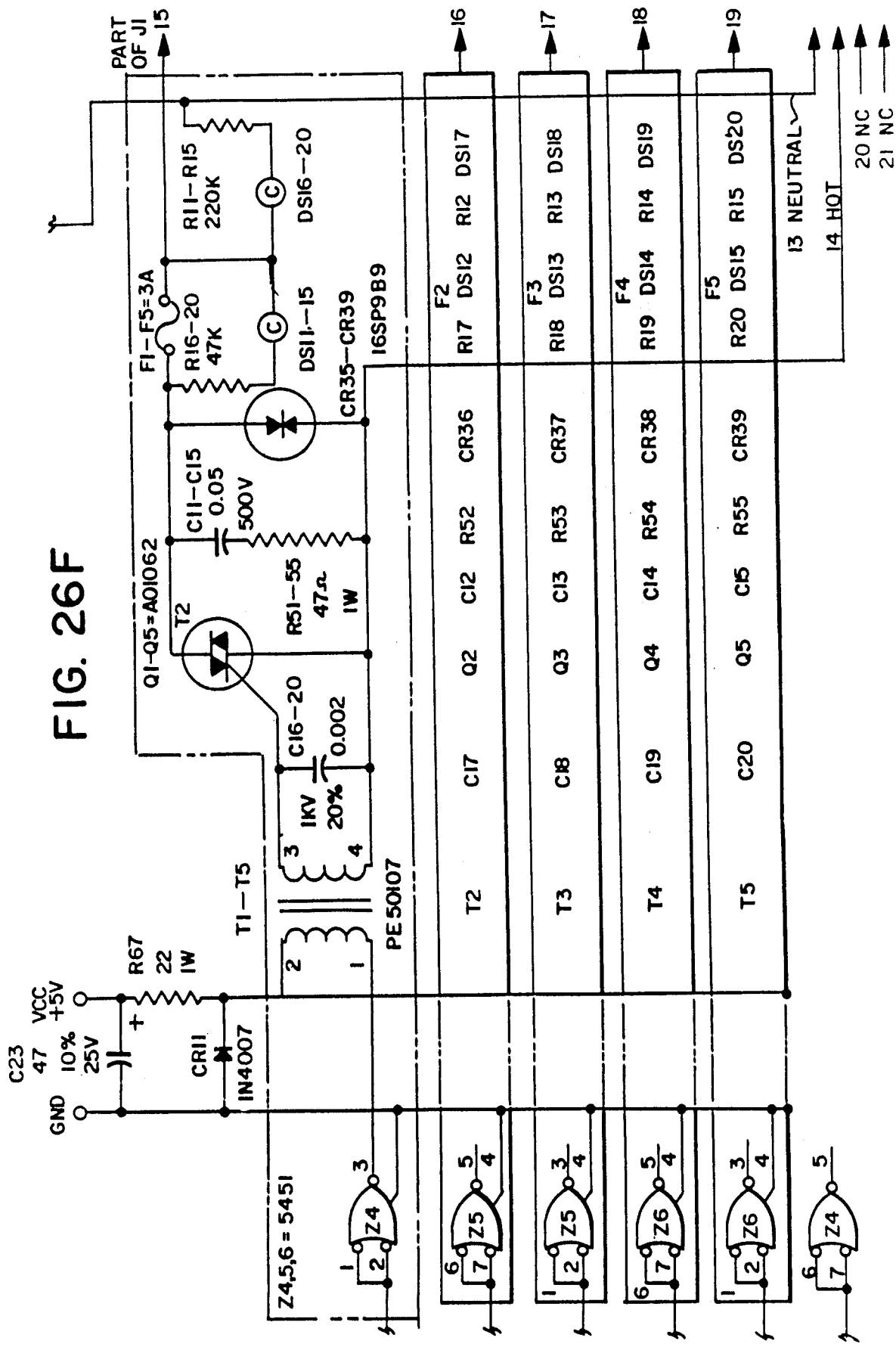
Figure 26:
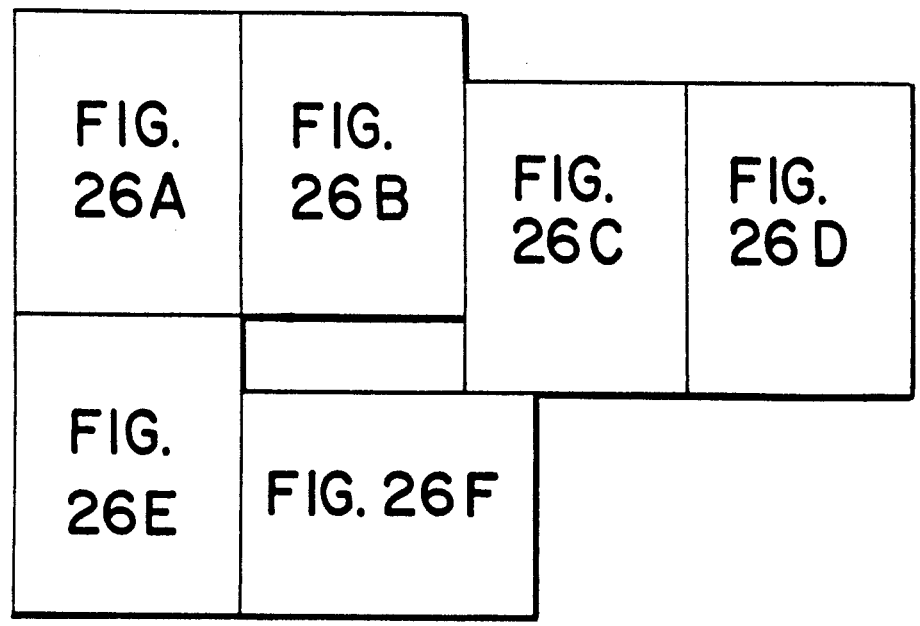

FIG. 12 comprising FIGS. 12A, 12B, 12C, 12D, 12E, and 12F is a schematic diagram of a first portion of the central processor of the computer controller system of FIGS. 1 and 2;

FIG. 12G is a diagram showing how FIGS. 12A, 12B, 12C, 12D, 12E, and 12F are put together to form FIG. 12;

FIG. 13 comprising FIGS. 13A, 13B, 13C, 13D, 13E, 13F, 13G, and 13H is a schematic diagram of a second portion of the central processor of the computer controller system of FIGS. 1 and 2;

FIG. 13I is a diagram showing how FIGS. 13A, 13B, 13C, 13D, 13E, 13F, 13G, and 13H are put together to form FIG. 13;

FIG. 14 comprising FIGS. 14A, 14B, 14C, 14D, 14E, 14F, 14G, 14H, 14I, and 14J is a schematic diagram of a third portion of the central processor of the computer controller system of FIGS. 1 and 2;

FIG. 14K is a diagram showing how FIGS. 14A, 14B, 14C, 14D, 14E, 14F, 14G, 14H, 14I, and 14J are put together to form FIG. 14;

FIG. 15 comprising FIGS. 15A, 15B, 15C, 15E, 15F, and 15G is a schematic diagram of the random access memory of the programming panel of the computer controller system of FIG. 1;

FIG. 15H is a diagram showing how FIGS. 15A, 15B, 15C, 15E, 15F, and 15G are put together to form FIG. 15;

FIG. 16 comprising FIGS. 16A, 16B, 16C, 16D, 16E, 16F, 16G, 16H, 16I, 16J, 16K, 16L and 16N is a schematic diagram of a processor portion of the programming panel of the computer controller system of FIG. 1;

FIG. 16M is a diagram showing how FIGS. 16A, 16B, 16C, 16D, 16E, 16F, 16G, 16H, 16I, 16J, 16K, 16L, and 16N are put together to form FIG. 16;

FIG. 17 comprising FIGS. 17A, 17B, 17C, 17D, and 17E is a schematic diagram of a first portion of the central processor interface of the computer controller system of FIGS. 1 and 2;

FIG. 17F is a diagram showing how FIGS. 17A, 17B, 17C, 17D, and 17E are put together to form FIG. 17;

FIG. 18 comprising FIGS. 18A, 18B, 18C, and 18D is a schematic diagram of a second portion of the central processor interface of the computer controller system of FIGS. 1 and 2;

FIG. 18E is a diagram showing how FIGS. 18A, 18B, 18C, and 18D are put together to form FIG. 18;

FIG. 19 comprising FIGS. 19A, 19B, 19C, and 19D is a schematic diagram of the reprogrammable "read only" memory of the computer controller system of FIGS. 1 and 2;

FIG. 19E is a diagram showing how FIGS. 19A, 19B, 19C and 19D are put together to form FIG. 19;

FIG. 20 comprising FIGS. 20A, 20B and 20C is a schematic diagram of the control protion of the programming panel of the computer controller system of FIGS. 1 and 2;

FIG. 20D is a diagram showing how FIGS. 20A, 20B, and 20C are put together to form FIG. 20;

FIG. 21 comprising FIGS. 21A, 21B, and 21C is a schematic diagram of the programming panel interface of the computer controller system of FIGS. 1 and 2;

FIG. 21D is a diagram showing how FIGS. 21A, 21B and 21C are put together to form FIG. 21;

FIG. 22 comprising FIGS. 22A, 22B, 22C, 22D, 22E, 22F, and 22G is a flow chart of a portion of the computer program of the microprocessor of the computer controller system of FIGS. 1 and 2;

FIG. 22H is a diagram showing how FIGS. 22A, 22B, 22C, 22D, 22E, 22F, and 22G are put together to form FIG. 22;

FIG. 23 is a flow chart of the binary to binary coded decimal subroutine used by the microprocessor of the computer controller system of FIGS. 1 and 2;

FIG. 24 is a flow chart of an "exclusive or" subroutine used by the microprocessor of the computer controller system of FIGS. 1 and 2; and FIG. 25 is a flow chart of a "power-up" subroutine used by the microprocessor of the computer controller system of FIGS. 1 and 2;

FIG. 26 comprising FIGS. 26A, 26B, 26C, 26D, 26E, 26F, and 26G, is a schematic diagram of a typical input/output module used in the computer controller system of FIGS. 1 and 2.

FIG. 26H is a diagram showing how FIGS. 26A, 26B, 26C, 26D, 26E, and 26F are put together to form FIG. 26.

DETAILED DESCRIPTION

As can best be seen in FIGS. 1 and 2, a computer controller system of the present invention incorporates a central processor 30 that mechanically and electrically interconnects with a power supply module 32 or a reprogramming module 34. In addition, the central processor mechanically and electrically removably interconnects with an input/output housing 36 that in turn mechanically and electrically removably interfits with input/output modules 38 and 40.

As can best be seen in FIG. 1 in phantom, additional input/output housings 42 may interconnect with input/output housing 36 to provide expandable input/output capabilities to the computer controller system. The additional input/output housing further incorporates additional input/output modules 44 and 46 to properly receive and transfer electrical signals from external devices 41.

As best seen in FIG. 2 the reprogramming module 34 removably interconnects with central processor 30 via interconnector knob 48 communicating with controller 30 via interconnecting rod 50. The reprogramming panel incorporates a keel 52 of approximately 2 inches in width that is spaced in a longitudinal configuration on the rearward portion of the programming panel. The keel incorporates an L-shaped portion 54 on its upper portion that mechanically communicates with a finger portion 56 of the central processor 30. When the reprogramming module is disconnected from the central processor via interconnecting knob 48 and interconnecting rod 50, the module may be pivoted and removed from the central processor via a handle portion 58 of the reprogramming module as shown in phantom in FIG. 2.

The power supply 32 as shown in FIG. 1, similarly incorporates an interconnector knob 60 and an interconnecting rod (not shown). The power supply also includes a keel 62 and a handle 64 so as to allow easy removal of the power supply from the central processor 30.

It is thus apparent that both the power supply module 32 and the reprogramming module 34 incorporate similar features that allow their easy interconnecting to the same central processor 30. As will be discussed more fully later in this description, the power supply module is utilized once the proper control program has been obtained while the reprogramming module 34 is utilized to enter or monitor the desired control program into the central processor.

As also seen in FIG. 2, when the reprogramming module is connected to the central processor 30, a programming panel 66 is electrically connected to the reprogramming module via cable 68.

As is disclosed in U.S. Pat. No. 3,686,639, entitled "Digital Computer-Industrial Controller System and Apparatus", present-day computer controller systems are capable of controlling external devices by entering into the central processor various electrical circuit lines that represent the manner in which external devices are controlled by switches, timers, and counters. As described in the U.S. Pat. No. 3,686,639 and as shown in FIG. 3, these electrical circuit lines cause simulated relay coils 70, 71, 72, 73, and 74 to be energized when there is simulated electrical continuity between both ends of the electrical circuit lines. The energization of the electrical circuit line relay coil may then be used to drive external devices or as a reference for simulated electrical elements in any electrical circuit line of the computer controller system. Thus, as shown in FIG. 3, the relay coil of electrical circuit line No. 3 is a reference to the normally open switch in line No. 2. When relay coil 72 is energized the normally open switch in line 2 will be closed.

The electrical circuit lines disclosed in the U.S. Pat. No. 3,686,639 as well as the electrical circuit lines utilized in the present invention in its preferred embodiment consist of four nodes, 76, 77, 78, and 79 with a relay coil following the lattermost node. Thus when the simulated electrical elements close, continuity is obtained throughout the line and the central processor interprets this continuity by energizing the simulated relay coil of that particular line.

Similarly, as best seen in FIG. 4 the four nodes of the U.S. Pat. No. 3,686,639 as well as the preferred embodiment of the present invention may represent a timer or counter. In this configuration, the A-node generates a count or sweep if it is in the closed position whereas the electrical element in the B-node resets the count or time if it is in the open position. The preset count or time is entered into the C-node and the D-node stores the accumulated count or time of this particular counter or timer. When the number stored in the D-node is equal to the present count or time, the relay coil 82 is energized.

Thus, it can be readily seen that present-day computer controller systems as well as the preferred embodiment of the present invention are able to control external devices such as machine tools, chemical batch processing, and conveyor systems, by use of logic lines that represent electrical devices such as normally open switches, normally closed switches, parallel open switches, parallel closed switches, timers, and counters.

However, most present-day controller systems utilize core memories in order to store the variable information regarding the electrical elements in the various electrical circuit lines desired. Core memories are inherently expensive and the peripheral electronic circuitry needed to write-in information and read-out information to and from the core memories is also complicated and expensive.

Thus, computer controller systems have generally been used in applications requiring a relatively great number of input and output signals to external devices in order to justify the relatively large expense involved in using a core memory system to store variable information. However, since 1972, the Intel Corporation, of Santa Clara, California, has perfected a "read only" memory that is capable of being reprogrammed. Such a memory can be used to store the variable information regarding the electrical elements in the electrical circuit lines. Indeed, at least one manufacturer of computer controller systems has utilized the Intel Corporation reprogrammable memory chip (Part No. 1702A) to store this variable information. However, an inherent difficulty using these memory chips is that ultraviolet light must be used in order to erase these memory chips and that selective erasure of information within a particular chip is unobtainable. Thus in order to change a control program representing an electrical circuit line network, it has been necessary to remove the memory chip from the controller system, to reprogram it with a potentially desirable new control program, and to reinsert the memory chip into the controller. All these operations are not only time consuming to operators of industrial equipment but also, due to the inherently dirty industrial environments, a rather hazardous procedure to undertake on the factory floor. In addition, it requires the operator of the controller system to be well versed in the removal of these memory chips as well as the reprogramming of these chips on special devices. If the operator has dirty or greasy hands, the removal of the memory chips may prevent the chip from being properly erased or possibly from the chip making proper electrical continuity in the reprogramming device.

Figure 5:
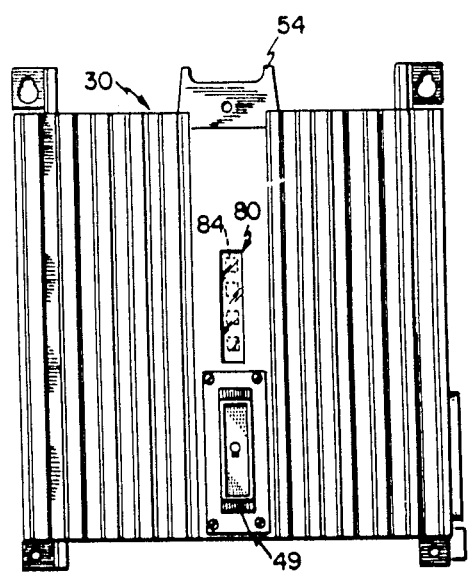
FIG. 5 is a front view of the central processor of the computer controller system of FIG. 1.

All these inherent difficulties in using reprogrammable "read only" memory chips have been eliminated in the present invention. As best seen in FIG. 5, the memory chips 80 communicate to the outside world via a quartz glass window 84 mounted on the central processor 30. The quartz glass window, unlike ordinary glass, is transparent to ultraviolet light and thus allows the RROM chips 80 to be erased from an external source of ultraviolet light. The reprogramming module 34 contains a source of ultraviolet light 83 (see FIG. 8) which when activated causes the data stored within the RROM to be completely erased. The power supply module 32 does not contain such a light source, and therefore it is apparent that in order to erase the memory of the RROM, it is necessary that the reprogramming module 34 be connected to central processor 30.

Figure 6:
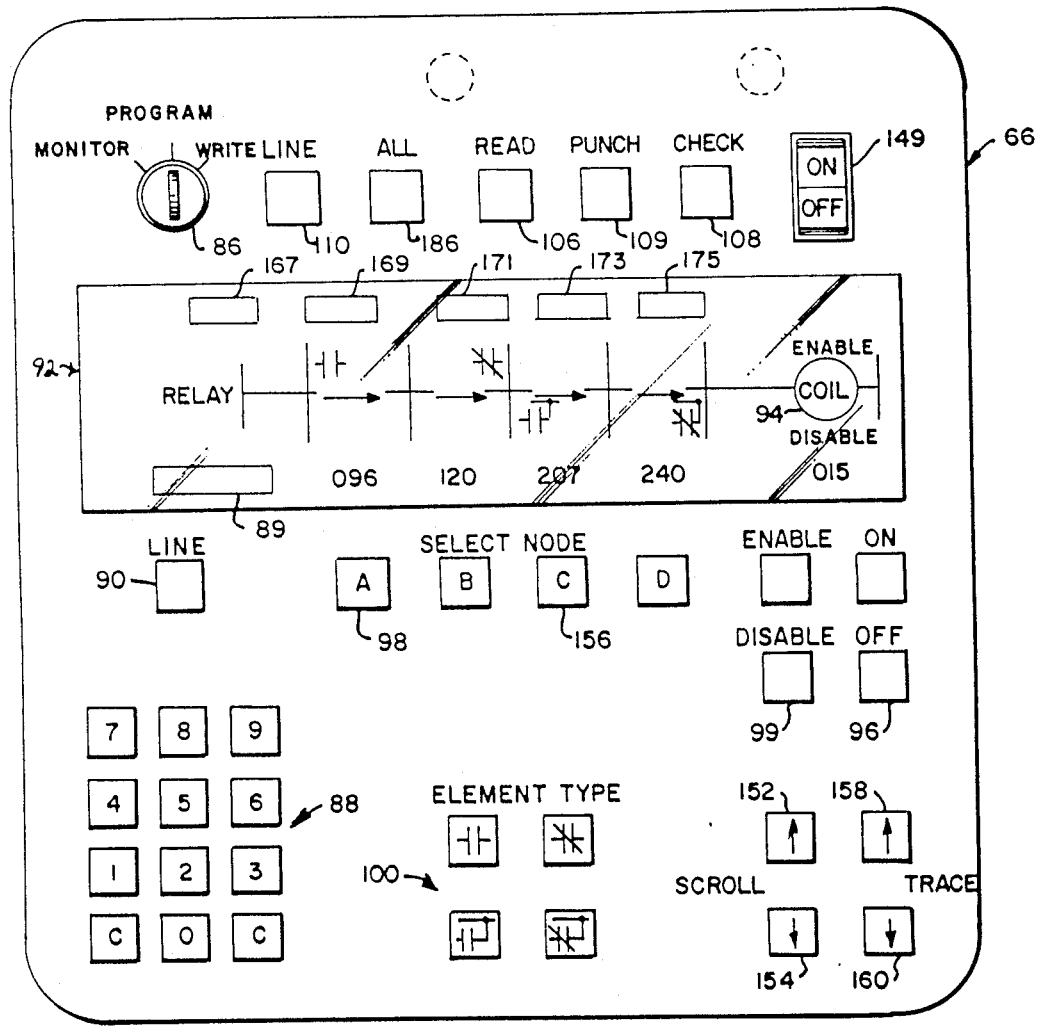
FIG. 6 is a diagrammatic front view of the programming panel of the computer controller system of FIG. 1 displaying a typical relay type electrical circuit line.

Thus, in order to change the variable data within the RROM of the central processor, it is necessary that the reprogramming module be connected to the central processor and that the programming panel in turn be connected to the reprogramming module. As best seen in FIG. 2, to initially generate the electrical circuit line ladder network or control program into the RROM chips 80, it is first necessary to generate this information in the programming panel 66. The information may be entered line by line by the operator via the push buttons on the programming panel. As can best be seen in FIG. 6, a key lock switch 86 is then placed in a PROGRAM mode. When in this mode, the reprogramming module 34 provides the variable information to the central processor 30. Also the programming panel 66 can enter new electrical circuit lines in the reprogramming module. To enter a logic line consisting of normally open, normally closed, parallel normally open, and parallel normally closed switches the operator must perform the following operations:

A. Set a line number (see FIG. 3) on key pad switches 88. The numbers selected are then displayed in a composition display 89. This display shows any number selected on key pad switches 88 before any other switch is depressed;

B. Depress a LINE push button 90. At this time, the type of line will be shown in a display window 92. As shown in FIG. 6, line No. 15 is shown to be a relay type line. Designated lines of the controller system are relay lines while others are counter or timer lines;

C. Put the key lock switch 86 into the PROGRAM position:

D. If the DISABLE lamp 94 is lit, and not specifically desired, press a DISABLE OFF switch 96 in order to turn off the DISABLE light;

E. Press the A node push button 98;

F. Set the desired line number or input number that is to set the initial condition of the electrical element in the A-node on the key pad switches 88;

G. Press the desired electrical element to be entered in the A node via electrical element switches 100; and H. Repeat steps D, E, and F for the B, C, and D, nodes of the chosen circuit line. When this operation has been completed, a circuit line such as line No. 15 shown in FIG. 6 will be entered into the reprogramming module 34 and simultaneously displayed in display window 92 of the programming panel.

To enter a counter or timer line as shown in FIG. 4, a similar procedure is utilized except that the line number must be one that is designated to be a counter line. Such a line number is entered on key pad switches 88 and when LINE push button 90 is depressed, the display window will indicate that a counter line has been selected. The same steps as discussed in the relay type line are utilized to enter the electrical elements into the A and B nodes of the counter line. To finish the counter line, the following steps are undertaken:

A. Press the C button;

B. Set the preset count on the key pad switches 88.

The D node does not need to be set since this node merely accumulates the count or time for this particular electrical circuit line and is thus initially set to zero.

Once the desired electrical circuit lines are programmed into the reprogrammable module, the information may then be transferred to the RROM by turning the key lock switch 86 to the WRITE position. At this point an ultraviolet lamp within the reprogramming module activates causing the information in the RROM to be erased. When the reprogramming module ascertains via ultraviolet sensor 93 (see FIG. 8) and via the RROM interface 128 that all the information in the RROM has been erased, the control program in the reprogramming module RAM 130 is transferred to the RROM. Once this transferral of information has been completed, the reprogramming module 34 may be removed from the central processor 30 and the power supply module 32 re-connected to the central processor. As best seen in FIG. 2 a paper tape module 102 may be connected to the programming panel 66 via cable 104 wherein the paper tape contains a desired control program. To enter the information on the paper tape into the programming panel and thus into the reprogramming module, the paper tape READ push button 106 on the programming panel (see FIG. 6) must first be depressed. A CHECK push button 108 is utilized to verify that the information has been properly received by the reprogramming module. This feature is generally used to verify a tape which has been recently punched, and to check a RROM memory image against source data. Once the desired information from the paper tape has been received by the reprogramming module, the transferral of this information to the RROM chips 80 of the central processor is accomplished by the identical method described above. It should also be noted that a paper tape record of a control program within the reprogramming module may be obtained by depressing a PUNCH push button 109 located on the programming panel.

THE FUNCTIONAL BLOCKS

As can best be seen in FIG. 8, the functional block diagram of the computer controller system of the present invention consists of two sections that communicate with one another via the connector 49 and quartz window 84. A first area is the central processor and a second area is the reprogramming module and programming panel. The central processor comprises functional blocks which perform all the logic solving, counting and timing that is needed to update each electrical circuit line of the controller system as well as generating output information that is to be relayed to the input/output assembly comprising the input/output housing 36 as well as input/output modules 38 and 40 (see FIG. 1). The detailed electrical schematics for the central processor are shown in FIGS. 12A through 12F, 13A through 13H, and 14A through 14J.

The reprogrammable "read only" memory consists of ultraviolet "read only" memory chips (INTEL CORPORATION, PART Number 1702A). These memory chips contain 256 eight-bit electrically programmable words that are capable of being erased via ultraviolet light. As seen in FIG. 8 an ultraviolet light source 83, contained in the reprogramming module 34, is able to impinge on these memory chips via quartz window 84. The RROMs store all the variable information regarding all the electrical circuit lines and the electrical elements within those electrical circuit lines. To store an electrical circuit line as shown in FIG. 3, six RROM words are utilized. These six words, as shown in FIG. 7A present four, 12-bit words which make up one electrical circuit line of information. These 12-bit words are broken into three, four-bit sub-words denoted by A1, A2, A3, B1, B2, B3, C1, C2, C3, D1, D2, and D3 (see FIG. 7B). As shown in FIG. 7C these four, 12-bit words represent one of the four nodes of the electrical circuit line selected. Thus with respect to the A-node, the first three bits of the A3 sub-word are utilized to define the state of the line as well as the electrical element chosen for that line. The last line bits of the A word comprising one bit of the A1 sub-word as well as the A2 and A1 sub-words refer to the address of the electrical circuit line relay coil to which this particular electrical element in this node is referenced to or to an input address that references this particular electrical element. The same configuration is also used for the B, C, and D nodes of the electrical circuit line stored in the six, eight-bit words of the RROM memory area.

It should be noted that each electrical circuit line of the computer controller system refers to a designated area in the RROM comprising six, eight-bit words in the RROM. Thus the entire memory area of the RROM memory chips utilized by the central processor is designated to particular electrical circuit lines of the computer controller system. Thus if line No. 3 is selected on the programming panel, a particular area in the RROM, comprising six, eight-bit words, is selected to store this information. As will be discussed further in this description, the selection of the particular address of the RROM that will contain the information regarding a particular electrical circuit line is performed by modules stored in the reprogramming module.

As best seen in FIG. 7D, the first column (a column) of each of the 12 bit words as well as the third column (b column) represent the particular electrical element chosen for the particular node of this particular twelve-bit word. Thus, if for the A word a $\phi$ is put into the a and b bit columns, the electrical element is a normally open switch. Similarly if the $\phi$ is placed in the a column and a 1 is placed in the b column, a normally closed switch is to be entered in the A-node. A similar procedure is utilized for the B, C, and D nodes to enter the particular electrical element desired for each of these nodes. As also seen in FIG. 7C under the a column with respect to the A 12-bit word, an X1 is shown, while for the c column in the D 12-bit word an X2 is shown. As seen in FIG. 7E, the states of the X1 and X2 bits refer to the particular state of the entire electrical circuit line. Thus if a $\phi$ is in the X1 and the X2 bits, this particular electrical circuit line will be disabled in an OFF state. What this state means is that when the central processor comes to solve this particular circuit line once every sweep through all the electrical circuit lines, it will sense this $\phi\phi$ state in the X1 and X2 bits and will completely disregard any other information stored in the remaining 46 bits dedicated to this particular electrical circuit line. The purpose for this type of disable state is that if the operator is programming electrical circuit lines in his ladder diagram (see FIG. 3) and a particular line has not been utilized (for instance lines 5 through 17) the operator need not input any information with regard to these circuit lines. When the RROM is then supplied the information regarding all the electrical circuit lines and no information is received regarding lines 5 through 17, states $\phi$ and $\phi$ will be placed in the X1 and X2 bits, and the central processor will then interpret these lines as being disabled. It should be noted that the X1 position is the a column bit of the A 12-bit word instead of the B, C or D words since parallel normally open and closed switches in the A-node are redundant with respect to normally open and closed switches.

As also seen in FIG. 7E, it is possible to disable a particular electrical circuit line in the ON state. When this occurs the relay coil of the particular electrical line is energized regardless of the conditions of the A, B, C, and D-nodes of that circuit line. The operator obtains this state by depressing DISABLE ON switch 99 on programming panel 66.

When the circuit line is to be used in normal operation as either a relay line or as a timer or counter, a 1 is placed in the X1 bit and a $\phi$ is placed in the X2 bit. The central processor will then interpret this circuit line as a normally programmed circuit line and will proceed to solve the electrical elements in the four nodes of this circuit line.

In addition it may be desired to disable a circuit line that has previously been programmed into the RROM without the necessity of erasing the entire memory of the RROM. Thus if the line was previously a normal circuit line, the X1 bit would be a 1 and the X2 bit would be a $\phi$. If it is desired to make this line a disabled OFF, the operator would depress the DISABLE OFF switch 96 which would then cause a 1 to be placed within the X2 bit when key lock switch 86 is placed in the WRITE mode and LINE WRITE switch 110 is depressed (see FIG. 6). It is therefore always possible to disable in an OFF state any previously programmed electrical circuit line.

As best seen in FIG. 8, a logic and counter processor 112 of the central processor performs the actual solving of the electrical circuit lines stored within the RROM 80. The logic and counter processor sequentially solves each of the electrical circuit lines once ever 5 milliseconds. The processor as well as the other function blocks of the central processor is composed of solid state devices as shown in FIGS. 12, 13 and 14.

More particularly the processor retrieves data concerning the electrical circuit lines by addressing the RROM along address lines 114. When the power supply module 32 is interconnected with the central processor 30, the address lines 114 communicate with address lines 116 of the RROM via cable 118 located within the power supply (shown in phantom in FIG. 8). The addressing of the RROM causes data within the RROM to be transferred to the logic and counter processor 112 via data lines 120, 122, and 124 if the power supply module is placed.

If the reprogramming module 34 is connected to the central processor the logic and counter processor 112 retrieves data on its data lines 124 from a controller interface 126 located within the reprogramming module. In this particular case the logic and counter processor 112 addresses a RROM interface 128 which in turn receives electrical circuit line information from a random access memory 130.

Once the logic and counter processor receives the data for a particular electrical circuit line it proceeds to solve each electrical element in that electrical circuit line with respect to the particular referenced relay or input to which that electrical element is referenced. If the particular electrical circuit line is a dedicated counter line, the processor proceeds to ascertain if the A-node of this line is closed during this particular sweep. If the A-node is closed and the B-node is not open, a count is added to the previous count of this line and stored in the D-node. This counting information is stored in a portion of the central processor's electronic circuitry shown in the block diagram as a counting memory 132. The counting memory stores counting information regarding every counter or timer line utilized in the control program of the computer controller system.

If a particular line is chosen to be a timer, it is solved in the same manner as a counter line except that an internal clocking signal is utilized to trigger a count in counting memory 132.

If the logic and counter processor 112 ascertains that the electrical elements in a relay type line are all closed or that the count in a counter line or the time in a timer line is equal to the preset count or time respectively, the processor indicates to a coil data random access memory (RAM) 134 that the simulated relay coil of this particular electrical circuit line is to be energized. The coil data RAM maintains information on each simulated relay coil of each electrical circuit line of the computer controller system. If a particular relay coil is to be energized, the coil data RAM stores information indicating the energized state of this coil.

This information is then transferred to an input/output refresher 136, which in turn sequentially transfers information regarding each electrical circuit line's relay coil to an input/output multiplexer 138. The refresher incorporates shift registers that perform this sequential transfer of data from the coil data RAM to the input/output multiplexer. The input/output multiplexer communicates with the input/output housing 36 and modules 38 and 40 (see FIG. 1) so as to energize the proper areas of an interconnected external device 40. The input/output multiplexer incorporates de-multiplexing circuitry which transforms the sequential information from the input/output refresher to a parallel form of output signal to the input/output assembly.

The input/output multiplexer also includes a latch circuit 139 that communicates with the remainder of the multiplexer via circuit lines 141 and 143. This latch circuit allows designated outputs to have retentive memories in case of a power failure. Thus if a latch output is energized before the power shutdown, a corresponding latch input will be initially energized when the computer controller system is re-energized, but will follow the corresponding latch output after an initial time delay.

As shown in FIG. 8, the input/output multiplexer also receives inputs from the input/output assembly. These signals are digitized equivalents of signals (including possible sensor signals) generated by the external device being controlled by the computer controller system. The input multiplexer section of the input/output refresher 136 sequentially looks at all the inputs from the input/output assembly. If an energized or high signal is found to exist on any particular input line during any one of five sequential scans of that input line, the refresher will interpret this high signal as indicating that the input from the external device is in the energized state. The reason that the refresher looks at each input five times is to eliminate the need for capacitive energy storage and rectification circuitry for each input line.

The output multiplexer section of the input/output refresher employs a shift register which stores a group of simulated relay coils. The contents of this register is sequentially distributed to triac gates (via suitable isolating circuitry) to drive external AC loads. This technique also eliminates energy storage and triggering circuitry for each output line.

The transferral of information between the refresher and the logic and counter processor is sequentially performed by the shift registers within the refresher. The input/output refresher transfers all the information regarding each of the inputs and outputs between the input/output multiplexer and the logic and counter processor 112 which in turn utilizes this information to determine the particular state of the electrical elements in the electrical circuit lines.

The central processor 30 also includes a sequence processor module 140 that is used to generate a sequence function on a particular dedicated counter line of the computer controller system. As best seen in FIG. 9, a sequencer allows a counter line to program up to 100 steps of sequence control. If the B node is closed, each time the A-node of this particular electrical circuit line is closed the sequencer sequentially energizes the next higher reference memory location in the sequence processor 140 and simultaneously de-energizes the current location. This particular memory location acts like an internal input and may be referenced to any electrical element in any particular electrical circuit line. In the preferred embodiment, any node may directly reference any of the 100 reference memory locations of the sequencer. When a sequencer coil is referenced the sequence processor 140 communicates with the logic processor to determine the state of the sequencer memory reference location. When the B node is open, reference memory location $\phi$ is energized and all other locations are de-energized.

The central processor receives the proper electrical energy to drive the central processor as well as the input/output assembly from the power supply module 32 if it is connected to the central processor or via a programmable power supply 142 of reprogramming module 34 if the reprogramming module is connected to the central processor. In either case, the electrical energy is received by the central processor through pin connections in the peripheral interface connector 49.

Furthermore, the central processor 30 communicates through peripheral interface connector 49 to the power supply 32 with respect to the internal running condition of the central processor via internal signal lines 144 and 146. If the central processor is operating properly in solving the electrical circuit lines a RUN light 48 on the power supply module 32 is energized (see FIG. 1). When the reprogramming module is connected to the central processor, a programming panel POWER switch 149 must be in the ON state before the RUN light will be energized (see FIG. 6). It should further be noted that the power supply module 32 as well as the reprogramming module 34 have a POWER light 150 that is energized when each module respectively is energized. A POWER switch 151 on the power supply module or reprogramming module is respectively used.

The central processor utilizes the same internal signal lines when the reprogramming module 34 is interconnected to the central processor. In this case, a similar RUN light 148 is energized if the controller is properly solving the electrical circuit lines and similarly the POWER light 150 is energized when the reprogramming module's programmable power supply 142 is supplying electrical energy to the central processor (see FIG. 2).

As can best be seen in FIG. 8, the reprogramming module 34 and programming panel 66 incorporate a number of functional blocks which are utilized by the computer controller system to monitor, program and write in the electrical circuit lines to the RROM 80 of the central processor 30.

As best seen in FIG. 6, when the programming panel is in the MONITOR mode, the information regarding the electrical circuit lines is stored in the RROM 80 and is viewable in display window 92 of the programming panel. Thus, in order to view line number 15, the operator would depress the 1 and 5 push buttons of key pad switches 88, and then depress LINE push button 90. At this point the programming panel would display the information shown in the display window 92. As seen in FIG. 6, this particular circuit line has a normally open switch in the A-node and a normally closed switch in the B-node, a normally open parallel switch in the C-node and a normally closed switch in the D-node. The reference relay coils for these nodes respectively are lines 096, 120, 207, and 240. As seen in FIG. 6, these reference coils are in the state to cause their respective electrical element to have continuity as shown by the arrows in each node location. The arrows shown in the display window indicate that electrical continuity and thus power is passing through each particular node and therefore relay coil number 015 is energized.

If electrical circuit line 016 is to be observed, the SCROLL UP push button 152 is depressed. On the next sweep through the electrical circuit lines, the information in the electrical circuit line 016 is displayed in display window 92. Similarly, if line 14 is to be observed, the SCROLL DOWN push button 154 is depressed until line number 014 is displayed in display window 92. As best seen in FIG. 11, the scroll function allows sequentially higher or lower circuit lines to be observed in display window 92. Thus the scroll function provides an easy technique to observe electrical circuit lines in sequential order from any particular circuit line previously observed by the operator.

If the operator desires to observe an electrical circuit line that is referencing a condition of a particular electrical element of a particular node in a presently observed electrical circuit line, the trace function of the present invention is utilized. Thus, in the present example, where line 015 is being observed, if the operator desires to observe the condition of electrical circuit line 207 which is referencing the condition of the normally open parallel switch in the C-node, the operator depresses a C-node push button 156 and then depresses the TRACE UP push button 158. At this time, electrical circuit line 207 is displayed in the display window 92. If the operator then wants to observe a circuit line whose output coil is referencing a particular node in line 207, a similar procedure is again performed. When the operator wants to return to line 015, he simply depresses the TRACE DOWN push button 160 until line 015 is redisplayed in display window 92. The operation of the trace function is best seen in FIG. 10.

As best seen in FIG. 8, when the programming panel is in the MONITOR mode, information in the RROM 80 is transferred to the RROM interface 128 via address information from controller interface 126 on address lines 162 of the reprogramming module and address lines 116 of the central processor. The data in the RROM is then transferred via data lines 120 and data lines 164 to the RROM interface 128. From the RROM interface 128, the electrical circuit line information is transferred to the random access memory 130 where it is in turn transferred to the controller interface 126 and a microprocessor 166. The information transferred to the controller interface is in turn transferred to the logic and counter processor 112 where the electrical circuit lines are solved in conjunction with the other blocks of the central processor. The electrical circuit line information transferred to the microprocessor 166 is transformed and acted upon by the microprocessor and in turn transferred to a panel interface 168 via data lines 170. The panel interface serially transmits this data in standard UART form to panel lights and switches 172 of the programming panel 66 via data lines 174. The information regarding the particular electrical circuit line desired as selected by the operator is first transferred to the panel interface 68 via data lines 176 when this information programming transferred in a proper form to microprocessor 166 via DATA FROM lines 178.

When the programming panel's key lock switch 86 is placed in the PROGRAM mode, the computer controller system is no longer operating from information within the RROM 80 but is being controlled by information from the reprogramming module 34 and programming panel 66. When the computer controller system is placed in the PROGRAM mode, all the electrical circuit line information in the RROM is transferred to RROM interface 128 and in turn to the random access memory 130 where it is stored. In this manner, all the previous information in the RROM is retained by the reprogramming module so as to allow the central processor to initially control the external devices in the same manner as when the power supply 32 is interconnected with the central processor 30. If the operator desires to observe any particular electrical circuit line, he merely dials on key pad switches 88 the desired number of that particular line and the information regarding that line will be shown in display window 92 (see FIG. 6). If the operator desires to add an electrical circuit line to the current control program, he merely dials this particular electrical circuit line on the key pad switches 88, depresses the LINE push button 90 and then selects the element types and reference relays or input address that is to govern the initial condition of each element type chosen. At this point, the information in the panel lights and switches 172 is transferred to the panel interface 168 and in turn transferred to the microprocessor 166. It should be noted that the information transferred to the microprocessor also includes control information from the panel interface via control lines 180. The microprocessor 166 proceeds to act upon this information and transfers it to the random access memory 130 in such a manner that it may be accepted by the logic and counter processor 112 and acted upon by the processor so as to solve this new electrical circuit line along with the previous electrical circuit lines stored in the random access memory.

The microprocessor 166 comprises an Intel Corporation Model MCS4 microprocessor, and this microprocessor is programmed to perform all the interfacing and transferral of control and data to the various functional blocks in the reprogramming module so as to provide the central processor with information regarding all the electrical circuit lines as well as providing the desired receipt and transferral of information to the programming panel and a teletype interface 182. The various programs stored in the microprocessor 166 are shown in Tables 1 and 2 and the flow charts of these programs is shown in FIGS. 22, 23, 24 and 25.

```
017     000     ROR0=0!20
018     020     ROR1=1!20
019     040     ROR2=2!20
020     060     ROR3=3!20
021     100     R1R0=4!20
022     120     R1R1=5!20
023     140     R1R2=6!20
024     160     R1R3=7!20
025     200     R2R0=10!20
026     220     R2R1=11!20
027     240     R2R2=12!20
028     260     R2R3=13!20
029     300     R3R0=14!20
030     320     R3R1=15!20
031     340     R3R2=16!20
032     360     R3R3=17!20
033
034     000     R0=0
035     001     R1=1
036     002     R2=2
037     003     R3=3
038     004     R4=4
039     005     R5=5
040     006     R6=6
041     007     R7=7
042     010     R10=10
043     011     R11=11
044     012     R12=12
045     013     R13=13
046     014     R14=14
047     015     R15=15
048     016     R16=16
049     017     R17=17
050
051             /SUBROUTINES NOT IN THIS ASSEMBLY
052     000     MEMSEL=0        /SELECT PROM OR RAM
053     000     READ=0          /READ ROM/ROM DATA
054     000     RITE=0          /WRITE (RAM) 1 BYTE
055     000     SNDADR=0        /SEND ADDRESS TO PORTS
056     000     SNDDAT=0        /SEND DATA TO PORTS
057             EJECT
058             /SYSTEM STORAGE (DCF : DISCRETE CHANGE FLAG)
059
060     040     ANDATA=ROR2 0   /A-NODE DATA (CHAS!1,2,3)
061     060     BINLIN=ROR3 0   /BINARY LINE # RAM ADDRESS
062     067     BINREF=ROR3 7   /BINARY REF. # RAM ADDRESS
063     043     BNDATA=ROR2 3   /B-NODE RAW DATA (CHAR 1,2,3)
064     176     COILIN=R1R3 16  /B3: LINE COIL
065                             /B2: CORRESPONDING INPUT BIT IN RAM 2
066                             /B1 & B0: HIGH ORDER COUNTER VALUE
067     164     CONBUT=R1R3 4   /B3: SHUNT CLOSED CONTACT BUTTON (DCF)
068                             /B2: SHUNT OPEN
069                             /B1: SERIES CLOSED
070                             /B0: SERIES OPEN
071     077     CONLIT=ROR3 17  /PSUEDO-STORAGE FOR CONTACT LIGHTS
072                             /SEE CONBUT
073     046     CNDATA=ROR2 6   /C-NODE DATA (CHAR 1,2,3)
074     174     CNTLOW=R1R3 14  /LOW ORDER COUNTER VALUE
075     175     CNTMID=R1R3 15  /MIDDLE ORDER COUNTER VALUE
076     160     DISABL=R1R3 0   /(DCF)
077                             /B2: DISABLE ON
078                             /B1: DISABLE OFF
079                             /B0: ENABLE
080     124     DISCON=R1R1 4   /DISPLAY CONTACT BITS
081     123     DISDIS=R1R1 3   /B3: DISABLE LAMP
082                             /B2: COIL LAMP
083                             /B1: SEQUENCER LAMP
084                             /B0: LATCH LAMP
```

| | | | |
|---|---|---|---|
| 085 | 126 | DISNOD=R1R1 6 | /DISPLAY NODE BITS |
| 086 | 120 | DISPLY=R1R1 0 | /DISPLAY IMAGE AREA (12 CHAR) |
| 087 | 130 | DISREF=R1R1 10 | /DISPLAY REF. # |
| 088 | 004 | DISSIZ=20-14 | /-# OF CHAR IN IMAGE AREA |
| 089 | 125 | DISTIK=R1R1 5 | /B3: TICK LAMP |
| 090 | | | /B2: BLANK LAMP |
| 091 | | | /B1: DEC. PT. TENTH |
| 092 | 051 | DNDATA=R0R2 11 | /D-NODE DATA (CHAR 1,2,3) |
| 093 | 121 | DONEDS=R1R1 1 | /DONE ETC., LAMPS - SEE DONEFG |
| 094 | 357 | DONEFG=RD3 | /B3: DONE (SC3) |
| 095 | | | /B2: BUSY |
| 096 | | | /B1: ILLEGAL |
| 097 | | | /B0: ERROR |
| 098 | 127 | DZBITS=R1R1 7 | /DISPLAY POWER BITS |
| 099 | 102 | ENTER=R1R0 2 | /B3: REF. # ENTER |
| 100 | 120 | ERRIN1=R1R1 | /ROM & REGISTER SELECT FOR ERROR FLAGS |
| 101 | 160 | INEDGE=R1R3 0 | /DISCRETE INPUT LEADING EDGE |
| 102 | 100 | INPUT=R1R0 0 | /INPUT STORAGE |
| 103 | 200 | IPRT10=10!20 | /LOW ORDER PANEL INPUT |
| 104 | 220 | IPRT11=11!20 | /NEXT HIGHER PANEL INPUT |
| 105 | 240 | IPRT12=12!20 | /NEXT HIGHER PANEL INPUT |
| 106 | 260 | IPRT13=13!20 | /HIGH ORDER PANEL INPUT |
| 107 | 300 | IPRT14=14!20 | /B3: TTY UART ERROR |
| 108 | | | /B2: PANEL UART ERROR |
| 109 | | | /B1: ERASE WD TIMER |
| 110 | | | /B0: ERASE LAMP ON SENSE BIT |
| 111 | 114 | LINE=R1R0 14 | /INPUT LINE # |
| 112 | 063 | LNTYPE=R0R3 3 | /LINE TYPE ID |
| 113 | 101 | MONITR=R1R0 1 | /B3: WRITE MODE |
| 114 | | | /B2: ABORT |
| 115 | | | /B1: PROGRAM MODE |
| 116 | | | /B0: MONITOR MODE |
| 117 | 354 | NFGFLG=RD0 | /B3: WRITE MODE NFG |
| 118 | 100 | NFGSTR=R1R0 | /RAM & REG. SELECT FOR STATUS, CHAR. |
| 119 | | | /FLAGS |
| 120 | 166 | NODBUT=R1R3 6 | /B3: A-NODE SELECT (DCF) |
| 121 | | | /B2: B-NODE |
| 122 | | | /B1: C-NODE |
| 123 | | | /B0: D-NODE |
| 124 | 076 | NODLIT=R0R3 16 | /PSUEDO-STORAGE FOR MODE SELECT LIGHTS |
| 125 | | | /SEE NOD BUT |
| 126 | 200 | OPRT10=10!20 | /HIGH ORDER PANEL DATA OUT (RAM1=LOW |
| 127 | | | /ORDER) |
| 128 | 220 | OPRT11=11!20 | /HIGHEST ORDER PANEL DATA OUT (RAM1=LOW |
| 129 | | | /ORDER) |
| 130 | 260 | OPRT12=13!20 | /B2: PULSE TO CLEAR TTY RECEIVER FLAG |
| 131 | | | /B1: PULSE TO CLEAR PANEL RECEIVE FLAG |
| 132 | | | /B0: PULSE TO CLEAR UARTS |
| 133 | 300 | OPRT14=14!20 | /PANEL ADDRESS (BITS 1 & 0) |
| 134 | 122 | PRESET=R1R1 2 | /B3: PRESET LAMP |
| 135 | | | /B2: COUNT LAMP |
| 136 | 064 | PROMAD=R0R3 4 | /LINE # PROM/RAM DATA ADDRESS |
| 137 | | RAMMEM= | /RAM MEMORY SELECT |
| 138 | 200 | RAWDAT=R2R0 0 | /RAW DATA (A,B,C,D NODES) |
| 139 | 355 | RDERR1=RD1 | /READ INPUT ERROR FLAGS |
| 140 | 356 | RDERR2=RD2 | /READ INPUT ERROR FLAGS |
| 141 | | READ= | /READ ROM/RAM |
| 142 | 110 | REFER=R1R0 10 | /INPUT REF # |
| 143 | 072 | RNTYPE=R0R3 12 | /REF TYPE ID |
| 144 | | ROMMEM= | /ROM MEMORY SELECT |
| 145 | 120 | TTYFLG=R1R1 | /B3: TTY READ |
| 146 | | | /B2: TTY PUNCH |
| 147 | | | /B1: TTY VERIFY |
| 148 | 354 | TTYRFV=RD0 | |
| 149 | 345 | WRERR1=WR1 | /WRITE INPUT ERROR FLAGS |
| 150 | 346 | WRERR2=WR2 | /WRITE INPUT ERROR FLAGS |
| 151 | 163 | WRITE=R1R3 3 | /B3: WRITE LINE (DCF) |
| 152 | | | /B2: WRITE ALL |
| 153 | 177 | ZBITS=R1R3 17 | /B3: NODE POWER |
| 154 | | | /B2: NODE POWER |
| 155 | | | /B1: NODE POWER |
| 156 | | | /B0: NODE POWER |
| 157 | | | |

```
001     000         PROMA=400
002
003     0400        *PROMA
004
005                 /DISPLAY PHILOSOPHY
006                 /THE ENTIRE DISPLAY (IMAGE) IS FLUSHED & THEN REBUILT
007                 /FROM SCRATCH. THIS ELIMINATES THE NECESSITY OF KNOWING
008                 /OR REMEMBERING WHAT DISPLAYS WERE ACTIVE, I. E.,
009                 /WE NEED TO CONCERN OURSELVES WITH ONLY THE CUR-
010                 /RENT STATE OF THE SYSTEM.
011
012     0400 054   DSPLAY, FIM RAWDAT+3,R14  /ADDRESS FOR B-NODE
        0401 203
013     0402 130           JMS B1B2B3        /STRAIGHTEN OUT RAW DATA
        0403 066
014                                          /TO LIVABLE FORMAT
015     0404 054           FIM RAWDAT+11,R14 /ADDRESS FOR D-NODE
        0405 211
016     0406 130           JMS B1B2B3
        0407 066
017
018                 /FLUSH THE IMAGE AREA
019
020     0410 324           LDM DISSIZ
021     0411 260           XCH R0            /SET THE FLUSH COUNT
022     0412 042           FIM DISPLY,R2
        0413 120
023     0414 320           LDM 0
024     0415 043   DSP4,   SRC R2
025     0416 340           WRM
026     0417 143           INC R3
027     0420 160           ISZ DSP4,R0
        0421 015
028
029                 /CHECK WRITE NODE NFG FLAG. FLAG IS SET WHEN THE KEY
030                 /SWITCH IS IN THE WRITE MODE POSITION ON A POWER-UP OR
031                 /AN MCS4 RESET CONDITION.
032
033     0422 040           FIM NFGSTR,R0
        0423 100
034     0424 041           SRC R0
035     0425 354           NFGFLG            /DISPLAY NOTHING EXCEPT "ILLEGAL"
036     0426 365           RAL               /WHEN THE FLAG IS SET.
037     0427 022           JCN ILLEG,CARRY
        0430 310
038
039                 /THE WRITE MODE NFG FLAG IS NOT SET
040                 /CHECK THE TTY FLAGS: READ, PUNCH, & VERIFY
041
042     0431 040           FIM TTYFLG,R0
        0432 120
043     0433 041           SRC R0
044     0434 354           TTYRPV
045     0435 365           RAL
046     0436 022           JCN CURENT,CARRY
        0437 046
047     0440 365           RAL
048     0441 022           JCN CURENT,CARRY
        0442 046
049     0443 365           RAL
050     0444 032           JCN CURE,NOT CARRY
        0445 052
051     0446 130   CURENT, JMS KERENT        /DISPLAY CURRENT STATE OF SYSTEM
        0447 000
052     0450 102           JUN IOXCH         /DO IO EXCHANGE
        0451 154
053                 /NOTHING HAPPENING ON THE TTY.
054     0452 054   CURE,   FIM RAWDAT,R14    /MOVE RAW DATA TO SCRATCH
        0453 200
055     0454 052           FIM ANDATA,R12    /PAD WHERE IT CAN BE DINKIED
        0455 040
056     0456 125           JMS MOVE4
        0457 307
057     0460 125           JMS MOVE4
        0461 307
```

```
058 0462 125            JMS MOVE4
    0463 307
059             /CHECK THE WRITE MODE SWITCH.
060 0464 040            FIM MONITR,R0
    0465 101
061 0466 041            SRC R0
062 0467 351            RDM
063 0470 365            RAL
064 0471 032            JCN CURE4,NOT CARRY
    0472 077
065             /WRITE MODE SET
066 0473 130            JMS KERENT     /DISPLAY DONE, ETC., LAMPS
    0474 000
067 0475 101            JUN P2
    0476 106
068
069             /WRITE MODE SWITCH NOT SET
070             /CHECK LINE # INVALID FLAG
071
072 0477 040   CURE4,   FIM ERRIN1,R0
    0500 120
073 0501 041            SRC R0
074 0502 355            RDR R1
075 0503 365            RAL
076 0504 022            JCN ILLEG,CARRY
    0505 310
077
078             /LINE # IS OK
079             /CHECK LINE # INVALID FLAG (NEEDED IF IN WRITE MODE)
080
081 0506 040   P2,      FIM LNTYPE,R0  /LINE TYPE #= 0 IS ILLEGAL
    0507 063
082 0510 041            SRC R0
083 0511 351            RDM
084 0512 365            RAL
085 0513 022            JCN ILLEG,CARRY
    0514 310
086
087             /LINE # OK, IS LINE # IN THE 1ST OR 2ND RAMS?
088 0515 351            RDM            /LN=1 TO 5 IS IN RAM 1
089 0516 260            XCH R0
090 0517 325            LDM 5
091 0520 220            SUB R0
092 0521 032            JCN P3,NOT CARRY /RAM 2 OR JUMP
    0522 317
093
094             /LINE # IS IN RAM 1
095             /CHECK FOR A BLANK LINE
096 0523 324            LDM 20-14
097 0524 260            XCH R0
098 0525 042            FIM ANDATA,R2
    0526 040
099 0527 043   P26,     SRC R2
100 0530 351            RDM
101 0531 034            JCN P210,NOT ZERO
    0532 146
102 0533 143            INC R3
103 0534 160            ISZ P26,R0
    0535 127
104
105             /LINE # IS BLANK - DISPLAY IT
106
107 0536 054            FIM DISTIK,R14
    0537 125
108 0540 055            SRC R14
109 0541 351            RDM
110 0542 125            JMS SET2
    0543 316
111 0544 260            XCH R0
112 0545 340            WRM
113
114             /RELAY LINE DIALED UP?
115
116 0546 040   P210,    FIM LNTYPE,R0
    0547 063
```

```
117  0550 041              SRC R0
118  0551 324              LDM 4
119  0552 350              SBM
120  0553 032              JCN P5; NOT CARRY          /NO ON JUMP.
     0554 245
121
122                 /TURN ON RELAY LAMP
123
124  0555 040              FIM DISPLY; R0
     0556 120
125  0557 041              SRC R0
126  0560 320              LDM 0
127  0561 125              JMS SET0
     0562 342
128  0563 260              XCH R0
129  0564 340              WRM
130
131                 /REF. # INVALID?
132
133  0565 040     P2A,     FIM ERRIN1; R0
     0566 120
134  0567 041              SRC R0
135  0570 355              RDERR1
136  0571 365              RAL
137  0572 365              RAL
138  0573 022              JCN P2A30; CARRY          /YES ON JUMP
     0574 235
139
140                 /REF. # OK; A-NODE SELECTED?
141  0575 040              FIM NODLIT; R0
     0576 076
142  0577 041              SRC R0
143  0600 351              RDM
144  0601 365              RAL
145  0602 032              JCN P2A10; NOT CARRY      /NO ON JUMP
     0603 214
146
147                 /A-NODE IS SELECTED; SHUNT CONTACT SELECTED?
148
149  0604 054              FIM CONLIT; R14
     0605 077
150  0606 334              LDM 14
151  0607 137              JMS ANDOR
     0610 272
152  0611 260              XCH R0
153  0612 034              JCN CONILL; NOT ZERO      /YES ON JUMP
     0613 303
154
155
156                 /GET THE REFERENCE # FROM SCRATCH PAD RAW DATA
157                 /CALADD RETURNS WITH THE ADDRESS OF THE SELECTED NODE
158                 /MSN IN R14,15. THE DATA IS IN THE MODIFIED FORM.
159
160  0614 130     P2A10,   JMS CALADD
     0615 011
161  0616 321              LDM 1                     /REMOVE THE 3 MSB'S OF THE
162  0617 137              JMS ANDOR
     0620 272
163  0621 260              XCH R0
164  0622 340              WRM                       /PUT BIT 1 BACK IN SCRATCH PAD.
165  0623 255              LD R15                    /MOVE POINTER BACK TO LSN.
166  0624 370              DAC
167  0625 370              DAC
168  0626 275              XCH R15
169  0627 110              JUN BNREF                 /VALIDATE REF. #
     0630 000
170  0631 102     REFBN,   JUN CENZ                  /ALL DONE -TOSS IN LITES & QUIT
     0632 067
171  0633 102              JUN CENZ                  /ALL DONE-TOSS IN LIGHTS & QUIT.
     0634 067
172
173                 /REF. # FLAGGED INVALID - GET SWITCHES TO DISPLAY
174
175  0635 054     P2A30,   FIM REFER; R14
     0636 110
```

```
176 0637 052              FIM DISREF,R12
    0640 130
177 0641 125              JMS MOVE3
    0642 274
178 0643 101              JUN ILLEG       /ALL DONE - THROW OUT ILLEGAL
    0644 310
179                                       /& QUIT.

001                  /PROCESSING A COUNTER LINE
002                  /IS THE A-NODE REFERENCE A "TICK"?
003
004 0645 054    P5,  FIM ANDATA+2,R14
    0646 042
005 0647 321         LDM 1           /MASK OUT 3 MSB'S OF CHAR 3
006 0650 137         JMS ANDOR
    0651 272
007 0652 260         XCH R0
008 0653 340         WRM
009 0654 054         FIM ANDATA,R14  /0001 0000 1000  (410)8=TICK
    0655 040
010 0656 330         LDM 10          /LSN
011 0657 121         JMS P555
    0660 317
012 0661 034         JCN P5A10,NOT ZERO
    0662 327
013 0663 121         JMS P555        /MIDDLE NIBBLE
    0664 317
014 0665 034         JCN P5A10,NOT ZERO
    0666 327
015 0667 321         LDM 1           /MSN
016 0670 121         JMS P555
    0671 317
017 0672 034         JCN P5A10,NOT ZERO
    0673 327
018                  /IF WE GET THIS FAR, THE A-NODE = TICK
019                  /TURN ON TIMER LAMP
020 0674 040         FIM DISPLY,R0
    0675 120
021 0676 041         SRC R0
022 0677 324         LDM 4
023 0700 340         WRM
024 0701 102         JUN P5A24
    0702 010
025
026                  /TURN ON ALL CONTACT LAMPS
027
028 0703 040    CONILL, FIM DISCON,R0
    0704 124
029 0705 041         SRC R0
030 0706 337         LDM 17
031 0707 340         WRM
032 0710 040    ILLEG, FIM DONEDS,R0   /SET THE ILLEGAL BIT
    0711 121
033 0712 041         SRC R0
034 0713 322         LDM 2
035 0714 340         WRM
036 0715 102         JUN IOXCH
    0716 154
037
038                  /*****                              *****
039
040                  P3,             /RAM 2 ACQUISITION, GET BIT FROM RAM 2
041
042                  /NEEDS WORK - NEEDS WORK - NEEDS WORK
043
044                  /*****                              *****
045 0717 361    P555, CLC
046 0720 055         SRC R14
047 0721 155         INC R15
048 0722 350         SBM
049 0723 034         JCN P555G,NOT ZERO
    0724 326
```

```
050 0725 300            BBL 0
051 0726 317    P5556,  BBL 17
052
053
054             /THE A-NODE IS NOT = "TICK"
055             /IS THIS THE 1ST COUNTER LINE?
056
057 0727 040    P5A10,  FIM LINE,R0    /LOOK FOR A 1 IN THE 2 LSN'S
    0730 114
058 0731 041            SRC R0
059 0732 351            RDM
060 0733 141            INC R1
061 0734 041            SRC R0
062 0735 353            ADM
063 0736 370            DAC
064 0737 034            JCN P5A20,NOT ZERO
    0740 351
065             /2 LSN'S = 0 = 1ST COUNTER LINE = SEQUENCER
066             /TURN ON SEQUENCER LAMP
067 0741 040            FIM DISDIS,R0
    0742 123
068 0743 041            SRC R0
069 0744 351            RDM
070 0745 125            JMS SET1
    0746 322
071 0747 260            XCH R0
072 0750 340            WRM
073             /TURN ON COUNTER LAMP
074 0751 040    P5A20,  FIM DISPLY,R0
    0752 120
075 0753 041            SRC R0
076 0754 330            LDM 10
077 0755 340            WRM
078 0756 102            JUN P5A24
    0757 010
079             EJECT
080         000 PROMB=PROMA+400
081
082        1000 *PROMB
083
084 1000 103    AIN30,  JUN IN30
    1001 002
085 1002 101    AP2A,   JUN P2A
    1003 165
086 1004 101    CONILA, JUN CONILL
    1005 303
087
088 1006 104    ERR10,  JUN GETOUT     /PAGE ERROR RETURN
    1007 054
089             /ARE THE A OR B NODES SELECTED>
090 1010 040    P5A24,  FIM NODLIT,R0
    1011 076
091 1012 365            RAL
092 1013 022            JCN AP2A,CARRY  /A-NODE ON JUMP
    1014 002
093 1015 365            RAL
094 1016 022            JCN AP2A,CARRY  /B-NODE ON JUMP
    1017 002
095 1020 365            RAL
096 1021 022            JCN P5A30,CARRY /C-NODE ON JUMP
    1022 062
097
098             /TRYING TO ENTER INTO THE D-NODE?
099 1023 040            FIM ERRIN1,R0
    1024 120
100 1025 041            SRC R0
101 1026 355            RDERR1
102 1027 366            RAR
103 1030 366            RAR
104 1031 022            JCN CONILA,CARRY/YES ON JUMP
    1032 004
105             /DISPLAY COUNT & COUNT VALUE
106
107 1033 320            LDM 0
108 1034 125            JMS SET2
    1035 316
```

```
109 1036 260    P5A28,  XCH R0
110 1037 054            FIM PRESET,R14   /TURN ON COUNT LAMP
    1040 122
111 1041 055            SRC R14
112 1042 340            WRM
113 1043 054            FIM ROR2+2,R14
    1044 042
114 1045 323            LDM 3            /MASK OUT 2 MSB'S OF MSN
115 1046 137            JMS ANDOR
    1047 272
116 1050 260            XCH R0
117 1051 340            WRM
118 1052 054            FIM ROR2 0,R14   /CONVERT BINARY TO BCD AND STORE
    1053 040
119 1054 052            FIM REFER,R12    /IN DISPLAY (4TH CHAR. NOT USED
    1055 110
120 1056 137            JMS BINBCD       /IN DISPLAY BUFFER)
    1057 137
121 1060 102            JUN CENZ         /ALL DONE - QUIT
    1061 067
122                     /LIGHT PRESET LAMP
123 1062 320    P5A30,  LDM 0
124 1063 125            JMS SET3
    1064 312
125 1065 102            JUN P5A28
    1066 036
126

001                     /ROUTINE LOADS THE DISPLAY IMAGE AREA WITH THE
002                     /FOLLOWING:
003                     /CONTACT TYPE
004                     /NODE SELECT
005                     /POWER BITS
006                     /COIL BIT (THROUGH ENABLE/DISABLE)
007
008 1067 040    CENZ,   FIM CONLIT,R0    /CONTACT SELECT
    1070 077
009 1071 041            SRC R0
010 1072 351            RDM
011 1073 040            FIM DISCON,R0    /DROP INTO DISPLAY
    1074 124
012 1075 041            SRC R0
013 1076 340            WRM
014 1077 040            FIM NODLIT,R0    /NODE SELECT
    1100 076
015 1101 041            SRC R0
016 1102 351            RDM
017 1103 040            FIM DISNOD,R0    /DROP INTO DISPLAY
    1104 126
018 1105 041            SRC R0
019 1106 340            WRM
020 1107 040            FIM ZBITS,R0     /POWER BITS
    1110 177
021 1111 041            SRC R0
022 1112 351            RDM
023 1113 040            FIM DZBITS,R0    /DROP INTO DISPLAY
    1114 127
024 1115 041            SRC R0
025 1116 340            WRM
026
027                     /IF LINE IS DISABLED, LIGHT DISABLE LIGHT. ENABLED OR
028                     /DISABLED - GET COIL BIT FROM RAM.
029                     /(DISABLED: X2=1)
030
031 1117 040            FIM DNDATA+2,R0
    1120 053
032 1121 041            SRC R0
033 1122 351            RDM
034 1123 365            RAL
035 1124 365            RAL
036 1125 032            JCN CENZ10,NOT CARRY
    1126 137
```

```
037
038           /LINE IS DISABLED : LIGHT THE LAMP
039
040 1127 054          FIM DISDIS,R14
    1130 123
041 1131 055          SRC R14
042 1132 351          RDM
043 1133 125          JMS SET3
    1134 312
044 1135 260          XCH R0
045 1136 340          WRM
046
047           /GET COIL BIT FROM RAM DATA (B3)
048 1137 054  CENZ10, FIM DISDIS,R14  /LAMPS
    1140 123
049 1141 040          FIM COILIN,R0
    1142 176
050 1143 041          SRC R0
051 1144 351          RDM
052 1145 361          CLC              /MOVE COIL BIT FROM B3 TO B2
053 1146 366          RAR              /FOR DISPLAY
054 1147 137          JMS ANDOR        /"OR" IN THE BIT
    1150 272
055 1151 261          XCH R1
056 1152 055          SRC R14
057 1153 340          WRM
058          PAUSE

001           /PANEL INPUT/OUTPUT EXCHANGE
002 1154 052  IOXCH,  FIM R0R0,R12   /INPUT IMAGE ADDRESS
    1155 000
003 1156 046          FIM R1R0,R6    /RAM PORT POINTER
    1157 100
004 1160 042          FIM OPRT14,R2  /PANEL ADDRESS PORT
    1161 300
005 1162 056          FIM DISPLY,R16 /DISPLAY IMAGE ADDRESS
    1163 120
006 1164 320  IOEX,   LDM 0          /1ST ADDRESS
007 1165 124          JMS LDPAN      /LOAD INPUTS, ERROR CHECK, READ
    1166 243
008                                  /INPUTS
009 1167 321          LDM 01
010 1170 124          JMS LDPAN
    1171 243
011 1172 322          LDM 2
012 1173 124          JMS LDPAN
    1174 243
013 1175 323          LDM 3
014 1176 124          JMS LDPAN
    1177 243
015           /ALL DATA HAS BEEN READ AT LEAST ONCE
016
017           /ALL ERROR RETURNS FROM THIS PAGE: ERR10
018           /NEW INPUTS - PROCESS THEM
019           /MAKE LEADING EDGES FOR ALL DISCRETE INPUTS
020
021 1200 054          FIM R0R0,R14   /NEW INPUT ADDRESS
    1201 000
022 1202 052          FIM INPUT,R12  /OLD INPUT ADDRESS
    1203 100
023 1204 050          FIM INEDGE,R10 /LEADING EDGE STORAGE
    1205 160
024 1206 330          LDM 10
025 1207 267          XCH R7
026
027 1210 053  INITA,  SRC R12
028 1211 351          RDM            /READ OLD INPUTS
029 1212 364          CMA            /"NOT" STATE
030 1213 137          JMS ANDOR      /"AND" AC & NEW INPUT
    1214 272
031 1215 260          XCH R0
032 1216 051          SRC R10
033 1217 340          WRM            /STORE LEADING EDGE
034 1220 151          INC R11
035 1221 153          INC R13
```

```
036 1222 155              INC R15
037 1223 167              ISZ IN11A,R7
    1224 210
038
039                /COMPARE OLD LINE #'S WITH THOSE JUST READ IN
040
041 1225 050              FIM RORO 14,R10  /NEW INPUT ADDRESS (SCRATCH PAD)
    1226 014
042 1227 052              FIM LINE,R12     /OLD INPUT ADDRESS
    1230 114
043 1231 335              LDM 15
044 1232 276              XCH R16
045 1233 051     IN20,    SRC R10
046 1234 361              CLC
047 1235 351              RDM
048 1236 053              SRC R12
049 1237 350              SBM
050 1240 034              JCN IN22,NOT ZERO
    1241 246
051 1242 151              INC R11
052 1243 153              INC R13
053 1244 176              ISZ IN20,R16
    1245 233
054 1246 260     IN22,    XCH R0           /SAVE AC FOR LATER SWITCH
055
056                /MOVE ALL INPUT TO PERMANENT STORAGE (INCLUDING REF. #)
057                /THE REF # IS NOT FLAGGED FOR CHANGES. (THE SWITCHES ARE
058                /READ WHEN THE "ENTER" BUTTON IS BANGED.)
059
060 1247 044              FIM RORO 0,R4    /SCRATCH PAD
    1250 000
061 1251 046              FIM INPUT,R6     /PERMANENT STORAGE
    1252 100
062
063 1253 124     IN23,    JMS RDWRIT
    1254 144
064
065 1255 167              ISZ IN23,R7
    1256 253
066
067                /BRING BACK LINE # CHANGE SWITCH
068
069 1257 260              XCH R0
070 1260 024              JCN AIN30,ZERO
    1261 000
071
072                /LINE # CHANGED - VALIDATE IT
073
074 1262 054              FIM LINE,R14
    1263 114
075 1264 106              JUN BCDLIN
    1265 000
076                /LINE # VALIDITY CHECK RETURN
077                /AC=0: LINE # NG
078                /AC NOT 0: AC=LINE TYPE
079 1266 104     LINBCD,  JUN GETOUT
    1267 054

001      000     PROMC=PROMB+400
002
003      1400    *PROMC
004
005              /ALL ERROR RETURNS FROM THIS PAGE: ERR20
006              /NO CHANGE IN LINE #, CHECK NODE SELECTION.
007              /IF NO BUTTONS ARE PUSHED, THE RESULT IS OBTAINED FROM
008              /THE LIGHT REGISTER OR IN THE CASE OF 0 IN BUTTONS & 0
009              /IN LIGHTS, BIT 0 IS ARBITRARILY SET IN THE OUTPUT LITES
010              /FOR THE NEXT TIME AROUND. BUTLIT & NODLIT ARE RAM CELLS
011              /& ARE PICKED BY DISPLAY & PUT IN THE DISPLAY BUFFER.
012
013 1400 104     AIN140,  JUN IN140
    1401 000
```

```
014 1402 040      IN30,    FIM NODBUT,R0
    1403 166
015 1404 042               FIM NODLIT,R2
    1405 076
016 1406 124               JMS ONLYWN
    1407 206
017
018              /IF IN MONITOR MODE OR WRITE MODE, WE ARE ALL DONE.
019              /THE CHECK IS MODE ON THE PROGRAM MODE BIT
020
021 1410 040               FIM MONITR,R0
    1411 101
022 1412 041               SRC R0
023 1413 351               RDM
024 1414 366               RAR
025 1415 366               RAR
026 1416 032               JCN ERR20,NOT CARRY/(THIS IS NOT AN ERROR)
    1417 165
027
028              /KEEP GOING, WE ARE IN THE PROGRAM MODE
029              /UPDATE CONTACT SELECT BUTTONS.
030
031 1420 040               FIM CONBUT,R0
    1421 164
032 1422 042               FIM CONLIT,R2
    1423 077
033 1424 124               JMS ONLYWN       /CHECK BUTTONS FOR ONE
    1425 206
034                                         /SELECTION
035
036              /DISABLE - ENABLE TRUTH TABLE
037              /X1    X2
038              / 0     0      DISABLE LINE OFF
039              / 0     1      DISABLE LINE ON
040              / 1     0      LINE ENABLED
041              / 1     1      DISABLE LINE OFF
042
043
044              /CHECK ENABLE BUTTON. IF PUSHED, SET LINE DATA TO NORMAL
045              /OPERATION.
046              /(X1=1,X2=0) IF THE LINE # IS OK.
047
048 1426 054               FIM ANDATA+2,R14/MSN OF A-NODE DATA
    1427 042
049 1430 052               FIM DNDATA+2,R12        /MSN OF D-NODE DATA
    1431 053
050                                         /(X1 & X2 BITS)
051 1432 040               FIM DISABL,R0   /B0: ENABLE
    1433 160
052 1434 041               SRC R0
053 1435 351               RDM
054 1436 366               RAR
055 1437 032               JCN IN50,NOT CARRY
    1440 063
056
057              /ENABLE IS PUSHED
058
059 1441 124               JMS CHEKR0      /CHECK LINE #
    1442 117
060 1443 034               JCN ERR20,NOT ZERO      /LINE NG ON JUMP
    1444 165
061
062              /LINE # IS OK, SET X1=1, X2=0
063
064 1445 053               SRC R12
065 1446 351               RDM
066 1447 125               JMS CLR2        /0->X2
    1450 332
067 1451 260               XCH R0
068 1452 340               WRM
069 1453 055               SRC R14
070 1454 351               RDM
071 1455 125               JMS SET3        /1->X1
    1456 312
```

```
072 1457 260             XCH R0
073 1460 340             WRM
074 1461 104             JUN IN164
    1462 023
075
076              EJECT
077
078              /CHECK THE DISABLE ON. IF PUSHED, CHECK FOR LINE # OK
079
080 1463 366    IN50,    RAR
081 1464 032             JCN IN60; NOT CARRY
    1465 107
082
083              /ON BUTTON PUSHED
084
085 1466 124             JMS CHEKRG      /CHECK LINE #
    1467 117
086 1470 034             JCN ERR20; NOT ZERO
    1471 165
087              /LINE # OK
088              /SET X1 & X2 FOR DISABLE ON (X1=0, X2=1)
089
090 1472 055             SRC R14
091 1473 351             RDM
092 1474 125             JMS CLR3        /CLEAR X1
    1475 326
093 1476 260             XCH R0
094 1477 340             WRM
095 1500 053             SRC R12         /SET X2
096 1501 351             RDM
097 1502 125             JMS SET2
    1503 316
098 1504 340             WRM
099 1505 104             JUN IN164
    1506 023
100
101              /CHECK DISABLE OFF BUTTON. IF PUSHED, CHECK FOR LINE
102              /# OK
103
104 1507 366    IN60,    RAR
105 1510 032             JCN IN70; NOT CARRY
    1511 133
106
107              /OFF BUTTON PUSHED
108
109 1512 124             JMS CHEKRG      /CHECK LINE #
    1513 117
110 1514 034             JCN ERR20; NOT ZERO
    1515 165
111
112              /LINE # OK, SET X1=1 & X2=1
113
114 1516 055             SRC R14
115 1517 351             RDM
116 1520 125             JMS SET3        /SET X2
    1521 312
117 1522 260             XCH R0
118 1523 340             WRM
119 1524 053             SRC R12
120 1525 351             RDM
121 1526 125             JMS SET2        /SET X1
    1527 316
122 1530 340             WRM
123 1531 104             JUN IN164
    1532 023
124
125              /CHECK ENTER BUTTON. THE ENTER BUTTON INPUT IS QUERIED
126              /NOT THE LEADING EDGE. BY LOOKING AT THE INPUT, THE ILL-
127              /EGAL FLAGS ARE GENERATED & CLEARED AUTOMATICALLY & WILL
128              /ONLY BE PRESENT WHEN THE BUTTON IS HELD DOWN.
129
130 1533 040    IN70,    FIM ENTER; R0
    1534 102
131 1535 041             SRC R0
132 1536 351             RDM
133 1537 365             RAL
```

```
134  1540 022             JCN IN80;CARRY
     1541 167
135
136                /ENTER NOT ACTIVE - CLEAR ALL ERROR CONDITION FLAGS
137                /GENERATED BY THE ENTER BUTTON.
138
139  1542 054             FIM ERRIN1;R14    /RAM & REGISTER CONTAINING
     1543 120
140                                         /ERROR FLAGS
141  1544 055             SRC R14
142  1545 355             RDERR1
143  1546 125             JMS CLR1          /D-NODE SELECTED ON A COUNTER
     1547 336
144                                         /LINE
145  1550 260             XCH R0
146  1551 125             JMS CLR0          /SHUNT CONTACT SELECTED FOR THE
     1552 370
147                                         /A-NODE
148  1553 260             XCH R0
149  1554 125             JMS CLR2          /REF. # INVALID
     1555 332
150  1556 260             XCH R0
151  1557 345             WRERR1
152  1560 356             RDERR2
153  1561 125             JMS CLR2          /LINE # NOT A PROGRAMMABLE LINE
     1562 332
154  1563 260             XCH R0
155  1564 346             WRERR2
156  1565 104      ERR20, JUN GETOUT
     1566 054

001                /ENTER BUTTON WAS BANGED. CHECK LINE NUMBER FOR OK.
002
003  1567 124      IN80,  JMS CHEKRG
     1570 117
004  1571 034             JCN ERR20;NOT ZERO
     1572 165
005
006                /LINE # IS OK. IF LINE IS A COUNTER, CHECK C & D NODES.
007                /LINE TYPE ID IS 1: COUNTER, 2: SEQUENCER
008
009  1573 040             FIM LNTYPE;R0
     1574 063
010  1575 041             SRC R0
011  1576 351             RDM
012  1577 370             DAC
013  1600 024             JCN IN100;ZERO
     1601 245
014
015                /LINE IS NOT A COUNTER, CHECK FOR SEQUENCER.
016
017  1602 370             DAC
018  1603 024             JCN IN100;ZERO
     1604 245
019
020                /LINE IS NOT A SEQUENCER, VALIDATE THE REFERENCE #
021                /SWITCHES
022
023  1605 054      IN86,  FIM REFER;R14
     1606 110
024  1607 106             JUN BCDREF
     1610 021
025                /REF. # VALIDITY CHECK RETURN
026                /AC=0: REF. # NG
027                /AC NOT 0: AC = REF. TYPE
028  1611 034      REFBCD, JCN IN88;NOT ZERO/REF. # OK ON JUMP
     1612 213
029
030                /CHECK FOR A SHUNT CONTACT IN THE A-NODE
031
032  1613 040      IN88,  FIM NODLIT;R0
     1614 076
```

```
033 1615 041         SRC R0
034 1616 351         RDM              /READ NODE SELECTION FROM OUTPUT
035 1617 365         RAL
036 1620 032         JCN AIN140;NOT CARRY
    1621 000
037
038                  /A-NODE IS SELECTED; CHECK FOR SHUNT CONTACT
039
040 1622 054         FIM CONLIT;R14
    1623 077
041 1624 055         SRC R14
042 1625 334         LDM 14
043 1626 137         JMS ANDOR
    1627 272
044 1630 260         XCH R0
045 1631 024         JCN AIN140;ZERO  /NOT SHUNT ON JUMP
    1632 000
046
047                  /SHUNT CONTACT; SET ERROR FLAG
048
049 1633 054         FIM ERRIN1;R14
    1634 120
050 1635 055         SRC R14
051 1636 355         RDERR1
052 1637 125         JMS SET0
    1640 342
053 1641 260         XCH R0
054 1642 345         WRERR1
055 1643 104         JUN GETOUT
    1644 054
056
057                  /LINE IS A COUNTER (OR SEQUENCER). CHECK D-NODE SELECTED
058                  /IF D-NODE IS SELECTED - FLAG AS AN ERROR.
059                  /IF C-NODE IS SELECTED, GRAB REF # DIGI-SWITCHES,
060                  /CONVERT TO BINARY & STORE RESULT IN COUNTER PRESET
061
062 1645 040    IN100,  FIM NODLIT;R0
    1646 076
063 1647 041         SRC R0
064 1650 351         RDM
065 1651 366         RAR
066 1652 032         JCN IN104;NOT CARRY
    1653 265
067
068                  /D-NODE SELECTED ON A COUNTER LINE - SET ERROR FLAG.
069
070 1654 040         FIM ERRIN1;R0
    1655 120
071 1656 041         SRC R0
072 1657 355         RDERR1
073 1660 125         JMS SET1
    1661 322
074 1662 345         WRERR1
075 1663 104         JUN GETOUT
    1664 054
076
077                  /CHECK FOR C-NODE SELECTION
078
079 1665 366    IN104,  RAR
080 1666 032         JCN IN86;NOT CARRY
    1667 205
081
082                  /C-NODE IS SELECTED. GET REF # DIGI-SWITCHES => BINARY &
083                  /STUFF INTO PRESET LINE DATA. NO CHECKING NECESSARY.
084
085 1670 054         FIM REFER;R14     /REF # SWITCHES
    1671 110
086 1672 052         FIM ROR1 0;R12    /SCRATCH PAD
    1673 020
087 1674 136         JMS BCDBIN
    1675 355
088
089                  /MOVE BINARY PRESET TO C-NODE STORAGE
090
```

| | | | | |
|---|---|---|---|---|
| 091 | 1676 054 | | FIM ROR1 1;R14 | /DO NOT PICK UP MSD |
| 092 | 1677 021 | | | /FROM CONVERSION |
| 093 | 1700 052 | | FIM CNDATA;R12 | |
| 094 | 1701 046 1702 125 1703 274 | | JMS MOVE3 | |
| 095 | 1704 104 1705 023 | | JUN IN164 | |
| 096 | | | | |

| | | | | |
|---|---|---|---|---|
| 001 | 000 | | PROMD=PROMC+400 | |
| 002 | | | | |
| 003 | 2000 | | *PROMD | |
| 004 | | | | |
| 005 | | | /EVERYTHING OK; PUT REF # & CONTACT TYPE IN THE | |
| 006 | | | /    RAM=F (NODE SELECT & LINE #) | |
| 007 | | | | |
| 008 | | | /CHECK A & D NODES TO RETAIN STATE OF X1 & X2 | |
| 009 | 2000 040 2001 076 | IN140, | FIM NODLIT;R0 | |
| 010 | 2002 041 | | SRC R0 | |
| 011 | 2003 351 | | RDM | |
| 012 | 2004 365 | | RAL | |
| 013 | 2005 022 2006 102 | | JCN MESWA;CARRY | /A-NODE ON JUMP |
| 014 | 2007 366 | | RAR | |
| 015 | 2010 366 | | RAR | |
| 016 | 2011 022 2012 114 | | JCN MESWD;CARRY | /D-NODE ON JUMP |
| 017 | 2013 124 | IN142, | JMS CONSET | /SET THE CONTACT TYPE |
| 018 | 2014 152 2015 130 2016 011 | | JMS CALADD | /GET NODE ADDRESS IN R12-13 |
| 019 | 2017 054 2020 067 | | FIM BINREF;R14 | |
| 020 | 2021 125 2022 274 | | JMS MOVE3 | /MOVE SCRATCH PAD BINARY |
| 021 | | | | /TO RAW DATA STORAGE |
| 022 | | | | |
| 023 | | | /MOVE ALL OF THE RAW DATA TO THE RAM | |
| 024 | | | | |
| 025 | 2023 054 2024 203 | IN164, | FIM RAWDAT+3;R14 | /STRAIGHTEN OUT DATA |
| 026 | 2025 130 2026 042 | | JMS B3B1B2 | |
| 027 | 2027 054 2030 211 | | FIM RAWDAT+11;R14 | /D-NODE DATA |
| 028 | 2031 130 2032 042 | | JMS B3B1B2 | |
| 029 | 2033 334 | | LDM 14 | /STORE LOOP COUNT |
| 030 | 2034 260 | | XCH R0 | |
| 031 | 2035 054 2036 064 | IN166, | FIM FROMAD;R14 | /ADDRESS IN FROM/RAM |
| 032 | 2037 120 2040 000 | | JMS SNDADR | |
| 033 | 2041 052 2042 200 | | FIM RAWDAT;R12 | |
| 034 | 2043 120 2044 000 | | JMS SNDDAT | |
| 035 | 2045 000 U | | LDM RAMMEM | |
| 036 | 2046 120 2047 000 | | JMS MEMSEL | |
| 037 | 2050 120 2051 163 | | JMS WRITE | |
| 038 | 2052 160 2053 035 | | ISZ IN166;R0 | |
| 039 | | | /GET NEW RAW DATA =F (BINARY LINE #) | |
| 040 | | | | |
| 041 | | | | |
| 042 | 2054 054 2055 064 | GETOUT, | FIM FROMAD;R14 | |
| 043 | 2056 120 2057 000 | | JMS SNDADR | |

```
044  2060 052            FIM RAWDAT,R12
     2061 200
045  2062 120            JMS SNDDAT
     2063 000
046  2064 040            FIM MONITR,R0    /LOOK AT MODE SWITCH
     2065 101
047  2066 366            RAR              /TO PICK UP CORRECT
048  2067 022            JCN GETOUU,CARRY /MEMORY CONTROL
     2070 074
049  2071 000 U          LDM RAMMEM       /RUNNING FROM RAM
050  2072 104            JUN GETOUV
     2073 075
051  2074 000 U  GETOUU, LDM ROMMEM       /RUNNING FROM ROM
052  2075 120   GETOUV, JMS MEMSEL
     2076 000
053  2077 120            JMS READ         /READ THE DATA
     2100 000
054  2101 300            BBL 0            /ALL DONE - GO HOME
055
056           /A-NODE: SET X1=1 & BIT 0 OR 1 DEPENDING
057
058  2102 334  MESWA,    LDM 14           /RETAIN X1 & GAMMA
059  2103 054  MESWA1,   FIM BINREF+2,R14
     2104 071
060  2105 137            JMS ANDOR
     2106 272
061  2107 260            XCH R0
062  2110 055            SRC R14
063  2111 340            WRM
064  2112 104            JUN IN142
     2113 013
065
066  2114 324  MESWD,    LDM 4            /RETAIN X2
067  2115 104            JUN MESWA1
     2116 103
068          EJECT
069
070
071          /SUBROUTINE TO CHECK LINE # INVALID FLAG. IF LINE # OK,
072          /THE LINE # RANGE IS CHECKED TO DETERMINE IF THE LINE #
073          /FALLS IN RAM ONE.
074          /THE AC ON RETURN IS NOT 0 IF THE LINE # IS NOT IN RANGE
075
076  2117 054  CHEKRG,   FIM ERRIN1,R14   /GET LINE # INVALID FLAG
     2120 120
077  2121 055            SRC R14
078  2122 355            RDERR1           /READ CHAR
079  2123 365            RAL
080  2124 022            JCN LNNFG,CARRY
     2125 137
081
082          /LINE # OK, CHECK RANGE FOR LINE # IN FIRST RAM.
083
084  2126 054            FIM LNTYPE,R14
     2127 063
085  2130 055            SRC R14
086  2131 333            LDM 13
087  2132 353            ADM
088  2133 365            RAL              /CARRY IS SET IF WITHIN RANGE
089  2134 032            JCN LNNFG,NOT CARRY
     2135 137
090  2136 300            BBL 0
091
092          /LINE # OK BUT IS IN 2ND RAM (NOT PROGRAMMABLE)
093
094  2137 356  LNNFG,    RDERR2  /SET "LINE NUMBER NOT PROGRAMMABLE"
095                              /BIT
096  2140 125            JMS SET2
     2141 316
097  2142 346            WRERR2
098  2143 317            BBL 17
099
100          /READ FROM RAM SELECTED BY R4-5 & WRITE SAME INTO
101          /RAM SELECTED BY R6-7.
102
```

```
103 2144 045      RDWRIT,  SRC R4
104 2145 351               RDM
105 2146 047               SRC R6
106 2147 340               WRM
107 2150 145               INC R5    /R4-5 ARE INCREMENTED IN ADDRESSING
108 2151 300               BBL 0     /R6-7 ARE NOT.
109

001                /DETERMINE CONTACT TYPE & SET BITS ACCORDINGLY.
002                /IN THE BINARY REF #
003                /SERIES OPEN STATE, NO BITS NEED SETTING
004
005 2152 040      CONSET,  FIM CONLIT,R0
    2153 077
006 2154 041               SRC R0
007 2155 351               RDM
008 2156 365               RAL
009 2157 022               JCN CONS10,CARRY
    2160 200
010
011                /NOT SHUNT CLOSED
012 2161 365               RAL
013 2162 022               JCN CONS20,CARRY
    2163 203
014
015                /NOT SHUNT OPEN
016 2164 365               RAL
017 2165 032               JCN CONS30,NOT CARRY
    2166 177
018
019                /SERIES CLOSED  A=0,B=1
020
021 2167 322               LDM 2
022 2170 054      CONS8,   FIM BINREF+2,R14
    2171 071
023 2172 137               JMS ANDOR
    2173 272
024 2174 261               XCH R1
025 2175 055               SRC R14
026 2176 340               WRM
027 2177 300      CONS30,  BBL 0
028
029                /SHUNT CLOSED  A=1,B=1
030 2200 332      CONS10,  LDM 12
031 2201 104               JUN CONS8
    2202 170
032
033                /SHUNT OPEN  A=1,B=0
034 2203 330      CONS20,  LDM 10
035 2204 104               JUN CONS8
    2205 170
036
037                /R0 CONTAINS ADDRESS OF BUTTONS
038                /R2 CONTAINS ADDRESS OF LIGHTS
039                /CHECK BUTTONS. IF ANY ON, USE THEM. IF OFF, USE LIGHT
040                /REGISTER. GUARANTEE THAT ONE & ONLY ONE BIT IS SET FROM
041                /THE ABOVE FORK. PUT THIS BIT IN THE LIGHT REGISTER.
042                /IF NO BITS RESULT FROM THE FLOW, SET BIT 0 IN THE LIGHT
043                /REGISTER.
044
045 2206 041      ONLYWN,  SRC R0
046 2207 351               RDM       /READ BUTTONS
047 2210 034               JCN ONLY5,NOT ZERO
    2211 214
048
049                /NO BUTTONS ON, GET LIGHT REGISTER
050
051 2212 043               SRC R2
052 2213 351               RDM
053 2214 044      ONLY5,   FIM 14,R4      /R4=0,R5=14
    2215 014
054 2216 365      ONLY6,   RAL
```

| | | | | |
|---|---|---|---|---|
| 055 | 2217 | 144 | | INC R4 |
| 056 | 2220 | 022 | | JCN ONLY10,CARRY /FOUND A BIT |
| | 2221 | 225 | | |
| 057 | 2222 | 165 | | ISZ ONLY6,R5 |
| | 2223 | 216 | | |
| 058 | | | | |
| 059 | | | | /NO BUTTONS OR LIGHTS ON, SET BIT 0 IN LIGHTS. |
| 060 | 2224 | 372 | | STC |
| 061 | | | | /CLEAR THE AC & ROTATE THE CARRY BACK THE SAME # OF |
| 062 | | | | /TIMES. |
| 063 | | | | |
| 064 | 2225 | 367 | ONLY10, | TCC /SAVE THE CARRY BIT |
| 065 | 2226 | 266 | | XCH R6 |
| 066 | 2227 | 244 | | LD R4 /4-R4=BIT # THAT WAS SET |
| 067 | 2230 | 364 | | CMA |
| 068 | 2231 | 362 | | IAC |
| 069 | 2232 | 264 | | XCH R4 |
| 070 | 2233 | 266 | | XCH R6 /BRING BACK THE CARRY |
| 071 | 2234 | 366 | | RAR |
| 072 | 2235 | 366 | ONLY11, | RAR |
| 073 | 2236 | 164 | | ISZ ONLY11,R4 |
| | 2237 | 235 | | |
| 074 | 2240 | 043 | | SRC R2 |
| 075 | 2241 | 340 | | WRM |
| 076 | 2242 | 300 | | BBL 0 |

| | | | | |
|---|---|---|---|---|
| 001 | | | | /LOAD RAM & ROM PORTS WITH 16 BITS FROM DISPLAY IMAGE. |
| 002 | 2243 | 260 | LDPAN, | XCH R0 /SAVE PANEL ADDRESS |
| 003 | 2244 | 124 | | JMS LDRAM /LOAD RAM PORT |
| | 2245 | 320 | | |
| 004 | 2246 | 050 | | FIM OPRT10,R10 |
| | 2247 | 200 | | |
| 005 | 2250 | 124 | | JMS LDROM /LOAD ROM PORT |
| | 2251 | 326 | | |
| 006 | 2252 | 124 | | JMS LDRAM |
| | 2253 | 320 | | |
| 007 | 2254 | 050 | | FIM OPRT11,R10 |
| | 2255 | 220 | | |
| 008 | 2256 | 124 | | JMS LDROM |
| | 2257 | 326 | | |
| 009 | 2260 | 043 | | SRC R2 |
| 010 | 2261 | 240 | | LD R0 /SEND ADDRESS TO PANEL |
| 011 | 2262 | 342 | | WRR |
| 012 | | | | |
| 013 | | | | /LOAD CONTROL REGISTER TO GET INPUTS |
| 014 | | | | |
| 015 | 2263 | 240 | LDCON, | LD R0 |
| 016 | 2264 | 365 | | RAL |
| 017 | 2265 | 372 | | STC |
| 018 | 2266 | 366 | | RAR |
| 019 | 2267 | 043 | | SRC R2 |
| 020 | 2270 | 342 | | WRR |
| 021 | 2271 | 044 | | FIM IPRT10,R4 /LOW ORDER DATA INPUT |
| | 2272 | 200 | | |
| 022 | 2273 | 124 | | JMS READPN |
| | 2274 | 312 | | |
| 023 | 2275 | 044 | | FIM IPRT11,R4 |
| | 2276 | 220 | | |
| 024 | 2277 | 124 | | JMS READPN |
| | 2300 | 312 | | |
| 025 | 2301 | 044 | | FIM IPRT12,R4 |
| | 2302 | 240 | | |
| 026 | 2303 | 124 | | JMS READPN |
| | 2304 | 312 | | |
| 027 | 2305 | 044 | | FIM IPRT13,R4 |
| | 2306 | 260 | | |
| 028 | 2307 | 124 | | JMS READPN |
| | 2310 | 312 | | |
| 029 | 2311 | 300 | | BBL 0 |
| 030 | | | | |
| 031 | 2312 | 045 | READPN, | SRC R4 |
| 032 | 2313 | 352 | | RDR /READ ROM PORT |
| 033 | 2314 | 053 | | SRC R12 |
| 034 | 2315 | 340 | | WRM /PUT NEW DATA IN IMAGE |

```
035 2316 153                INC R13
036 2317 300                BBL 0
037
038            /LOAD RAM 1 PORT WITH DATA FROM R16-17
039
040 2320 057   LDRAM,  SRC R16
041 2321 351           RDM          /READ DATA
042 2322 047           SRC R6
043 2323 341           WMP          /DATA TO PORT
044 2324 157           INC R17      /STEP DATA ADDRESS
045 2325 300           BBL 0
046
047            /LOAD ROM PORT SELECTED BY R10-11 WITH DATA FROM R16-17
048
049 2326 057   LDROM,  SRC R16
050 2327 351           RDM          /READ DISPLAY IMAGE
051 2330 051           SRC R10
052 2331 342           WRR          /WRITE ROM PORT
053 2332 157           INC R17      /STEP IMAGE POINTER
054 2333 300           BBL 0
055
056            PAUSE
```

```
001        000     PROME=PROMD+400
002
003        2400    *PROME
004
005                /BCD CONSTANTS:   ADDRESS POINTS TO THE TWO LSN'S
006
007 2400 000               0
008 2401 000       A000,   0
009 2402 000               0
010 2403 001       A001,   1
011 2404 000               0
012 2405 002       A002,   2
013 2406 000               0
014 2407 003       A003,   3
015 2410 000               0
016 2411 005       A005,   5
017 2412 000               0
018 2413 006       A006,   6
019 2414 000               0
020 2415 007       A007,   7
021 2416 000               0
022 2417 010       A008,   10
023 2420 000               0
024 2421 026       A016,   1!20 6
025 2422 001               1
026 2423 007       A107,   7
027 2424 001               1
028 2425 020       A110,   1!20 0
029 2426 001               1
030 2427 021       A111,   1!20 1
031 2430 001               1
032 2431 062       A132,   3!20 2
033 2432 001               1
034 2433 121       A151,   5!20 1
035 2434 001               1
036 2435 162       A172,   7!20 2
037 2436 002               2
038 2437 001       A201,   1
039 2440 002               2
040 2441 042       A222,   2!20 2
041 2442 002               2
042 2443 126       A256,   5!20 6
043 2444 002               2
044 2445 142       A262,   6!20 2
045 2446 002               2
046 2447 143       A263,   6!20 3
047 2450 002               2
```

```
048 2451 144    A264,   6!20 4
049 2452 002            2
050 2453 160    A270,   7!20 0
051 2454 003            3
052 2455 000    A300,   0
053 2456 003            3
054 2457 001    A301,   1
055 2460 003            3
056 2461 027    A317,   1!20 7
057 2462 003            3
058 2463 141    A361,   6!20 1
059 2464 003            3
060 2465 203    A383,   10!20 3
061 2466 003            3
062 2467 204    A384,   10!20 4
063 2470 004            4
064 2471 000    A400,   0
065 2472 004            4
066 2473 005    A405,   5
067 2474 004            4
068 2475 061    A431,   3!20 1
069 2476 005            5
070 2477 121    A551,   5!20 1
071 2500 005            5
072 2501 127    A557,   5!20 7
073 2502 006            6
074 2503 001    A601,   1
075 2504 006            6
076 2505 002    A602,   2
077 2506 006            6
078 2507 003    A603,   3
079 2510 007            7
080 2511 001    A701,   1
081 2512 010            10
082 2513 051    A829,   2!20 11
083 2514 011            11
084 2515 001    A901,   1
085 2516 011            11
086 2517 027    A917,   1!20 7

001             /ROUTINE GETS CONSTANT FROM RAM AND STORES SAME
002             /IN SPECIFIED ADDRESS.
003             /ENTER WITH R0-1 CONTAINING RELATIVE ADDRESS OF DATA TO
004             /PICK UP (POINTS TO THE 2 LSN'S).
005             /R2-3 POINT TO THE STORAGE (LSN STORED FIRST).
006             /FIN RX: FETCH INDIRECT FROM R0-1 => RX
007
008
009 2520 336   GET4,   LDM 16
010 2521 266           XCH R6
011 2522 064   GET4B,  FIN R4   /GET ROM DATA
012 2523 043           SRC R2
013 2524 245           LD R5
014 2525 340           WRM      /STORE LSN
015 2526 143           INC R3
016 2527 244           LD R4
017 2530 043           SRC R2
018 2531 340           WRM      /STORE LSN+1
019 2532 143           INC R3
020 2533 166           ISZ GETDT,R6   /4 CHARACTERS STORED?
    2534 136
021 2535 300           BBL 0    /YES
022 2536 337   GETDT,  LDM 17   /NO; SUBTRACT 1 FROM ROM
023 2537 361           CLC
024 2540 201           ADD R1   /ADDRESS & GO AGAIN
025 2541 261           XCH R1
026 2542 105           JUN GET4B
    2543 122
027 2544 042   CON,    FIM ROR2 14,R2   /STORE CONSTANT IN ROR2C14-17
    2545 054
028 2546 105           JUN GET4
    2547 120
```

```
001             /FINAL SOLUTION EXCEPT FOR ADDITION & CHECKING
002             /OF REMAINDER
003
004  2550 054   SOLUTN, FIM ROR1 14,R14
     2551 034
005  2552 056           FIM ROR1 4,R16
     2553 024
006  2554 052           FIM ROR2 0,R12
     2555 040
007  2556 136           JMS SUBBCD
     2557 313
008  2560 054           FIM ROR1 0,R14
     2561 040
009  2562 056           FIM ROR1 10,R16
     2563 030
010  2564 052           FIM ROR1 0,R12
     2565 020
011  2566 136           JMS DIVIDE
     2567 101
012  2570 054           FIM ROR1 4,R14
     2571 024
013  2572 056           FIM ROR2 10,R16
     2573 050
014  2574 052           FIM ROR2 0,R12
     2575 040
015  2576 136           JMS MLTPLY
     2577 000
016  2600 054           FIM ROR2 0,R14
     2601 040
017  2602 056           FIM ROR2 14,R16
     2603 054
018  2604 052           FIM ROR2 14,R12
     2605 054
019  2606 136           JMS ADDBCD
     2607 335
020  2610 300           BBL 0
021
022             /CHCK LIMIT: CARRY IS SET IF BCD >= CONSTANT
023
024  2611 042   CHKLMT, FIM ROR2 0,R2
     2612 040
025  2613 125           JMS GET4
     2614 120
026  2615 054           FIM ROR1 14,R14 /LINE # ADDRESS (SCRATCH PAD)
     2616 034
027  2617 056           FIM ROR2 0,R16 /CONSTANT
     2620 040
028  2621 052           FIM ROR2 0,R12
     2622 040
029  2623 136           JMS SUBBCD
     2624 313
030  2625 300           BBL 0
031
032             /GET & STORE CONSTANT INITIALLY SUBTRACTED FROM BCD
033             /
034  2626 042   PUTSUB, FIM ROR1 4,R2
     2627 024
035  2630 125           JMS GET4
     2631 120
036  2632 300           BBL 0
037
038             /GET & STORE DENOMINATOR
039
040  2633 042   PUTDEN, FIM ROR1 10,R2
     2634 030
041  2635 125           JMS GET4
     2636 120
042  2637 300           BBL 0
043
044             /GET & STORE NUMERATOR
045
046  2640 042   PUTNUM, FIM ROR2 10,R2
     2641 050
047  2642 125           JMS GET4
     2643 120
```

```
048 2644 300             BBL 0
049
050              /GET & STORE FINAL CONSTANT
051
052 2645 042     PUTCON, FIM ROR2 14;R2
    2646 054
053 2647 125             JMS GET4
    2650 120
054 2651 300             BBL 0
055
056              /ADD REMAINDER TO FINAL ANSWER
057
058 2652 054     ADDREM, FIM ROR2 14;R14  /ANSWER
    2653 054
059 2654 056             FIM ROR1 0;R16   /REMAINDER
    2655 020
060 2656 052             FIM ROR2 14;R12
    2657 054
061 2660 136             JMS ADDBCD
    2661 335
062 2662 300     BBLRET, BBL 0
063
064 2663 054     SUBTCT, FIM ROR1 14;R14
    2664 034
065 2665 056             FIM ROR1 4;R16
    2666 024
066 2667 052             FIM ROR2 4;R12
    2670 044
067 2671 136             JMS SUBBCD
    2672 313
068 2673 300             BBL 0
069
070              /MOVE 3 NIBBLES FROM R14-15 TO R12-13
071
072 2674 335     MOVE3,  LDM 15
073 2675 260     MOVE3A, XCH R0
074 2676 055     MOVE3B, SRC R14
075 2677 351             RDM
076 2700 053             SRC R12
077 2701 340             WRM
078 2702 155             INC R15
079 2703 153             INC R13
080 2704 160             ISZ MOVE3B;R0
    2705 276
081 2706 300             BBL 0
082 2707 334     MOVE4,  LDM 14
083 2710 105             JUN MOVE3A
    2711 275
084              EJECT
085
086              /SUBROUTINES TO SET OR CLEAR BITS 3,2,1, OR 0 OF THE
087              /CONTENTS OF THE AC LEAVING THE OTHERS UNCHANGED
088
089 2712 262     SET3,   XCH R2   /SET 3
090 2713 337             LDM 17
091 2714 105             JUN SET0A
    2715 344
092 2716 262     SET2,   XCH R2   /SET 2
093 2717 336             LDM 16
094 2720 105             JUN SET0A
    2721 344
095 2722 262     SET1,   XCH R2   /SET 1
096 2723 335             LDM 15
097 2724 105             JUN SET0A
    2725 344
098 2726 262     CLR3,   XCH R2   /CLEAR 3
099 2727 337             LDM 17
100 2730 105             JUN CLR0A
    2731 372
101 2732 262     CLR2,   XCH R2   /CLEAR 2
102 2733 336             LDM 16
103 2734 105             JUN CLR0A
    2735 372
104 2736 262     CLR1,   XCH R2   /CLEAR 1
105 2737 335             LDM 15
106 2740 105             JUN CLR0A
    2741 372
```

```
107
108  2742 262    SET0,   XCH R2    /SAVE AC: CLEAR 0
109  2743 334            LDM 14
110  2744 260    SET0A,  XCH R0
111  2745 337            LDM 17
112  2746 263    SETBT,  XCH R3    /SET THE SET/CLEAR SWITCH
113  2747 240            LD R0
114  2750 261            XCH R1
115  2751 262            XCH R2    /BRING BACK THE AC
116  2752 365    SET0B,  RAL       /ROTATE THE CHOSEN BIT TO CARRY
117  2753 161            ISZ SET0B,R1
     2754 352
118  2755 163            ISZ SET0C,R3
     2756 362
119  2757 372            STC
120  2760 105            JUN SET0D
     2761 363
121  2762 361    SET0C,  CLC
122  2763 366    SET0D,  RAR       /MOVE THE CARRY BACK TO ITS WORD
123  2764 160            ISZ SET0D,R0  /POSITION.
     2765 363
124  2766 260            XCH R0
125  2767 300            BBL 0
126  2770 262    CLR0,   XCH R2
127  2771 334            LDM 14        /# OF ROTATES = 14 - AC
128  2772 260    CLR0A,  XCH R0
129  2773 320            LDM 0     /SET THE SET/CLEAR SWITCH
130  2774 105            JUN SETBT
     2775 346

001         000    PROMF=PROME+400
002
003   3000         *PROMF
004
005                /RETURN POINTERS (STATUS CHAR. 1)
006                / 0 : LINE #BCD -> BINARY
007                / 1 : REF. #BCD -> BINARY
008                / 2 : REF. # BINARY -> BCD
009                /ENTRY FOR LINE#BCD -> BINARY
010
011   3000 040    BCDLIN, FIM ERRIN1,R0  /CLEAR LINE # INVALID FLAG
      3001 120
012   3002 041            SRC R0
013   3003 355            RD1
014   3004 125            JMS CLR3
      3005 326
015   3006 260            XCH R0
016   3007 345            WR1
017   3010 320            LDM 0          /SET RETURN SWITCH
018   3011 040    BCDLNI, FIM ROR2 0,R0
      3012 040
019   3013 041            SRC R0
020   3014 345            WR1            /RETURN SWITCH
021   3015 320            LDM 0          /CLEAR LINE/REF TYPE
022   3016 347            WR3            /(ALSO USED AS ILLEG. LINE TYPE)
023   3017 106            JUN BCDRAM
      3020 034
024
025                /ENTRY FOR REF. #BCD -> BINARY
026   3021 040    BCDREF, FIM ERRIN1,R0  /CLEAR INVALID FLAG
      3022 120
027   3023 041            SRC R0
028   3024 355            RD1
029   3025 125            JMS CLR2
      3026 332
030   3027 260            XCH R0
031   3030 345            WR1
032   3031 321            LDM 1          /SET RETURN SWITCH
033   3032 106            JUN BCDLNI
      3033 011
034
035                EJECT
```

```
036         /LINE/REFERENCE NUMBER VALIDITY CHECK AND CONVERSION TO
037         /RAM ADDRESS WHEN VALID.
038         /ENTER WITH R14-15 POINTING TO LSN OF 3 BCD DIGIT
039         /STRING. AC CONTAINS NUMBER POINTING TO LINE # (0),
040         /A-NODE (1), ETC.
041         /LOOK AT 2 LSN'S FOR BOTH ZERO. IF BOTH ZERO: EXIT
042         /INVALID SET. OTHERWISE GO THROUGH HORRENDOUS CHECKING
043         /PROCEDURE.
044         /SCO HOLDS LINE # REF # POINTER.
045         /BRING IN BCD: STORE IN ROR1C14-16, R14-15 IS POINTING
046         /TO THE LSN OF THE BCD IN THE MAINLINE.
047
048  3034 052   BCDRAM, FIM ROR1 14,R12
     3035 034
049  3036 125           JMS MOVE4
     3037 307
050         /GET MSN OF BCD; CHECK NIBBLE PER TABLE BELOW.
051         /IF NIBBLE=1 DO NOT FLUSH STORAGE (REDUCING
052         /TO 2 NIBBLES).
053         /
054  3040 040           FIM ROR1 16,R0   /CHECK LEADING DIGIT FOR ZERO
     3041 036
055  3042 041           SRC R0
056  3043 351           RDM
057  3044 034           JCN AAA, NOT ZERO
     3045 052
058         /MSN:
059         /   1   : RELAY (1-106)(111-131)(151-171)
060         /   2   : COUNTER (201-221)
061         /   3   : INPUT (301-360)
062         / 4&5   : LATCHES (405,410,...430)(551-556)
063         /   6   : TICK & WDT (601,602)
064         / 7&8   : SEQUENCE STATES (701-828)
065         /   9   : COMPUTER INPUTS (901-916)
066
067  3046 126           JMS LSN0         /CHECK 2 LSN'S FOR BOTH ZERO.
     3047 315
068  3050 034           JCN VALERR, NOT ZERO
     3051 266
069  3052 040   AAA,    FIM A008,R0      /PRESET NUMERATOR TO 8
     3053 017
070  3054 125           JMS PUTNUM       /PRESET DENOMINATOR TO 1
     3055 240
071  3056 040           FIM A001,R0      /PRESET CONSTANT TO ZERO
     3057 003
072  3060 125           JMS PUTDEN
     3061 233
073  3062 040           FIM A000,R0
     3063 001
074  3064 125           JMS PUTCON
     3065 245
075  3066 040           FIM ROR1 16,R0   /GET MSN OF BCD
     3067 036
076  3070 041           SRC R0
077  3071 351           RDM
078  3072 024           JCN RELAY, ZERO  /MSN=0? YES ON JUMP
     3073 077
079  3074 370           DAC              /MSN=1?
080  3075 034           JCN CHK2, NOT ZERO         /YES ON FALL-THROUGH
     3076 346
081

001         /RELAYS
002
003
004  3077 040   RELAY,  FIM A107,R0
     3100 023
005  3101 125           JMS CHKLMT       /BCD<107?
     3102 211
006  3103 032           JCN RELGRP, NOT CARRY   /YES ON JUMP
     3104 224
```

```
007  3105 040           FIM A111;R0
     3106 027
008  3107 125           JMS CHKLMT      /BCD<111?
     3110 211
009  3111 032           JCN VALERR;NOT CARRY    /YES ON JUMP
     3112 266
010  3113 040           FIM A132;R0
     3114 031
011  3115 125           JMS CHKLMT      /BCD<132?
     3116 211
012  3117 032           JCN AUXREL;NOT CARRY    /YES ON JUMP
     3120 332
013  3121 040           FIM A151;R0
     3122 033
014  3123 125           JMS CHKLMT      /BCD<151?
     3124 211
015  3125 032           JCN VALERR;NOT CARRY    /YES ON JUMP
     3126 266
016  3127 040           FIM A172;R0
     3130 035
017  3131 125           JMS CHKLMT      /BCD<172?
     3132 211
018  3133 022           JCN VALERR;CARRY        /NO ON JUMP
     3134 266
019
020
021                    /LATCH GROUP RELAYS
022
023  3135 040           FIM A151;R0
     3136 033
024  3137 324           LDM 4   /SET LINE TYPE
025  3140 347           WR3
026  3141 125           JMS PUTSUB
     3142 226
027  3143 040           FIM A006;R0
     3144 013
028  3145 125           JMS PUTCON
     3146 245
029  3147 125           JMS SOLUTN
     3150 150
030
031
032                    /SEND FINAL ANSWER BACK TO MAINLINE
033
034  3151 054   INBAK;  FIM ROR2 14;R14 /BCD=>BINARY
     3152 054
035  3153 355           RD1             /JUMP BACK SWITCH
036  3154 034           JCN BACK1;NOT ZERO
     3155 216
037  3156 052           FIM BINLIN;R12
     3157 060
038  3160 136           JMS BCDBIN
     3161 355
039  3162 040           FIM A006;R0     /GET PROM ADDRESS
     3163 013
040  3164 125           JMS PUTDEN      /=6*RAM ADDRESS
     3165 233
041  3166 054           FIM ROR2 14;R14 /CALCULATE PROM ADDRESS
     3167 054
042  3170 054           FIM ROR1 10;R14
     3171 030
043  3172 052           FIM ROR1 0;R12
     3173 020
044  3174 136           JMS MLTPLY
     3175 000
045  3176 054           FIM ROR1 0;R14
     3177 020
046  3200 052           FIM PROMAD;R12
     3201 064
047  3202 136           JMS BCDBIN
     3203 355
048  3204 040           FIM ROR2 0;R0   /SEND BACK LINE TYPE
     3205 040
049  3206 041           SRC R0
050  3207 357           RD3
```

```
051  3210 040           FIM LNTYPE;R0
     3211 063
052  3212 041           SRC R0
053  3213 340           WRM
054  3214 102           JUN LINBCD
     3215 266
055
056                  / 0 : LINE # BCD -> BINARY
057                  / 1 : REF # BCD -> BINARY
058
059  3216 052   BACK1,   FIM BINREF;R12
     3217 067
060  3220 136           JMS BCDBIN
     3221 355
061  3222 103           JUN REFBCD
     3223 211
062
063                  /MAIN GROUP RELAYS
064
065  3224 040   RELGRP,  FIM A000;R0
     3225 001
066  3226 321           LDM 1
067  3227 347           WR3                /SET LINE TYPE
068  3230 125           JMS PUTSUB
     3231 226
069  3232 040           FIM A005;R0
     3233 011
070  3234 125           JMS PUTDEN
     3235 233
071  3236 125           JMS SOLUTN
     3237 150
072  3240 125           JMS ADDREM
     3241 252
073                  /CHECK REMAINDER FOR 0.  IF 0, SUBTRACT 3 FROM
074                  /FINAL ANSWER.
075
076  3242 054           FIM ROR1 0;R14
     3243 020
077  3244 055           SRC R14
078  3245 351           RDM
079  3246 034           JCN BINBAK;NOT ZERO
     3247 151
080  3250 040           FIM A003;R0
     3251 007
081  3252 125           JMS PUTNUM
     3253 240
082  3254 054           FIM ROR2 14;R14
     3255 054
083  3256 056           FIM ROR2 10;R16
     3257 050
084  3260 052           FIM ROR2 14;R12
     3261 054
085  3262 136           JMS SUBBCD
     3263 313
086  3264 106           JUN BINBAK
     3265 151
087
088                  /VALIDATION ERROR RETURN : SETS ERROR FLAGS
089
090  3266 040   VALERR,  FIM ROR2 0;R0
     3267 040
091  3270 042           FIM ERRIN1;R2
     3271 120
092  3272 041           SRC R0
093  3273 355           RD1
094  3274 043           SRC R2
095  3275 024           JCN VALE10;ZERO  /LINE # BCD TO BIN ON JUMP
     3276 306
096  3277 355           RDERR1
097  3300 125           JMS SET2
     3301 316
098  3302 260           XCH R0
099  3303 345           WRERR1
100  3304 103           JUN REFBCD       /REF. # BCD TO BIN RETURN
     3305 211
101
```

```
102 3306 355    VALE10, RDERR1
103 3307 125            JMS SET3
    3310 312
104 3311 260            XCH R0
105 3312 345            WRERR1
106 3313 102            JUN LINBCD      /LINE # TO BCD RETURN
    3314 266
107
108                     /CHECK 2 LSN'S FOR BOTH ZERO
109
110 3315 040    LSN0,   FIM R0R1 14;R0
    3316 034
111 3317 041            SRC R0
112 3320 351            RDM
113 3321 034            JCN LSNA;NOT ZERO
    3322 330
114 3323 141            INC R1
115 3324 041            SRC R0
116 3325 351            RDM
117 3326 024            JCN LSNB;ZERO   /BOTH ZERO ON JUMP
    3327 331
118 3330 300    LSNA,   BBL 0
119 3331 317    LSNB,   BBL 17
120
121                     /AUXILIARY GROUP RELAYS
122
123 3332 040    AUXREL, FIM A110;R0
    3333 025
124 3334 322            LDM 2           /SET LINE TYPE
125 3335 347            WR3
126 3336 125            JMS PUTSUB
    3337 226
127 3340 125            JMS SOLUTN
    3341 150
128 3342 106            JUN BINBAK
    3343 151
129                     EJECT
130 3344 107    ACHK3,  JUN CHK3
    3345 000
131 3346 042    CHK2,   FIM R0R2 0;R2   /MSN=2?
    3347 040
132 3350 043            SRC R2
133 3351 034            JCN ACHK3;NOT ZERO  /YES ON FALL-THROUGH
    3352 344
134 3353 040            FIM A222;R0
    3354 041
135 3355 125            JMS CHKLMT      /BCD>221?
    3356 211
136 3357 022            JCN VALERR;CARRY    /YES ON JUMP
    3360 266

001                     /COUNTERS
002
003 3361 126            JMS LSN0        /CHECK FOR 2 LSN'S = 0.
    3362 315
004 3363 034            JCN VALERR;NOT ZERO
    3364 266
005 3365 040            FIM A201;R0
    3366 037
006 3367 324            LDM 4           /SET LINE TYPE
007 3370 347            WR3
008 3371 125            JMS PUTSUB
    3372 226
009 3373 040            FIM A007;R0
    3374 015
010 3375 125            JMS PUTCON
    3376 245
011 3377 125            JMS SOLUTN
    3400 150
012 3401 106            JUN BINBAK
    3402 151
013
014                     EJECT
```

```
015    000          PROMG=PROMF+400
016
017    3400         *PROMG
018 3400 370   CHK3,   DAC           /MSN=3?
019 3401 034           JCN CHK4;NOT ZERO    /YES ON FALL-THROUGH
    3402 062
020 3403 040           FIM A361;R0
    3404 063
021 3405 125           JMS CHKLMT    /BCD>360?
    3406 211
022 3407 022           JCN VALER1;CARRY  /YES ON JUMP
    3410 140
023

001                   /INPUTS
002
003 3411 126           JMS LSN0      /CHECK FOR 2 LSN'S = 0.
    3412 315
004 3413 034           JCN VALER1;NOT ZERO
    3414 140
005 3415 040           FIM A300;R0
    3416 055
006 3417 330           LDM 10  /SET LINE TYPE
007 3420 347           WR3
008 3421 125           JMS PUTSUB
    3422 226
009 3423 040           FIM A005;R0
    3424 011
010 3425 125           JMS PUTDEN
    3426 233
011 3427 040           FIM A256;R0
    3430 043
012 3431 125           JMS PUTCON
    3432 245
013 3433 125           JMS SOLUTN
    3434 150
014 3435 125           JMS ADDREM
    3436 252
015                   /CHECK REMAINDER FOR 0.  IF 0, SUBTRACT 3 FROM
016                   /FINAL ANSWER
017
018 3437 054           FIM ROR1 0;R14
    3440 020
019 3441 351           RDM
020 3442 034           JCN CHK3D;NOT ZERO
    3443 060
021 3444 040           FIM A003;R0
    3445 007
022 3446 125           JMS PUTNUM
    3447 240
023 3450 054           FIM ROR2 14;R14
    3451 054
024 3452 056           FIM ROR2 10;R16
    3453 050
025 3454 052           FIM ROR2 14;R12
    3455 054
026 3456 136           JMS SUBBCD
    3457 313
027 3460 106   CHK3D,  JUN BINBAR
    3461 151
028 3462 370   CHK4,   DAC           /MSN=4?
029 3463 034           JCN CHK5A;NOT ZERO   /YES ON FALL-THROUGH
    3464 136
030 3465 126           JMS LSN0      /CHECK FOR 2 LSN'S = 0.
    3466 315
031 3467 034           JCN VALER1;NOT ZERO
    3470 140
032 3471 040           FIM A431;R0
    3472 075
033 3473 125           JMS CHKLMT    /BCD>430?
    3474 211
034 3475 022           JCN VALER1;CARRY     /YES ON JUMP
    3476 140
035
```

```
001                 /LATCHES 405,410,...430
002
003 3477 040        FIM A400,R0
    3500 071
004 3501 125        JMS PUTSUB
    3502 226
005 3503 040        FIM A005,R0
    3504 011
006 3505 125        JMS PUTDEN
    3506 233
007 3507 040        FIM A016,R0
    3510 021
008 3511 125        JMS PUTNUM
    3512 240
009 3513 040        FIM A262,R0
    3514 045
010 3515 125        JMS PUTCON
    3516 245
011 3517 125        JMS SOLUTN
    3520 150
012 3521 040        FIM ROR1 0,R0  /CHECK FOR 0 IN REMAINDER
    3522 020
013 3523 041        SRC R0
014 3524 351        RDM
015 3525 034        JCN VALER1,NOT ZERO
    3526 140
016 3527 040        FIM ROR2 0,R0
    3530 040
017 3531 041        SRC R0
018 3532 331        LDM 11         /SET LINE TYPE
019 3533 347        WR3
020 3534 106        JUN BINBAK
    3535 151
021 3536 107  CHK5A, JUN CHK5
    3537 142
022 3540 106  VALER1, JUN VALERR   /PAGE ERROR RETURNS
    3541 266
023
024                 EJECT
025
026 3542 370  CHK5, DAC            /MSN=5?
027 3543 034        JCN CHK6,NOT ZERO    /YES ON FALL THROUGH
    3544 203
028 3545 040        FIM A551,R0
    3546 077
029 3547 125        JMS CHKLMT     /BCD<551?
    3550 211
030 3551 032        JCN VALER1,NOT CARRY   /YES ON JUMP
    3552 140
031 3553 040        FIM A557,R0
    3554 101
032 3555 125        JMS CHKLMT     /BCD>556?
    3556 211
033 3557 022        JCN VALER1,CARRY   /YES ON JUMP
    3560 140
034
```

```
001                 /LATCHES 551-556
002 3561 040        FIM A551,R0
    3562 077
003 3563 331        LDM 11 /SET LINE TYPE
004 3564 347        WR3
005 3565 125        JMS PUTSUB
    3566 226
006 3567 040        FIM A016,R0
    3570 021
007 3571 125        JMS PUTNUM
    3572 240
008 3573 040        FIM A270,R0
    3574 053
009 3575 125        JMS PUTCON
    3576 245
```

```
010  3577 125            JMS SOLUTN
     3600 150
011  3601 106            JUN BINBAK
     3602 151
012  3603 370    CHK6,   DAC         /MSN=6?
013  3604 034            JCN CHK7;NOT ZERO        /YES ON FALL-THROUGH
     3605 244
014  3606 126            JMS LSN0    /CHECK FOR 2 LSN'S = 0.
     3607 315
015  3610 034            JCN VALER1;NOT ZERO
     3611 140
016  3612 040            FIM A602;R0
     3613 105
017  3614 125            JMS CHKLMT  /BCD=601? (TICK)
     3615 211
018  3616 022            JCN CHK6D;CARRY          /YES ON FALL THROUGH
     3617 230
019  3620 040            FIM A264;R0
     3621 051
020  3622 327            LDM 7       /SET LINE TYPE
021  3623 347            WR3
022  3624 125    CHK6C,  JMS CON
     3625 144
023  3626 106            JUN BINBAK
     3627 151
024
025  3630 040    CHK6D,  FIM A603;R0
     3631 107
026  3632 125            JMS CHKLMT  /BCD=602? (WDT)
     3633 211
027  3634 022            JCN VALER1;CARRY         /YES ON FALL-THROUGH
     3635 140
028  3636 040            FIM A256;R0
     3637 043
029  3640 326            LDM 6       /SET LINE TYPE
030  3641 347            WR3
031  3642 107            JUN CHK6C
     3643 224
032  3644 370    CHK7,   DAC         /MSN=7?
033  3645 034            JCN CHK8;NOT ZERO        /YES ON FALL THROUGH
     3646 275
034
035          EJECT
036          /SEQUENCER - ALL 7XX ARE LEGAL
037
038  3647 126    CHK7A,  JMS LSN0    /CHECK FOR 2 LSN'S = 0
     3650 315
039  3651 034            JCN VALER1;NOT ZERO
     3652 140
040  3653 040            FIM A701;R0
     3654 111
041  3655 325            LDM 5       /SET LINE TYPE
042  3656 347            WR3
043  3657 125            JMS PUTSUB
     3660 226
044  3661 040            FIM A001;R0
     3662 003
045  3663 125            JMS PUTNUM
     3664 240
046  3665 040            FIM A383;R0
     3666 065
047  3667 125            JMS PUTCON
     3670 245
048  3671 125            JMS SOLUTN
     3672 150
049  3673 106            JUN BINBAK
     3674 151
050  3675 370    CHK8,   DAC         /MSN=8?
051  3676 034            JCN CHK9;NOT ZERO        /YES ON FALL THROUGH
     3677 310
052  3700 040            FIM A829;R0
     3701 113
053  3702 125            JMS CHKLMT  /BCD=828?
     3703 211
054  3704 032            JCN CHK7A;NOT CARRY      /YES ON FALL-THROUGH
     3705 247
```

```
055  3706 107            JUN VALER1      /ERROR RETURN
     3707 140
056  3710 370    CHK9,   DAC     /MSN=9?
057  3711 034            JCN VALER1;NOT ZERO    /YES ON FALL-THROUGH
     3712 140
058  3713 126            JMS LSN0        /CHECK FOR 2 LSN'S = 0
     3714 315
059  3715 034            JCN VALER1;NOT ZERO
     3716 140
060  3717 040            FIM A917;R0
     3720 117
061  3721 125            JMS CHKLMT      /BCD>916?
     3722 211
062  3723 022            JCN VALER1;CARRY      /YES ON JUMP
     3724 140
063
064                     EJECT
065                     /COMPUTER INPUTS
066
067  3725 040            FIM A901;R0
     3726 115
068  3727 332            LDM 12   /SET LINE TYPE
069  3730 347            WR3
070  3731 125            JMS PUTSUB
     3732 226
071  3733 040            FIM A263;R0
     3734 047
072  3735 125            JMS PUTCON
     3736 245
073  3737 125            JMS SOLUTN
     3740 150
074  3741 106            JUN BINBAR
     3742 151
075                     PAUSE 001      000            PROMH=PROMG+400
002      4000           *PROMH
003
004                     /RAM ADDRESS=> CUSTOMER BCD
005                     /R14-15 POINTS TO THE BINARY #
006                     /MOVE BINARY TO ROR1C14-16
007
008  4000 052    BNREF,  FIM ROR2 10;R12 /BRING IN BINARY #
     4001 050
009  4002 125            JMS MOVE3
     4003 274
010  4004 052            FIM ROR1 14;R12 /CONVERT BINARY TO 4 DIGIT BCD
     4005 034
011  4006 054            FIM ROR2 10;R14
     4007 050
012  4010 137            JMS BINBCD
     4011 137
013  4012 040            FIM A256;R0     /CHECK FOR GROUP1: RELAYS & COUNTERS
     4013 043
014  4014 125            JMS PUTSUB
     4015 226
015  4016 125            JMS SUBTCT      /BCD -256 IN ROR2C4-7
     4017 263
016  4020 022            JCN GROUP2;CARRY /RELAYS & COUNTERS ON
     4021 136
017                                     /FALL-THROUGH
018  4022 040            FIM A008;R0
     4023 017
019  4024 125            JMS PUTDEN
     4025 233
020  4026 054            FIM ROR2 4;R14
     4027 044
021  4030 056            FIM ROR1 10;R16
     4031 030
022  4032 052            FIM ROR1 0;R12
     4033 020
```

```
023  4034 136              JMS DIVIDE
     4035 101
024
025                /GET REMAINDER AND RUN THRU TABLE LISTED BELOW
026
027                /R=0    AUXILIARY GROUP RELAYS
028                /R=1-5  /MAIN GROUP RELAYS
029                /R=6    /LATCH GROUP RELAYS
030                /R=7    COUNTERS
031
032  4036 040              FIM A000;R0      /PUT 0 IN CONSTANT
     4037 001
033  4040 125              JMS PUTSUB       /SUBTRACTED FROM BCD
     4041 226
034  4042 040              FIM A001;R0      /PRESET NUM & DENOM TO 1
     4043 003
035  4044 125              JMS PUTDEN
     4045 233
036  4046 040              FIM A001;R0
     4047 003
037  4050 125              JMS PUTNUM
     4051 240
038  4052 040              FIM R0R1 0;R0
     4053 020
039  4054 041              SRC R0
040  4055 351              RDM              /R=0? (AUXILIARY GROUPS)
041  4056 034              JCN CHK1A; NOT ZERO     /YES ON FALL-THRU
     4057 070
042
043                /AUXILIARY GROUP
044
045  4060 040              FIM A111;R0
     4061 027
046  4062 125              JMS PUTCON
     4063 245
047  4064 125              JMS SOLUTN
     4065 150
048  4066 110              JUN BCDBAK
     4067 343
049
050  4070 332     CHK1A,   LDM 12           /R>5?
051  4071 361              CLC
052  4072 353              ADM
053  4073 024              JCN RELLAT; ZERO /R=6 ON JUMP
     4074 116
054  4075 370              DAC              /R=7?
055  4076 024              JCN RELCNT; ZERO /R=7 ON JUMP
     4077 126
056
057                /MAIN GROUP RELAYS
058
059  4100 040              FIM A005;R0
     4101 011
060  4102 125              JMS PUTNUM
     4103 240
061  4104 040              FIM A000;R0
     4105 001
062  4106 125              JMS PUTCON
     4107 245
063  4110 125              JMS SOLUTN
     4111 150
064  4112 125              JMS ADDREM
     4113 252
065  4114 110              JUN BCDBAK
     4115 343
066
067                /LATCH GROUP RELAYS
068
069  4116 040     RELLAT,  FIM A151;R0
     4117 033
070  4120 125              JMS PUTCON
     4121 245
071  4122 125              JMS SOLUTN
     4123 150
072  4124 110              JUN BCDBAK
     4125 343
```

```
073
074                 /COUNTERS
075
076  4126 040   RELCNT, FIM A201;R0
     4127 037
077  4130 125           JMS PUTCON
     4131 245
078  4132 125           JMS SOLUTN
     4133 150
079  4134 110           JUN BCDBAK
     4135 343
080                 EJECT
081                 /GROUP2 : STUFF RESIDING IN 2ND RAM OF 284 CPU
082
083  4136 040   GROUP2, FIM A005;R0      /PRESET NUM TO 5
     4137 011
084  4140 125           JMS PUTNUM
     4141 240
085  4142 040           FIM A001;R0      /PRESET DEN TO 1
     4143 003
086  4144 125           JMS PUTDEN
     4145 233
087  4146 040           FIM A384;R0      /PRESET BCD SUBTRACTED TO 0
     4147 067
088  4150 125           JMS PUTSUB
     4151 226
089. 4152 125           JMS SUBTCT
     4153 263
090  4154 022           JCN GROUP3;CARRY   /GROUP2 ON FALL-THRU
     4155 331
091  4156 040           FIM A256;R0
     4157 043
092  4160 125           JMS PUTSUB
     4161 226
093  4162 125           JMS SUBTCT
     4163 263
094  4164 040           FIM A008;R0
     4165 017
095  4166 125           JMS PUTDEN
     4167 233
096  4170 054           FIM ROR2 4;R14
     4171 044
097  4172 056           FIM ROR1 10;R16
     4173 030
098  4174 052           FIM ROR1 0;R12
     4175 020
099  4176 136           JMS DIVIDE
     4177 101
100
101                 /GET REMAINDER & RUN THRU TABLE LISTED BELOW
102                 /R=0 & Q=0        :WDT
103                 /R=0 & Q=1        /TICK
104                 /R=1-5            /INPUTS
105                 /R=6              /LATCHES
106                 /R=7              /CPU INPUTS
107
108  4200 040           FIM A000;R0
     4201 001
109  4202 125           JMS PUTSUB
     4203 226
110  4204 040           FIM ROR1 0;R0
     4205 020
111  4206 041           SRC R0
112  4207 351           RDM
113  4210 034           JCN GCHK1;NOT ZERO    /R=0 ON FALL-THRU
     4211 234
114  4212 040           FIM ROR1 4;R0  ;/GET QUOTIENT
     4213 024
115  4214 041           SRC R0
116  4215 351           RDM
117  4216 024           JCN WDT;ZERO
     4217 226
118
119                 /TICK
120
```

```
121  4220 040           FIM A601,R0
     4221 103
122  4222 125           JMS CON
     4223 144
123  4224 110           JUN BCDBAK
     4225 343
124
125                /WDT
126
127  4226 040    WDT,   FIM A602,R0
     4227 105
128  4230 125           JMS CON
     4231 144
129  4232 110           JUN BCDBAK
     4233 343
130
131  4234 332    GCHK1, LDM 12
132  4235 361           CLC
133  4236 353           ADM            /R=6 OR 7?
134  4237 024           JCN REM6,ZERO  /R=6 ON JUMP
     4240 256
135  4241 370           DAC            /R=7?
136  4242 024           JCN REM7,ZERO  /R=7 ON JUMP
     4243 315
137
138                /INPUTS
139  4244 040           FIM A301,R0
     4245 057
140  4246 125           JMS PUTCON
     4247 245
141  4250 125           JMS SOLUTN
     4251 150
142  4252 125           JMS ADDREM
     4253 252
143  4254 110           JUN BCDBAK
     4255 343
144
145                /LATCHES
146
147  4256 040    REM6,  FIM A002,R0
     4257 005
148  4260 125           JMS PUTDEN
     4261 233
149
150                /GET LSN OF QUOTIENT: DETERMINE WHETHER ODD OR EVEN
151
152  4262 040           FIM ROR1 4,R0
     4263 024
153  4264 041           SRC R0
154  4265 351           RDM
155  4266 366           RAR
156  4267 022           JCN ODD,CARRY  /ODD ON JUMP
     4270 301
157
158                /EVEN
159
160  4271 040           FIM A405,R0
     4272 073
161  4273 125           JMS PUTCON
     4274 245
162  4275 125           JMS SOLUTN
     4276 150
163  4277 110           JUN BCDBAK
     4300 343
164
165                /ODD
166
167  4301 040    ODD,   FIM A001,R0
     4302 003
168  4303 125           JMS PUTSUB
     4304 226
169  4305 040           FIM A551,R0
     4306 077
170  4307 125           JMS PUTCON
     4310 245
```

```
171 4311 125            JMS SOLUTN
    4312 150
172 4313 110            JUN BCDBAK
    4314 343
173
174                     /R=7   CPU INPUTS
175
176 4315 040    REM7,   FIM A001,R0
    4316 003
177 4317 125            JMS PUTNUM
    4320 240
178 4321 040            FIM A901,R0
    4322 115
179 4323 125            JMS PUTCON
    4324 245
180 4325 125            JMS SOLUTN
    4326 150
181 4327 110            JUN BCDBAK
    4330 343
182
183                     /GROUP 3  SEQUENCERS
184
185 4331 040    GROUP3, FIM A001,R0
    4332 003
186 4333 125            JMS PUTNUM
    4334 240
187 4335 040            FIM A317,R0      /-384+701=317
    4336 061
188 4337 125            JMS PUTCON
    4340 245
189 4341 125            JMS SOLUTN
    4342 150
190 4343 054    BCDBAK, FIM R0R2 14,R14 /MOVE BCD BACK TO DISPLAY
    4344 054
191 4345 052            FIM R1R1 10,R12
    4346 130
192 4347 125            JMS MOVE3
    4350 274
193 4351 101            JUN REFBN
    4352 231
194                     PAUSE 001      000            PROMI=PROMH+400
002
003      4000           *PROMH
004
005                     /PICK UP THE DONE, BUSY, ILLEGAL, ERROR FLAGS, &
006                     /PUT THEM IN THE DISPLAY IMAGE.
007
008 4000 040    KERENT, FIM INPUT,R0
    4001 100
009 4002 041            SRC R0
010 4003 357            DONEFG             /READ FLAGS
011 4004 040            FIM DONEDS,R0
    4005 121
012 4006 041            SRC R0
013 4007 340            WRM
014 4010 300            BBL 0
015
016 4011 054    CALADD, FIM NODLIT,R14
    4012 076
017 4013 055            SRC R14
018 4014 351            RDM
019 4015 365            RAL
020 4016 022            JCN ANFIM,CARRY
    4017 037
021 4020 365            RAL
022 4021 022            JCN BNFIM,CARRY
    4022 034
023 4023 365            RAL
024 4024 022            JCN CNFIM,CARRY
    4025 031
```

```
025  4026 054             FIM DNDATA,R14
     4027 051
026  4030 300             BBL 0
027  4031 054    CNFIM,   FIM CNDATA+2,R14
     4032 002
028  4033 300             BBL 0
029  4034 054    BNFIM,   FIM BNDATA+2,R14
     4035 045
030  4036 300             BBL 0
031  4037 054    ANFIM,   FIM ANDATA+2,R14
     4040 042
032  4041 300             BBL 0
033                       /PUT B & D NODES BACK IN THE SCREWED-UP ORDER IT IS
034                       /SUPPOSED TO BE IN. R14-15 POINT TO B1 (OR D1).
035                       /ORDER GOES FROM B1,B2,B3 TO B3,B1,B2
036
037  4042 055    B3B1B2,  SRC R14
038  4043 351             RDM              /READ CHAR 1
039  4044 261             XCH R1
040  4045 155             INC R15
041  4046 055             SRC R14
042  4047 351             RDM              /READ CHAR 2
043  4050 262             XCH R2
044  4051 155             INC R15
045  4052 055             SRC R14
046  4053 351             RDM              /READ CHAR 3
047  4054 263             XCH R3
048  4055 262             XCH R2           /STUFF 2 IN LAST SLOT
049  4056 130             JMS ADDM1
     4057 112
050  4060 261             XCH R1           /STUFF 1 IN MIDDLE SLOT
051  4061 130             JMS ADDM1
     4062 112
052  4063 263             XCH R3
053  4064 340             WRM              /STUFF 3 IN 1ST SLOT
054  4065 300             BBL 0
055
056                       /REALIGN B & D NODES TO MATCH A & C NODES
057                       /R14-15 POINT TO THE 1ST RAW DATA CHAR.
058                       /ORDER GOES FROM B3,B1,B2 TO B1,B2,B3
059
060  4066 055    B1B2B3,  SRC R14
061  4067 351             RDM              /READ CHAR 3
062  4070 263             XCH R3
063  4071 155             INC R15
064  4072 055             SRC R14
065  4073 351             RDM              /READ CHAR 1
066  4074 261             XCH R1
067  4075 155             INC R15
068  4076 055             SRC R14
069  4077 351             RDM              /READ CHAR 2
070  4100 262             XCH R2
071  4101 263             XCH R3           /STUFF CHAR 3 IN 2'S SLOT
072  4102 130             JMS ADDM1
     4103 112
073  4104 262             XCH R2           /STUFF CHAR 2 IN 1'S SLOT
074  4105 130             JMS ADDM1
     4106 112
075  4107 261             XCH R1           /STUFF CHAR 1 IN 3'S SLOT
076  4110 340             WRM
077  4111 300             BBL 0
078
079
080  4112 340    ADDM1,   WRM
081  4113 361             CLC
082  4114 337             LDM 17
083  4115 215             ADD R15
084  4116 275             XCH R15
085  4117 055             SRC R14
086  4120 300             BBL 0
087
```

```
001              SUBJOB 4 NIBX4NIB=8NIB PRODUCT
002
003     7000     *7000
004
005     000           BIGLP=0
006     001           ADDCNT=1
007     002           OVRFLW=2
008     003           CNTR=3
009              /A X B = C
010              /4 DIGIT X 4 DIGIT = 8 DIGIT MULTIPLY
011              /INITIALLY THE PRODUCT IS FLUSHED TO ZERO.
012              /THE LSD OF B IS USED AS THE COUNTER
013              /FOR ADDING A TO ITSELF LSD TIMES.  AN
014              /OVERFLOW COUNTER IS MAINTAINED AND ADDED TO
015              /THE MSD+1 NIB OF THE SUM.
016              /THE LSD SUM POINTER IS SHIFTED LEFT ONE NIB
017              /AND THE PROCESS IS REPEATED FOR THE NEXT
018              /LSD OF B.
019              /
020
021              /AXB=C  (R14,15)(R16,17)=R12,13 (8 DIGITS)
022
023
024
025  7000 330  MLTPLY, LDM 10           /FLUSH PRODUCT
026  7001 263          XCH CNTR
027  7002 320          LDM 0
028  7003 053  MLT4,   SRC R12
029  7004 340          WRM
030  7005 153          INC R13          /STEP ADDRESS
031  7006 163          ISZ MLT4,CNTR
     7007 003
032  7010 330          LDM 10           /RESTORE ADDRESS
033  7011 361          CLC
034  7012 213          ADD R13
035  7013 273          XCH R13
036  7014 334          LDM 14
037  7015 260          XCH BIGLP
038  7016 057  MLT10,  SRC R16          /GET DIGIT FROM B,
039  7017 351          RDM              /= NUMBER OF TIMES THROUGH
040  7020 364          CMA
041  7021 362          IAC
042  7022 263          XCH CNTR         /ADD LOOP BELOW
043  7023 262          XCH OVRFLW       /FLUSH OVERFLOW COUNTER
044  7024 243  MLT11,  LD CNTR
045  7025 024          JCN MLT200,ZERO  /JUMP IF NO MULTIPLY
     7026 062
046  7027 334          LDM 14           /SET 4 CHAR ADD COUNTER
047  7030 261          XCH ADDCNT
048  7031 361          CLC
049  7032 055  MLT12,  SRC R14          /GET A
050  7033 351          RDM
051  7034 053          SRC R12
052  7035 353          ADM              /+ ANSWER
053  7036 373          DAA
054  7037 340          WRM              /STORE IN ANSWER
055  7040 153          INC R13
056  7041 155          INC R15
057  7042 161          ISZ MLT12,ADDCNT /FINISHED WITH ADD?
     7043 032
058  7044 032          JCN MLT14,NOT CARRY /YES; WAS THERE AN OVERFLOW?
     7045 047
059  7046 142          INC OVRFLW       /YES; STEP OVERFLOW COUNTER
060  7047 334  MLT14,  LDM 14           /RESTORE ADD ADDRESSES
061  7050 361          CLC
062  7051 213          ADD R13
063  7052 273          XCH R13
064  7053 334          LDM 14
065  7054 361          CLC
066  7055 215          ADD R15
067  7056 275          XCH R15
068  7057 143          INC CNTR         /STEP ADD LOOP COUNTER
069  7060 116          JUN MLT11
     7061 024
070
```

```
071 7062 324    MLT200, LDM 4           /HAVE COMPLETED ONE DIGIT'S
072 7063 361            CLC
073 7064 213            ADD R13                 /WORTH OF ADDITIONS
074 7065 273            XCH R13
075 7066 242            LD OVRFLW       /PUT OVERFLOW COUNTER
076 7067 053            SRC R12         /INTO MSD+1 SLOT IN ANSWER
077 7070 340            WRM
078 7071 157            INC R17         /STEP B POINTER
079 7072 335            LDM 15          /MOVE ANSWER POINTER TO
080 7073 361            CLC
081 7074 213            ADD R13         /NEXT LSD
082 7075 273            XCH R13
083 7076 160            ISZ MLT10;BIGLP /ALL DIGITS IN B PROCESSED?
    7077 016
084 7100 300            BBL 0           /YES
085

001             SUBJOB 4 NIB DIVIDEND/4 NIB DIVISOR=8 NIB REMAINDER &
                QUOTIENT
002
003             /LSD OF A IN R14-15, LSD OF B IN R16-17
004             /LSD OF REMAINDER / QUOTIENT IN R12-13
005             /(8 DIGITS R->Q, LSD->MSD)
006             /AC=0: NORMAL RETURN
007             /AC#0: 0 DIVISOR
008
009
010 7101 040    DIVIDE, FIM 0;20 14;R0  /CHECK FOR 0 DIVISOR
    7102 014
011 7103 057    DIV1,   SRC R16
012 7104 351            RDM
013 7105 024            JCN DIV2;ZERO
    7106 110
014 7107 140            INC R0          /DIVISOR NOT ZERO
015 7110 157    DIV2,   INC R17
016 7111 161            ISZ DIV1;R1
    7112 103
017 7113 240            LD R0
018 7114 024            JCN DIV100;ZERO /JUMP IF 0 DIVISOR
    7115 312
019 7116 040            FIM 14;R0       /FLUSH REMAINDER FOR ADDITION
    7117 014
020 7120 320            LDM 0
021 7121 053    DIV3,   SRC R12
022 7122 340            WRM
023 7123 153            INC R13
024 7124 161            ISZ DIV3;R1
    7125 121
025 7126 334            LDM 14          /RESTORE REGISTER
026 7127 361            CLC
027 7130 213            ADD R13
028 7131 273            XCH R13
029 7132 327            LDM 7           /SET QUOTIENT POINTER TO
030 7133 361            CLC
031 7134 213            ADD R13         /POINT TO MSD
032 7135 263            XCH R3          /R2-3
033 7136 252            LD R12
034 7137 262            XCH R2
035 7140 334            LDM 14          /RESTORE DIVISOR ADDRESS
036 7141 361            CLC
037 7142 217            ADD R17
038 7143 277            XCH R17
039 7144 323            LDM 3           /POINTER TO GET DIVIDEND DIGITS
040 7145 361            CLC
041 7146 215            ADD R15         /R10-11
042 7147 261            XCH R1
043 7150 254            LD R14
044 7151 260            XCH R0
045 7152 334            LDM 14          /DIVIDEND DIGIT COUNTER
046 7153 266            XCH R6
047 7154 053    DIV6,   SRC R12         /READ LOW ORDER DIGIT
048 7155 351            RDM
049 7156 265            XCH R5          /SAVE IT IN R5
050 7157 153            INC R13
```

| | | | | |
|---|---|---|---|---|
| 051 | 7160 053 | | SRC R12 | |
| 052 | 7161 351 | | RDM | /READ NEXT ORDER DIGIT |
| 053 | 7162 265 | | XCH R5 | /BRING BACK LOW ORDER DIGIT |
| 054 | 7163 340 | | WRM | /& STORE |
| 055 | 7164 153 | | INC R13 | |
| 056 | 7165 053 | | SRC R12 | |
| 057 | 7166 351 | | RDM | /READ NEXT ORDER DIGIT |
| 058 | 7167 265 | | XCH R5 | /& STORE PREVIOUS ORDER DIGIT |
| 059 | 7170 340 | | WRM | |
| 060 | 7171 153 | | INC R13 | |
| 061 | 7172 053 | | SRC R12 | |
| 062 | 7173 265 | | XCH R5 | /STORE IN HIGHEST ORDER DIGIT |
| 063 | 7174 340 | | WRM | |
| 064 | 7175 335 | | LDM 15 | |
| 065 | 7176 361 | | CLC | /RESTORE POINTER |
| 066 | 7177 213 | | ADD R13 | |
| 067 | 7200 273 | | XCH R13 | |
| 068 | 7201 041 | | SRC R0 | /START LOOP – GET DIGIT FROM |
| 069 | 7202 351 | | RDM | /DIVIDEND & STORE IN |
| 070 | 7203 053 | | SRC R12 | /REMAINDER FOR SUBTRACT LOOP |
| 071 | 7204 340 | | WRM | |
| 072 | 7205 320 | | LDM 0 | /CLEAR QUOTIENT COUNTER |
| 073 | 7206 264 | | XCH R4 | |
| 074 | 7207 334 | DIV8, | LDM 14 | /SET SUBTRACT LOOP COUNTER |
| 075 | 7210 265 | | XCH R5 | |
| 076 | 7211 372 | | STC | |
| 077 | 7212 371 | DIV10, | TCS | /SUBTRACT START |
| 078 | 7213 057 | | SRC R16 | |
| 079 | 7214 350 | | SBM | /–B(I) |
| 080 | 7215 361 | | CLC | |
| 081 | 7216 053 | | SRC R12 | |
| 082 | 7217 353 | | ADM | /+A(I) |
| 083 | 7220 373 | | DAA | |
| 084 | 7221 340 | | WRM | /STORE IN C(I) = A(I) |
| 085 | 7222 153 | | INC R13 | |
| 086 | 7223 157 | | INC R17 | |
| 087 | 7224 165 | | ISZ DIV10, R5 | /LOOP FINISHED? |
| | 7225 212 | | | |
| 088 | 7226 367 | | TCC | /SAVE CARRY |
| 089 | 7227 265 | | XCH R5 | |
| 090 | 7230 334 | | LDM 14 | /RESTORE ADDRESSES FOR |
| 091 | 7231 361 | | CLC | |
| 092 | 7232 217 | | ADD R17 | /NEXT SUBTRACT |
| 093 | 7233 277 | | XCH R17 | |
| 094 | 7234 334 | | LDM 14 | |
| 095 | 7235 361 | | CLC | |
| 096 | 7236 213 | | ADD R13 | |
| 097 | 7237 273 | | XCH R13 | |
| 098 | 7240 265 | | XCH R5 | /RESTORE CARRY |
| 099 | 7241 366 | | RAR | |
| 100 | 7242 032 | | JCN DIV14, NOT CARRY | /JUMP IF BORROW |
| | 7243 247 | | | |
| 101 | 7244 144 | | INC R4 | /STEP QUOTIENT COUNTER AND |
| 102 | 7245 116 | | JUN DIV8 | /SUBTRACT DIVISOR AGAIN |
| | 7246 207 | | | |
| 103 | 7247 334 | DIV14, | LDM 14 | /WENT TOO FAR – ADD DIVISOR |
| 104 | 7250 265 | | XCH R5 | /BACK IN |
| 105 | 7251 361 | | CLC | |
| 106 | 7252 057 | DIV16, | SRC R16 | |
| 107 | 7253 351 | | RDM | /B(I) |
| 108 | 7254 053 | | SRC R12 | |
| 109 | 7255 353 | | ADM | /+A(I) |
| 110 | 7256 373 | | DAA | |
| 111 | 7257 340 | | WRM | /STORE IN C(I) = A(I) |
| 112 | 7260 153 | | INC R13 | |
| 113 | 7261 157 | | INC R17 | |
| 114 | 7262 165 | | ISZ DIV16, R5 | /FINISHED |
| | 7263 252 | | | |
| 115 | 7264 334 | | LDM 14 | /RESTORE DIVISOR ADDRESS |
| 116 | 7265 361 | | CLC | |
| 117 | 7266 217 | | ADD R17 | |
| 118 | 7267 277 | | XCH R17 | |
| 119 | 7270 334 | | LDM 14 | /RESTORE QUOTIENT ADDRESS |
| 120 | 7271 361 | | CLC | |
| 121 | 7272 213 | | ADD R13 | |

```
122 7273 273            XCH R13
123 7274 043            SRC R2
124 7275 244            LD R4         /STORE QUOTIENT DIGIT
125 7276 340            WRM           /(MSD FIRST)
126 7277 337            LDM 17        /DECREMENT POINTER POINTING
127 7300 361            CLC           /TO DIVIDEND DIGITS
128 7301 201            ADD R1
129 7302 261            XCH R1
130 7303 337            LDM 17        /DECREMENT QUOTIENT ADDRESS
131 7304 361            CLC
132 7305 203            ADD R3
133 7306 263            XCH R3
134 7307 166            ISZ DIV6,R6   /ALL DIVIDEND DIGITS PROCESSED?
    7310 154
135 7311 300            BBL 0         /YES; NORMAL RETURN
136 7312 317   DIV100,  BBL 17        /0 DIVISION RETURN
137
138            SUBJOB
```

```
001            SUBJOB 4 BCD DIGIT SUBTRACTION
002
003            /4 DIGIT SUBTRACTION A - B => C
004            /A & B LSD'S IN R14-15, R16-17;
005            /C LSD IN R12-13 (CPU REG.)
006            /STORAGE IN ASCENDING MEMORY (LSD - MSD)
007            /CARRY IS SET WHEN A =>B
008            /REGISTERS USED: 11
009
010 7313 334   SUBBCD,  LDM 14        /SET LOOP COUNTER
011 7314 260            XCH R0
012 7315 372            STC
013 7316 371   SUB4A,   TCS
014 7317 057            SRC R16
015 7320 350            SBM           /-B(I)
016 7321 361            CLC
017 7322 055            SRC R14
018 7323 353            ADM           /+A(I)
019 7324 373            DAA
020 7325 053            SRC R12
021 7326 340            WRM           /STORE IN C(I)
022 7327 157            INC R17       /STEP ADDRESSES
023 7330 155            INC R15
024 7331 153            INC R13
025 7332 160            ISZ SUB4A,R0  /FINISHED?
    7333 316
026 7334 300            BBL 0         /YES
027            SUBJOB
```

```
001            SUBJOB 4 BCD DIGIT ADDITION
002
003            /4 DIGIT ADDITION A +B => C
004            /A & B LSD'S IN R14-15, R16-17;
005            /C LSD IN R12-13 (CPU REG.)
006            /STORAGE IN ASCENDING MEMORY (LSD->MSD)
007            /CARRY BIT IS SET IF OVERFLOW OCCURS
008            /REGISTERS USED: 11
009
010 7335 334   ADDBCD,  LDM 14        /SET LOOP COUNTER
011 7336 260            XCH R0
012 7337 361            CLC
013 7340 055   ADD4A,   SRC R14
014 7341 351            RDM           /A(I)
015 7342 057            SRC R16
016 7343 353            ADM           /+B(I)
017 7344 373            DAA
018 7345 053            SRC R12
019 7346 340            WRM           /STORE IN C(I)
```

| | | | | |
|---|---|---|---|---|
| 020 | 7347 | 155 | INC R15 | /STEP ADDRESSES |
| 021 | 7350 | 157 | INC R17 | |
| 022 | 7351 | 153 | INC R13 | |
| 023 | 7352 | 160 | ISZ ADD4A,R0 | /FINISHED? |
| | 7353 | 340 | | |
| 024 | 7354 | 300 | BBL 0 | /YES |
| 025 | | | | |
| 026 | | | SUBJOB | |
| 027 | | | PAUSE | |

```
001         SUBJOB BCD TO BINARY CONVERTER SUBROUTINE - BCDBIN 001 R
EV AX01
002         /SUBJOB FMR 3.25.74
003
004
005         /BCD TO BINARY CONVERTER SUBROUTINE
006
007         /ALGORITHM=((MSDX10+NSD)X10+NSD)X10+LSD
008         /MSD=MOST SIGNIFICANT DIGIT
009         /NSD=NEXT SIGNIFICANT DIGIT
010         /LSD=LEAST SIGNIFICANT DIGIT
011
012         /CALLING ROUTINE REQUIREMENTS:
013         /1)THE CALLING ROUTINE WILL SPECIFY TWO RAM
014         /ADDRESSES TO BE CONTAINED IN TWO INDEX
015         /REGISTER PAIRS.
016         /R14-15 WILL SPECIFY THE ADDRESS IN RAM OF THE
017         /BCD # TO BE CONVERTED.
018         /R12-13 WILL SPECIFY THE ADDRESS IN RAM WHERE THE
019         /CONVERSION RESULT WILL BE STORED.
020         /NOTE: UPON ENTRY THE REGISTERS POINT TO
021         /THE LEAST SIGNIFICANT NIBBLES OF BOTH THE BCD #
022         /AND THE RESULT.
023         /THE CALLING STATEMENT WILL BE - JMS BCDBIN.
024
025         /START BY CLEARING THE RAM WHERE THE
026         /CONVERSION RESULT IS TO BE STORED.
027
028         /DEFINITIONS
029
030   005   ANS=5
031   006   BCD=6
032   013   ANSNIB=2!ANS+1
033   015   BCDNIB=2!BCD+1
034   153   NXTANS=INC ANSNIB
035   155   NXTBCD=INC BCDNIB
036   273   SWPANS=XCH ANSNIB
037   275   SWPBCD=XCH BCDNIB
038
039
040 7355 334  BCDBIN, LDM 20-4      /SET COMPLETION COUNTER
041 7356 260          XCH R0
042 7357 253          LD ANSNIB     /SAVE THE ORIGINAL ADDRESS
043 7360 261          XCH R1
044 7361 053  CLRRAM, SRC ANS!2
045 7362 360          CLB
046 7363 340          WRM
047 7364 153          NXTANS
048 7365 160          ISZ CLRRAM,R0
    7366 361
049 7367 241          LD R1
050 7370 273          XCH ANSNIB
051
052         /NOW WE ARE READY TO START THE ALGORITHM
053
054 7371 335          LDM 20-3
055 7372 260          XCH R0
056
057         /ADD THE APPROPRIATE DIGIT TO THE ACCUMULATING CONVERSION
058
```

```
059 7373 323           LDM 3
060 7374 215           ADD BCDNIB
061 7375 275           XCH BCDNIB
062 7376 055   CONALG, SRC BCD!2
063 7377 351           RDM
064 7400 053   CONPRP, SRC ANS!2
065 7401 353           ADM
066 7402 340           WRM
067 7403 320           LDM 0
068 7404 153           NXTANS
069 7405 022           JCN CONPRP;CARRY
    7406 000
070 7407 241           LD R1
071 7410 273           XCH ANSNIB
072
073                    /THE DIGIT IS ADDED TO ANSWER; NOW MULTIPLY ANSWER
074                    /BY 10. THE PROCEDURE IS TO MULTIPLY BY 2, SAVE IT;
075                    /MULTIPLY BY 4, ADD TO SAVED INFO. MULTIPLY BY 2 IS
076                    /ACCOMPLISHED BY LEFT SHIFTS
077
078 7411 334           LDM 20-4
079 7412 262           XCH R2
080 7413 053   CONROT, SRC ANS!2
081 7414 351           RDM
082 7415 365           RAL
083 7416 340           WRM
084 7417 153           NXTANS
085 7420 162           ISZ CONROT;R2
    7421 013
086 7422 241           LD R1
087 7423 273           XCH ANSNIB
088
089                    /WE HAVE NOW MULTIPLIED (ANS) BY 2; NOW SAVE IT
090
091 7424 053           SRC ANS!2
092 7425 351           RDM
093 7426 262           XCH R2
094 7427 153           NXTANS
095 7430 053           SRC ANS!2
096 7431 351           RDM
097 7432 263           XCH R3
098 7433 153           NXTANS
099 7434 053           SRC ANS!2
100 7435 351           RDM
101 7436 264           XCH R4
102 7437 153           NXTANS
103 7440 053           SRC ANS!2
104 7441 351           RDM
105 7442 265           XCH R5
106
107
108                    /MULT X 2 IS SAVED; NOW MULT BY 2 TWO MORE
109                    /TIMES TO GET (ANS) X 8
110
111 7443 336           LDM 20-2
112 7444 266           XCH R6
113 7445 334   CONMPY, LDM 20-4
114 7446 267           XCH R7
115 7447 241           LD R1     /RESTORE ANSNIB
116 7450 273           XCH ANSNIB
117 7451 053   CONRAL, SRC ANS!2
118 7452 351           RDM
119 7453 365           RAL
120 7454 340           WRM
121 7455 153           NXTANS
122 7456 167           ISZ CONRAL;R7
    7457 051
123 7460 166           ISZ CONMPY;R6
    7461 045
124 7462 241           LD R1
125 7463 273           XCH ANSNIB
126
127                    /MULTIPLY BY 8 IS ACCOMPLISHED; NOW ADD SAVED
128                    /MULTIPLY BY 2 TO GET MULTIPLY BY 10
```

```
129
130  7464  242           LD R2
131  7465  053           SRC ANS!2
132  7466  353           ADM
133  7467  340           WRM
134  7470  153           NXTANS
135  7471  243           LD R3
136  7472  053           SRC ANS!2
137  7473  353           ADM
138  7474  340           WRM
139  7475  153           NXTANS
140  7476  244           LD R4
141  7477  053           SRC ANS!2
142  7500  353           ADM
143  7501  340           WRM
144  7502  153           NXTANS
145  7503  245           LD R5
146  7504  053           SRC ANS!2
147  7505  353           ADM
148  7506  340           WRM
149
```

```
001                /MULTIPLY BY 10 ACCOMPLISHED; NOW GET NEXT DIGIT
002                /AND TEST FOR COMPLETION; IF DONE, THEN RETURN;
003                /IF NOT, THEN GO TO CONALG.
004
005  7507  241           LD R1
006  7510  273           XCH ANSNIB
007  7511  255           LD BCDNIB
008  7512  370           DAC
009  7513  275           XCH BCDNIB
010  7514  360           CLB
011  7515  160           ISZ CONAL,R0
     7516  135
012
013                /RESTORE CALLING INDEX REGISTERS TO THEIR INITIAL
014                /STATE.
015
016  7517  241           LD R1
017  7520  273           XCH ANSNIB
018  7521  055           SRC BCD!2        /NOW ADD IN LSN
019  7522  351           RDM
020  7523  053    CNPRP2, SRC ANS!2
021  7524  353           ADM
022  7525  340           WRM
023  7526  153           NXTANS
024  7527  320           LDM 0
025  7530  022           JCN CNPRP2,CARRY
     7531  123
026  7532  241           LD R1
027  7533  273           XCH ANSNIB
028  7534  300           BBL 0
029
030  7535  116    CONAL, JUN CONALG
     7536  376
031
032                SUBJOB
```

```
001           SUBJOB BINARY TO BCD CONVERTER - BINBCD 001 REV AX01
002
003
004           /BINARY TO BCD CONVERTER SUBROUTINE
005
006           /ALGORITHM:  THIS ROUTINE USES THE BASIC DOUBLER
007           /ALGORITHM; THE ANSWER IS INITIALIZED TO 0, THEN
008           /THE MSB OF THE BIN # IS ADDED TO THE ACCUMULATING
009           /ANSWER AND THE BIN # IS LEFT SHIFTED ONCE. AT THIS
010           /POINT THE ANSWER IS DOUBLED AGAIN FOLLOWED BY AN ADD OF
011           /OF THE MSB; THIS PROCESS CONTINUES UNTIL THE
012           /LSB OF THE BIN # IS IN THE MSB POSITION.
```

```
013            /EXAMPLE:
014
015            /BIN # = 1100101   (101 BASE 10)
016            /                  MSB        LSB
017            /0                 1100101
018            / 0 X 2 + 1 = 1     100101
019            / 1 X 2 + 1 = 3      00101
020            / 3 X 2 + 0 = 6       0101
021            / 6 X 2 + 0 = 12       101
022            /12 X 2 + 1 = 25        01
023            /25 X 2 + 0 = 50         1
024            /50 X 2 + 1 = 101
025            /
026
027            /CALLING ROUTINE REQUIREMENTS
028            /THE CALLING ROUTINE SHALL SPECIFY TWO RAM ADDRESSES:
029            /ONE SHALL BE THE ADDRESS OF THE LSN (LEAST SIGNIF-
030            /ICANT NIBBLE) OF THE BINARY # TO BE CONVERTED; THE
031            /OTHER SHALL BE THE ADDRESS OF THE LSN OF THE
032            /ANSWER REGISTER, WHICH WILL BE AN ACCUMULATING
033            /ANSWER.
034            /THE CALLING STATEMENT IS - JMS BINBCD
035            /THE TWO SPECIFIED ADDRESSES WILL BE IN INDEX
036
037            /REGISTER PAIRS 6 (BIN #) AND 5 (ANSWER).

001            /DEFINITIONS:
002
003    006     BIN=BCD
004    155     NXTBIN=NXTBCD
005    015     BINNIB=BCDNIB
006
007
008            /FIRST CLEAR THE (ANSWER)
009
010 7537 334   BINBCD, LDM 20-4        /SET COMPLETION COUNTER
011 7540 260           XCH R0
012 7541 253           LD ANSNIB       /SAVE THE ORIGINAL ANSNIB
013 7542 261           XCH R1
014 7543 360   RAMCLR, CLB             /CLEAR ROUTINE
015 7544 053           SRC ANS!2       /ESTABLISH RAM ADDR
016 7545 340           WRM     /0->(RAM ADDR)
017 7546 153           NXTANS  /INCREMENT RAM ADDRESS POINTER
018 7547 160           ISZ RAMCLR;R0 /AND TEST FOR COMPLETION
    7550 143
019
020
021            /NOW COPY THE BINARY # TO BE CONVERTED INTO R4->R7;
022            /THIS IS NECESSARY BECAUSE THE BIN # WILL BE LOST DUE
023            /TO LEFT SHIFTS.
024
025 7551 255           LD BINNIB       /SAVE THE ADDRESS OF THE
026 7552 262           XCH R2  /BINARY NUMBER LSN IN
027                            /RDUM3
028 7553 055           SRC BIN!2       /GET (LSN) OF BINARY # -> AC
029 7554 351           RDM
030 7555 263           XCH R3  /SAVE (LSN) IN RDUM4
031 7556 155           NXTBIN
032 7557 055           SRC BIN!2               /GET (NSN)
033 7560 351           RDM
034 7561 264           XCH R4  /SAVE (NSN) IN RDUM5
035 7562 155           NXTBIN
036 7563 055           SRC BIN!2
037 7564 351           RDM
038 7565 265           XCH R5  /SAVE (NSN) IN RDUM6
039 7566 155           NXTBIN
040 7567 055           SRC BIN!2
041 7570 351           RDM
042 7571 266           XCH R6  /SAVE (MSN) IN RDUM7
043
044            /NOW START THE ALGORITHM: FOR SIMPLICITY WE DO DOUBLING
045            /AND BIN # ROTATING SIMULTANEOUSLY.
046
047 7572 321           LDM 1   /SET COMPLETION COUNTER FOR
```

```
048 7573 260              XCH R0    /16 BITS OF BIN #; USE RDWM1
049 7574 334    MCNDBL,   LDM 20-4    /SET COMPLETION COUNTER FOR
050 7575 267              XCH R7
051 7576 241              LD R1
052 7577 273              XCH ANSNIB
053 7600 242              LD R2
054 7601 275              XCH BINNIB
055 7602 053    CONDBL,   SRC ANS!2
056 7603 351              RDM
057 7604 353              ADM
058 7605 373              DAA
059 7606 340              WRM
060 7607 153              NXTANS
061 7610 167              ISZ CONDBL,R7
    7611 202
```

```
001              /NOW DO BINARY # LEFT SHIFT. USE BINARY ADD.
002 7612 334              LDM 20-4
003 7613 267              XCH R7
004 7614 055    CONSHF,   SRC BIN!2
005 7615 351              RDM
006 7616 353              ADM
007 7617 340              WRM
008 7620 155              NXTBIN
009 7621 167              ISZ CONSHF,R7
    7622 214
010
011              /NOW ADD MSB OF BIN # TO ANS USE DECIMAL ADD
012
013 7623 365              RAL
014 7624 367              TCC
015 7625 267              XCH R7
016 7626 242              LD R2
017 7627 275              XCH BINNIB
018 7630 241              LD R1
019 7631 273              XCH ANSNIB
020 7632 267              XCH R7
021 7633 053    CONCRY,   SRC ANS!2
022 7634 353              ADM
023 7635 373              DAA
024 7636 340              WRM
025 7637 153              NXTANS
026 7640 022              JCN CONCRY,CARRY
    7641 233
027 7642 160              ISZ MCNDBL,R0
    7643 174
028
029              /ANSWER IS NOW COMPLETE IN RAM. BUT BEFORE EXIT, RESTORE
030              /BIN # TO ITS ORIGINAL STATE IN RAM.
031
032 7644 242              LD R2
033 7645 275              XCH BINNIB
034 7646 243              LD R3
035 7647 055              SRC BIN!2
036 7650 340              WRM
037 7651 155              NXTBIN
038 7652 244              LD R4
039 7653 055              SRC BIN!2
040 7654 340              WRM
041 7655 155              NXTBIN
042 7656 245              LD R5
043 7657 055              SRC BIN!2
044 7660 340              WRM
045 7661 155              NXTBIN
046 7662 246              LD R6
047 7663 055              SRC BIN!2
048 7664 340              WRM
049
050              /RESTORE THE INDEX REGISTER PAIRS TO THEIR CALLING
051              /STATE.
052
```

```
053 7665 241        LD R1      /RESTORE ANSNIB
054 7666 273        XCH ANSNIB
055 7667 242        LD R2      /RESTORE BINNIB
056 7670 275        XCH BINNIB
057 7671 300        BBL        /FINIS
058
059
060           SUBJOB
061           EJECT
062           SUBJOB LOGICAL "AND", "OR", "EXCLUSIVE OR"
063
064           /THIS SUBROUTINE COMPUTES THE THREE LOGIC FUNC-
065           /TIONS - AND, OR, EXOR, ON A NIBBLE BASIS.
066
067
068           /R0=A.B
069           /R1=A+B
070           /R2=A EXOR B
071
072           /A IS IN THE ACCUMULATOR UPON ENTRY
073           /B IS IN THE RAM POINTED TO BY RP7
074
075           /ALGORITHM
076           /FOUR STEPS ARE USED TO COMPUTE THE LOGIC FUNCTIONS
077           /EACH STEP WILL ROTATE THE NSB->MSB FOR BOTH A AND B
078           /WHILE KEEPING THE THREE LSB'S ZEROED, THUS FORMING
079           /A1 AND B1. NEXT A1 AND B1 ARE ADDED AND THE ACCU-
080           /MULATOR AND LINK ARE SENSED ACCORDING TO THE FOLLOW-
081           /ING TABLE.
082           /R0,R1,R2 ARE ADJUSTED APPROPRIATELY AND ROTATED LEFT
083           /TO PREPARE FOR NEXT BIT.
084
085           / ACC     CARRY    AND    OR    EXOR
086
087           /0000      0        0     0      0
088           /1000      0        0     1      1
089           /0000      1        1     1      0
090           EJECT
091           /FIRST, ESTABLISH "A" AND "B" INTO INDEX REG-
092           /ISTERS.
093
094           ANDOR,
095 7672 263  LOGIC,    XCH R3           /PUT "A" INTO R3
096 7673 055            SRC R14          /ESTABLISH RAM ADDRESS FOR
097 7674 351            RDM              /"B"
098 7675 264            XCH R4           /PUT "B" INTO R4
099
100           /"A" IS NOW IN R3, AND "B" IS NOW IN R4
101           /NOW CLEAR THE THREE ANSWER REGISTERS, R0,R1,R2
102
103 7676 360            CLB
104 7677 260            XCH R0           /CLEAR THE ANSWER REGISTERS
105 7700 240            LD R0
106 7701 261            XCH R1
107 7702 241            LD R1
108 7703 262            XCH R2
109 7704 334            LDM 20-4         /SET COMPLETION COUNTER, USE
110 7705 265            XCH R5           /R5
111
112 7706 243  CONLOG,   LD R3            /POSITION "A"
113 7707 365            RAL              /PUT MSB -> C0
114 7710 263            XCH R3           /SAVE SHIFTED NIBBLE
115 7711 320            LDM 0            /CLEAR AC AND PUT C0->MSB
116 7712 366            RAR
117 7713 266            XCH R6           /THEN SAVE IN R6
118 7714 360            CLB              /NOW DO THE SAME FOR "B"
119 7715 244            LD R4
120 7716 365            RAL
121 7717 264            XCH R4
122 7720 320            LDM 0
123 7721 366            RAR
124
125 7722 206            ADD R6           /NOW ADD THE MSB'S
126 7723 022            JCN ADJC0,CARRY  /CHECK FOR CARRY
    7724 332
```

```
127  7725 034           JCN ADJNTO, NOT ZERO/CHECK FOR NON-ZERO ACC
     7726 357
128  7727 165           ISZ ROTANS;R5
     7730 344
129  7731 300           BBL 0
130              EJECT
131
132              /IF WE GOT HERE, THEN WE HAD A CARRY; SO WE MUST
133              /INCREMENT R0 AND R1, I.E., LOGICAL AND AND LOGICAL
134              /OR ARE BOTH 1'S.
135
136  7732 140   ADJCO,   INC R0
137  7733 141            INC R1
138  7734 165            ISZ ROTANS;R5   /NOW GO ROTATE ANSWER
     7735 344
139  7736 300            BBL 0
140                                      /REGS AND TEST FOR COM-
141                                      /PLETION
142
143              /IF WE GOT HERE, THEN WE HAD A NON-ZERO ACCUMULATOR,
144              /SO WE MUST INCREMENT R1 AND R2, I.E., LOGICAL OR AND
145              /LOGICAL EXOR ARE BOTH 1'S.
146
147  7737 141   ADJNTO,  INC R1
148  7740 142            INC R2
149  7741 165            ISZ ROTANS;R5   /NOW GO ROTATE ANSWER REGS
     7742 344
150  7743 300            BBL 0
151                                      /AND TEST FOR COMPLETION.
152              /NOW ROTATE EACH OF THE ANSWER REGISTERS ONE LEFT.
153
154  7744 360   ROTANS,  CLB             /ESPECIALLY CLEAR CARRY
155  7745 240            LD R0           /FIRST R0 - LOGICAL AND
156  7746 365            RAL
157  7747 260            XCH R0
158  7750 241            LD R1           /NEXT R1 - LOGICAL OR
159  7751 365            RAL
160  7752 261            XCH R1
161  7753 242            LD R2           /LAST R2 - LOGICAL EXOR
162  7754 365            RAL
163  7755 262            XCH R2
164
165  7756 117            JUN CONLOG      /TEST FOR COMPLETION.
     7757 306
166
167              SUBJOB SYMBOL TABLE
168              EJECT
```

| | | | | |
|---|---|---|---|---|
| AAA | 3052 | | A007 | 2415 |
| ACHK3 | 3344 | | A008 | 2417 |
| ADDBCD | 7335 | | A016 | 2421 |
| ADDCNT | 0001 | | A107 | 2423 |
| ADDH1 | 4112 | | A110 | 2425 |
| ADDREM | 2652 | | A111 | 2427 |
| ADD4A | 7340 | | A132 | 2431 |
| ADJCO | 7732 | | A151 | 2433 |
| ADJNTO | 7737 | | A172 | 2435 |
| AIN140 | 1400 | | A201 | 2437 |
| AIN30 | 1000 | | A222 | 2441 |
| ANDATA | 0040 | | A236 | 2443 |
| ANDOR | 7672 | | A262 | 2445 |
| ANFIM | 4037 | | A263 | 2447 |
| ANS | 0005 | | A264 | 2451 |
| ANSNIB | 0013 | | A270 | 2453 |
| AP2A | 1002 | | A300 | 2455 |
| AUXREL | 3332 | | A301 | 2457 |
| A000 | 2401 | | A317 | 2461 |
| A001 | 2403 | | A361 | 2463 |
| A002 | 2405 | | A383 | 2465 |
| A003 | 2407 | | A384 | 2467 |
| A005 | 2411 | | A400 | 2471 |
| A006 | 2413 | | A405 | 2473 |

| | |
|---|---|
| A431 | 2475 |
| A551 | 2477 |
| A557 | 2501 |
| A601 | 2503 |
| A602 | 2505 |
| A603 | 2507 |
| A701 | 2511 |
| A829 | 2513 |
| A901 | 2515 |
| A917 | 2517 |
| BACK1 | 3216 |
| BBLRET | 2662* |
| BCD | 0006 |
| BCDBAK | 4343 |
| BCDBIN | 7355 |
| BCDLIN | 3000 |
| BCDLNI | 3011 |
| BCDNIB | 0015 |
| BCDRAM | 3034 |
| BCDREF | 3021 |
| BIGLP | 0000 |
| BIN | 0006 |
| BINBAK | 3151 |
| BINBCD | 7537 |
| BINLIN | 0060 |
| BINNIB | 0015 |
| BINREF | 0067 |
| BNDATA | 0043 |
| BNFIM | 4034 |
| BNREF | 4000 |
| B1B2B3 | 4066 |
| B3B1B2 | 4042 |
| CALADD | 4011 |
| CENZ | 1067 |
| CENZ10 | 1137 |
| CHEKRG | 2117 |
| CHKLMT | 2611 |
| CHK1A | 4070 |
| CHK2 | 3346 |
| CHK3 | 3400 |
| CHK3D | 3460 |
| CHK4 | 3462 |
| CHK5 | 3542 |
| CHK5A | 3536 |
| CHK6 | 3603 |
| CHK6C | 3624 |
| CHK6D | 3630 |
| CHK7 | 3644 |
| CHK7A | 3647 |
| CHK8 | 3675 |
| CHK9 | 3710 |
| CLRRAM | 7361 |
| CLR0 | 2770 |
| CLR0A | 2772 |
| CLR1 | 2736 |
| CLR2 | 2732 |
| CLR3 | 2726 |
| CNDATA | 0046 |
| CNFIM | 4031 |
| CNPRP2 | 7523 |
| CNTLOW | 0174* |
| CNTMID | 0175* |
| CNTR | 0003 |
| COILIN | 0176 |
| CON | 2544 |
| CONAL | 7535 |
| CONALG | 7376 |
| CONBUT | 0164 |
| CONCRY | 7633 |
| CONDBL | 7602 |
| CONILA | 1004 |
| CONILL | 0703 |
| CONLIT | 0077 |
| CONLOG | 7706 |
| CONMPY | 7445 |

| | |
|---|---|
| CONPRP | 7400 |
| CONRAL | 7451 |
| CONROT | 7413 |
| CONSET | 2152 |
| CONSHF | 7614 |
| CONS10 | 2200 |
| CONS20 | 2203 |
| CONS30 | 2177 |
| CONS8 | 2170 |
| CURE | 0452 |
| CURENT | 0446 |
| CURE4 | 0477 |
| DISABL | 0160 |
| DISCON | 0124 |
| DISDIS | 0123 |
| DISNOD | 0126 |
| DISPLY | 0120 |
| DISREF | 0130 |
| DISSIZ | 0103 |
| DISTIK | 0125 |
| DIVIDE | 7101 |
| DIV1 | 7103 |
| DIV10 | 7212 |
| DIV100 | 7312 |
| DIV14 | 7247 |
| DIV15 | 7252 |
| DIV2 | 7110 |
| DIV3 | 7121 |
| DIV6 | 7154 |
| DIV8 | 7207 |
| DNDATA | 0051 |
| DONEDS | 0121 |
| DONEFG | 0357 |
| DSPLAY | 0400* |
| DSP4 | 0415 |
| DZBITS | 0127 |
| ENTER | 0102 |
| ERRIN1 | 0120 |
| ERR10 | 1006* |
| ERR20 | 1565 |
| GCHK1 | 4234 |
| GETDT | 2536 |
| GETOUT | 2054 |
| GETOUU | 2074 |
| GETOUV | 2075 |
| GET4 | 2520 |
| GET4B | 2522 |
| GROUP2 | 4136 |
| GROUP3 | 4331 |
| ILLEG | 0710 |
| INEDGE | 0160 |
| INPUT | 0100 |
| IN100 | 1645 |
| IN104 | 1665 |
| IN11A | 1210 |
| IN140 | 2000 |
| IN142 | 2013 |
| IN164 | 2023 |
| IN166 | 2035 |
| IN20 | 1233 |
| IN22 | 1246 |
| IN23 | 1253 |
| IN30 | 1402 |
| IN50 | 1463 |
| IN60 | 1507 |
| IN70 | 1533 |
| IN80 | 1567 |
| IN86 | 1605 |
| IN88 | 1613 |
| IOEX | 1164* |
| IOXCH | 1154 |
| IPRT10 | 0200 |
| IPRT11 | 0220 |
| IPRT12 | 0240 |
| IPRT13 | 0260 |

| | | | |
|---|---|---|---|
| IPRT14 | 0300* | P5A28 | 1036 |
| KERENT | 4000 | P5A30 | 1062 |
| LDCON | 2263* | P555 | 0717 |
| LDPAN | 2243 | P5556 | 0726 |
| LDRAM | 2320 | RAMCLR | 7543 |
| LDROM | 2326 | RAMMEM | 2045U |
| LINBCD | 1266 | RAWDAT | 0200 |
| LINE | 0114 | RDERR1 | 0355 |
| LNNFG | 2137 | RDERR2 | 0356 |
| LNTYPE | 0063 | RDWRIT | 2144 |
| LOGIC | 7672* | READ | 0000 |
| LSNA | 3330 | READFN | 2312 |
| LSNB | 3331 | REFBCD | 1611 |
| LSNO | 3315 | REFBN | 0631 |
| MCNDBL | 7574 | RFFER | 0110 |
| MENSEL | 0000 | RELAY | 3077 |
| MESWA | 2102 | RELCNT | 4126 |
| MESWA1 | 2103 | RELGRP | 3224 |
| MESWD | 2114 | RELLAT | 4116 |
| MLTPLY | 7000 | REM6 | 4256 |
| MLT10 | 7016 | REM7 | 4315 |
| MLT11 | 7024 | RITE | 0000* |
| MLT12 | 7032 | RNTYPE | 0072* |
| MLT14 | 7047 | ROMMEM | 2074U |
| MLT200 | 7062 | ROTANS | 7744 |
| MLT4 | 7003 | R0 | 0000 |
| MONITR | 0101 | ROR0 | 0000 |
| MOVE3 | 2674 | ROR1 | 0020 |
| MOVE3A | 2675 | ROR2 | 0040 |
| MOVE3B | 2676 | ROR3 | 0060 |
| MOVE4 | 2707 | R1 | 0001 |
| NFGFLG | 0354 | R1R0 | 0100 |
| NFGSTR | 0100 | R1R1 | 0120 |
| NODBUT | 0166 | R1R2 | 0140* |
| NODLIT | 0076 | R1R3 | 0160 |
| NXTANS | 0153 | R10 | 0010 |
| NXTBCD | 0155 | R11 | 0011 |
| NXTBIN | 0155 | R12 | 0012 |
| ODD | 4301 | R13 | 0013 |
| ONLYWN | 2206 | R14 | 0014 |
| ONLY10 | 2225 | R15 | 0015 |
| ONLY11 | 2235 | R16 | 0016 |
| ONLY5 | 2214 | R17 | 0017 |
| ONLY6 | 2216 | R2 | 0002 |
| OPRT10 | 0200 | R2R0 | 0200 |
| OPRT11 | 0220 | R2R1 | 0220* |
| OPRT12 | 0260* | R2R2 | 0240* |
| OPRT14 | 0300 | R2R3 | 0260* |
| OVRFLW | 0002 | R3 | 0003 |
| PRESET | 0122 | R3R0 | 0300* |
| PROMA | 0400 | R3R1 | 0320* |
| PROMAD | 0064 | R3R2 | 0340* |
| PROMB | 1000 | R3R3 | 0360* |
| PROMC | 1400 | R4 | 0004 |
| PROMD | 2000 | R5 | 0005 |
| PROME | 2400 | R6 | 0006 |
| PROMF | 3000 | R7 | 0007 |
| PROMG | 3400 | SETBT | 2746 |
| PROMH | 4000 | SET0 | 2742 |
| PROMI | 4400* | SET0A | 2744 |
| PUTCON | 2645 | SET0B | 2752 |
| PUTDEN | 2633 | SET0C | 2762 |
| PUTNUM | 2640 | SET0D | 2763 |
| PUTSUB | 2626 | SET1 | 2722 |
| P2 | 0506 | SET2 | 2716 |
| P2A | 0565 | SET3 | 2712 |
| P2A10 | 0614 | SNDADR | 0000 |
| P2A30 | 0635 | SNDDAT | 0000 |
| P210 | 0546 | SOLUTN | 2550 |
| P26 | 0527 | SUBBCD | 7313 |
| P3 | 0717 | SUBTCT | 2663 |
| P5 | 0645 | SUB4A | 7316 |
| P5A10 | 0727 | SWPANS | 0273* |
| P5A20 | 0751 | SWPBCD | 0275* |
| P5A24 | 1010 | TTYFLG | 0120 |

| | |
|---|---|
| TTYRPV | 0354 |
| VALERR | 3266 |
| VALER1 | 3540 |
| VALE10 | 3306 |
| WDT | 4226 |
| WRERR1 | 0345 |
| WRERR2 | 0346 |
| WRITE | 0163 |
| ZBITS | 0177 |

```
001                 /PMR    30 MAR 74
002
003                 /INDEX REGISTER DEFINITIONS
004
005       000       R0=0
006       001       R1=1
007       002       R2=2
008       003       R3=3
009       004       R4=4
010       005       R5=5
011       006       R6=6
012       007       R7=7
013       010       R10=10
014       011       R11=11
015       012       R12=12
016       013       R13=13
017       014       R14=14
018       015       R15=15
019       016       R16=16
020       017       R17=17
021
022       000       RP0=0!2
023       002       RP1=1!2
024       004       RP2=2!2
025       006       RP3=3!2
026       010       RP4=4!2
027       012       RP5=5!2
028       014       RP6=6!2
029       016       RP7=7!2
030
031
032                 SUBJOB I/O PORT AND RAM ASSIGNMENTS
033                 EJECT
034                 /SOFTWARE FLAGS USED IN PROM BOMBER ROUTINE
035
036                 /INPUT FLAGS FOR DISCRETE CHANGES
037
038       160       IFLGH0=7!20      /RAM1 REG 3 MC 0
039                 /
040                 /DISABLE OFF
041                 /DISABLE ON
042                 /ENABLE
043       161       IFLGH1=7!20 1    /RAM 1 REG 3 MC 1
044                 /WRITE MODE
045                 /ABORT PROCESS
046                 /PROGRAM MODE
047                 /MONITOR MODE
048
049       162       IFLGH2=7!20 2    /RAM 1 REG 3 MC 2
050                 /ENTER
051                 /
052                 /
053                 /
054
055       163       IFLGH3=7!20 3    /RAM 1 REG 3 MC 3
056                 /WRITE LINE
057                 /WRITE ALL
058                 /
059                 /
060
061                 /OUTPUT FLAGS
062
```

```
063     100     OFLG0=1!100     /RAM 1 REG 0
064                             /SC0
065     010     WRTNFG=10       /WRITE MODE NFG
066     004     READY=4
067             /
068             /
069                             /SC1
070     010     OVRKIL=10       /OVERKILL MODE FOR WRITE ROUTINES
071             /
072             /
073             /
074                             /SC2
075     010     LNWRT=10        /WRITE LINE MODE FLAG
076             /
077             /
078             /
079                             /SC3
080     010     DONE=10
081     004     BUSY=4
082     002     ILLEGL=2
083     001     ERROR=1
084
085     120     OFLG1=5!20      /RAM 1 REG 1
086                             /SC0
087     010     TTYRED=10
088     004     TTYPCH=4
089     002     TTYVER=2
090             /
091
092                             /SC1
093     010     INVLIN=10
094     004     INVREF=4
095             /
096             /
097
098                             /SC2
099             /
100     004     UNPROG=4
101             /
102             /
103                             /SC3
104     010     RAMACQ=10       /RAM ACQUISITION
105     004     PRMACQ=4        /PROM ACQUISITION
106             /
107             /

001                     /ROM AND RAM OUTPUT PORT DEFINITIONS
002
003                     /PORT NAME & ADDRESS    /INFORMATION TO PORT
004
005     000     ROP0=0!20               /LOW ORDER RAM OR PROM
006                                     /ACQUISITION ADDRESS BITS.
007     020     ROP1=1!20               /MIDDLE ORDER RAM OR PROM
008                                     /ACQUISITION ADDRESS BITS.
009     040     ROP2=2!20               /HIGH ORDER RAM OR PROM
010                                     /ACQUISITION ADDRESS BITS.
011     060     ROP3=3!20               /CONTROL BIT PORT 1
012                                     /MSB=WRITE RAM
013                                     /NSB=DUMP PROM TO RAM
014                                     /NSB=HALT 284 CONTROLLER
015                                     /LSB=PROM / RAM SELECT
016     100     ROP4=4!20               /CONTROL BIT PORT 2
017                                     /MSB=PULSE TO START ACQUISITION.
018                                     /NSB=PULSE TO CLEAR SCAN FLAG.
019                                     /NSB=PULSE TO START PROM WRITE.
020                                     /LSB=PULSE TO INCR. ADDRESS REG.
021     120     ROP5=5!20               /SPARE
022     140     ROP6=6!20               /SPARE
023     160     ROP7=7!20
024     200     ROP10=10!20             /HIGH ORDER PANEL DATA
025     220     ROP11=11!20             /HIGH ORDER TTY DATA
026     240     ROP12=12!20             /CONTROL PORT 3
027                                     /MSB=SPARE
```

```
028                              /NSB=TTY SEND TO PUNCH
029                              /NSB=START ERASE LAMP
030                              /LSB=ERASE LAMP ON
031       260   ROP13=13!20      /CONTROL PORT 4
032                              /MSB=SPARE
033                              /NSB=PULSE TO CLEAR TTY RCV FLG
034                              /NSB=PULSE TO CLEAR PAN RCV FLG
035                              /LSB=PULSE TO CLEAR UARTS
036       300   ROP14=14!20      /PANEL ADDRESS REG. (SHOW ONLY)
037       320   ROP15=15!20      /SPARE
038       340   ROP16=16!20      /SPARE
039       360   ROP17=17!20      /SPARE
040
041                              /LOW ORDER DATA REG FOR
042       100   RAP1=1!100       /PANEL AND TTY.
043
044       000   RAP0=0!100       /FLAG MUX ADDRESS SELECTOR
045                              /0=WRITE BUSY SENSE
046                              /1=ACQUISITION DONE SENSE
047                              /2=END OF SCAN SENSE
048                              /3=TTY XMT SENSE
049                              /4=TTY RCV SENSE
050                              /5=PANEL XMIT SENSE
051                              /6=PANEL RCV SENSE
052                              /7=INITIALIZE MODE SENSE.
053       200   RAP2=2!100       /LOW ORDER DATA REG FOR
054                              /PROM/RAM WRITE.
055       300   RAP3=3!100       /HIGH ORDER DATA REG FOR
056                              /PROM/RAM WRITE.
057

001             /ROM INPUT PORT DEFINITIONS
002             /PMR 3-8-74
003
004             /PORT NAME & ADDRESS    INFORMATION AT PORT
005
006       000   RIP0=0           /ACQUISITION DATA (FUNCTION OF
007                              /PROM/RAM SELECT) - LOW NIBBLE
008       020   RIP1=1!20        /ACQUISITION DATA - HIGH NIBBLE
009       040   RIP2=2!20        /COUNT VALUE (COUNTERS) - LOW
010                              /NIBBLE
011       060   RIP3=3!20        /COUNT VALUE - MIDDLE NIBBLE
012       100   RIP4=4!20        /COUNT VALUE - HIGH NIBBLE *
013       120   RIP5=5!20        /Z BITS (ZD->ZA) ZA=LSB
014       140   RIP6=6!20        /PROM DATA - LOW NIBBLE
015       160   RIP7=7!20        /PROM DATA - HIGH NIBBLE
016       200   RIP10=10!20      /PANEL DAT - LOW NIBBLE
017       220   RIP11=11!20      /PANEL DATA - HIGH NIBBLE
018       240   RIP12=12!20      /TTY DATA - LOW NIBBLE
019       260   RIP13=13!20      /TTY DATA - HIGH NIBBLE
020       300   RIP14=14!20      /STATUS BITS - RUN, ERASE, WDT,
021                              /ERASE LAMP
022                              /ON=LSB (1 SPARE BIT)
023       320   RIP15=15!20      /STATUS BITS - TTY ERR, PAN ERR
024                              /=LSB (2 SPARE BITS)
025       340   RIP16=16!20      /SPARE
026       360   RIP17=17!20      /SPARE
027
028             /* 2LSB'S ARE COUNT VALUE; 2 MSB'S ARE COIL BIT (MSB)
029             /AND Z IN (?)
030

001             /CONTROL BIT AND PORT DEFINITIONS
002
003       060   CTRLP1=ROP3      /FIRST GROUP OF CONTROL BITS GO OUT
004                              /ROM OUTPORT 3.
```

```
005
006   000   SELFRM=0         /RAM/PROM SELECT BIT
007   002   HLTCPU=2         /STOP 284
008   004   DMPPRM=4         /DUMP PROM->RAM
009   010   WRTRAM=10        /WRITE USER RAM
010
011   100   CTRLP2=ROP4      /SECOND GROUP OF CONTROL BITS GO
012                          /OUT ROM OUTPUT PORT 4
013
014   002   STRTWR=2         /PULSE TO START FROM WRITE CYCLE
015   004   CLRSCN=4         /PULSE TO CLEAR SCAN FLAG
016   001   INCRAD=1         /PULSE TO INCREMENT ADDRESS REG
017   010   STRTAC=10        /PULSE TO START ACQUISITION CYCLE
018
019   240   CTRLP3=ROP12     /THIRD GROUP OF CONTROL BITS GO OUT
020                          /ROM PORT 10
021                 /
022                 /
023   002   STRTER=2         /START ERASE LAMP
024   001   ERSEON=1         /KEEP ERASE LAMP ON.
025
026
027   260   CTRLP4=ROP13     /LAST GROUP OF CONTROL BITS GO OUT
028                          /ROM PORT 11
029
030
031   004   CLRTTY=4         /PULSE TO CLEAR TTY
032   002   CLRPAN=2         /PULSE TO CLEAR PANEL
033   001   CLRURT=1         /PULSE TO CLEAR UARTS.

001                 /FUNCTIONAL OUTPUT PORT DEFINITIONS
002
003   000   ARLPRT=ROP0      /LOW ADDRESS DATA GOES OUT ROM PORT
004                          /0
005   020   ARMPRT=ROP1      /MIDDLE ADDRESS DATA GOES OUT ROM
006                          /PORT 1
007   040   ARHPRT=ROP2      /HIGH ADDRESS DATA GOES OUT ROM
008                          /PORT 2
009   200   HPNPRT=ROP10     /HIGH ORDER PANEL DATA GOES OUT ROM
010                          /PORT 8
011   220   HTYPRT=ROP11     /HIGH ORDER TTY DATA GOES OUT ROM
012                          /PORT 9
013   300   PADPRT=ROP14     /PANEL ADDRESS DATA GOES OUT ROM PORT
014                          /12
015   200   LDTPRT=RAP2      /LOW ORDER DATA FOR RAM/PROM WRITE
016                          /GOES OUT RAM PORT 2
017   300   HDTPRT=RAP3      /HIGH ORDER DATA FOR RAM/PROM WRITE
018                          /GOES OUT RAM PORT 3
019   000   FLGMUX=RAP0      /TEST LINE FLAGS ARE SELECTED BY AN
020                          /ADDRESS SENT OUT RAM PORT 0
021
022                 /THE FOLLOWING LIST OF DEFINITIONS ARE FOR THE
023                 /TEST LINE FLAG MUX ADDRESS BITS.
024
025   000   WRTBZY=0         /TEST WRITE BUSY
026   001   ACQDON=1         /TEST ACQUISITION DONE
027   002   ENDSCN=2         /TEST END OF SCAN
028   003   TTYXMT=3         /TEST  TTY XMTTING
029   004   TTYRCV=4         /TEST FOR TTY RCVING.
030   005   PANXMT=5         /TEST FOR PAN XMTTING
031   006   PANRCV=6         /TEST FOR PAN RCVING
032   007   INITZE=7         /TEST FOR INITIALIZING
033
034                 /FUNCTIONAL INPUT PORT DEFINITIONS
035
036   000   LACPRT=RIP0      /LOW ORDER RAM OR PROM ACQUISITION DATA.
037   020   HACPRT=RIP1      /HIGH ORDER RAM OR PROM ACQUISITION DATA
038   140   LRDPRT=RIP6      /LOW ORDER DATA FROM READ PORT
039   160   HRDPRT=RIP7      /HIGH ORDER DATA FROM READ PORT
040
```

```
041             /MISCELLANEOUS DEFINITIONS FOR PROM BOMBER
042
043     240     CPUSVR=12!20    /RAM AND REG ADDRESS WHERE CPU REGS
044                             /ARE SAVED OR TO BE SAVED
045
046     214     ADDRSS=10!20 14 /EFFECTIVE ADDRESS FOR PROM BOMB
047                             /ROUTINES IS AT RAM 2 REG 0 MC 14
048                             /IS LSN OF EFFECTIVE ADDRESS.
049
050     200     PUTPRM=10!20    /PROM DATA GOES INTO RAM 2 REG 0
051     220     PUTRAM=11!20    /RAM DAT GOES INTO RAM 2 REG 1
052     200     GETPRM=10!20    /PROM DATA IS STORED IN RAM 2 REG 0
053     220     GETRAM=11!20    /RAM DATA IS STORED IN RAM 2 REG 1
054
055     230     RAMSAV=11!20 10 /UPON ACQUISITION, RAM DATA WILL BE
056                             /SAVED IN
057     001     SELRAM=1
058
059
060             SUBJOB POWER UP AND EXECUTIVE ROUTINES

001             /SOFTWARE FLAGS UPDATED BY MASTER ROUTINE
002
003     100     IFLGS0=1!100 0  /RAM 1 REG 0 MC 0
004             /
005             /
006             /
007             /
008
009     101     IFLGS1=1!100 1  /RAM 1 REG 0 MC 1
010     010     BOMB=10         /WRITE MODE
011     004     ABRT=4          /ABORT
012     002     PROG=2          /PROGRAM MODE
013     001     MNIT=1          /MONITOR MODE
014
015     102     IFLGS2=1!100 2  /RAM 1 REG 0 MC 2
016             /
017             /
018             /
019             /
020
021     103     IFLGS3=1!100 3  /RAM 1 REG 0 MC 3
022     010     LINWRT=10       /WRITE LINE
023     004     ALLWRT=4        /WRITE ALL
024             /
025             /
026             EJECT
027             / POWER UP ROUTINE
028
029             /THIS ROUTINE WILL WAIT FOR THE 294 TO INITIALIZE
030             /AND CHECK THAT WE WERE NOT IN WRITE MODE UPON
031             /POWER DOWN/UP.  IF WE WERE IN WRITE MODE THE
032             /APPROPRIATE ERROR ACTION WILL BE TAKEN, IF NOT
033             /WE WILL GO INTO MONITOR MODE.
034
035     0000    *0
036
037             /SET UP TO TEST INITIALIZE FLAG
038
039 0000 056            FIM FLGMUX,RP7  /SET UP INITIALIZE FLAG
    0001 000
040 0002 057            SRC RP7         /MUX ADDRESS
041 0003 327            LDM INITZE
042 0004 341            WMP
043 0005 031            JCN .,NOT TEST  /WAIT FOR INITIALIZE TO
    0006 005                            /GET DONE.
044
045 0007 134            JMS INOUTS      /SEE IF MODE SWITCH IS
    0010 000
046 0011 056            FIM IFLGS1,RP7  /IN WRITE POSITION.
    0012 101
```

```
047 0013 057             SRC RP7
048 0014 351             RDM
049 0015 365             RAL
050 0016 022             JCN ABRTT;CARRY
    0017 066
051
052 0020 321             LDM MNIT      /SET MONITOR MODE FLAG
053 0021 340             WRM
054 0022 100             JUN MONITR
    0023 044
055
056                /MASTER ROUTINE
057
058 0024 056       MASTER, FIM IFLGS1;RP7   /READ THE SWITCHES
    0025 101
059 0026 057             SRC RP7
060 0027 351             RDM
061 0030 365             RAL
062 0031 022             JCN PBSTRT;CARRY
    0032 070
063 0033 365             RAL
064 0034 365             RAL
065 0035 022             JCN PROGRM;CARRY
    0036 055
066 0037 365             RAL
067 0040 022             JCN MONITR;CARRY
    0041 044
068 0042 100             JUN .
    0043 042
069
070                /MONITOR MODE CONTROLLER ROUTINE
071
072 0044 056       MONITR, FIM CTRLP1;RP7   /CLEAR 284 HALT AND SELECT
    0045 060
073 0046 057             SRC RP7         /PROM AND ENABLE DMPPRM
074 0047 324             LDM SELPRM DMPPRM
075 0050 342             WRR
076
077 0051 134       COMMON, JMS INOUTS
    0052 000
078 0053 100             JUN MASTER
    0054 024
079
080                /PROGRAM MODE CONTROLLER
081
082 0055 056       PROGRM, FIM CTRLP1;RP7   /DISABLE DUMP PROM
    0056 060
083 0057 057             SRC RP7
084 0060 321             LDM SELRAM      /SELECT RAM
085 0061 342             WRR
086 0062 134             JMS INOUTS
    0063 000
087 0064 100             JUN MASTER
    0065 024
088 0066 102       ABRTT,  JUN ABORTT
    0067 235
089                SUBJOB PROM BOMBER ROUTINE
090                PAUSE

001                /PROM BOMBER ROUTINE
002
003                /THIS ROUTINE WILL OPERATE IN TWO MODES:
004
005                /1)WRITE A LINE OF DATA INTO A LINE WHICH IS
006                /  EMPTY OR INTO A LINE WHICH IS TO BE DIS-
007                /  ABLED.
008                /2)ERASE ALL OF PROM AND COPY THE USER SCRATCH
009                /  PAD RAM INTO THE PROMS.
010
011                /IN THE WRITE MODE, A "READY" FLAG (AND INDICA-
```

```
012           /TOR) WILL BE SET UNTIL EITHER THE "WRITE LINE" OR
013           /"WRITE ALL" BUTTON IS ACTUATED, AT WHICH TIME THE
014           /"READY" FLAG IS CLEARED AND THE "BUSY" FLAG IS SET.
015
016           /IN THE "WRITE LINE" MODE A LINE OF PROM DATA WILL
017           /BE WRITTEN ACCORDING TO THE FOLLOWING CONDITIONS.
018           /1)THE DATA IN THE PROM IS ZERO - THE CORRESPONDING
019           /  RAM DATA WILL BE COPIED INTO THE PROM.
020           /2)THE DATA IN THE PROM IS NOT ZERO - THE LINE
021           /   WILL BE WRITTEN IF THE LINE IS TO BE DISABLED OFF.
022           /ANY VIOLATION OF THESE TWO CONDITIONS WILL
023           /RESULT IN AN "ILLEGAL" FLAG.
024           /IF THE LINE IS NOT ABLE TO BE WRITTEN INTO, THE
025           /"ERROR" FLAGS WILL BE SET. THIS CONDITION WILL BE
026           /THE RESULT OF AN EXCESSIVE AMOUNT OF TIME BEING SPENT
027           /IN TRYING TO WRITE THE PROM.
028           /WHILE ATTEMPTING TO REWRITE THE LINE, THE PROGRAM WILL
029           /SENSE THE "ABORT" FLAG; IF THE "ABORT" FLAG IS SET, THE
030           /"BUSY" FLAG WILL BE CLEARED AND THE "READY" FLAG WILL
031           /BE SET TO GIVE THE USER ANOTHER CHANCE TO ATTEMPT A
032           /WRITE CYCLE.
033           /UPON COMPLETION OF A SUCCESSFUL "WRITE" LINE CYCLE, THE
034           /"BUSY" FLAG WILL BE CLEARED AND THE "DONE" FLAG WILL BE

035           /SET AND STAY SET UNTIL EITHER "MONITOR MODE" OR "PROG-
036           /GRAM MODE" IS ENTERED.
037
038           /IN THE "WRITE ALL" MODE, THE ENTIRE PROM WILL BE ERASED
039           /AND REWRITTEN AS A COPY OF THE RAM.
040           /IN THE ERASE CYCLE, THE UV LAMP WILL BE TURNED ON AND
041           /SENSED BY THE PROGRAM. IF THE LAMP IS DETERMINED TO
042           /BE OFF AFTER A SPECIFIED NUMBER OF SENSE CYCLES THE
043           /"ABORT" AND "ERROR" FLAGS WILL BE SET, AND THE "BUSY"
044           /FLAG WILL BE CLEARED.
045           /AFTER A SUCCESSFUL ERASE CYCLE, THE WRITE CYCLE WILL
046           /START. AN UNSUCCESSFUL WRITE WILL RESULT IN THE "ERROR"
047           /FLAGS BEING SET AND THE "BUSY" FLAG BEING CLEARED.
048           /A SUCCESSFUL WRITE CYCLE WILL CLEAR THE "BUSY" FLAG AND
049           /SET THE DONE FLAG.
050
051           /IF AT ANY TIME THE PROGRAM SENSES THE "ABORT" FLAG
052           /BEING SET, ALL WRITING AND ERASING WILL CEASE, THE
053           /"READY" FLAG WILL BE SET AND THE PROGRAM WILL
054           /IDLE UNTIL A NEW COMMAND (WRITE LINE OR WRITE ALL)
055           /IS ISSUED OR WRITE MODE IS LEFT.
056
057           SUBJOB PROM BOMBER EXECUTIVE
058

001                       /START HERE, INITIALLY SET READY FLAG
002
003  0070 056  PBSTRT, FIM OFLG0,RP7    /SET UP FLAG RAM SC0 TO BE
     0071 100
004                                    /WRITTEN INTO
005  0072 057           SRC RP7
006
007  0073 324           LDM READY       /READY FLAG IS BIT 3 OF
008  0074 344           WRO             /STATUS CHARACTER 0, TURN
009                                     /OTHER BITS OFF
010  0075 056           FIM CTRLP1,RP7  /SELECT RAM FOR WRITE MODE
     0076 060
011  0077 057           SRC RP7
012  0100 321           LDM SELRAM
013  0101 342           WRR
014
015
016           /READY FLAG IS SET, NOW DO THE UPDATING ROUTINES
017
018  0102 134  UPDATE, JMS INOUTS       /SAVE INPUTS, DISPLAY OUT,
     0103 000
019                                     /AND GET NEW INPUTS
```

```
020                             /UNPACK THE INPUTS
021                             /DISPLAY STATUS CONDITIONS
022
023             /UPDATE DONE; NOW WHAT MUST WE DO? WRITE A LINE?
024             /WRITE ALL? OR GO BACK TO MASTER'S CONTROL.
025
026  0104 056        FIM IFLGH3;RP7   /SET UP FLAG RAM POINTER
     0105 163
027  0106 057        SRC RP7
028  0107 351        RDM              /READ MC 3 FOR
029  0110 365        RAL              /WRITE FLAGS
030  0111 022        JCN .+2;CARRY/IF CARRY IS TRUE, THEN GO
     0112 113
031  0113 101        JUN WRTLIN
     0114 000
032  0115 365        RAL              /WRITE A LINE OF DATA
033                                   /WRITE ALL?
034  0116 032        JCN WRTMDQ;NOT CARRY/IF CARRY IS TRUE, THEN
     0117 122
035  0120 101        JUN ERASE        /BOMB AND REWRITE PROMS
     0121 154
036
037             /ARE WE IN THE WRITE MODE?
038
039  0122 056   WRTMDQ, FIM IFLGS1;RP7  /READ THE MODE FLAGS FROM
     0123 101
040  0124 057        SRC RP7           /RAM 1 REG 0 MC 1
041  0125 351        RDM
042  0126 365        RAL
043  0127 022        JCN UPDATE;CARRY/CARRY=1 SAYS OPERATOR
     0130 102
044                                   /HASN'T DECIDED YET WHETHER TO
045                                   /WRITE ALL OR TO WRITE LINE
046                                   /-TRY AGAIN.
047
048             /IF WE GOT HERE WE'RE ALL DONE - RETURN TO MASTER'S
049             /CONTROL, AND CLEAR ALL SOFTWARE FLAGS PERTIN-
050             /ENT TO THE FROM BOMBER ROUTINE
051
052  0131 320        LDM 0             /CLEAR THE FOLLOWING FLAGS:
053                                    /WRITE MODE NFG, READY, OVER-
054                                    /KILL MODE, WRITE LINE MODE
055                                    /DONE, BUSY, ILLEGAL, AND
056                                    /ERROR.
057  0132 056        FIM OFLG0;RP7
     0133 100
058  0134 057        SRC RP7
059  0135 344        WR0
060  0136 345        WR1
061  0137 346        WR2
062  0140 347        WR3
063  0141 100        JUN MASTER        /GO BACK TO MAIN CONTROLLER
     0142 024
064
065             SUBJOB WRITE LINE ROUTINE - PRELIMINARIES
066             EJECT
067       0400  *400
068             /IF WE GET HERE, WE ARE SUPPOSED TO WRITE A LINE OF
069             /DATA
070
071  0400 056   WRTLIN, FIM OFLG1;RP7   /CHECK TO SEE THAT THE LINE TO
     0401 120
072  0402 057        SRC RP7           /BE WRITTEN IS VALID. IF NOT,
073  0403 355        RD1               /THEN SET THE ILLEGAL FLAG
074  0404 365        RAL               /AND GET ANOTHER UPDATE.
075  0405 022        JCN BADLIN;CARRY
     0406 102
076
077             /NOW TO CHECK IF WE HAVE AN UNPROGRAMMABLE LINE
078
079  0407 356        RD2               /FLAG IS IN SC2 OF RAM 1
080  0410 365        RAL               /REG 1
081  0411 365        RAL
082  0412 022        JCN BADLIN;CARRY
     0413 102
```

```
083
084 0414 056           FIM OFLG0,RP7    /LINE IS VALID, CLEAR THE
    0415 100
085 0416 057           SRC RP7          /READY FLAG AND SET THE
086 0417 320           LDM 0            /BUSY FLAG.
087 0420 344           WRO
088 0421 324           LDM BUSY
089 0422 347           WR3
090                /GET AND SAVE THE RAM/PROM ADDRESS
091                /GET IT FROM RAM 0 REG 3 MC4->6
092                /PUT IT IN RAM 0 REG 3 MC 13->15
093
094 0423 056           FIM 3!20 4,RP7/SET RP6 RP7 AS POINTER IN
    0424 064
095 0425 054           FIM 3!20 13,RP6/THIS MOVE
    0426 073
096 0427 335           LDM 20-3         /SET LOP COUNT
097 0430 261           XCH R1
098 0431 057   MOV3B,  SRC RP7
099 0432 351           RDM
100 0433 055           SRC RP6
101 0434 340           WRM
102 0435 157           INC R17
103 0436 155           INC R15
104 0437 161           ISZ MOV3B,R1
    0440 031
105
106 0441 134           JMS INOUTS       /DO DISPLAY ROUTINE TO
    0442 000
107                                     /INDICATE WE ARE BUSY
108                                     /GET INPUTS
109
110 0443 124           JMS ABORTQ       /CHECK FO R ABORT
    0444 047
111                                     /ABORT FLAG IS IN RAM 1 REG 3
112                                     /PUT ABORT FLAG IN CARRY AND GO
113                                     /TO PBSTRT IF CARRY IS TRUE
114
115
116                /NOW IT'S TIME TO GET THE RAM AND PROM DATA
117                /FOR PROPER PROCESSING - FIRST GET PROM DATA AND
118                /PUT IT IN RAM 2 REG 0
119
120                /NOW GET THE PROM DATA
121
122 0445 125           JMS SETACP
    0446 031
123 0447 361           CLC              /GET A LINE'S WORTH OF DATA
124 0450 124           JMS REDPRM
    0451 077
125
126                /NOW GET THE RAM DATA
127
128 0452 125           JMS SETACR       /SET UP RP6 TO TUCK DATA
    0453 035
129                                     /INTO RAM 2 REG 1
130 0454 361           CLC
131 0455 125           JMS ACQRAM       /GET THE RAM DATA
    0456 166
132
133                /THIS IS THE POINT OF NO RETURN : IF EVERY THING
134                /IS LEGAL, THE LINE OF DATA WILL BE WRITTEN.
135                /SO - IS EVERYTHING LEGAL? I.E., CHECK FOR PROM
136                /DATA=0 (PROM DATA IS IN RAM 2 REG 0)
137
138 0457 332           LDM 20-6         /SET 0 CHECK COMPLETION
139 0460 262           XCH R2           /COUNTER. (12 NIBBLES)
140 0461 054           FIM GETPRM,RP6   /SET UP RP7 TO POINT TO
    0462 200
141 0463 125   SFSG6,  JMS ZEROQ        /LSN OF RAM 2 REG 0
    0464 130
142 0465 022           JCN DISABQ,CARRY
    0466 113
143 0467 162           ISZ SFSG6,R2
    0470 063
144
145 0471 056           FIM OFLG0,RP7    /SET WRITE LINE MODE
```

```
         0472 100
146 0473 057           SRC RP7  /FLAG
147 0474 330           LDM LNWRT
148 0475 346           WR2
149 0476 332           LDM 20-6            /SET WRITE LINE COMPLETION
150 0477 263           XCH R3              /COUNTER
151 0500 102           JUN NEXTAD          /WRITE THE LINE.
    0501 000
152
153 0502 056   BADLIN, FIM OFLGO;RP7  /LINE IS ILLEGAL, SET ILLEGAL
    0503 100
154 0504 057           SRC RP7             /FLAG AND CLEAR BUSY FLAG
155 0505 320           LDM 0
156 0506 344           WR0
157 0507 322           LDM ILLEGL
158 0510 347           WR3
159 0511 100           JUN UPDATE
    0512 102
160
161
162                    /IF WE GET HERE, PROM DATA IS NOT ZERO; SO IS THE LINE
163                    /TO BE DISABLED OFF?
164
165 0513 056   DISABL, FIM GETRAM 2;RP7/GET X1 INTO CARRY
    0514 222
166 0515 057           SRC RP7
167 0516 351           RDM
168 0517 365           RAL
169 0520 022           JCN XOIS1;CARRY
    0521 143
170 0522 372           STC                 /X1 IS A ZERO - MAKE IT A
171 0523 366           RAR                 /ONE AND PUT IT BACK
172 0524 340           WRM
173 0525 056           FIM GETRAM 11;RP7   /NOW SEE IF X2=0
    0526 231
174 0527 057           SRC RP7
175 0530 351           RDM
176 0531 365           RAL
177 0532 365           RAL
178 0533 022           JCN BADLIN;CARRY
    0534 102
179 0535 372           STC                 /LINE IS TO BE DISABLED
180 0536 366           RAR                 /OFF - FIX X2 AND WRITE
181 0537 366           RAR                 /THE LINE
182 0540 340           WRM
183 0541 102           JUN NEXTAD          /WRITE THE BASTARD
    0542 000
184
185 0543 056   XOIS1,  FIM GETRAM 11;RP7/SEE IF X2 IS A 1
    0544 231
186 0545 057           SRC RP7
187 0546 365           RAL
188 0547 365           RAL
189 0550 032           JCN BADLIN;NOT CARRY
    0551 102
190 0552 102           JUN NEXTAD          /GO WRITE THE LINE
    0553 000
191
192                    SUBJOB PROM BOMBER ERASE ROUTINE
193

001                    /IF WE GET HERE WE WILL WRITE THE ENTIRE FOUR
002                    /PROMS
003
004 0554 056   ERASE,  FIM OFLGO;RP7/CLR READY AND SET BUSY
    0555 100
005 0556 057           SRC RP7
006 0557 320           LDM 0
007 0560 344           WRO
008 0561 324           LDM BUSY
009 0562 347           WR3
```

```
010
011              /ERASE ROUTINE - TURN ON "LAMP ON" SIGNAL AND HIT
012              /THE START ERASE BIT FOR .5 SEC.
013
014  0563 056    OVON,   FIM CTRLP3,RP7   /SET PORT POINTER
     0564 240
015  0565 057            SRC RP7
016  0566 323            LDM ERSEON STRTER
017  0567 342            WRR              /TURN ON LAMP
018
019              /NOW ENTER 1 SEC DELAY BEFORE SHUTTING OFF ERASE START
020
021  0570 320            LDM 0    /DO ABORT CHECKING WHILE WAITING.
022  0571 260            XCH R0
023  0572 124    WAIT1,  JMS SAVRGS       /SAVE CPU REGS
     0573 211
024  0574 134            JMS INOUTS
     0575 000
025  0576 124            JMS ABORTQ
     0577 047
026  0600 124            JMS RSTRGS
     0601 321
027  0602 160            ISZ WAIT1,R0
     0603 172
028
029              /LAMP IS ON - NOW READ THE PROMS LOOKING FOR ZEROS
030
031  0604 056            FIM CTRLP3,RP7
     0605 240
032  0606 057            SRC RP7
033  0607 321            LDM ERSEON       /SHUT OFF START LAMP BIT
034  0610 342            WRR
035
036              /NOW TEST THAT LAMP IS ON BUT WAIT .5 SEC
037              /BEFORE DOING SO.
038
039  0611 320            LDM 0
040  0612 260            XCH R0
041  0613 124    WAIT3,  JMS SAVRGS
     0614 211
042  0615 134            JMS INOUTS
     0616 000
043  0617 124            JMS ABORTQ
     0620 047
044  0621 124            JMS RSTRGS
     0622 321
045  0623 160            ISZ WAIT3,R0
     0624 213
046  0625 331            LDM 20-7
047  0626 267            XCH R7
048  0627 320            LDM 0    /SET ERASE ROTN LOOPCOUNT
049  0630 266            XCH R6
050
051  0631 056            FIM RIP14,RP7
     0632 300
052  0633 057            SRC RP7
053  0634 352            RDR
054  0635 366            RAR
055  0636 022            JCN ZTADDR,CARRY
     0637 263
056
057              /LAMP IS NOT ON TRY AGAIN
058
059  0640 056            FIM CTRLP3,RP7
     0641 240
060  0642 057            SRC RP7
061  0643 320            LDM 0
062  0644 342            WRR
063  0645 320            LDM 0
064  0646 260            XCH R0
065  0647 124    WAIT2,  JMS SAVRGS
     0650 211
066  0651 134            JMS INOUTS
     0652 000
067  0653 124            JMS ABORTQ
     0654 047
```

| | | | | |
|---|---|---|---|---|
| 068 | 0655 | 124 | | JMS RSTRGS |
| | 0656 | 321 | | |
| 069 | 0657 | 160 | | ISZ WAIT2,R0 |
| | 0660 | 247 | | |
| 070 | 0661 | 101 | | JUN UVON |
| | 0662 | 163 | | |

071
072

| 073 | 0663 | 056 | ZTADDR, | FIM ADDRSS,RP7 | /CLR THE ADDRESS REGISTER IN |
|---|---|---|---|---|---|
| | 0664 | 214 | | | |
| 074 | 0665 | 335 | | LDM 20-3 | /RAM |
| 075 | 0666 | 260 | | XCH R0 | |
| 076 | 0667 | 320 | | LDM 0 | |
| 077 | 0670 | 057 | CLRADR, | SRC RP7 | |
| 078 | 0671 | 340 | | WRM | |
| 079 | 0672 | 157 | | INC R17 | |
| 080 | 0673 | 160 | | ISZ CLRADR,R0 | |
| | 0674 | 270 | | | |

081

| 082 | 0675 | 334 | SFSG, | LDM 20-4 | |
|---|---|---|---|---|---|
| 083 | 0676 | 260 | | XCH R0 | /SET LOOP COUNTER |
| 084 | 0677 | 125 | SFSG1, | JMS SETACP | /SET UP FOR PROM ACQUISITION |
| | 0700 | 031 | | | |
| 085 | 0701 | 124 | | JMS REDPRM | /GET PRMDAT |
| | 0702 | 077 | | | |
| 086 | 0703 | 054 | | FIM GETPRM,RP6 | |
| | 0704 | 200 | | | |
| 087 | 0705 | 125 | | JMS ZEROQ | /SEE IF DATA IS ZERO |
| | 0706 | 130 | | | |
| 088 | 0707 | 022 | | JCN ZTADDR,CARRY | |
| | 0710 | 263 | | | |
| 089 | 0711 | 124 | | JMS SAVRGS | /SAVE CPU REGISTERS |
| | 0712 | 211 | | | |
| 090 | 0713 | 134 | | JMS INOUTS | /GET INPUTS, SEND OUTPUTS |
| | 0714 | 000 | | | |
| 091 | 0715 | 124 | | JMS ABORTQ | /ABORT? |
| | 0716 | 047 | | | |
| 092 | 0717 | 124 | | JMS RSTRGS | /RESTORE CPU REGS. |
| | 0720 | 321 | | | |

093
094
095  /NOW INCREMENT ADDRESS REG AND CHECK NEXT FROM WORD
096  /FOR ZERO, ALSO TEST FOR COMPLETION
097

| 098 | 0721 | 125 | | JMS INCRCS | /PREPARE TO READ FROM NEXT |
|---|---|---|---|---|---|
| | 0722 | 070 | | | |
| 099 | | | | | /PROM |
| 100 | 0723 | 160 | | ISZ SFSG1,R0 | |
| | 0724 | 277 | | | |
| 101 | 0725 | 125 | | JMS TSTDN1 | /INCREMENT ADDRESS AND |
| | 0726 | 146 | | | |
| 102 | 0727 | 024 | | JCN SFSG, ZERO | /CHECK FOR ADDRESS=0 |
| | 0730 | 275 | | | |
| 103 | 0731 | 166 | | ISZ ZTADDR,R6 | |
| | 0732 | 263 | | | |
| 104 | 0733 | 167 | | ISZ ZTADDR,R7 | |
| | 0734 | 263 | | | |

105
106  /ALL PROMS HAVE BEEN SUCCESSFULLY ERASED -
107  /SHUT LAMP OFF
108

| 109 | 0735 | 056 | | FIM CTRLP3,RP7 | |
|---|---|---|---|---|---|
| | 0736 | 240 | | | |
| 110 | 0737 | 057 | | SRC RP7 | |
| 111 | 0740 | 320 | | LDM 0 | |
| 112 | 0741 | 342 | | WRR | |

113
114  /NOW WRITE THE BASTARDS
115

| 116 | 0742 | 056 | | FIM OFLG0,RP7 | /CLEAR WRITE LINE FLAG |
|---|---|---|---|---|---|
| | 0743 | 100 | | | |
| 117 | 0744 | 057 | | SRC RP7 | |
| 118 | 0745 | 320 | | LDM 0 | |
| 119 | 0746 | 346 | | WR2 | |
| 120 | 0747 | 102 | | JUN NEXTAD | |
| | 0750 | 000 | | | |

| 121 | | | | |
|---|---|---|---|---|
| 122 | | SUBJOB PROM BOMBER MAIN WRITING ROUTINE | | |

| | | | | |
|---|---|---|---|---|
| 001 | | | /PROMS HAVE BEEN ERASED SUCCESSFULLY - NOW DO WRITE. | |
| 002 | | | | |
| 003 | | | /CLEAR THE WRITE COUNTER | |
| 004 | | 1000 | *1000 | |
| 005 | 1000 | 046 | NEXTAD, FIM 0,RP3 | /CLEAR WRITE COUNT |
| | 1001 | 000 | | |
| 006 | 1002 | 052 | FIM OFLGO,RP5 | /CLEAR OVERKILL MODE FLAG |
| | 1003 | 100 | | |
| 007 | 1004 | 053 | SRC RP5 | |
| 008 | 1005 | 320 | LDM 0 | |
| 009 | 1006 | 345 | WR1 | |
| 010 | 1007 | 044 | SFSG5, FIM RAMSAV,RP2 | |
| | 1010 | 230 | | |
| 011 | 1011 | 334 | LDM 20-4 | /SET COMPLETION COUNTER |
| 012 | 1012 | 260 | XCH R0 | |
| 013 | 1013 | 125 | NXTPRM, JMS SETACR | /SET UP FOR RAM ACQUISITION |
| | 1014 | 035 | | |
| 014 | 1015 | 125 | JMS ACQRAM | |
| | 1016 | 166 | | |
| 015 | 1017 | 336 | LDM 20-2 | /SAVE THE ACQUIRED RAM WORD |
| 016 | 1020 | 261 | XCH R1 | |
| 017 | 1021 | 052 | FIM GETRAM,RP5 | |
| | 1022 | 220 | | |
| 018 | 1023 | 053 | SAVAGN, SRC RP5 | |
| 019 | 1024 | 351 | RDM | |
| 020 | 1025 | 045 | SRC RP2 | |
| 021 | 1026 | 340 | WRM | |
| 022 | 1027 | 153 | INC R13 | |
| 023 | 1030 | 145 | INC R5 | |
| 024 | 1031 | 161 | ISZ SAVAGN,R1 | |
| | 1032 | 023 | | |
| 025 | 1033 | 123 | JMS SNDDAT | /SEND THE DATA |
| | 1034 | 062 | | |
| 026 | 1035 | 124 | JMS WRITE | /WRITE THE DATA INTO THE PROM |
| | 1036 | 150 | | |
| 027 | 1037 | 124 | JMS SAVRGS | /SAVE CPU REGS. |
| | 1040 | 211 | | |
| 028 | 1041 | 134 | JMS INOUTS | /GET INPUTS AND SEND OUTPUTS |
| | 1042 | 000 | | |
| 029 | 1043 | 124 | JMS ABORTQ | /ABORT? |
| | 1044 | 047 | | |
| 030 | 1045 | 124 | JMS RSTRGS | /RESTORE CPU REGS |
| | 1046 | 321 | | |
| 031 | | | | |
| 032 | 1047 | 125 | JMS INCRCS | /INCREMENT CHIP SELECT PORTION |
| | 1050 | 070 | | |
| 033 | | | | /OF ADDRESS REG. |
| 034 | 1051 | 160 | ISZ NXTPRM,R0 | /TEST FOR LOOP COMPLETION |
| | 1052 | 013 | | |
| 035 | 1053 | 125 | JMS OVKILQ | /ARE WE IN OVERKILL MODE? |
| | 1054 | 122 | | |
| 036 | 1055 | 022 | JCN DNKLMQ,CARRY | |
| | 1056 | 174 | | |
| 037 | | | | |
| 038 | | | /NOW IT'S TIME TO GET AND VERIFY THE PROM DATA. | |
| 039 | | | | |
| 040 | 1057 | 044 | LSTVER, FIM RAMSAV,RP2 | |
| | 1060 | 230 | | |
| 041 | 1061 | 334 | LDM 20-4 | /SET LOOP COUNTER |
| 042 | 1062 | 260 | XCH R0 | |
| 043 | 1063 | 125 | NXTGET, JMS SETACP | /SET UP FOR PROM ACQUISITION |
| | 1064 | 031 | | |
| 044 | 1065 | 124 | JMS REDPRM | |
| | 1066 | 077 | | |
| 045 | 1067 | 336 | LDM 20-2 | /REESTORE THE PROPER RAM WORD |
| 046 | 1070 | 261 | XCH R1 | /TO RAM 2 REG 0 MC 0,1 |
| 047 | 1071 | 052 | FIM PUTRAM,RP5 | |
| | 1072 | 220 | | |
| 048 | 1073 | 045 | RSTRAM, SRC RP2 | |
| 049 | 1074 | 351 | RDM | |

```
050 1075 053            SRC RP5
051 1076 340            WRM
052 1077 153            INC R13
053 1100 145            INC R5
054 1101 161            ISZ RSTRAM;R1
    1102 073
055
056 1103 056            FIM GETFRM;RP7   /SET UP FOR VERIFY
    1104 200
057 1105 054            FIM GETRAM;RP6
    1106 220
058 1107 124            JMS VERIFY       /CARRY TRUE = DATA IS GOOD
    1110 167
059 1111 032            JCN INCWRT;NOT CARRY
    1112 162
060
061                     /GOOD SO FAR; NOW CHECK NEXT PROM AND TEST FOR
062                     /COMPLETION
063
064 1113 125            JMS INCRCS       /NEXT PROM
    1114 070
065 1115 160            ISZ NXTGET;RO
    1116 063
066
067                     /IF WE GET HERE THE WRITE WAS GOOD. SO NOW DO OVER-
068                     /KILL, IF WE ARE NOT ALREADY IN OVERKILLMODE.
069
070 1117 125            JMS OVKILQ       /ARE WE IN OVERKILL MODE?
    1120 122
071 1121 022            JCN SFSG4;CARRY  /CARRY=1->YES
    1122 134
072 1123 052            FIM OFLGO;RP5    /GO INTO OVERKILL MODE
    1124 100
073 1125 053            SRC RP5          /SET OVERKILL MODE FLAG
074 1126 330            LDM OVRKIL
075 1127 345            WR1
076
077 1130 125            JMS CMPWRT       /COMPLEMENT WRITE COUNT
    1131 053
078 1132 102            JUN SFSG5        /SAVE IT AND SET X4 COUNTER
    1133 007
079
080                     /THAT TAKES CARE OF THIS WORD FOR ALL PROMS; NOW
081                     /GET READY FOR NEXT WORD AND CHECK FOR LOOP
082                     /COMPLETION.
083
084 1134 056    SFSG4,  FIM OFLGO;RP7    /TEST IF WE ARE IN THE WRITE LINE
    1135 100
085 1136 057            SRC RP7          /MODE
086 1137 356            RD2              /CARRY TRUE=YES
087 1140 365            RAL
088 1141 022            JCN LNDNQ;CARRY
    1142 212
089 1143 125            JMS TSTDN1       /TEST COMPLETION OF WRITE
    1144 146
090 1145 024            JCN NEXTAD;ZERO  /ALL MODE
    1146 000
091 1147 056    FINIS,  FIM OFLGO;RP7    /WE ARE DONE!
    1150 100
092 1151 057            SRC RP7          /SET AND CLEAR APPROPRIATE
093 1152 330            LDM DONE         /FLAGS
094 1153 347            WR3
095 1154 320            LDM 0
096 1155 344            WR0
097 1156 345            WR1
098 1157 346            WR2
099 1160 100            JUN UPDATE
    1161 102
100
101
```

```
001            /IF WE GET HERE WE HAD A BAD WRITE SO INCREMENT
002            /WRITE COUNT AND TRY AGAIN IF WE ARE NOT IN OVERKILL
003            /MODE
004
005 1162 125   INCWRT, JMS OVKILQ        /ARE WE IN OVERKILL MODE?
    1163 122
006 1164 022           JCN ABRT1;CARRY/CARRY=1->YES->BAD WRITE
    1165 172
007                                      /SO ABORT
008 1166 125           JMS WRTCNT        /INCREMENT WRITE COUNTER
    1167 022
009 1170 032           JCN SFSG5;NOT CARRY/TOO MANY WRITES?
    1171 007
010 1172 102   ABRT1,  JUN ABORTT        /NO; CONTINUE
    1173 235
011
012            /IF WE GET HERE WE ARE IN OVERKILL MODE AND WANT
013            /TO TEST FOR COMPLETION
014
015 1174 125   DNKLMQ, JMS WRTCNT        /INCREMENT WRITE COUNT
    1175 022
016 1176 032           JCN SFSG5;NOT CARRY/TEST FOR COMPLETION OF
    1177 007
017                                      /BASIC WRITES
018 1200 162           ISZ RSTWRT;R2     /TEST FOR COMPLETION OF X4
    1201 204
019                                      /LOOP
020 1202 102           JUN LSTVER        /SEE IF DATA IS STILL GOOD
    1203 057
021 1204 250   RSTWRT, LD R10            /PUT COMPLEMENTED WRITE
022 1205 266           XCH R6            /COUNTBACK INTO WRITE
023 1206 251           LD R11            /COUNTER
024 1207 267           XCH R7
025 1210 102           JUN SFSG5
    1211 007
026
027            /IF WE GET HERE WE ARE IN WRITE LINE MODE
028            /INCREMENT ADDRESS AND TEST FOR COMPLETION
029
030 1212 056   LNDNQ,  FIM ADDRSS;RP7
    1213 214
031 1214 057           SRC RP7
032 1215 351           RDM
033 1216 362           IAC
034 1217 340           WRM
035 1220 022           JCN ADCAR;CARRY
    1221 226
036 1222 163   TSTDN2, ISZ NEXTAD;R3
    1223 000
037 1224 102           JUN FINIS
    1225 147
038 1226 157   ADCAR,  INC R17
039 1227 057           SRC RP7
040 1230 367           TCC
041 1231 353           ADM
042 1232 340           WRM
043 1233 102           JUN TSTDN2
    1234 222
044
045            /ABORT ROUTINE
046
047 1235 056   ABORTT, FIM OFLGO;RP7
    1236 100
048 1237 057           SRC RP7
049 1240 330           LDM WRTNFG
050 1241 344           WR0
051 1242 321           LDM ERROR
052 1243 347           WR3
053 1244 100           JUN UPDATE
    1245 102
054
055            SUBJOB
056            PAUSE
```

```
001     2000                *2000
002
003                 /ASSORTED THIRD (LAST) LEVEL SUBROUTINES
004
005                 /SUBROUTINE FOR SENSING ADDRESS TO ADDRESS REGISTER
006                 /ADDRESS IS STORED IN THREE NIBBLES IN RAM POINTED TO
007                 /BY RP7. ROM PORTS 0,1, AND 2 ARE THE ADDRESS REGISTER
008                 /PORTS (PORT 0 -> LSN OF ADDRESS)
009
010  2000 335       SNDADR, LDM 20-3         /SET LOOP COUNTER
011  2001 261               XCH R1
012  2002 052               FIM ARLPRT,RP5   /SET PORT POINTER
     2003 000
013  2004 057       ADRAGN, SRC RP7
014  2005 351               RDM              /READ THE ADDRESS NIBBLE
015  2006 053               SRC RP5
016  2007 342               WRR              /SEND THE ADDRESS NIBBLE
017  2010 157               INC R17          /INCREMENT POINTERS
018  2011 152               INC R12
019  2012 161               ISZ ADRAGN,R1    /TEST FOR COMPLETION
     2013 004
020  2014 300               BBL 0
021  2015 052       ACQIRE, FIM CTRLP2,RP5   /HIT START ACQUISITION PULSE
     2016 100
022  2017 053               SRC RP5
023  2020 330               LDM STRTAC
024  2021 342               WRR
025  2022 052               FIM FLGMUX,RP5   /SEE IF ACQUISITION IS DONE
     2023 000
026  2024 053               SRC RP5
027  2025 321               LDM ACQDON
028  2026 341               WMP
029  2027 031               JCN .,NOT TEST
     2030 027
030  2031 300               BBL 0
031                 /SUBROUTINE FOR READING FROM A PREVIOUSLY SELECTED MEM-
032                 /ORY DEVICE AT A PREVIOUSLY SELECTED ADDRESS. RP6 WILL
033                 /POINT TO WHERE THE EIGHT DATA BITS ARE TO BE STORED.
034                 /RP5 WILL BE USED AS A ROM INPUT PORT POINTER.
035
036  2032 336       REDDAT, LDM 20-2
037  2033 261               XCH R1
038  2034 052               FIM RIPO,RP5     /SET ROM INPUT PORT POINTER
     2035 000
039  2036 053       REDCON, SRC RP5
040  2037 352               RDR              /GET THE DATA
041  2040 055               SRC RP6
042  2041 340               WRM              /STORE IT
043  2042 152               INC R12          /INCREMENT POINTERS
044  2043 155               INC R15
045  2044 161               ISZ REDCON,R1    /TEST FOR COMPLETION
     2045 036
046  2046 300               BBL 0
047
048
049                 /SUBROUTINE FOR LOOKING AT ABORT FLAG
050
051  2047 056       ABORTQ, FIM IFLGH1,RP7   /SET RAM POINTER
     2050 161
052  2051 057               SRC RP7
053  2052 351               RDM              /PUT ABORT FLAG IN CARRY
054  2053 365               RAL              /AND RETURN
055  2054 365               RAL
056  2055 032               JCN RTURN,NOT CARRY
     2056 061
057  2057 102               JUN ABORTT
     2060 235
058  2061 300       RTURN,  BBL 0
059
060
061                 /SUBROUTINE FOR FILLING UP DATA REGISTER WITH DATA
062                 /TO BE WRITTEN INTO THE SELECTED MEMORY DEVICE
063
064  2062 337       SNDDAT, LDM 20-1         /P6 POINTS TO DATA
065  2063 261               XCH R1           /GET THE LSN OF DATA
```

```
066 2064 052            FIM LDTPRT,RP5  /SET RAM PORT 2 FOR THE LSN
    2065 200
067 2066 055    SND2,   SRC RP6 /PF DATA
068 2067 351            RDM             /GET THE MSN OF DATA
069 2070 053            SRC RP5
070 2071 341            WMP
071 2072 155            INC R15         /SEND THE MSN OF DATA OUT
072 2073 152            INC R12         /ROM PORT 03
073 2074 161            ISZ SND2,R1
    2075 066
074 2076 300            BBL 0
075
076             /SUBROUTINE TO READ A WORD OR LINE OF PROM DATA
077             /RP7 POINTS TO ADDRESS
078             /RP6 POINTS TO WHERE DATA WILL BE STORED
079
080 2077 124    REDPRM, JMS SAVRGS
    2100 211
081 2101 022            JCN WORD1,CARRY
    2102 107
082 2103 332            LDM 20-6
083 2104 260            XCH R0
084 2105 104            JUN READ
    2106 111
085 2107 337    WORD1,  LDM 20-1
086 2110 260            XCH R0
087 2111 124    READ,   JMS SNDADR
    2112 000
088 2113 336            LDM 20-2        /SET THE LOOP COUNTER
089 2114 261            XCH R1
090 2115 052            FIM LRDPRT,RP5  /SET UP TO READ PROM
    2116 140
091 2117 053    CONRED, SRC RP5 /DATA
092 2120 352            RDR
093 2121 055            SRC RP6
094 2122 340            WRM             /STORE THE DATA
095 2123 152            INC R12
096 2124 155            INC R15
097 2125 161            ISZ CONRED,R1
    2126 117
098 2127 160            ISZ INCR2,R0
    2130 134
099 2131 124            JMS RSTRGS
    2132 321
100 2133 300            BBL 0
101 2134 124    INCR2,  JMS INCR
    2135 140
102 2136 104            JUN CONRED
    2137 117
103 2140 052    INCR,   FIM CTRLP2,RP5
    2141 100
104 2142 053            SRC RP5
105 2143 321            LDM INCRAD
106 2144 342            WRR
107 2145 320            LDM 0
108 2146 342            WRR
109 2147 300            BBL 0
110

001             /SUBROUTINE TO START WRITE CYCLE
002
003 2150 052    WRITE,  FIM CTRLP2,RP5  /RP5 POINTS TO ROM PORT 11
    2151 100
004 2152 053            SRC RP5         /WHERE START WRITE PULSE
005 2153 322            LDM STRTWR      /IS SENSED
006 2154 342            WRR
007 2155 320            LDM 0
008 2156 342            WRR
009 2157 052            FIM FLGMUX,RP5  /TEST WRITE DONE
    2160 000
010 2161 053            SRC RP5
011 2162 320            LDM WRTBZY
```

```
012 2163 341                WMP
013 2164 031                JCN ,;NOT TEST
    2165 164
014 2166 300                BBL 0
015
016             /SUBROUTINE TO VERIFY THAT DATA WRITTEN INTO THE
017             /PROM IS CORRECT. IF DATA COMPARES CARRY WILL BE SET;
018             /IF NOT CARRY WILL BE CLEARED.
019             /RAM DATA IS IN RAM 2 REG 1; POINTED TO BY RP6
020             /PROM DATA IS IN RAM 2 REG 0; POINTED TO BY RP7
021
022 2167 336   VERIFY, LDM 20-2      /SET COMPLETION COUNTER
023 2170 261           XCH R1
024 2171 361   CONVER, CLC           /CLEAR THE NASTY CARRY
025 2172 057           SRC RP7       /READ THE PROM NIBBLE
026 2173 351           RDM
027 2174 055           SRC RP6       /SUBTRACT THE RAM NIBBLE
028 2175 350           SBM
029 2176 034           JCN NOVER;NOT ZERO    /CHECK FOR ZERO ACC
    2177 207
030 2200 032           JCN NOVER;NOT CARRY   /CHECK FOR ZERO CARRY
    2201 207
031 2202 155           INC R15       /INCREMENT NIBBLE POINTERS
032 2203 157           INC R17
033 2204 161           ISZ CONVER;R1  /TEST FOR COMPLETION
    2205 171
034 2206 300           BBL 0
035 2207 361   NOVER,  CLC           /NO COMPARE; CLR CARRY
036 2210 300           BBL 0
037
038            /SUBROUTINE TO SAVE CPU REGS R0->R15
039            /RP5 IS USED AS A POINTER TO RAM 2 REG 2
040            /R0->LSN
041
042 2211 052   SAVRGS, FIM CPUSVR;RP5
    2212 240
043 2213 053           SRC RP5 /SAVED REGS:
044 2214 240           LD R0         /R0
045 2215 340           WRM           /R6
046 2216 153           INC R13       /R7
047 2217 053           SRC RP5       /R10
048 2220 246           LD R6         /R11
049 2221 340           WRM           /R4
050 2222 153           INC R13       /R5
051 2223 053           SRC RP5       /R14
052 2224 247           LD R7         /R15
053 2225 340           WRM           /R16
054 2226 153           INC R13       /R17
055 2227 053           SRC RP5       /R2
056 2230 250           LD R10        /R3
057 2231 340           WRM
058 2232 153           INC R13
059 2233 053           SRC RP5
060 2234 251           LD R11
061 2235 340           WRM
062 2236 153           INC R13
063
064 2237 053           SRC RP5
065 2240 244           LD R4
066 2241 340           WRM
067 2242 153           INC R13
068 2243 053           SRC RP5
069 2244 245           LD R5
070 2245 340           WRM
071 2246 153           INC R13
072 2247 053           SRC RP5
073 2250 254           LD R14
074 2251 340           WRM
075 2252 153           INC R13
076 2253 053           SRC RP5
077 2254 255           LD R15
078 2255 340           WRM
079 2256 153           INC R13
080 2257 053           SRC RP5
081 2260 256           LD R16
```

```
082 2261 340          WRM
083 2262 153          INC R13
084 2263 053          SRC RP5
085 2264 257          LD R17
086 2265 340          WRM
087 2266 153          INC R13
088 2267 053          SRC RP5
089 2270 242          LD R2
090 2271 340          WRM
091 2272 153          INC R13
092 2273 053          SRC RP5
093 2274 243          LD R3
094 2275 340          WRM
095 2276 300          BBL 0
096
097                   /RAM WRITING SUBROUTINE
098                   /WRITES A LINE OF DATA >RAM
099                   /LSN OF ADDRESS POINTED TO BY RP7
100                   /LSN OF DATA TO BE WRITTEN POINTED TO BY RP6
101
102 2277 124  RAMWRT, JMS SNDADR      /SEND THE BASE ADDRESS
    2300 000
103 2301 332          LDM 20-6
104 2302 260          XCH R0    /SET THE LOOP COUNTER
105 2303 124  RAM1A,  JMS SNDDAT      /SEND THE DATA
    2304 062
106 2305 052          FIM CTRLP1,RP5  /SEND WRITE AND SELECT RAM
    2306 060
107 2307 053          SRC RP5
108 2310 331          LDM SELRAM WRTRAM
109 2311 342          WRR
110 2312 124          JMS ACQIRE
    2313 015
111 2314 124          JMS INCR        /INCREMENT THE ADDRESS
    2315 140
112 2316 160          ISZ RAM1A,R0
    2317 303
113 2320 300          BBL 0

001                   /SUBROUTINE TO RESTORE SAVED CPU REGISTERS
002                   /RP7 POINTS TO RAM 2 REG 2 WHERE REGS ARE SAVED
003
004 2321 052  RSTRGS, FIM CPUSVR,RP5  /SET UP RP5 AS RAM POINTER
    2322 240
005 2323 053          SRC RP5
006 2324 351          RDM
007 2325 260          XCH R0
008 2326 153          INC R13
009 2327 053          SRC RP5
010 2330 351          RDM
011 2331 266          XCH R6
012 2332 153          INC R13
013 2333 053          SRC RP5
014 2334 351          RDM
015 2335 267          XCH R7
016 2336 153          INC R13
017 2337 053          SRC RP5
018 2340 351          RDM
019 2341 270          XCH R10
020 2342 153          INC R13
021 2343 053          SRC RP5
022 2344 351          RDM
023 2345 271          XCH R11
024 2346 153          INC R13
025 2347 053          SRC RP5
026 2350 351          RDM
027 2351 264          XCH R4
028 2352 153          INC R13
029 2353 053          SRC RP5
030 2354 351          RDM
```

```
031 2355 265           XCH R5
032 2356 153           INC R13
033 2357 053           SRC RP5
034 2360 351           RDM
035 2361 274           XCH R14
036 2362 153           INC R13
037 2363 053           SRC RP5
038 2364 351           RDM
039 2365 275           XCH R15
040 2366 153           INC R13
041 2367 053           SRC RP5
042 2370 351           RDM
043 2371 276           XCH R16
044 2372 153           INC R13
045 2373 053           SRC RP5
046 2374 351           RDM
047 2375 277           XCH R17
048 2376 153           INC R13
049 2377 053           SRC RP5
050 2400 351           RDM
051 2401 262           XCH R2
052 2402 153           INC R13
053 2403 053           SRC RP5
054 2404 351           RDM
055 2405 263           XCH R3
056 2406 300           BBL 0
057
058            /SUBROUTINE FOR A 10 MILLISEC DELAY.
059
060 2407 056   DELAY,  FIM 0,RP7      /USES 3 REGS FOR 512
    2410 000
061 2411 336           LDM 16         /ISZ INSTRUCTIONS (APPROX=
062 2412 275           XCH R15        /20 USEC'S EACH)
063 2413 177   CONDLY, ISZ CONDLY,R17
    2414 013
064 2415 176           ISZ CONDLY,R16
    2416 013
065 2417 175           ISZ CONDLY,R15
    2420 013
066 2421 300           BBL 0
067
068            /SUBROUTINE FOR INCREMENTING AND TESTING
069            /THE WRITE COUNTER
070
071 2422 361   WRTCNT, CLC
072 2423 167           ISZ RTRN,R7
    2424 030
073 2425 166           ISZ RTRN,R6
    2426 030
074 2427 372           STC
075 2430 300   RTRN,   BBL 0
076
077            /SUBROUTINE TO SET UP RP6 AND RP7 FOR A RAM OR PROM
078            /ACQUISITION ON A WORD BASIS
079
080 2431 054   SETACP, FIM PUTPRM,RP6
    2432 200
081 2433 105           JUN .+4
    2434 037
082 2435 054   SETACR, FIM PUTRAM,RP6
    2436 220
083 2437 056           FIM ADDRSS,RP7
    2440 214
084 2441 372           STC            /SET CARRY FOR A WORD
085 2442 300           BBL 0          /ACQUISITION
086

001            /SUBROUTINE FOR SETTING UP POINTERS FOR VERIFICATION
002
003 2443 250   SETVER, LD R10         /SET UP RP6 AND RP7
004 2444 276           XCH R16
```

```
005 2445 250            LD R10
006 2446 362            IAC
007 2447 274            XCH R14
008 2450 251            LD R11
009 2451 277            XCH R17
010 2452 300            BBL 0
011
012                 /SUBROUTINE FOR COMPLEMENTING WRITE COUNT
013
014 2453 246    CMPWRT, LD R6           /COMPLEMENT WRITE COUNT
015 2454 364            CMA
016 2455 266            XCH R6
017 2456 247            LD R7
018 2457 364            CMA
019 2460 267            XCH R7
020 2461 246            LD R6            /SAVE COMPLEMENT WRITE COUNT
021 2462 270            XCH R10
022 2463 247            LD R7
023 2464 271            XCH R11
024 2465 334            LDM 20-4         /SET X4 COMPLETION COUNTER
025 2466 262            XCH R2
026 2467 300            BBL 0
027
028                 /SUBROUTINE TO SENSE WRITE LINE VERSUS WRITE
029                 /ALL MODE.
030                 /IF WRITE ALL MODE, THEN INCREMENT MSN OF ADDRESS
031                 /AND RETURN.
032                 /IF WRITE LINE MODE, THEN DO A 10 MILLISEC DELAY
033                 /AND SET COMPLETION COUNTER TO SKIP ON NEXT TEST.
034
035 2470 056    INCRCS, FIM OFLG0,RP7    /LOOK AT MODE FLAG
    2471 100
036 2472 057            SRC RP7          /CARRY TRUE SAYS WRITE
037 2473 356            RD2              /LINE MODE
038 2474 365            RAL
039 2475 022            JCN LINMOD,CARRY
    2476 115
040
041                 /IF WE GET HERE WE ARE IN WRITE ALL MODE
042
043 2477 056            FIM ADDRSS+2,RP7    /INCREMENT THIRD
    2500 216
                                            /NIBBLE OF ADDRESS
044
045 2501 057            SRC RP7
046 2502 361            CLC
047 2503 351            RDM
048 2504 362            IAC
049 2505 365            RAL
050 2506 365            RAL
051 2507 022            JCN GOBACK,CARRY
    2510 113
052 2511 366            RAR
053 2512 366            RAR
054 2513 340    GOBACK, WRM
055 2514 300            BBL 0
056
057                 /IF WE GET HERE WE ARE IN WRITE LINE MODE
058
059 2515 125    LINMOD, JMS DELAY        /DO A 10 MS DELAY
    2516 007
060 2517 337            LDM 17   /SET UP R0 TO SKIP ON
061 2520 260            XCH R0   /NEXT ISZ INSTRUCTION
062 2521 300            BBL 0
063
064                 /SUBROUTINE FOR SENSING
065                 /OVERKILL MODE
066
067 2522 052    OVKILQ, FIM OFLG0,RP5    /GET THE FLAG AND PUT IT
    2523 100
068 2524 053            SRC RP5          /IN CARRY, THEN RETURN
069 2525 355            RD1
070 2526 365            RAL
071 2527 300            BBL 0
072
073
```

```
074            /SUBROUTINE FOR CHECKING IF TWO CONSECUTIVE
075            /NIBBLES IN RAM ARE 0
076            /RP6 POINTS TO THE LSN
077
078 2530 336   ZEROQ,   LDM 20-2        /SET COMPLETION COUNTER
079 2531 261            XCH R1
080 2532 055   SFSG2,   SRC RP6
081 2533 351            RDM             /GET THE RAM NIBBLE
082 2534 364            CMA
083 2535 034            JCN SETCAR,NOT ZERO    /0?
    2536 144
084 2537 155            INC R15
085 2540 151            ISZ SFSG2,R1
    2541 132
086 2542 361   CLRCAR,  CLC             /DATA IS ZERO - CLR CARRY
087 2543 300            BBL 0
088 2544 372   SETCAR,  STC             /DATA IS NOT ZERO - SET
089 2545 300            BBL 0           /CARRY
090
091            /SUBROUTINE FOR CINCREMENTING ADDRESS REGISTER
092            /AND TESTING FOR COMPLETION
093
094 2546 336   TSTDNI,  LDM 20-2        /SET COMPLETION COUNTER
095 2547 261            XCH R1
096 2550 361            CLC
097 2551 056            FIM ADDRSS,RP7
    2552 214
098 2553 057   CONFIN,  SRC RP7
099 2554 321            LDM 1
100 2555 353            ADM             /ADD 1 TO LSN
101 2556 340            WRM
102 2557 157            INC R17
103 2560 024            JCN SFSG3,ZERO
    2561 163
104 2562 300            BBL 0   /FLAG WE ARE NOT DONE
105 2563 161   SFSG3,   ISZ CONFIN,R1
    2564 153
106 2565 301            BBL 1   /FLAG WE ARE DONE
107

001            /ACQUISITION SUBROUTINE - SECOND LEVEL SUBROUTINE
002
003            /THIS SUBROUTINE WILL GET THE RAW DATA FROM RAM/PROM
004            /ACCORDING TO THE BINARY NUMBER POINTED TO BY RP7
005            /(POINTS TO LSN) AND STORE THE CORRESPONDING SIX
006            /WORDS OR WORD OF RAM/PROM DATA IN A RAM SPECIFIED
007            /BY RP6 (R10,R11). THE CARRY BIT UPON ENTRY WILL
008            /SELECT WHETHER A LINE OF DATA OR A WORD OF DATA IS
009            /TO BE ACQUIRED.       CARRY=0->GET LINE OF DATA
010            /                      CARRY=1->GET WORD OF DATA
011            /CALLING STATEMENT=JMS ACQRAM FOR RAM ACQUISITION.
012            /UPON EXIT, RP6 AND RP7 WILL BE IN THEIR CALLING
013            /STATE.
014
015
016
017 2566 124   ACQRAM,  JMS SAVRGS      /SAVE CPU REGS
    2567 211
018
019
020            /DECIDE WHETHER TO READ A LINE OR WORD OF DATA
021
022 2570 022            JCN WORD,CARRY
    2571 176
023 2572 332            LDM 20-6        /SET LOOP COUNTER FOR A LINE
024 2573 260            XCH R0          /OF DATA
025 2574 105            JUN ACQ         /DO ACQUISITION CYCLE
    2575 200
026 2576 337   WORD,    LDM 20-1        /SET LOOP COUNTER FOR A WORD
027 2577 260            XCH R0          /OF DATA
028
```

```
029             /SEND ADDRESS
030
031  2600 124   ACQ,    JMS SNDADR
     2601 000
032
033             /NOW GET DATA
034
035  2602 124   CONACQ, JMS ACQIRE      /ACQUIRE THE DATA
     2603 015
036  2604 124           JMS REDDAT      /READ THE DATA
     2605 032
037
038             /TEST FOR COMPLETION
039
040  2606 160           ISZ INCR1;R0
     2607 213
041  2610 124           JMS RSTRGS      /RESTORE CPU REGS
     2611 321
042  2612 300           BBL 0
043
044             /INCREMENT ADDRESS
045
046  2613 124   INCR1,  JMS INCR
     2614 140
047  2615 105           JUN CONACQ      /READ NEXT WORD
     2616 202
048
049             PAUSE

001             /11 APR 74  SKB
002             /PROGRAM TO LOAD OR READ ANY RAM CELL OR STATUS
003             /CHARACTER OF A RAM REGISTER USING THE TEST
004             /PANEL.  THE PANEL HAS THREE BANKS OF SWITCHES,
005             /ONE BANK OF LIGHTS, AND A SINGLE LIGHT.
006             /TWO OF THE THREE BANKS ARE USED FOR ADDRESSING
007             /AND DATA   THE THIRD BANK IS USED FOR
008             /CONTROLLING THE OTHER TWO.  SEE BELOW.
009             /
010             /SWITCHES
011             /
012             /TEST       =0 EXECUTE IO
013             /           =1 ECECUTE JMS SUBR (THEN IO WHEN NOT TEST)
014             /UPPER LEFT  RAM AND REGISTER SELECT
015             /LOWER LEFT  CHARACTER SELECT, STATUS CHARACTER
016             /            INDICATOR, OR DATA INPUT
017             /RIGHT       CONTROL SWITCHES
018             /            SW3       ENTER ADDRESS
019             /            SW2 = 0 DATA INPUT FROM PANEL
020             /                = 1 DATA DISPLAY TO PANEL
021             /            SW1 = 0 LOWER LEFT SWITCHES ARE
022             /                    CHARACTER SELECT
023             /                = 1 LOWER LEFT SWITCHES ARE
024             /                    STATUS CHARACTER INDICATORS
025             /            SW0     ENTER OR DISPLAY DATA FROM
026             /                    THE CURRENT ADDRESS SELECTION
027             /
028             /WHEN ENTERING OR READING DATA FROM RAM CHARACTERS,
029             /THE RAM ADDRESS IS INCREMENTED AFTER THE ACTION TAKES
030             /PLACE ALLOWING SEQUENTIAL ADDRESSING OF THE RAM
031             /WITHOUT ADDRESS MANIPULATION.  STATUS CHARACTERS
032             /MUST BE ADDRESSED INDIVIDUALLY.  (SW3=SC3, SW2=SC2,
033             /ETC.)
034             /NOTE:  SW3 AND SW0 MUST BE RESET BEFORE THE ACTION
035             /TAKES PLACE.
036             /
037             /DISPLAY
038             /
039             /LIGHTS      ALL DATA (IN OR OUT) IS DISPLAYED
040             /
041             /TEST LAMP   ON INDICATES AN ILLEGAL ENTRY CONDITION
042             /            I.E., SW1=1 BUT NO SWITCHES SET IN THE
043             /            STATUS CHARACTER SELECT.
```

```
044        /
045        /CPU REGISTERS ARE SAVED IN R3R3C0-17.
046        /R1 IS NOT SAVED.  THE CARRY BIT IS SAVED IN B0
047        /OF R1.
```

```
001                  JOB RAM READ/LOAD PANEL CONTROL
002
003
004
005       6000       *6000
006
007
008                  SUBJOB EXEC
009 6000 021  START, JCN  CONIO; TEST        /LOOK AT "TEST"
    6001 012
010 6002 000         NOP
011 6003 000         NOP
012 6004 031         JCN  .; NOT TEST
    6005 004
013 6006 300         BBL
014 6007 000         NOP
015 6010 031         JCN  SAVREG; NOT TEST/SAVE CPU REG.
    6011 244
016 6012 040  CONIO, FIM  15!20 0; R0   /GET CONTROL SWITCHES
    6013 320
017 6014 041         SRC  R0
018 6015 352         RDR
019 6016 365         RAL             /PUT SW3 IN CARRY
020 6017 022         JCN  ADDRES; CARRY/READ ADDRESS IF CARRY TRUE
    6020 027
021 6021 366         RAR
022 6022 366         RAR             /PUT SW0 IN CARRY
023 6023 022         JCN  INOUT; CARRY /DATA SWITCH IS SET
    6024 050
024 6025 032         JCN  START; NOT CARRY /IF CARRY TRUE
    6026 000
025                  SUBJOB READ ADDRESS SWITCHES
026 6027 320  ADDRES, LDM 0          /TURN OFF ERROR INDICATOR
027 6030 342         WRR
028 6031 352         RDR             /READ SWITCHES AGAIN AND
029 6032 365         RAL    /WAIT FOR SWITCH TO BE RESET
030 6033 022         JCN  ADDRES; CARRY
    6034 027
031 6035 040         FIM  16!20 0; R0 /SWITCH IS RESET
    6036 340
032 6037 041         SRC  R0          /SELECT RAM & REGISTER ADDRESS
033 6040 352         RDR
034 6041 264         XCH  R4          /STORE ADDRESS IN R4-5
035 6042 140         INC  R0
036 6043 041         SRC  R0          /SELECT CHAR ADDR OR SC INDICATOR
037 6044 352         RDR
038 6045 265         XCH  R5
039
040 6046 032         JCN  START; NOT CARRY
    6047 000
041
042                  SUBJOB
```

```
001                  SUBJOB INPUT/DISPLAY DATA
002
003 6050 320  INOUT, LDM  0           /TURN OFF ERROR INDICATOR
004 6051 342         WRR
005 6052 352         RDR             /READ SWITCHES AGAIN AND
006 6053 366         RAR             /WAIT FOR SWITCH TO BE
007 6054 022         JCN  INOUT; CARRY /RESET
    6055 050
008 6056 366         RAR             /DATA DISPLAY OR DATA INPUT?
009 6057 366         RAR
```

```
010  6060 022              JCN OUT;CARRY    /DATA DISPLAY ON JUMP
     6061 164
011
012              /DATA INPUT - LOOK AT SW1 FOR CHARACTER OR SC
013
014  6062 365              RAL
015  6063 022              JCN INSC;CARRY   /INPUT SC ON JUMP
     6064 103
016  6065 040              FIM 17!20 0;R0
     6066 360
017  6067 041              SRC R0           /SELECT ROM PORT 9
018  6070 352              RDR              /READ DATA
019  6071 045              SRC R4           /STORE DATA IN PREVIOUSLY
020  6072 340              WRM              /SELECTED ADDRESS
021  6073 351              RDM              /READ STORED DATA
022  6074 041              SRC R0           /DATA TO DISPLAY
023  6075 342              WRR
024  6076 165              ISZ INCELL;R5    /STEP ADDRESS TO NEXT
     6077 101
025  6100 144              INC R4           /CELL
026  6101 032     INCELL,  JCN START;NOT CARRY
     6102 000
027
028              /STATUS CHARACTER INPUT
029
030  6103 040     INSC,    FIM 17!20 0;R0   /GET DATA & SAVE IN R2
     6104 360
031  6105 041              SRC R0
032  6106 352              RDR              /READ DATA
033  6107 342              WRR              /DISPLAY DATA
034  6110 262              XCH R2           /SAVE DATA
035  6111 245              LD R5            /DETERMINE WHICH SC TO LOAD
036  6112 366              RAR
037  6113 045              SRC R4           /SELECT RAM & REGISTER
038  6114 022              JCN INSC00;CARRY         /SC0 ON JUMP
     6115 136
039  6116 366              RAR
040  6117 022              JCN INSC10;CARRY         /SC1 ON JUMP
     6120 143
041  6121 366              RAR
042  6122 022              JCN INSC20;CARRY         /SC2 ON JUMP
     6123 150
043  6124 366              RAR
044  6125 022              JCN INSC30;CARRY         /SC3 ON JUMP
     6126 155
045  6127 040     ERRR,    FIM 15!20 0;R0   /NO SWITCHES SET
     6130 320
046  6131 041              SRC R0           /TURN ON ERROR LIGHT
047  6132 321              LDM 1
048  6133 342              WRR
049  6134 032              JCN START;NOT CARRY
     6135 000
050
051  6136 262     INSC00,  XCH R2           /INPUT TO SC0
052  6137 344              WR0
053  6140 354              RD0              /READ STATUS CHAR.
054  6141 022              JCN SCDIS;CARRY  /LOAD DISPLAY PORT
     6142 160
055
056  6143 262     INSC10,  XCH R2           /INPUT TO SC1
057  6144 345              WR1
058  6145 355              RD1
059  6146 022              JCN SCDIS;CARRY
     6147 160
060
061  6150 262     INSC20,  XCH R2           /INPUT TO SC2
062  6151 346              WR2
063  6152 356              RD2
064  6153 022              JCN SCDIS;CARRY
     6154 160
065
066  6155 262     INSC30,  XCH R2
067  6156 347              WR3
068  6157 357              RD3
069
```

```
070 6160 041    SCDIS,   SRC R0            /LOAD DISPLAY PORT
071 6161 342             WRR
072 6162 022             JCN START;CARRY
    6163 000
073                      SUBJOB

001             /DATA OUTPUT - LOOK AT SW1 FOR CHARACTER OR SC
002
003 6164 365   OUT,     RAL
004 6165 022            JCN OUTSC;CARRY    /OUTPUT SC ON JUMP
    6166 203
005 6167 045            SRC R4             /GET DATA
006 6170 351            RDM
007 6171 040   OUT10,   FIM 17!20 0;R0
    6172 360
008 6173 041            SRC R0
009 6174 342            WRR                /DISPLAY DATA
010 6175 165            ISZ OUTCEL;R5      /STEP ADDRESS
    6176 200
011 6177 144            INC R4
012 6200 372   OUTCEL,  STC
013 6201 022            JCN START;CARRY
    6202 000
014
015             /STATUS CHARACTER OUTPUT - DETERMINE WHICH CHARACTER
016
017 6203 045   OUTSC,   SRC R4
018 6204 245            LD R5
019 6205 366            RAR
020 6206 022            JCN OUTSC0;CARRY        /SC0 ON JUMP
    6207 223
021 6210 366            RAR
022 6211 022            JCN OUTSC1;CARRY        /SC1 ON JUMP
    6212 226
023 6213 366            RAR
024 6214 022            JCN OUTSC2;CARRY        /SC2 ON JUMP
    6215 231
025 6216 366            RAR
026 6217 022            JCN OUTSC3;CARRY        /SC3 ON JUMP
    6220 234
027 6221 032            JCN ERRR;NOT CARRY
    6222 127
028
029 6223 354   OUTSC0,  RD0
030 6224 022            JCN OUT10;CARRY
    6225 171
031
032 6226 355   OUTSC1,  RD1
033 6227 022            JCN OUT10;CARRY
    6230 171
034
035 6231 356   OUTSC2,  RD2
036 6232 022            JCN OUT10;CARRY
    6233 171
037
038 6234 357   OUTSC3,  RD3
039 6235 022            JCN OUT10;CARRY
    6236 171
040
041                     EJECT
042 6237 041   SAV10,   SRC R0
043 6240 340            WRM
044 6241 161            ISZ SAV20;R1
    6242 243
045 6243 300   SAV20,   BBL 0
046
047             /SAVE CPU REGISTERS
048
049 6244 260   SAVREG,  XCH R0
050 6245 040            FIM 17!20 0;R0
    6246 360
051 6247 134            JMS SAV10          /SAVE R0 IN CHAR 0
    6250 237
```

```
052 6251 367        TCC              /MOVE CARRY TO AC
053 6252 134        JMS SAV10        /SAVE CARRY IN CHAR 1
    6253 237
054 6254 262        XCH R2
055 6255 134        JMS SAV10        /R2 IN CHAR 2
    6256 237
056 6257 263        XCH R3
057 6260 134        JMS SAV10        /R3 ETC.
    6261 237
058 6262 264        XCH R4
059 6263 134        JMS SAV10
    6264 237
060 6265 265        XCH R5
061 6266 134        JMS SAV10
    6267 237
062 6270 266        XCH R6
063 6271 134        JMS SAV10
    6272 237
064 6273 267        XCH R7
065 6274 134        JMS SAV10
    6275 237
066 6276 270        XCH R10
067 6277 134        JMS SAV10
    6300 237
068 6301 271        XCH R11
069 6302 134        JMS SAV10
    6303 237
070 6304 272        XCH R12
071 6305 134        JMS SAV10
    6306 237
072 6307 273        XCH R13
073 6310 134        JMS SAV10
    6311 237
074 6312 274        XCH R14
075 6313 134        JMS SAV10
    6314 237
076 6315 275        XCH R15
077 6316 134        JMS SAV10
    6317 237
078 6320 276        XCH R16
079 6321 134        JMS SAV10
    6322 237
080 6323 277        XCH R17
081 6324 134        JMS SAV10
    6325 237
082 6326 114        JUN START
    6327 000
083     000    INOUTS=START
```

| | | | | |
|---|---|---|---|---|
| ABORTQ | 2047 | | CLRTTY | 0004* |
| ABORTT | 1235 | | CLRURT | 0001* |
| ABRT | 0004* | | CMPWRT | 2453 |
| ABRTT | 0066 | | COMMON | 0051* |
| ABRT1 | 1172 | | CONACQ | 2602 |
| ACQ | 2600 | | CONDLY | 2413 |
| ACQDON | 0001 | | CONFIN | 2553 |
| ACQIRE | 2015 | | CONIO | 6012 |
| ACQRAM | 2566 | | CONRED | 2117 |
| ADCAR | 1226 | | CONVER | 2171 |
| ADDRES | 6027 | | CPUSVR | 0240 |
| ADDRSS | 0214 | | CTRLP1 | 0060 |
| ADRAGN | 2004 | | CTRLP2 | 0100 |
| ALLWRT | 0004* | | CTRLP3 | 0240 |
| ARHPRT | 0040* | | CTRLP4 | 0260* |
| ARLPRT | 0000 | | DELAY | 2407 |
| ARMPRT | 0020* | | DISABQ | 0513 |
| BADLIN | 0502 | | DMPPRM | 0004 |
| BOMB | 0010* | | DNKLMQ | 1174 |
| BUSY | 0004 | | DONE | 0010 |
| CLRADR | 0670 | | ENDSCN | 0002* |
| CLRCAR | 2542* | | ERASE | 0554 |
| CLRPAN | 0002* | | ERROR | 0001 |
| CLRSCN | 0004* | | FRRR | 6127 |

| | | | |
|---|---|---|---|
| ERSEON | 0001 | RAMACQ | 0010* |
| FINIS | 1147 | RAMSAV | 0230 |
| FLGMUX | 0000 | RAMWRT | 2277* |
| GETPRM | 0200 | RAM1A | 2303 |
| GETRAM | 0220 | RAP0 | 0000 |
| GOBACK | 2513 | RAP1 | 0100* |
| HACPRT | 0020* | RAP2 | 0200 |
| HDTPRT | 0300* | RAP3 | 0300 |
| HLTCPU | 0002* | READ | 2111 |
| HPNPRT | 0200* | READY | 0004 |
| HRDPRT | 0160* | REDCON | 2036 |
| HTYPRT | 0220* | REDDAT | 2032 |
| IFLGH0 | 0160* | REDPRM | 2077 |
| IFLGH1 | 0161 | RIP0 | 0000 |
| IFLGH2 | 0162* | RIP1 | 0020 |
| IFLGH3 | 0163 | RIP10 | 0200* |
| IFLGS0 | 0100* | RIP11 | 0220* |
| IFLGS1 | 0101 | RIP12 | 0240* |
| IFLGS2 | 0102* | RIP13 | 0260* |
| IFLGS3 | 0103* | RIP14 | 0300 |
| ILLEGL | 0002 | RIP15 | 0320* |
| INCELL | 6101 | RIP16 | 0340* |
| INCR | 2140 | RIP17 | 0360* |
| INCRAD | 0001 | RIP2 | 0040* |
| INCRCS | 2470 | RIP3 | 0060* |
| INCR1 | 2613 | RIP4 | 0100* |
| INCR2 | 2134 | RIP5 | 0120* |
| INCWRT | 1162 | RIP6 | 0140 |
| INITZE | 0007 | RIP7 | 0160 |
| INOUT | 6050 | ROP0 | 0000 |
| INOUTS | 6000 | ROP1 | 0020 |
| INSC | 6103 | ROP10 | 0200 |
| INSC00 | 6136 | ROP11 | 0220 |
| INSC10 | 6143 | ROP12 | 0240 |
| INSC20 | 6150 | ROP13 | 0260 |
| INSC30 | 6155 | ROP14 | 0300 |
| INVLIN | 0010* | ROP15 | 0320* |
| INVREF | 0004* | ROP16 | 0340* |
| LACPRT | 0000* | ROP17 | 0360* |
| LDTPRT | 0200 | ROP2 | 0040 |
| LINMOD | 2515 | ROP3 | 0060 |
| LINWRT | 0010* | ROP4 | 0100 |
| LNDNQ | 1212 | ROP5 | 0120* |
| LNWRT | 0010 | ROP6 | 0140 |
| LRDPRT | 0140 | ROP7 | 0160* |
| LSTVER | 1057 | RP0 | 0000* |
| MASTER | 0024 | RP1 | 0002* |
| MNIT | 0001 | RP2 | 0004 |
| MONITR | 0044 | RP3 | 0006 |
| MOV3B | 0431 | RP4 | 0010* |
| NEXTAD | 1000 | RP5 | 0012 |
| NOVER | 2207 | RP6 | 0014 |
| NXTGET | 1063 | RP7 | 0016 |
| NXTPRM | 1013 | RSTRAM | 1073 |
| OFLG0 | 0100 | RSTRGS | 2321 |
| OFLG1 | 0120 | RSTWRT | 1204 |
| OUT | 6164 | RTRN | 2430 |
| OUTCEL | 6200 | RTURN | 2061 |
| OUTSC | 6203 | R0 | 0000 |
| OUTSC0 | 6223 | R1 | 0001 |
| OUTSC1 | 6226 | R10 | 0010 |
| OUTSC2 | 6231 | R11 | 0011 |
| OUTSC3 | 6234 | R12 | 0012 |
| OUT10 | 6171 | R13 | 0013 |
| OVKILQ | 2522 | R14 | 0014 |
| OVRKIL | 0010 | R15 | 0015 |
| PADPRT | 0300* | R16 | 0016 |
| PANRCV | 0006* | R17 | 0017 |
| PANXMT | 0005* | R2 | 0002 |
| PBSTRT | 0070 | R3 | 0003 |
| PRMACQ | 0004* | R4 | 0004 |
| PROG | 0002* | R5 | 0005 |
| PROGRM | 0055 | R6 | 0006 |
| PUTPRM | 0200 | R7 | 0007 |
| PUTRAM | 0220 | SAVAGN | 1023 |

| | |
|---|---|
| SAVREG | 6244 |
| SAVRGS | 2211 |
| SAV10 | 6237 |
| SAV20 | 6243 |
| SCDIS | 6160 |
| SELPRM | 0000 |
| SELRAM | 0001 |
| SETACP | 2431 |
| SETACR | 2435 |
| SETCAR | 2544 |
| SETVER | 2443* |
| SFSG | 0675 |
| SFSG1 | 0677 |
| SFSG2 | 2532 |
| SFSG3 | 2563 |
| SFSG4 | 1134 |
| SFSG5 | 1007 |
| SFSG6 | 0463 |
| SNDADR | 2000 |
| SNDDAT | 2062 |
| SND2 | 2066 |
| START | 6000 |
| STRTAC | 0010 |
| STRTER | 0002 |
| STRTWR | 0002 |
| TSTDN1 | 2546 |
| TSTDN2 | 1222 |
| TTYPCH | 0004* |
| TTYRCV | 0004* |
| TTYRED | 0010* |
| TTYVER | 0002* |
| TTYXMT | 0003* |
| UNPROG | 0004* |
| UPDATE | 0102 |
| UVON | 0563 |
| VERIFY | 2167 |
| WAIT1 | 0572 |
| WAIT2 | 0647 |
| WAIT3 | 0613 |
| WORD | 2576 |
| WORD1 | 2107 |
| WRITE | 2150 |
| WRTBZY | 0000 |
| WRTCNT | 2422 |
| WRTLIN | 0400 |
| WRTMDQ | 0122 |
| WRTNFG | 0010 |
| WRTRAM | 0010 |
| XOIS1 | 0543 |
| ZEROQ | 2530 |
| ZTADDR | 0663 |

If RROM 80 of the central processor is initially empty and a complete control program is desired to be placed within the central processor, it is possible to transfer this information to the random access memory 130 via the teletype interface 182. The teletype interface is a functional block consisting of electronic circuitry. The schematic diagram for this functional block as well as the remaining functional blocks of the reprogramming module and the programming panel are inclusively shown in FIGS. 15, 16, 17, 18, 19, 20, and 21. The teletype interface accepts paper tape information from a paper tape reader (see FIG. 2) and transfers this information to microprocessor 166 where it is interpreted and transferred to the random access memory and there stored representing the particular electrical lines of the control program.

It is thus apparent that when the programming panel is in the PROGRAM mode, information regarding electrical circuit lines may be readily entered into any existing program and also that entirely new programs may be transferred to the random access memory 130 by use of the teletype interface 182. It should be noted that when information from the teletype interface is to be read into the reprogramming module 34, it is necessary that the operator depress the READ push button 106 of the programming panel 66 (see FIG. 6).

While in the PROGRAM mode not only is the random access memory 130 capable of receiving additional information regarding new electrical circuit lines but it is also transferring this information via the control interface 126 to the central processor 30 where each electrical circuit line is repeatedly being solved every 5 milliseconds. Thus the present invention allows an operator to de-bug an existing control program or insert an entirely new control program and then de-bug it while the computer controller system is on-line and controlling external devices. This feature is of extreme importance in industrial control situations since it may be necessary in many circumstances to see what affect a new or an altered electrical circuit line will have on the total control of the industrial process.

It should also be noted that not only will new electrical circuit lines be added to a current program but that the same electrical circuit lines of the original control program, which may have been initially stored in the RROM, may also be altered by the operator.

Following the obtainment of the desired control program, the information within the reprogramming module concerning the electrical circuit lines may be transferred to the RROM 80 of the central processor 30. In order to perform this function, the programming panel key lock switch 86 must be placed in the WRITE mode. If all the information in the random access memory concerning the electrical circuit lines is to be entered in the RROM, then ALL push button 186 is then depressed. When this switch is depressed, the reprogramming module initiates the erasing of all the information in the RROM. This is performed by the microprocessor 166 sending control information to a RROM erase module 188 via control lines 190. The RROM erase module 188 then activates ultraviolet light source 83 which communicates through quartz window 84 to the RROM memory chips 80. The light is detected by an ultraviolet sensor 93 which indicates to the RROM erase module 188 that the light source is functioning properly.

While the RROM erase module 188 is causing the ultraviolet light source 83 to erase the information in the RROM memory chips, the microprocessor 166 is sensing the current state of all the memory bits in the RROM memory chips. The reason for this operation is that it takes approximately 2½ minutes to erase all the information in the RROM memory chips and thus the microprocessor ensures that all the information in these chips is erased before the RROM erase module is deactivated causing the ultraviolet light source 83 to be deactivated.

Once the microprocessor determines that all the information in the RROM memory chips is erased, the microprocessor initiates the reprogramming of these chips by causing the information stored in the random access memory 130 to be sequentially transferred to designated words of the memory chips as discussed above and as shown in FIG. 7A. In order to program these memory chips, it is necessary that approximately 50 volts be placed on each memory bit that is to be placed in the ON state. Since under normal operation approximately 12 volts DC is used, it is necessary that the power supply 142 in the reprogramming module be capable of supplying the 50 volts DC when the RROM memory chips are to be reprogrammed. In such a case, the microprocessor sends a signal to a timing and reset control module 194 which in turn transfers a signal to the programmable power supply 142 via circuit line 196. The power supply then transmits to the RROM the necessary 50 volt DC current via power lines 198.

After all the information in the random access memory has been transferred in the proper form to the designated areas in the RROM memory chips, the microprocessor 166 terminates the WRITE operation and causes this completion of the WRITE operation to be displayed in one of a number of special display areas 167, 169, 171, 173, and 175 of the display window 92 of the programming panel. The other display areas are used to show error signals generated by the microprocessor in response to a fault in the computer controller system or an impermissible entry on the programming panel.

If only an additional line or lines is desired to be added to the control program originally stored in the RROM 80, it is possible to program in this information without first erasing all the information in the RROM. To do this operation, the key lock switch 86 is first placed in the WRITE mode and then the WRITE LINE push button 110 is depressed. At this time, the microprocessor 166 causes the particular line chosen on key pad switches 88 to be entered into its designated area of the RROM memory chips 80. If the line number chosen on the key pad 173, switches is the same as a previously stored line in the RROM memory chips, the new information desired for this particular line may be entered into the RROM if this new information comprises the changing of certain bits from a $\phi$ state to a 1 state. If this new information requires a previously programmed 1 bit to be placed in the 0 state, the desired change may not be performed since it is impossible to selectively erase bit locations in the ultraviolet memory chips. In this case, the microprocessor, through the panel interface 168 causes an error signal to be shown in one of the error display areas 169, 171, 173 or 175 of display window 92.

It should be noted, as discussed above, that it is always possible to cause a previously entered electrical circuit line to be disabled in the OFF state without erasing the entire memory of the RROM memory chips. This is because a 1 may always be entered into the X1 and X2 positions of two of the twelve-bit data words comprising one electrical circuit line (see FIGS. 7C and 7E). Once all the information with respect to a particular control program has been properly transferred to the RROM memory chips, it is possible to remove the reprogramming module 34 from the central processor 30 and replace the reprogramming module with the power supply module 32. The power supply module then supplies the necessary electrical power to the central processor and also prevents the RROM memory chips from being erased by stray ultraviolet light. If at a later time, it is desired to observe the electrical conditions of these electrical circuit lines or to change or even to write in a new control program, the reprogramming module 134 is again connected to the central processor 30 and the operations described above are repeated with respect to the desired change.

Thus a computer controller system has been described that utilizes reprogrammable "read only" memory chips to store the control program selected by the operator to control and monitor an industrial process. The computer controller system allows the control program to be varied by an operator while the system is on-line.

It should be noted that although hardwire electronics were disclosed with respect to the central processor, that the solving of the electrical circuit lines could also be performed by a digital computer. In addition it is apparent to one skilled in the art that the reprogrammable "read only" memory chips may be used with central processors that perform functions other than the solving of electrical circuit lines. It is therefore also apparent that the reprogramming assembly that enters, varies, and monitors these memory chips may do so when these chips are providing the variable memory for such non-electrical circuit line solving central processors.

Having described the invention what is claimed is:
1. An industrial computer controller for monitoring and controlling external devices by solving an electrical ladder-type control circuit having a plurality of circuit lines, a plurality of spaces in each line, each space providing for the inclusion of one type of a plurality of types of electrical elements comprising elements the condition of which is a function of a referenced condition, said industrial computer controller comprising in combination:
   A. A central processor for solving the electrical circuit lines including the generation of circuit line condition specifying information;
   B. an input/output assembly communicating with the central processor for receiving, transforming, and transferring at least a portion of said circuit line condition specifying information to intercommunicating external devices and for receiving, transforming, and transferring at least a portion of the information generated by said external devices to said central processor;
   C. A variable memory for the storing of said electrical ladder-type control circuit;
   D. A housing incorporating said central processor and said variable memory; and
   E. A reprogramming assembly removably interconnected with said housing and communicating with said central processor and said variable memory for generating, monitoring and varying said electrical ladder-type control circuit and for storing said varied control circuit into said variable memory.

2. An industrial computer controller as defined in claim 1 wherein said variable memory is an ultraviolet light erasable "read only" addressable memory.

3. An industrial computer controller as defined in claim 2 wherein said housing provides means for an external ultraviolet light source to impinge on said variable memory.

4. An industrial computer controller as defined in claim 3 wherein said reprogramming assembly further incorporates an ultraviolet light source communicating with said variable memory when said reprogramming assembly is interconnected with said housing.

5. An industrial computer controller as defined in claim 1, wherein said input/output assembly further comprises an input multiplexer portion for scanning input information and said central processor further comprises first means for sequentially receiving and accumulating information from the input multiplexer portion of said input/output assembly and second means for transferring to other areas of said central processor information generated by the input multiplexer portion of the input/output assembly if said information is received by said accululator within a predetermined amount of time.

6. An industrial computer controller as defined in claim 5, wherein said means for sequentially receiving and accumulating information from said input/output assembly comprises shift registers.

7. An industrial computer controller as defined in claim 1, wherein said input/output assembly further comprises an input multiplexer portion for scanning input information and said central processor further comprises first means for sequentially receiving and accumulating information from the input multiplexer portion of said input/output assembly and second means for transferring to other areas of said central processor information generated by said input multiplexer portion of the input/output assembly when the consecutively sampled values of said information obtains at least one non-zero sample following a predetermined number of sampling periods.

8. An industrial computer controller as defined in claim 1 wherein said reprogramming assembly incorporates a programming panel comprising in combination:
   A. Manually operable means for specifying to the reprogramming assembly one of a plurality of circuit lines of said electrical ladder-type control circuit;
   B. Manually operable means for specifying to the reprogramming assembly one type of the plurality of types of electrical elements;
   C. Manually operable means for specifying to the reprogramming assembly a reference to the circuit line condition specifying means in the electrical ladder-type control circuit which is to control the condition of said specified type of electrical element; and
   D. Manually operable means for specifying to the reprogramming assembly one of the spaces in the specified circuit line of the electrical ladder-type control circuit into which the specified type of electrical element is to be entered.

9. An industrial computer controller as defined in claim 8 wherein said plurality of types of electrical elements specifiable by said manually operable means of said programming panel comprises normally open switches, normally closed switches, normally open parallel switches, and normally closed parallel switches, and wherein said manually operable means for specifying to the reprogramming assembly one type of the plurality of types of electrical elements comprises:
   A. A first switch mounted on the programming panel for specifying a normally open switch;
   B. A second switch mounted on the programming panel for specifying a normally closed switch;
   C. A third switch mounted on the programming panel for specifying a normally open parallel switch; and
   D. A fourth switch mounted on the programming panel for specifying a normally closed parallel switch.

10. An industrial computer controller as defined in claim 8 wherein said programming panel incorporates means for viewing an entire electrical circuit line at one particular time.

11. An industrial computer controller as defined in claim 8 wherein said programming panel incorporates means for sequentially viewing numerically higher or lower electrical circuit lines than a presently viewed electrical circuit line.

12. An industrial computer controller as defined in claim 8 wherein said programming panel provides means for viewing an electrical circuit line to which a currently viewed electrical circuit line is referenced.

13. An industrial computer controller as defined in claim 12 wherein said means for viewing an electrical circuit line to which a currently viewed electrical circuit line is referenced further provides means for reviewing the formerly viewed electrical circuit line.

14. An industrial computer controller of clam 8 wherein said programming panel further comprises means for viewing diagnostic signals generated by said reprogramming assembly.

15. An industrial computer controller as defined in claim 8 wherein said programming panel removably interconnects with the remainder of said reprogramming assembly.

16. An industrial computer controller as defined in claim 8 wherein said programming panel further comprises means for causing the remainder of the reprogramming assembly to generate, monitor or vary the electrical ladder-type control circuit.

17. An industrial computer controller as defined in claim 1 wherein the generating, monitoring, and varying said electrical ladder-type control circuit and storing said varied control circuit into said variable memory by said reprogramming assembly is performed while said computer controller is monitoring and controlling external devices.

18. A reprogramming apparatus removably interconnected to an electronic device utilizing ultraviolet erasable "read only" memory chips comprising in combination:
   A. An ultraviolet light source positioned in in juxtaposed spaced relationship to said memory chips when said reprogramming assembly is interconnected with said electronic structure;
   B. Reprogramming means communicating with said electronic structure and said memory chips; and
   C. Monitoring means communicating with said electronic structure and said memory chips; whereby information in said memory chips is alterable while said chips are mounted in said elctronic device.

19. An industrial computer controller as defined in claim 1, further comprising:
   F. a power supply removably interconnected with said housing and communicating with said central processor and said variable memory for the generation and transferral of electromotive energy.

20. An improved programming panel for programming a computer controller to perform control functions, the computer controller having stored therein a central processor for communicating with the programming panel and for simulating an electrical ladder-type control circuit having a plurality of circuit lines, a plurality of spaces in each circuit line, each space providing for the inclusion of one type of a plurality of types of electrical elements comprising elements the condition of which is a function of a referenced condition, and each of said circuit lines further providing circuit line condition specifying means controlled in accordance with the electrical condition of its respective circuit line or an external input controlling a line, at least some of said condition specifying means controlling outputs, the executive program stimulating specified ones of the plurality of electrical elements in speci fied spaces to complete a simulated control circuit, the programming panel having:
- A. manually operable means for specifying to the computer controller one of a plurality of circuit lines of said electrical ladder-type control circuit;
- B. manually operable means for specifying to the computer controller one type of the plurality of types of electrical elements;
- C. manually operable means for specifying to the computer controller a reference to the circuit line condition specifying means in the electrical ladder-type control circuit which is to control the condition of said specified type of electrical elements;
- D. manually operable means for specifying to the computer controller one of the spaces in the specified circuit line of the electrical ladder-type control circuit to which the specified type of electrical element is to be entered; wherein the improvement comprises:
- E. means for sequentially viewing numerically higher or lower electrical circuit lines than a presently viewed electrical circuit line.

21. An improved programming panel for programming a computer controller to perform control functions, the computer controller having stored therein a central processor for communicating with the programming panel and for simulating an electrical ladder-type control circuit having a plurality of circuit lines, a plurality of spaces in each circuit line, each space providing for the inclusion of one type of a plurality of types of electrical elements comprising elements the condition of which is a function of a referenced condition, and each of said circuit lines further providing circuit line condition specifying means controlled in accordance with the electrical condition of its respective circuit line or an external input controlling a line, at least some of said condition specifying means controlling outputs, the executive program simulating specified ones of the plurality of electrical elements in specified spaces to complete a simulated control circuit, the programming panel having:
- A. manually operable means for specifying to the computer controller one of a plurality of circuit lines of said electrical ladder-type control circuit;
- B. manually operable means for specifying to the computer controller one type of the plurality of types of electrical elements;
- C. manually operable means for specifying to the computer controller a reference to the circuit line condition specifying means in the electrical ladder-type control circuit which is to control the condition of said specified type of electrical elements;
- D. manually operable means for specifying to the computer controller one of the spaces in the specified circuit line of the electrical ladder-type control circuit to which the specified type of electrical element is to be entered; wherein the improvement comprises:
- E. means for viewing an electrical circuit line to which a currently viewed electrical circuit line is referenced.

22. A programming panel as defined in claim 21, wherein said means for viewing an electrical circuit line to which a currently viewed electrical circuit line is referenced further provides means for re-viewing the formerly viewed electrical circuit line.

23. A programming panel as defined in claim 21, wherein said programming panel further comprises:
- F. means for viewing diagnostic signals generated by said computer controller.

* * * * *

UNITED STATES PATENT AND TRADEMARK OFFICE
CERTIFICATE OF CORRECTION

PATENT NO. : 3,944,984
DATED : March 16, 1976
INVENTOR(S) : Richard E. Morley and Michael P. Greenberg It is certified that error appears in the above-identified patent and that said Letters Patent are hereby corrected as shown below:

```
Column 8, line 20, "protion" should be --portion--
Column 10, line 11, "present" should be --preset--
Column 14, line 43, "ever" should be --every--
Column 16, line 32, "may" should be --may be--
Column 16, line 33, first occurrence of "reference" should
     be --referenced to--
Column 18, line 22, "programming" should be --is--
Following Line 3, column 20, insert --Table 1--
Following Line 9, column 117, insert --Table 2--
Column 175, line 32, please delete "173,"
Column 177, line 4, "accululator" should be --accumulator--
Column 178, line 13, "clam" should be --claim--
Column 178, line 36, delete the second occurrence of "in"
Column 178, line 38, "assembly" should be --apparatus--
Column 178, line 39, "structure" should be --device--
Column 178, line 41, "structure" should be --device--
Column 178, line 43, "structure" should be --device--
Column 178, line 45, "elctronic" should be --electronic--
Column 178, line 67, "stimulating" should be --simulating--.
```

Signed and Sealed this

Twentieth Day of June 1978

[SEAL]

Attest:

RUTH C. MASON
Attesting Officer

DONALD W. BANNER
Commissioner of Patents and Trademarks